US010419529B2

(12) United States Patent
Kalgi

(10) Patent No.: US 10,419,529 B2
(45) Date of Patent: *Sep. 17, 2019

(54) HYBRID APPLICATIONS UTILIZING DISTRIBUTED MODELS AND VIEWS APPARATUSES, METHODS AND SYSTEMS

(71) Applicant: VISA INTERNATIONAL SERVICE ASSOCIATION, San Francisco, CA (US)

(72) Inventor: Avinash Kalgi, Kirkland, WA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,288

(22) Filed: Nov. 6, 2018

(65) Prior Publication Data

US 2019/0075156 A1 Mar. 7, 2019

Related U.S. Application Data

(63) Continuation of application No. 15/406,325, filed on Jan. 13, 2017, now Pat. No. 10,154,084, which is a (Continued)

(51) Int. Cl.

| | |
|---|---|
| ***H04L 29/08*** | (2006.01) |
| ***G06F 9/44*** | (2018.01) |

(Continued)

(52) U.S. Cl.

CPC ............ *H04L 67/10* (2013.01); *G06F 16/958* (2019.01); *G06F 17/2235* (2013.01);

(Continued)

(58) Field of Classification Search

CPC ............... G06F 3/0484; G06F 3/04817; G06F 17/2247; G06F 17/211; G06F 17/246;

(Continued)

(56) References Cited

U.S. PATENT DOCUMENTS

| | | | |
|---|---|---|---|
| 789,106 | A | 5/1905 | Seymour |
| 4,896,363 | A | 1/1990 | Taylor |

(Continued)

FOREIGN PATENT DOCUMENTS

| | | | |
|---|---|---|---|
| CN | 1841425 | A | 10/2006 |
| CN | 101025806 | A | 8/2007 |

(Continued)

OTHER PUBLICATIONS

David Breitkopf, "ACS to Take Over Mich. WC Distribution Program", American Banker, New York, NY: Jul. 20, 2006, vol. 171. Issue 138, p. 6.

(Continued)

*Primary Examiner* — Thuy Dao

(74) *Attorney, Agent, or Firm* — Loeb & Loeb LLP

(57) ABSTRACT

The HYBRID APPLICATIONS UTILIZING DISTRIBUTED MODELS AND VIEWS APPARATUSES, METHODS AND SYSTEMS ("HAP") transform hybrid application user inputs using HAP components into web-view secured data populated application views. In some implementations, the disclosure provides a processor-implemented method of providing distributed model views utilizing a hybrid application environment.

20 Claims, 106 Drawing Sheets

Example Data Flow: Hybrid Application Distributed View Processing

Related U.S. Application Data continuation of application No. 14/156,025, filed on Jan. 15, 2014, now Pat. No. 9,582,598, which is a continuation-in-part of application No. 13/542,443, filed on Jul. 5, 2012, now Pat. No. 10,121,129, said application No. 15/406,325 is a continuation-in-part of application No. 13/802,658, filed on Mar. 13, 2013, now Pat. No. 9,355,393, which is a continuation-in-part of application No. 13/624,779, filed on Sep. 21, 2012, which is a continuation-in-part of application No. 13/589,053, filed on Aug. 17, 2012, now abandoned.

(60) Provisional application No. 61/504,348, filed on Jul. 5, 2011, provisional application No. 61/612,368, filed on Mar. 18, 2012, provisional application No. 61/525,168, filed on Aug. 18, 2011, provisional application No. 61/537,421, filed on Sep. 21, 2011, provisional application No. 61/588,620, filed on Jan. 19, 2012, provisional application No. 61/668,441, filed on Jul. 5, 2012.

(51) Int. Cl.

| | |
|---|---|
| ***G06F 9/445*** | (2018.01) |
| ***G06F 17/22*** | (2006.01) |
| ***G06Q 40/00*** | (2012.01) |
| ***G06F 16/958*** | (2019.01) |
| ***G06Q 20/12*** | (2012.01) |
| ***G06Q 20/20*** | (2012.01) |
| ***G06Q 20/32*** | (2012.01) |
| ***G06Q 20/36*** | (2012.01) |
| ***G06Q 20/42*** | (2012.01) |
| ***G06Q 30/06*** | (2012.01) |
| ***G06Q 20/22*** | (2012.01) |
| ***G06Q 20/28*** | (2012.01) |
| ***G06Q 20/34*** | (2012.01) |
| ***G06Q 40/02*** | (2012.01) |

(52) U.S. Cl.

CPC ............. *G06Q 20/12* (2013.01); *G06Q 20/20* (2013.01); *G06Q 20/227* (2013.01); *G06Q 20/28* (2013.01); *G06Q 20/325* (2013.01); *G06Q 20/3226* (2013.01); *G06Q 20/3227* (2013.01); *G06Q 20/3276* (2013.01); *G06Q 20/3278* (2013.01); *G06Q 20/3552* (2013.01); *G06Q 20/363* (2013.01); *G06Q 20/425* (2013.01); *G06Q 30/0601* (2013.01); *G06Q 40/00* (2013.01); *G06Q 40/02* (2013.01); *H04L 67/16* (2013.01); *H04L 67/20* (2013.01)

(58) Field of Classification Search

CPC ........ G06F 8/20; G06F 9/451; G06F 17/2235; G06F 16/958; G06F 16/972; H04L 67/02; H04L 67/10; H04L 67/34; H04L 67/2247; H04L 67/211; H04L 67/16; H04W 4/60

See application file for complete search history.

(56) References Cited

U.S. PATENT DOCUMENTS

| | | | |
|---|---|---|---|
| 5,177,342 | A | 1/1993 | Adams |
| 5,221,838 | A | 6/1993 | Gutman |
| 5,237,164 | A | 8/1993 | Takada |
| 5,311,594 | A | 5/1994 | Penzias |
| 5,384,449 | A | 1/1995 | Peirce |
| 5,446,890 | A | 8/1995 | Renslo |
| 5,459,656 | A | 10/1995 | Fields |
| 5,500,513 | A | 3/1996 | Langhans |
| 5,510,777 | A | 4/1996 | Pilc |
| 5,521,362 | A | 5/1996 | Powers |
| 5,526,409 | A | 6/1996 | Conrow |
| 5,530,438 | A | 6/1996 | Bickham |
| 5,536,045 | A | 7/1996 | Adams |
| 5,590,038 | A | 12/1996 | Pitroda |
| 5,613,012 | A | 3/1997 | Hoffman |
| 5,615,110 | A | 3/1997 | Wong |
| 5,615,264 | A | 3/1997 | Kazmierczak |
| 5,621,201 | A | 4/1997 | Langhans |
| 5,649,118 | A | 7/1997 | Carlisle |
| 5,655,007 | A | 8/1997 | McAllister |
| 5,748,737 | A | 5/1998 | Daggar |
| 5,781,438 | A | 7/1998 | Lee |
| 5,796,832 | A | 8/1998 | Kawan |
| 5,815,657 | A | 9/1998 | Williams |
| 5,850,446 | A | 12/1998 | Berger |
| 5,878,337 | A | 3/1999 | Joao |
| 5,883,810 | A | 3/1999 | Franklin |
| 5,884,271 | A | 3/1999 | Pitroda |
| 5,892,838 | A | 4/1999 | Brady |
| 5,903,830 | A | 5/1999 | Joao |
| 5,914,472 | A | 6/1999 | Foladare |
| 5,943,624 | A | 8/1999 | Fox |
| 5,953,710 | A | 9/1999 | Fleming |
| 5,956,699 | A | 9/1999 | Wong |
| 5,963,924 | A | 10/1999 | Williams |
| 6,000,832 | A | 12/1999 | Franklin |
| 6,006,200 | A | 12/1999 | Boies |
| 6,014,635 | A | 1/2000 | Harris |
| 6,044,360 | A | 3/2000 | Picciallo |
| 6,052,675 | A | 4/2000 | Checchio |
| 6,064,990 | A | 5/2000 | Goldsmith |
| 6,092,053 | A | 7/2000 | Boesch |
| 6,160,903 | A | 12/2000 | Hamid |
| 6,163,771 | A | 12/2000 | Walker |
| 6,182,894 | B1 | 2/2001 | Hackett |
| 6,195,447 | B1 | 2/2001 | Ross |
| 6,202,052 | B1 | 3/2001 | Miller |
| 6,202,933 | B1 | 3/2001 | Poore |
| 6,226,624 | B1 | 5/2001 | Watson |
| 6,227,447 | B1 | 5/2001 | Campisano |
| 6,236,981 | B1 | 5/2001 | Hill |
| 6,263,447 | B1 | 7/2001 | French |
| 6,267,292 | B1 | 7/2001 | Walker |
| 6,327,578 | B1 | 12/2001 | Linehan |
| 6,336,099 | B1 | 1/2002 | Barnett |
| 6,339,766 | B1 | 1/2002 | Gephart |
| 6,341,724 | B2 | 1/2002 | Campisano |
| 6,381,584 | B1 | 4/2002 | Ogram |
| 6,385,596 | B1 | 5/2002 | Wiser |
| 6,385,655 | B1 | 5/2002 | Smith |
| 6,422,462 | B1 | 7/2002 | Cohen |
| 6,425,523 | B1 | 7/2002 | Shem-Ur |
| 6,456,984 | B1 | 9/2002 | Demoff |
| 6,473,500 | B1 | 10/2002 | Risafi |
| 6,529,725 | B1 | 3/2003 | Joao |
| 6,535,855 | B1 | 3/2003 | Cahill |
| 6,560,581 | B1 | 5/2003 | Fox |
| 6,592,044 | B1 | 7/2003 | Wong |
| 6,601,761 | B1 | 8/2003 | Katis |
| 6,636,833 | B1 | 10/2003 | Flitcroft |
| 6,735,572 | B2 | 5/2004 | Landesmann |
| 6,748,367 | B1 | 6/2004 | Lee |
| 6,805,287 | B2 | 10/2004 | Bishop |
| 6,853,982 | B2 | 2/2005 | Smith |
| 6,857,073 | B2 | 2/2005 | French |
| 6,865,522 | B1 | 3/2005 | Gastiger |
| 6,873,974 | B1 | 3/2005 | Schutzer |
| 6,879,965 | B2 | 4/2005 | Fung |
| 6,891,953 | B1 | 5/2005 | DeMello |
| 6,898,598 | B2 | 5/2005 | Himmel |
| 6,901,387 | B2 | 5/2005 | Wells |
| 6,925,439 | B1 | 8/2005 | Pitroda |
| 6,931,382 | B2 | 8/2005 | Laage |
| 6,934,528 | B2 | 8/2005 | Loureiro |
| 6,938,019 | B1 | 8/2005 | Uzo |
| 6,941,285 | B2 | 9/2005 | Sarcanin |
| 6,944,595 | B1 | 9/2005 | Graser |

(56) References Cited

U.S. PATENT DOCUMENTS

| | | | | |
|---|---|---|---|---|
| 6,980,670 | B1 | 12/2005 | Hoffman | |
| 6,990,470 | B2 | 1/2006 | Hogan | |
| 6,991,157 | B2 | 1/2006 | Bishop | |
| 6,999,943 | B1 | 2/2006 | Johnson | |
| 7,024,383 | B1 | 4/2006 | Mancini | |
| 7,028,052 | B2 | 4/2006 | Chapman | |
| 7,047,041 | B2 | 5/2006 | Vanska | |
| 7,051,002 | B2 | 5/2006 | Keresman, III | |
| 7,051,929 | B2 | 5/2006 | Li | |
| 7,069,249 | B2 | 6/2006 | Stolfo | |
| 7,089,208 | B1 | 8/2006 | Levchin | |
| 7,096,003 | B2 | 8/2006 | Joao | |
| 7,103,576 | B2 | 9/2006 | Mann | |
| 7,111,789 | B2 | 9/2006 | Rajasekaran | |
| 7,113,930 | B2 | 9/2006 | Eccles | |
| 7,117,172 | B1 | 10/2006 | Black | |
| 7,136,835 | B1 | 11/2006 | Flitcroft | |
| 7,155,411 | B1 | 12/2006 | Blinn | |
| 7,167,903 | B2 | 1/2007 | Percival | |
| 7,177,835 | B1 | 2/2007 | Walker | |
| 7,177,848 | B2 | 2/2007 | Hogan | |
| 7,180,457 | B2 | 2/2007 | Trott | |
| 7,194,437 | B1 | 3/2007 | Britto | |
| 7,206,847 | B1 | 4/2007 | Alberth | |
| 7,209,561 | B1 | 4/2007 | Shankar | |
| 7,212,979 | B1 | 5/2007 | Matz | |
| RE39,736 | E | 7/2007 | Morrill | |
| 7,264,154 | B2 | 9/2007 | Harris | |
| 7,266,557 | B2 | 9/2007 | Aschen | |
| 7,268,667 | B2 | 9/2007 | Beenau | |
| 7,268,668 | B2 | 9/2007 | Beenau | |
| 7,287,692 | B1 | 10/2007 | Patel | |
| 7,290,704 | B1 | 11/2007 | Ball | |
| 7,292,999 | B2 | 11/2007 | Hobson | |
| 7,313,546 | B2 | 12/2007 | Alarcon-Luther | |
| 7,318,049 | B2 | 1/2008 | Iannacci | |
| 7,337,119 | B1 | 2/2008 | Geschwender | |
| 7,337,144 | B1 | 2/2008 | Blinn | |
| 7,343,149 | B2 | 3/2008 | Benco | |
| 7,343,351 | B1 | 3/2008 | Bishop | |
| 7,349,885 | B2 | 3/2008 | Gangi | |
| 7,350,230 | B2 | 3/2008 | Forrest | |
| 7,353,382 | B2 | 4/2008 | Labrou | |
| 7,356,505 | B2 | 4/2008 | March | |
| 7,357,310 | B2 | 4/2008 | Calabrese | |
| 7,359,880 | B2 | 4/2008 | Abel | |
| 7,373,669 | B2 | 5/2008 | Eisen | |
| 7,379,899 | B1 | 5/2008 | Junger | |
| 7,379,919 | B2 | 5/2008 | Hogan | |
| 7,392,222 | B1 | 6/2008 | Hamilton | |
| RE40,444 | E | 7/2008 | Linehan | |
| 7,395,242 | B2 | 7/2008 | Blinn | |
| 7,398,250 | B2 | 7/2008 | Blinn | |
| 7,413,113 | B1 | 8/2008 | Zhu | |
| 7,415,443 | B2 | 8/2008 | Hobson | |
| 7,415,469 | B2 * | 8/2008 | Singh | G06F 17/2229 |
| 7,427,021 | B2 | 9/2008 | Kemper | |
| 7,444,676 | B1 | 10/2008 | Asghari-Kamrani | |
| 7,450,966 | B2 | 11/2008 | Vanska | |
| 7,469,151 | B2 | 12/2008 | Khan | |
| 7,477,780 | B2 | 1/2009 | Boncyk | |
| 7,499,889 | B2 | 3/2009 | Golan | |
| 7,500,607 | B2 | 3/2009 | Williams | |
| 7,505,935 | B2 | 3/2009 | Mendiola | |
| 7,533,064 | B1 | 5/2009 | Boesch | |
| 7,536,318 | B1 | 5/2009 | Wolfe | |
| 7,536,335 | B1 | 5/2009 | Weston | |
| 7,536,360 | B2 | 5/2009 | Stolfo | |
| 7,548,889 | B2 | 6/2009 | Bhambri | |
| 7,567,934 | B2 | 7/2009 | Flitcroft | |
| 7,567,936 | B1 | 7/2009 | Peckover | |
| 7,571,139 | B1 | 8/2009 | Giordano | |
| 7,571,140 | B2 | 8/2009 | Weichert | |
| 7,571,142 | B1 | 8/2009 | Flitcroft | |
| 7,580,898 | B2 | 8/2009 | Brown | |
| 7,584,153 | B2 | 9/2009 | Brown | |
| 7,593,858 | B2 | 9/2009 | Matz | |
| 7,593,896 | B1 | 9/2009 | Flitcroft | |
| 7,603,311 | B1 | 10/2009 | Yadav-Ranjan | |
| 7,606,560 | B2 | 10/2009 | Labrou | |
| 7,627,531 | B2 | 12/2009 | Breck | |
| 7,627,895 | B2 | 12/2009 | Gifford | |
| 7,630,937 | B1 | 12/2009 | Mo | |
| 7,634,295 | B2 | 12/2009 | Hayaashi | |
| 7,644,037 | B1 | 1/2010 | Ostrovsky | |
| 7,644,859 | B1 | 1/2010 | Zhu | |
| 7,650,314 | B1 | 1/2010 | Saunders | |
| 7,660,749 | B2 | 2/2010 | Koski | |
| 7,668,754 | B1 | 2/2010 | Bridgelall | |
| 7,669,760 | B1 | 3/2010 | Zettner | |
| 7,676,434 | B2 | 3/2010 | Evans | |
| 7,685,037 | B2 | 3/2010 | Reiners | |
| 7,685,067 | B1 | 3/2010 | Britto | |
| 7,698,221 | B2 | 4/2010 | Blinn | |
| 7,702,578 | B2 | 4/2010 | Fung | |
| 7,707,113 | B1 | 4/2010 | Dimartino | |
| 7,707,120 | B2 | 4/2010 | Dominguez | |
| 7,708,194 | B2 | 5/2010 | Vawter | |
| 7,708,198 | B2 | 5/2010 | Gangi | |
| 7,712,655 | B2 | 5/2010 | Wong | |
| 7,712,658 | B2 | 5/2010 | Gangi | |
| 7,734,527 | B2 | 6/2010 | Uzo | |
| 7,739,194 | B2 | 6/2010 | Blinn | |
| 7,742,984 | B2 | 6/2010 | Mohsenzadeh | |
| 7,753,265 | B2 | 7/2010 | Harris | |
| 7,770,789 | B2 | 8/2010 | Oder | |
| 7,774,076 | B2 | 8/2010 | Skowronek | |
| 7,783,569 | B2 | 8/2010 | Abel | |
| 7,784,684 | B2 | 8/2010 | Labrou | |
| 7,784,685 | B1 | 8/2010 | Hopkins | |
| 7,793,851 | B2 | 9/2010 | Mullen | |
| 7,797,215 | B1 | 9/2010 | Zerenner | |
| 7,801,826 | B2 | 9/2010 | Labrou | |
| 7,801,829 | B2 | 9/2010 | Gray | |
| 7,802,719 | B2 | 9/2010 | Johnson | |
| 7,805,376 | B2 | 9/2010 | Smith | |
| 7,805,378 | B2 | 9/2010 | Berardi | |
| 7,810,720 | B2 | 10/2010 | Lovett | |
| 7,818,264 | B2 | 10/2010 | Hammad | |
| 7,819,307 | B2 | 10/2010 | Lyons | |
| 7,827,288 | B2 | 11/2010 | Da | |
| 7,828,206 | B2 | 11/2010 | Hessburg | |
| 7,828,220 | B2 | 11/2010 | Mullen | |
| 7,828,992 | B2 | 11/2010 | Kilickiran | |
| 7,835,960 | B2 | 11/2010 | Breck | |
| 7,837,125 | B2 | 11/2010 | Biskupski | |
| 7,841,523 | B2 | 11/2010 | Oder | |
| 7,841,539 | B2 | 11/2010 | Hewton | |
| 7,844,530 | B2 | 11/2010 | Ziade | |
| 7,844,550 | B2 | 11/2010 | Walker | |
| 7,848,980 | B2 | 12/2010 | Carlson | |
| 7,849,014 | B2 | 12/2010 | Erikson | |
| 7,849,020 | B2 | 12/2010 | Johnson | |
| 7,853,529 | B1 | 12/2010 | Walker | |
| 7,853,995 | B2 | 12/2010 | Chow | |
| 7,865,414 | B2 | 1/2011 | Fung | |
| 7,870,027 | B1 | 1/2011 | Tannenbaum | |
| 7,873,579 | B2 | 1/2011 | Hobson | |
| 7,873,580 | B2 | 1/2011 | Hobson | |
| 7,877,299 | B2 | 1/2011 | Bui | |
| 7,878,400 | B2 | 2/2011 | Harris | |
| 7,890,370 | B2 | 2/2011 | Whitsitt | |
| 7,890,393 | B2 | 2/2011 | Talbert | |
| 7,891,563 | B2 | 2/2011 | Oder | |
| 7,895,119 | B2 | 2/2011 | Praisner | |
| 7,896,238 | B2 | 3/2011 | Fein | |
| 7,899,744 | B2 | 3/2011 | Bishop | |
| 7,904,360 | B2 | 3/2011 | Evans | |
| 7,908,216 | B1 | 3/2011 | Davis | |
| 7,908,227 | B2 | 3/2011 | Zizzimopoulos | |
| 7,922,082 | B2 | 4/2011 | Muscato | |
| 7,926,714 | B1 | 4/2011 | Zhu | |
| 7,931,195 | B2 | 4/2011 | Mullen | |
| 7,933,779 | B2 | 4/2011 | Rooks | |

(56) References Cited

U.S. PATENT DOCUMENTS

| | | | | |
|---|---|---|---|---|
| 7,937,324 | B2 | 5/2011 | Patterson | |
| 7,938,318 | B2 | 5/2011 | Fein | |
| 7,942,337 | B2 | 5/2011 | Jain | |
| 7,954,705 | B2 | 6/2011 | Mullen | |
| 7,959,076 | B1 | 6/2011 | Hopkins | |
| 7,962,418 | B1 | 6/2011 | Wei | |
| 7,967,196 | B1 | 6/2011 | Bierbaum | |
| 7,971,782 | B1 | 7/2011 | Shams | |
| 7,996,259 | B1 | 8/2011 | Distefano, III | |
| 7,996,288 | B1 | 8/2011 | Stolfo | |
| 8,016,192 | B2 | 9/2011 | Messerges | |
| 8,020,763 | B1 | 9/2011 | Kowalchyk | |
| 8,024,260 | B1 | 9/2011 | Hogl | |
| 8,025,223 | B2 | 9/2011 | Saunders | |
| 8,028,041 | B2 | 9/2011 | Olliphant | |
| 8,032,438 | B1 | 10/2011 | Barton | |
| 8,041,338 | B2 | 10/2011 | Chen | |
| 8,046,256 | B2 | 10/2011 | Chien | |
| 8,050,997 | B1 | 11/2011 | Nosek | |
| 8,060,413 | B2 | 11/2011 | Castell | |
| 8,060,448 | B2 | 11/2011 | Jones | |
| 8,060,449 | B1 | 11/2011 | Zhu | |
| 8,073,565 | B2 * | 12/2011 | Johnson | H04W 76/11 700/245 |
| 8,074,876 | B2 | 12/2011 | Foss | |
| 8,074,877 | B2 | 12/2011 | Mullen | |
| 8,074,879 | B2 | 12/2011 | Harris | |
| 8,082,210 | B2 | 12/2011 | Hansen | |
| 8,090,351 | B2 | 1/2012 | Klein | |
| 8,095,113 | B2 | 1/2012 | Kean | |
| 8,104,679 | B2 | 1/2012 | Brown | |
| 8,108,261 | B2 | 1/2012 | Carlier | |
| RE43,157 | E | 2/2012 | Bishop | |
| 8,109,436 | B1 | 2/2012 | Hopkins | |
| 8,117,127 | B1 | 2/2012 | Sanders | |
| 8,121,942 | B2 | 2/2012 | Carlson | |
| 8,121,956 | B2 | 2/2012 | Carlson | |
| 8,126,449 | B2 | 2/2012 | Beenau | |
| 8,127,982 | B1 | 3/2012 | Casey | |
| 8,131,666 | B2 | 3/2012 | OBrien | |
| 8,140,418 | B1 | 3/2012 | Casey | |
| 8,145,188 | B2 | 3/2012 | Park | |
| 8,145,561 | B1 | 3/2012 | Zhu | |
| 8,145,566 | B1 | 3/2012 | Ahuja | |
| 8,145,569 | B2 | 3/2012 | Gong | |
| 8,145,898 | B2 | 3/2012 | Kamalakantha | |
| 8,150,767 | B2 | 4/2012 | Wankmueller | |
| 8,150,772 | B2 | 4/2012 | Mardikar | |
| 8,151,328 | B1 | 4/2012 | Lundy | |
| 8,151,330 | B2 | 4/2012 | Vishik | |
| 8,151,336 | B2 | 4/2012 | Savoor | |
| 8,155,999 | B2 | 4/2012 | De Boer | |
| 8,156,000 | B1 | 4/2012 | Thompson | |
| 8,156,026 | B2 | 4/2012 | Junger | |
| 8,156,042 | B2 | 4/2012 | Winkleman, III | |
| 8,156,549 | B2 | 4/2012 | Rice | |
| 8,157,178 | B2 | 4/2012 | Dewan | |
| 8,157,181 | B2 | 4/2012 | Bates | |
| 8,160,935 | B2 | 4/2012 | Bui | |
| 8,160,959 | B2 | 4/2012 | Rackley, III | |
| 8,165,961 | B1 | 4/2012 | Dimartino | |
| 8,166,068 | B2 | 4/2012 | Stevens | |
| RE43,351 | E | 5/2012 | Jordan | |
| 8,170,921 | B2 | 5/2012 | Stocker | |
| 8,171,525 | B1 | 5/2012 | Pelly | |
| 8,175,235 | B2 | 5/2012 | Mumford | |
| 8,175,965 | B2 | 5/2012 | Moore | |
| 8,175,967 | B2 | 5/2012 | OLeary | |
| 8,175,968 | B2 | 5/2012 | OLeary | |
| 8,175,973 | B2 | 5/2012 | Davis | |
| 8,175,975 | B2 | 5/2012 | Cai | |
| 8,175,979 | B2 | 5/2012 | Baentsch | |
| 8,176,416 | B1 | 5/2012 | Williams | |
| 8,179,563 | B2 | 5/2012 | King | |
| 8,180,289 | B1 | 5/2012 | Glickman | |
| 8,180,705 | B2 | 5/2012 | Kowalchyk | |
| 8,180,804 | B1 | 5/2012 | Narayanan | |
| 8,190,513 | B2 | 5/2012 | Felger | |
| 8,190,523 | B2 | 5/2012 | Patterson | |
| 8,191,775 | B2 | 6/2012 | Hildred | |
| 8,195,233 | B2 | 6/2012 | Morikuni | |
| 8,195,544 | B2 | 6/2012 | Horsfall | |
| 8,195,547 | B2 | 6/2012 | Aaltonen | |
| 8,195,565 | B2 | 6/2012 | Bishop | |
| 8,195,576 | B1 | 6/2012 | Grigg | |
| 8,196,131 | B1 | 6/2012 | Von Behren | |
| 8,196,813 | B2 | 6/2012 | Vadhri | |
| 8,200,582 | B1 | 6/2012 | Zhu | |
| 8,204,774 | B2 | 6/2012 | Chwast | |
| 8,204,829 | B2 | 6/2012 | Alvarez | |
| 8,205,791 | B2 | 6/2012 | Randazza | |
| 8,209,245 | B2 | 6/2012 | Dennes | |
| 8,209,744 | B2 | 6/2012 | Zhu | |
| 8,214,288 | B2 | 7/2012 | Olliphant | |
| 8,214,289 | B2 | 7/2012 | Scipioni | |
| 8,214,291 | B2 | 7/2012 | Pelegero | |
| 8,214,292 | B2 | 7/2012 | Duggal | |
| 8,214,293 | B2 | 7/2012 | Powell | |
| 8,214,886 | B2 | 7/2012 | Foley | |
| 8,215,546 | B2 | 7/2012 | Lin | |
| 8,219,411 | B2 | 7/2012 | Matz | |
| 8,219,474 | B2 | 7/2012 | Sutton | |
| 8,219,489 | B2 | 7/2012 | Patterson | |
| 8,219,490 | B2 | 7/2012 | Hammad | |
| 8,220,047 | B1 | 7/2012 | Soghoian | |
| 8,224,702 | B2 | 7/2012 | Mangerink | |
| 8,224,754 | B2 | 7/2012 | Pastusiak | |
| 8,224,773 | B2 | 7/2012 | Spiegel | |
| 8,225,385 | B2 | 7/2012 | Chow | |
| 8,225,997 | B1 | 7/2012 | Bierbaum | |
| 8,227,936 | B1 | 7/2012 | Folk | |
| 8,229,354 | B2 | 7/2012 | Sklovsky | |
| 8,229,808 | B1 | 7/2012 | Heit | |
| 8,229,844 | B2 | 7/2012 | Felger | |
| 8,229,851 | B2 | 7/2012 | Doran | |
| 8,229,852 | B2 | 7/2012 | Carlson | |
| 8,229,854 | B2 | 7/2012 | Stephen | |
| 8,233,841 | B2 | 7/2012 | Griffin | |
| 8,234,183 | B2 | 7/2012 | Smith | |
| 8,239,276 | B2 | 8/2012 | Lin | |
| 8,244,580 | B2 | 8/2012 | Mankoff | |
| 8,245,139 | B2 | 8/2012 | Michelman | |
| 8,249,925 | B2 | 8/2012 | Broms | |
| 8,249,965 | B2 | 8/2012 | Tumminaro | |
| 8,255,278 | B1 | 8/2012 | Young | |
| 8,255,323 | B1 | 8/2012 | Casey | |
| 8,255,324 | B2 | 8/2012 | Bercy | |
| 8,265,993 | B2 | 9/2012 | Chien | |
| 8,275,704 | B2 | 9/2012 | Bishop | |
| 8,280,777 | B2 | 10/2012 | Mengerink | |
| 8,281,991 | B2 | 10/2012 | Wentker | |
| 8,281,998 | B2 | 10/2012 | Tang | |
| 8,282,002 | B2 | 10/2012 | Shams | |
| 8,285,640 | B2 | 10/2012 | Scipioni | |
| 8,285,820 | B2 | 10/2012 | Olliphant | |
| 8,285,832 | B2 | 10/2012 | Schwab | |
| 8,286,875 | B2 | 10/2012 | Tang | |
| 8,290,433 | B2 | 10/2012 | Fisher | |
| 8,290,819 | B2 | 10/2012 | Bawcutt | |
| 8,290,829 | B1 | 10/2012 | Katz | |
| 8,295,898 | B2 | 10/2012 | Ashfield | |
| 8,296,187 | B2 | 10/2012 | Light | |
| 8,296,204 | B2 | 10/2012 | Templeton | |
| 8,296,228 | B1 | 10/2012 | Kloor | |
| 8,296,231 | B2 | 10/2012 | Britto | |
| 8,301,500 | B2 | 10/2012 | Pharris | |
| 8,301,510 | B2 | 10/2012 | Boesch | |
| 8,301,556 | B2 | 10/2012 | Hogl | |
| 8,311,520 | B2 | 11/2012 | Choi | |
| 8,312,096 | B2 | 11/2012 | Cohen | |
| 8,321,267 | B2 | 11/2012 | Hoerenz | |
| 8,321,294 | B2 | 11/2012 | Carlier | |
| 8,321,315 | B2 | 11/2012 | Abel | |
| 8,321,338 | B2 | 11/2012 | Baumgart | |

(56) References Cited

U.S. PATENT DOCUMENTS 8,321,343 B2 11/2012 Ramavarjula
8,321,364 B1 11/2012 Gharpure
8,326,756 B2 12/2012 Egendorf
8,326,769 B1 12/2012 Weisman
8,326,770 B1 12/2012 Weisman
8,327,450 B2 12/2012 Clement
8,328,095 B2 12/2012 Oder
8,332,272 B2 12/2012 Fisher
8,332,275 B2 12/2012 Poon
8,332,323 B2 12/2012 Stals
8,335,720 B2 12/2012 Juang
8,335,726 B1 12/2012 Ling
8,335,822 B2 12/2012 Ahmed
8,335,921 B2 12/2012 Von Behren
8,335,932 B2 12/2012 Von Behren
8,336,088 B2 12/2012 Raj
8,340,666 B2 12/2012 Ramer
8,341,029 B1 12/2012 Ramalingam
8,346,643 B2 1/2013 Boyer
8,346,659 B1 1/2013 Mohsenzadeh
8,346,663 B2 1/2013 Kawan
8,346,666 B2 1/2013 Lindelsee
8,352,323 B2 1/2013 Fisher
8,352,362 B2 1/2013 Mohsenzadeh
8,352,499 B2 1/2013 Bharat
8,352,749 B2 1/2013 Von Behren
8,355,987 B2 1/2013 Hirson
8,359,070 B1 1/2013 Zhu
8,364,587 B2 1/2013 Nuzum
8,364,590 B1 1/2013 Casey
8,370,264 B1 2/2013 Wei
8,376,225 B1 2/2013 Hopkins
8,380,177 B2 2/2013 Laracey
8,380,349 B1 2/2013 Hickman
8,386,078 B1 2/2013 Hickman
8,387,873 B2 3/2013 Saunders
8,396,750 B1 3/2013 Hariharan
8,396,810 B1 3/2013 Cook
8,401,539 B2 3/2013 Beenau
8,401,898 B2 3/2013 Chien
8,401,904 B1 3/2013 Simakov
8,402,555 B2 3/2013 Grecia
8,403,211 B2 3/2013 Brooks
8,412,586 B1 4/2013 Foulser
8,412,623 B2 4/2013 Moon
8,412,630 B2 4/2013 Ross
8,412,837 B1 4/2013 Emigh
8,417,633 B1 4/2013 Chmara
8,417,642 B2 4/2013 Oren
8,423,462 B1 4/2013 Amacker
8,429,521 B2 4/2013 Lloyd
8,437,633 B2 4/2013 Chmara
8,447,699 B2 5/2013 Batada
8,453,223 B2 5/2013 Svigals
8,453,925 B2 6/2013 Fisher
8,458,487 B1 6/2013 Palgon
8,484,134 B2 7/2013 Hobson
8,485,437 B2 7/2013 Mullen
8,494,959 B2 7/2013 Hathaway
8,498,908 B2 7/2013 Mengerink
8,504,475 B2 8/2013 Brand
8,504,478 B2 8/2013 Saunders
8,510,816 B2 8/2013 Quach
8,433,116 B2 9/2013 Davis
8,533,860 B1 9/2013 Grecia
8,538,845 B2 9/2013 Liberty
8,555,079 B2 10/2013 Shablygin
8,566,168 B1 10/2013 Bierbaum
8,567,670 B2 10/2013 Stanfield
8,571,939 B2 10/2013 Lindsey
8,577,336 B2 11/2013 Mechaley
8,577,803 B2 11/2013 Chatterjee
8,577,813 B2 11/2013 Weiss
8,578,176 B2 11/2013 Mattsson
8,583,494 B2 11/2013 Fisher
8,584,251 B2 11/2013 McGuire
8,589,237 B2 11/2013 Fisher
8,589,271 B2 11/2013 Evans
8,589,291 B2 11/2013 Carlson
8,595,098 B2 11/2013 Starai
8,595,812 B2 11/2013 Bomar
8,595,850 B2 11/2013 Spies
8,606,638 B2 12/2013 Dragt
8,606,700 B2 12/2013 Carlson
8,606,720 B1 12/2013 Baker
8,615,468 B2 12/2013 Varadarajan
8,620,754 B2 12/2013 Fisher
8,635,157 B2 1/2014 Smith
8,639,621 B1 1/2014 Ellis
8,646,059 B1 2/2014 von Behren
8,651,374 B2 2/2014 Brabson
8,656,180 B2 2/2014 Shablygin
8,661,495 B2 * 2/2014 Reisman .......... G06F 17/30873 725/110
8,739,016 B1 5/2014 Goldman
8,751,391 B2 6/2014 Freund
8,762,263 B2 6/2014 Gauthier
8,793,186 B2 7/2014 Patterson
8,838,982 B2 9/2014 Carlson
8,856,539 B2 10/2014 Weiss
8,887,308 B2 11/2014 Grecia
8,893,009 B2 * 11/2014 Raleigh ................ H04M 15/00 715/736
9,065,643 B2 6/2015 Hurry
9,070,129 B2 6/2015 Sheets
9,082,119 B2 7/2015 Ortiz
9,100,826 B2 8/2015 Weiss
9,105,050 B2 8/2015 Tietzen
9,160,741 B2 10/2015 Wentker
9,195,750 B2 11/2015 Hayden
9,229,964 B2 1/2016 Stevelinck
9,245,267 B2 1/2016 Singh
9,249,241 B2 2/2016 Dai
9,256,871 B2 2/2016 Anderson
9,280,765 B2 3/2016 Hammad
9,307,342 B2 4/2016 Sojoodi
9,355,393 B2 5/2016 Purves
9,448,972 B2 9/2016 Greenberg
9,524,089 B1 12/2016 Ghosh
9,530,137 B2 12/2016 Weiss
9,582,598 B2 2/2017 Kalgi
9,626,351 B2 4/2017 Davis
9,710,807 B2 7/2017 Theurer
9,772,987 B2 9/2017 Davis
9,804,834 B1 10/2017 Lopyrev
9,904,537 B2 2/2018 Lopyrev
2001/0037297 A1 3/2001 McNair
2001/0029485 A1 10/2001 Brody
2001/0034720 A1 10/2001 Armes
2001/0054003 A1 12/2001 Chien
2001/0056359 A1 12/2001 Abreu
2001/0056409 A1 12/2001 Bellovin
2002/0002522 A1 1/2002 Clift
2002/0004783 A1 1/2002 Paltenghe
2002/0007320 A1 1/2002 Hogan
2002/0016749 A1 2/2002 Borecki
2002/0026575 A1 2/2002 Wheeler
2002/0029193 A1 3/2002 Ranjan
2002/0035548 A1 3/2002 Hogan
2002/0040325 A1 4/2002 Takae
2002/0052778 A1 5/2002 Murphy
2002/0073045 A1 6/2002 Rubin
2002/0077976 A1 6/2002 Meyer
2002/0077978 A1 6/2002 OLeary
2002/0087894 A1 7/2002 Foley
2002/0099642 A1 7/2002 Schwankl
2002/0099647 A1 7/2002 Howorka
2002/0099656 A1 7/2002 Poh Wong
2002/0107755 A1 8/2002 Steed
2002/0111919 A1 8/2002 Weller
2002/0112014 A1 8/2002 Bennett
2002/0116271 A1 8/2002 Mankoff
2002/0116341 A1 8/2002 Hogan
2002/0120864 A1 8/2002 Wu

(56) References Cited

U.S. PATENT DOCUMENTS

| | | | | |
|---|---|---|---|---|
| 2002/0133467 | A1 | 9/2002 | Hobson | |
| 2002/0138290 | A1 | 9/2002 | Metcalfe | |
| 2002/0138445 | A1 | 9/2002 | Laage | |
| 2002/0141575 | A1 | 10/2002 | Hird | |
| 2002/0143614 | A1 | 10/2002 | MacLean | |
| 2002/0147913 | A1 | 10/2002 | Lun Yip | |
| 2002/0174030 | A1 | 11/2002 | Praisner | |
| 2002/0178370 | A1 | 11/2002 | Gurevich | |
| 2002/0194081 | A1 | 12/2002 | Perkowski | |
| 2003/0014307 | A1 | 1/2003 | Heng | |
| 2003/0018524 | A1 | 1/2003 | Fishman | |
| 2003/0026404 | A1 | 2/2003 | Joyce | |
| 2003/0028451 | A1 | 2/2003 | Ananian | |
| 2003/0028481 | A1 | 2/2003 | Flitcroft | |
| 2003/0055785 | A1 | 3/2003 | Lahiri | |
| 2003/0080185 | A1 | 5/2003 | Werther | |
| 2003/0097318 | A1 | 5/2003 | Yu | |
| 2003/0101134 | A1 | 5/2003 | Liu | |
| 2003/0126076 | A1 | 7/2003 | Kwok | |
| 2003/0130955 | A1 | 7/2003 | Hawthorne | |
| 2003/0144935 | A1 | 7/2003 | Sobek | |
| 2003/0174823 | A1 | 9/2003 | Justice | |
| 2003/0177361 | A1 | 9/2003 | Wheeler | |
| 2003/0179230 | A1 | 9/2003 | Seidman | |
| 2003/0191709 | A1 | 10/2003 | Elston | |
| 2003/0191711 | A1 | 10/2003 | Jamison | |
| 2003/0191945 | A1 | 10/2003 | Keech | |
| 2003/0195659 | A1 | 10/2003 | Kasuga | |
| 2003/0200142 | A1 | 10/2003 | Hicks | |
| 2003/0200184 | A1 | 10/2003 | Dominguez | |
| 2003/0212589 | A1 | 11/2003 | Kish | |
| 2003/0212642 | A1 | 11/2003 | Weller | |
| 2003/0216996 | A1 | 11/2003 | Cummings | |
| 2003/0220835 | A1 | 11/2003 | Barnes | |
| 2004/0010462 | A1 | 1/2004 | Moon | |
| 2004/0050928 | A1 | 3/2004 | Bishop | |
| 2004/0059682 | A1 | 3/2004 | Hasumi | |
| 2004/0068443 | A1 | 4/2004 | Hopson | |
| 2004/0078332 | A1 | 4/2004 | Ferguson | |
| 2004/0093281 | A1 | 5/2004 | Silverstein | |
| 2004/0103037 | A1 | 5/2004 | Wetmore | |
| 2004/0111698 | A1 | 6/2004 | Soong | |
| 2004/0128197 | A1 | 7/2004 | Bam | |
| 2004/0138999 | A1 | 7/2004 | Friedman | |
| 2004/0139008 | A1 | 7/2004 | Mascavage | |
| 2004/0143532 | A1 | 7/2004 | Lee | |
| 2004/0148255 | A1 | 7/2004 | Beck | |
| 2004/0158532 | A1 | 8/2004 | Breck | |
| 2004/0204128 | A1 | 10/2004 | Zakharia | |
| 2004/0210449 | A1 | 10/2004 | Breck | |
| 2004/0210498 | A1 | 10/2004 | Freund | |
| 2004/0215560 | A1 | 10/2004 | Amalraj | |
| 2004/0215963 | A1 | 10/2004 | Kaplan | |
| 2004/0230536 | A1 | 11/2004 | Fung | |
| 2004/0232225 | A1 | 11/2004 | Bishop | |
| 2004/0236646 | A1 | 11/2004 | Wu | |
| 2004/0254891 | A1 | 12/2004 | Blinn | |
| 2004/0260646 | A1 | 12/2004 | Berardi | |
| 2004/0267608 | A1 | 12/2004 | Mansfield | |
| 2004/0267655 | A1 | 12/2004 | Davidowitz | |
| 2004/0267878 | A1 | 12/2004 | Osias | |
| 2005/0010483 | A1 | 1/2005 | Ling | |
| 2005/0037735 | A1 | 2/2005 | Courts | |
| 2005/0038724 | A1 | 2/2005 | Roever | |
| 2005/0065819 | A1 | 3/2005 | Pamela | |
| 2005/0080730 | A1 | 4/2005 | Sorrentino | |
| 2005/0080747 | A1 | 4/2005 | Anderson | |
| 2005/0080821 | A1 | 4/2005 | Breil | |
| 2005/0097320 | A1 | 5/2005 | Golan | |
| 2005/0101309 | A1 | 5/2005 | Croome | |
| 2005/0102188 | A1 | 5/2005 | Hutchison | |
| 2005/0108178 | A1 | 5/2005 | York | |
| 2005/0114784 | A1 * | 5/2005 | Spring | G06F 21/6245<br>715/762 |
| 2005/0137969 | A1 | 6/2005 | Shah | |
| 2005/0144082 | A1 | 6/2005 | Coolman | |
| 2005/0171894 | A1 | 8/2005 | Traynor | |
| 2005/0171898 | A1 | 8/2005 | Bishop | |
| 2005/0184145 | A1 | 8/2005 | Law | |
| 2005/0187873 | A1 | 8/2005 | Labrou | |
| 2005/0192893 | A1 | 9/2005 | Keeling | |
| 2005/0192895 | A1 | 9/2005 | Rogers | |
| 2005/0199709 | A1 | 9/2005 | Linlor | |
| 2005/0220326 | A1 | 10/2005 | Sim | |
| 2005/0234817 | A1 | 10/2005 | VanFleet | |
| 2005/0246278 | A1 | 11/2005 | Gerber | |
| 2005/0246293 | A1 | 11/2005 | Ong | |
| 2005/0251446 | A1 | 11/2005 | Jiang | |
| 2005/0254714 | A1 | 11/2005 | Anne | |
| 2005/0256802 | A1 | 11/2005 | Ammermann | |
| 2005/0261967 | A1 | 11/2005 | Barry | |
| 2005/0269401 | A1 | 12/2005 | Spitzer | |
| 2005/0269402 | A1 | 12/2005 | Spitzer | |
| 2005/0273462 | A1 | 12/2005 | Reed | |
| 2006/0002607 | A1 | 1/2006 | Boncyk | |
| 2006/0020542 | A1 | 1/2006 | Litle | |
| 2006/0053056 | A1 | 3/2006 | Alspach-Goss | |
| 2006/0059277 | A1 | 3/2006 | Zito | |
| 2006/0069619 | A1 | 3/2006 | Walker | |
| 2006/0075235 | A1 | 4/2006 | Renkis | |
| 2006/0085328 | A1 | 4/2006 | Cohen | |
| 2006/0085477 | A1 | 4/2006 | Phillips | |
| 2006/0124729 | A1 | 6/2006 | Martin | |
| 2006/0129427 | A1 | 6/2006 | Wennberg | |
| 2006/0163349 | A1 | 7/2006 | Neugebauer | |
| 2006/0178918 | A1 | 8/2006 | Mikurak | |
| 2006/0178986 | A1 | 8/2006 | Giordano | |
| 2006/0178994 | A1 | 8/2006 | Stolfo | |
| 2006/0190347 | A1 | 8/2006 | Cuervo | |
| 2006/0195598 | A1 | 8/2006 | Fujita | |
| 2006/0208060 | A1 | 9/2006 | Mendelovich | |
| 2006/0212434 | A1 | 9/2006 | Crawford | |
| 2006/0226216 | A1 | 10/2006 | Keithley | |
| 2006/0235795 | A1 | 10/2006 | Johnson | |
| 2006/0237528 | A1 | 10/2006 | Bishop | |
| 2006/0247982 | A1 | 11/2006 | Stolfo | |
| 2006/0277143 | A1 | 12/2006 | Almonte | |
| 2006/0278704 | A1 | 12/2006 | Saunders | |
| 2006/0282332 | A1 | 12/2006 | Pfleging | |
| 2006/0293947 | A1 | 12/2006 | Nicholson | |
| 2007/0011025 | A1 | 1/2007 | Cracchiolo | |
| 2007/0016523 | A1 | 1/2007 | Blair | |
| 2007/0022007 | A1 | 1/2007 | Lawe | |
| 2007/0038515 | A1 | 2/2007 | Postrel | |
| 2007/0038516 | A1 | 2/2007 | Apple | |
| 2007/0055571 | A1 | 3/2007 | Fox | |
| 2007/0067215 | A1 | 3/2007 | Agarwal | |
| 2007/0087820 | A1 | 4/2007 | Van | |
| 2007/0094066 | A1 | 4/2007 | Kumar | |
| 2007/0100691 | A1 | 5/2007 | Patterson | |
| 2007/0100728 | A1 | 5/2007 | Rotman | |
| 2007/0106504 | A1 | 5/2007 | Deng | |
| 2007/0106607 | A1 | 5/2007 | Seib | |
| 2007/0106627 | A1 | 5/2007 | Srivastava | |
| 2007/0107044 | A1 | 5/2007 | Yuen | |
| 2007/0113289 | A1 | 5/2007 | Blumenau | |
| 2007/0125840 | A1 | 6/2007 | Law | |
| 2007/0129955 | A1 | 6/2007 | Dalmia | |
| 2007/0136193 | A1 | 6/2007 | Starr | |
| 2007/0136211 | A1 | 6/2007 | Brown | |
| 2007/0143204 | A1 | 6/2007 | Claus | |
| 2007/0150413 | A1 | 6/2007 | Morgenstern | |
| 2007/0156726 | A1 | 7/2007 | Levy | |
| 2007/0170247 | A1 | 7/2007 | Friedman | |
| 2007/0179885 | A1 | 8/2007 | Bird | |
| 2007/0180119 | A1 | 8/2007 | Khivesara | |
| 2007/0198435 | A1 | 8/2007 | Siegal | |
| 2007/0198587 | A1 | 8/2007 | Kobayasfii | |
| 2007/0208662 | A1 | 9/2007 | Jeronimus | |
| 2007/0208671 | A1 | 9/2007 | Brown | |
| 2007/0214078 | A1 | 9/2007 | Coppinger | |
| 2007/0214250 | A1 | 9/2007 | Ahmed | |
| 2007/0226152 | A1 | 9/2007 | Jones | |
| 2007/0233590 | A1 | 10/2007 | Hardison | |

(56) References Cited

U.S. PATENT DOCUMENTS

2007/0233615 A1 10/2007 Tumminaro
2007/0239502 A1 10/2007 Babu
2007/0245414 A1 10/2007 Chan
2007/0276765 A1 11/2007 Hazel
2007/0288377 A1 12/2007 Shaked
2007/0291995 A1 12/2007 Rivera
2008/0004116 A1 1/2008 Van
2008/0004952 A1 1/2008 Koli
2008/0010096 A1 1/2008 Patterson
2008/0013335 A1 1/2008 Tsutsumi
2008/0015988 A1 1/2008 Brown
2008/0021829 A1 1/2008 Kranzley
2008/0027218 A1 1/2008 Daugs
2008/0027850 A1 1/2008 Brittan
2008/0029607 A1 2/2008 Mullen
2008/0035738 A1 2/2008 Mullen
2008/0048022 A1 2/2008 Vawter
2008/0052226 A1 2/2008 Agarwal
2008/0054068 A1 3/2008 Mullen
2008/0054079 A1 3/2008 Mullen
2008/0054081 A1 3/2008 Mullen
2008/0059370 A1 3/2008 Sada
2008/0065554 A1 3/2008 Hogan
2008/0065555 A1 3/2008 Mullen
2008/0077489 A1 3/2008 Gilley
2008/0086365 A1 4/2008 Zollino
2008/0090513 A1 4/2008 Collins
2008/0091553 A1 4/2008 Koski
2008/0091616 A1 4/2008 Helwin
2008/0097856 A1 4/2008 Blagg
2008/0103795 A1 5/2008 Jakubowski
2008/0114639 A1 5/2008 Meek
2008/0114737 A1 5/2008 Neely
2008/0126145 A1 5/2008 Racklet, III
2008/0133351 A1 6/2008 White
2008/0140568 A1 6/2008 Henry
2008/0140684 A1 6/2008 OReilly
2008/0147883 A1 6/2008 Philyaw
2008/0154623 A1 6/2008 Derker
2008/0162361 A1 7/2008 Sklovsky
2008/0167965 A1 7/2008 Von
2008/0172274 A1 7/2008 Hurowitz
2008/0172331 A1 7/2008 Graves
2008/0177574 A1 7/2008 Marcos
2008/0177672 A1 7/2008 Brunner
2008/0201232 A1 8/2008 Walker
2008/0201264 A1 8/2008 Brown
2008/0201265 A1 8/2008 Hewton
2008/0221945 A1 9/2008 Pace
2008/0223918 A1 9/2008 Williams
2008/0228646 A1 9/2008 Myers
2008/0229217 A1* 9/2008 Kembel ............ G06F 17/30899 715/760
2008/0235261 A1 9/2008 Malek
2008/0024561 A1 10/2008 Fein
2008/0243305 A1 10/2008 Lee
2008/0243702 A1 10/2008 Hart
2008/0245855 A1 10/2008 Fein
2008/0245861 A1 10/2008 Fein
2008/0270300 A1 10/2008 Jones
2008/0272188 A1 11/2008 Keithley
2008/0283591 A1 11/2008 Oder
2008/0288376 A1 11/2008 Panthaki
2008/0288889 A1 11/2008 Hunt
2008/0300980 A1 12/2008 Benjamin
2008/0301055 A1 12/2008 Borgs
2008/0302869 A1 12/2008 Mullen
2008/0302876 A1 12/2008 Mullen
2008/0313264 A1 12/2008 Pestoni
2008/0319905 A1 12/2008 Carlson
2009/0006181 A1 1/2009 Ghosh
2009/0006262 A1 1/2009 Brown
2009/0010488 A1 1/2009 Matsuoka
2009/0013266 A1 1/2009 Gandhi
2009/0018895 A1 1/2009 Weinblatt
2009/0024527 A1 1/2009 Sellen
2009/0024636 A1 1/2009 Shiloh
2009/0037255 A1 2/2009 Chiu
2009/0037326 A1 2/2009 Chitti
2009/0037333 A1 2/2009 Flitcroft
2009/0037388 A1 2/2009 Cooper
2009/0043702 A1 2/2009 Bennett
2009/0048934 A1 2/2009 Haddad
2009/0048971 A1 2/2009 Hathaway
2009/0061884 A1 3/2009 Rajan
2009/0063261 A1 3/2009 Scribner
2009/0064056 A1 3/2009 Anderson
2009/0076953 A1 3/2009 Saville
2009/0076966 A1 3/2009 Bishop
2009/0083065 A1 3/2009 Unland
2009/0089176 A1 4/2009 Mccabe
2009/0089193 A1 4/2009 Paintin
2009/0104888 A1 4/2009 Cox
2009/0106112 A1 4/2009 Dalmia
2009/0106151 A1 4/2009 Nelsen
2009/0106160 A1 4/2009 Skowronek
2009/0108080 A1 4/2009 Meyer
2009/0112775 A1 4/2009 Chiulli
2009/0119176 A1 5/2009 Johnson
2009/0119190 A1 5/2009 Realini
2009/0119211 A1 5/2009 Johnson
2009/0125429 A1 5/2009 Takayama
2009/0132347 A1 5/2009 Anderson
2009/0132366 A1 5/2009 Lam
2009/0132395 A1 5/2009 Lam
2009/0134217 A1 5/2009 Flitcroft
2009/0144104 A1 6/2009 Johnson
2009/0144201 A1 6/2009 Gierkink
2009/0157555 A1 6/2009 Biffle
2009/0159673 A1 6/2009 Mullen
2009/0159700 A1 6/2009 Mullen
2009/0159707 A1 6/2009 Mullen
2009/0164344 A1 6/2009 Shiftan
2009/0170608 A1 7/2009 Herrmann
2009/0171778 A1 7/2009 Powell
2009/0173782 A1 7/2009 Muscato
2009/0182664 A1 7/2009 Trombley
2009/0187492 A1 7/2009 Hammad
2009/0200371 A1 8/2009 Kean
2009/0210300 A1 8/2009 Cansler
2009/0216910 A1 8/2009 Duchesneau
2009/0222347 A1 9/2009 Whitten
2009/0228211 A1 9/2009 Rasanen
2009/0233579 A1 9/2009 Castell
2009/0234751 A1 9/2009 Chan
2009/0240620 A1 9/2009 Kendrick
2009/0241159 A1 9/2009 Campagna
2009/0248583 A1 10/2009 Chhabra
2009/0248738 A1 10/2009 Martinez
2009/0254471 A1 10/2009 Seidel
2009/0254479 A1 10/2009 Pharris
2009/0254535 A1 10/2009 Eickelmann
2009/0265274 A1 10/2009 Hahn-Carlson
2009/0271246 A1 10/2009 Alvarez
2009/0271265 A1 10/2009 Lay
2009/0276347 A1 11/2009 Kargman
2009/0281948 A1 11/2009 Carlson
2009/0288012 A1 11/2009 Hertel
2009/0294527 A1 12/2009 Brabson
2009/0307060 A1 12/2009 Merz
2009/0307135 A1 12/2009 Gupta
2009/0307139 A1 12/2009 Mardikar
2009/0308921 A1 12/2009 Mullen
2009/0313132 A1 12/2009 McKenna
2009/0319638 A1 12/2009 Faith
2009/0327045 A1 12/2009 Olives
2009/0327088 A1 12/2009 Puthupparambil
2009/0327131 A1 12/2009 Beenau
2010/0004989 A1 1/2010 Bonalle
2010/0005025 A1 1/2010 Kumar
2010/0008535 A1 1/2010 Abulafia
2010/0009663 A1 1/2010 Chang
2010/0010964 A1 1/2010 Skowronek
2010/0021149 A1 1/2010 Mulder

(56) References Cited

U.S. PATENT DOCUMENTS

2010/0023386 A1 1/2010 Avisar
2010/0023455 A1 1/2010 Dispensa
2010/0023457 A1 1/2010 Riviere
2010/0036741 A1 2/2010 Cleven
2010/0036775 A1 2/2010 Edens
2010/0036884 A1 2/2010 Brown
2010/0042456 A1 2/2010 Stinchcombe
2010/0042537 A1 2/2010 Smith
2010/0042540 A1 2/2010 Graves
2010/0049879 A1 2/2010 Leavitt
2010/0057548 A1 3/2010 Edwards
2010/0063903 A1 3/2010 Whipple
2010/0070359 A1 3/2010 Heasley
2010/0076873 A1 3/2010 Taylor
2010/0078471 A1 4/2010 Lin
2010/0078472 A1 4/2010 Lin
2010/0082444 A1 4/2010 Lin
2010/0082445 A1 4/2010 Hodge
2010/0082447 A1 4/2010 Lin
2010/0082455 A1 4/2010 Rosenblatt
2010/0082480 A1 4/2010 Korosec
2010/0082481 A1 4/2010 Lin
2010/0082485 A1 4/2010 Lin
2010/0082490 A1 4/2010 Rosenblatt
2010/0082491 A1 4/2010 Rosenblatt
2010/0088188 A1 4/2010 Kumar
2010/0088237 A1 4/2010 Wankmueller
2010/0094730 A1 4/2010 Koski
2010/0094755 A1 4/2010 Kloster
2010/0094878 A1 4/2010 Soroca
2010/0100480 A1 4/2010 Altman
2010/0106644 A1 4/2010 Annan
2010/0114664 A1 5/2010 Jobin
2010/0120408 A1 5/2010 Beenau
2010/0121707 A1 5/2010 Goeldi
2010/0125492 A1 5/2010 Lin
2010/0125495 A1 5/2010 Smith
2010/0125803 A1 5/2010 Johnson
2010/0131347 A1 5/2010 Sarptipi
2010/0131415 A1 5/2010 Sartipi
2010/0133334 A1 6/2010 Vadhri
2010/0133339 A1 6/2010 Gibson
2010/0138026 A1 6/2010 Kaushal
2010/0138347 A1 6/2010 Chen
2010/0145860 A1 6/2010 Pelegero
2010/0153865 A1 6/2010 Barnes
2010/0155470 A1 6/2010 Woronec
2010/0161433 A1 6/2010 White
2010/0162126 A1* 6/2010 Donaldson ........ G06F 17/30902
715/738
2010/0174599 A1 7/2010 Rosenblatt
2010/0179855 A1 7/2010 Chen
2010/0185505 A1 7/2010 Sprogoe
2010/0185531 A1 7/2010 Van
2010/0185545 A1 7/2010 Royyuru
2010/0191578 A1 7/2010 Tran
2010/0191622 A1 7/2010 Reiss
2010/0191770 A1 7/2010 Cho
2010/0198626 A1 8/2010 Cho
2010/0211445 A1 8/2010 Bodington
2010/0211452 A1 8/2010 D
2010/0211469 A1 8/2010 Salmon
2010/0211499 A1 8/2010 Zanzot
2010/0211505 A1 8/2010 Saunders
2010/0217613 A1 8/2010 Kelly
2010/0217682 A1 8/2010 Chan
2010/0223186 A1 9/2010 Hogan
2010/0228668 A1 9/2010 Hogan
2010/0235284 A1 9/2010 Moore
2010/0243728 A1 9/2010 Wiesman
2010/0250351 A1 9/2010 Gillenson
2010/0256976 A1 10/2010 Atsmon
2010/0258620 A1 10/2010 Torreyson
2010/0268645 A1 10/2010 Martino
2010/0276484 A1 11/2010 Banerjee
2010/0287048 A1 11/2010 Ramer
2010/0287229 A1 11/2010 Hauser
2010/0291904 A1 11/2010 Musfeldt
2010/0293032 A1 11/2010 Engelsma
2010/0299267 A1 11/2010 Faith
2010/0299292 A1 11/2010 Collazo
2010/0305848 A1 12/2010 Stallman
2010/0306075 A1 12/2010 Drance
2010/0306076 A1 12/2010 Taveau
2010/0306113 A1 12/2010 Grey
2010/0312645 A1 12/2010 Niekadlik
2010/0312676 A1 12/2010 Muthukumaran
2010/0312724 A1 12/2010 Pinckney
2010/0325041 A1 12/2010 Berardi
2010/0332262 A1 12/2010 Horvitz
2010/0332283 A1 12/2010 Ng
2011/0004498 A1 1/2011 Readshaw
2011/0010292 A1 1/2011 Giordano
2011/0016047 A1 1/2011 Wu
2011/0016320 A1 1/2011 Bergsten
2011/0035273 A1 2/2011 Parikh
2011/0040640 A1 2/2011 Erikson
2011/0040655 A1 2/2011 Hendrickson
2011/0047017 A1 2/2011 Lieblang
2011/0047075 A1 2/2011 Fourez
2011/0047076 A1 2/2011 Carlson
2011/0078082 A1 3/2011 Gupta
2011/0082789 A1 4/2011 Boyd
2011/0083018 A1 4/2011 Kesanupalli
2011/0087596 A1 4/2011 Dorsey
2011/0087726 A1 4/2011 Shim
2011/0093335 A1 4/2011 Fordyce
2011/0093397 A1 4/2011 Carlson
2011/0099057 A1 4/2011 Tenyer
2011/0105183 A1 5/2011 Hsiao
2011/0106698 A1 5/2011 Isaacson
2011/0109737 A1 5/2011 Aben
2011/0119300 A1 5/2011 Marcade
2011/0125597 A1 5/2011 Oder
2011/0137740 A1 6/2011 Bhattacharya
2011/0137742 A1 6/2011 Parikh
2011/0153437 A1 6/2011 Archer
2011/0153498 A1 6/2011 Makhotin
2011/0154466 A1 6/2011 Harper
2011/0161233 A1 6/2011 Tieken
2011/0178896 A1 7/2011 Nakajima
2011/0178926 A1 7/2011 Lindelsee
2011/0180598 A1 7/2011 Morgan
2011/0184827 A1 7/2011 Hubert
2011/0191244 A1 8/2011 Dai
2011/0208418 A1 8/2011 Looney
2011/0215146 A1 9/2011 Shams
2011/0218870 A1 9/2011 Shams
2011/0221692 A1 9/2011 Seydoux
2011/0238474 A1 9/2011 Carr
2011/0238511 A1 9/2011 Park
2011/0238573 A1 9/2011 Varadarajan
2011/0246290 A1 10/2011 Howard
2011/0246317 A1 10/2011 Coppinger
2011/0251892 A1 10/2011 Laracey
2011/0258049 A1 10/2011 Ramer
2011/0258111 A1 10/2011 Raj
2011/0258123 A1 10/2011 Dawkins
2011/0270665 A1 11/2011 Kim
2011/0272471 A1 11/2011 Mullen
2011/0272478 A1 11/2011 Mullen
2011/0276380 A1 11/2011 Mullen
2011/0276381 A1 11/2011 Mullen
2011/0276424 A1 11/2011 Mullen
2011/0276425 A1 11/2011 Mullen
2011/0282780 A1 11/2011 French
2011/0288684 A1 11/2011 Farlow
2011/0295745 A1 12/2011 White
2011/0296508 A1 12/2011 Os
2011/0302081 A1 12/2011 Saunders
2011/0312423 A1 12/2011 Mosites
2011/0320344 A1 12/2011 Faith
2011/0320345 A1 12/2011 Taveau
2012/0005026 A1 1/2012 Khan

(56) References Cited

U.S. PATENT DOCUMENTS

| | | | |
|---|---|---|---|
| 2012/0011009 | A1 | 1/2012 | Lindsey |
| 2012/0011063 | A1 | 1/2012 | Killian |
| 2012/0016731 | A1 | 1/2012 | Smith |
| 2012/0022943 | A1 | 1/2012 | Howard |
| 2012/0023026 | A1 | 1/2012 | Chen |
| 2012/0023417 | A1 | 1/2012 | Nesladek |
| 2012/0023567 | A1 | 1/2012 | Hammad |
| 2012/0028609 | A1 | 2/2012 | Hruska |
| 2012/0030047 | A1 | 2/2012 | Fuentes |
| 2012/0030101 | A1 | 2/2012 | Boyd |
| 2012/0035998 | A1 | 2/2012 | Chien |
| 2012/0036071 | A1 | 2/2012 | Fulton |
| 2012/0041881 | A1 | 2/2012 | Basu |
| 2012/0047237 | A1 | 2/2012 | Arvidsson |
| 2012/0066065 | A1 | 3/2012 | Switzer |
| 2012/0066078 | A1 | 3/2012 | Kingston |
| 2012/0072311 | A1 | 3/2012 | Khan |
| 2012/0072350 | A1 | 3/2012 | Goldthwaite |
| 2012/0078735 | A1 | 3/2012 | Bauer |
| 2012/0078798 | A1 | 3/2012 | Downing |
| 2012/0078799 | A1 | 3/2012 | Jackson |
| 2012/0084132 | A1 | 4/2012 | Khan |
| 2012/0084204 | A1 | 4/2012 | Castell |
| 2012/0095852 | A1 | 4/2012 | Bauer |
| 2012/0095865 | A1 | 4/2012 | Doherty |
| 2012/0095895 | A1 | 4/2012 | Aston |
| 2012/0101881 | A1 | 4/2012 | Taylor |
| 2012/0110044 | A1 | 5/2012 | Nagpal |
| 2012/0116902 | A1 | 5/2012 | Cardina |
| 2012/0116966 | A1 | 5/2012 | Tan |
| 2012/0118950 | A1 | 5/2012 | Belk |
| 2012/0123838 | A1 | 5/2012 | Sparks |
| 2012/0123882 | A1 | 5/2012 | Carlson |
| 2012/0123940 | A1 | 5/2012 | Killian |
| 2012/0124496 | A1 | 5/2012 | Rose |
| 2012/0129514 | A1 | 5/2012 | Beenau |
| 2012/0130794 | A1 | 5/2012 | Strieder |
| 2012/0136780 | A1 | 5/2012 | El-Awady |
| 2012/0143767 | A1 | 6/2012 | Abadir |
| 2012/0143772 | A1 | 6/2012 | Abadir |
| 2012/0158580 | A1 | 6/2012 | Eram |
| 2012/0158589 | A1 | 6/2012 | Katzin |
| 2012/0158593 | A1 | 6/2012 | Garfinkle |
| 2012/0158792 | A1 | 6/2012 | MacLaurin |
| 2012/0158893 | A1 | 6/2012 | Boyns |
| 2012/0159163 | A1 | 6/2012 | von Behren |
| 2012/0165978 | A1 | 6/2012 | Li |
| 2012/0166333 | A1 | 6/2012 | von Behren |
| 2012/0166655 | A1 | 6/2012 | Maddali |
| 2012/0173431 | A1 | 7/2012 | Ritchie |
| 2012/0173962 | A1 | 7/2012 | Oh |
| 2012/0185386 | A1 | 7/2012 | Salama |
| 2012/0190386 | A1 | 7/2012 | Anderson |
| 2012/0197691 | A1 | 8/2012 | Grigg |
| 2012/0197794 | A1 | 8/2012 | Grigg |
| 2012/0197807 | A1 | 8/2012 | Schlesser |
| 2012/0203664 | A1 | 8/2012 | Torossian |
| 2012/0203666 | A1 | 8/2012 | Torossian |
| 2012/0209749 | A1 | 8/2012 | Hammad |
| 2012/0215640 | A1 | 8/2012 | Ramer |
| 2012/0215648 | A1 | 8/2012 | Rose |
| 2012/0215650 | A1 | 8/2012 | Oba |
| 2012/0215684 | A1 | 8/2012 | Kidron |
| 2012/0215688 | A1 | 8/2012 | Musser |
| 2012/0215696 | A1 | 8/2012 | Salonen |
| 2012/0221421 | A1 | 8/2012 | Hammad |
| 2012/0221502 | A1 | 8/2012 | Jerram |
| 2012/0226582 | A1 | 9/2012 | Hammad |
| 2012/0231844 | A1 | 9/2012 | Coppinger |
| 2012/0233004 | A1 | 9/2012 | Bercaw |
| 2012/0233170 | A1 | 9/2012 | Musgrove |
| 2012/0239417 | A1 | 9/2012 | Pourfallah |
| 2012/0239556 | A1 | 9/2012 | Magruder |
| 2012/0239560 | A1 | 9/2012 | Pourfallah |
| 2012/0246070 | A1 | 9/2012 | Vadhri |
| 2012/0246071 | A1 | 9/2012 | Jain |
| 2012/0246079 | A1 | 9/2012 | Wilson |
| 2012/0254108 | A1 | 10/2012 | Wedewer |
| 2012/0259763 | A1 | 10/2012 | Pessin |
| 2012/0265631 | A1 | 10/2012 | Cronic |
| 2012/0265685 | A1 | 10/2012 | Brudnicki |
| 2012/0271770 | A1 | 10/2012 | Harris |
| 2012/0284035 | A1 | 11/2012 | Gillin |
| 2012/0297446 | A1 | 11/2012 | Webb |
| 2012/0300932 | A1 | 11/2012 | Cambridge |
| 2012/0303425 | A1 | 11/2012 | Katzin |
| 2012/0303503 | A1 | 11/2012 | Cambridge |
| 2012/0303736 | A1 | 11/2012 | Novotny |
| 2012/0303961 | A1 | 11/2012 | Kean |
| 2012/0304273 | A1 | 11/2012 | Bailey |
| 2012/0310725 | A1 | 12/2012 | Chien |
| 2012/0310826 | A1 | 12/2012 | Chatterjee |
| 2012/0310831 | A1 | 12/2012 | Harris |
| 2012/0316992 | A1 | 12/2012 | Oborne |
| 2012/0317035 | A1 | 12/2012 | Royyuru |
| 2012/0317036 | A1 | 12/2012 | Bower |
| 2012/0317149 | A1 | 12/2012 | Jagota |
| 2012/0323664 | A1 | 12/2012 | Klems |
| 2012/0330874 | A1 | 12/2012 | Jerram |
| 2013/0013499 | A1 | 1/2013 | Kalgi |
| 2013/0017784 | A1 | 1/2013 | Fisher |
| 2013/0018757 | A1 | 1/2013 | Anderson |
| 2013/0019098 | A1 | 1/2013 | Gupta |
| 2013/0024364 | A1 | 1/2013 | Shrivastava |
| 2013/0024371 | A1 | 1/2013 | Hariramani |
| 2013/0024916 | A1 | 1/2013 | Evans |
| 2013/0030828 | A1 | 1/2013 | Pourfallah |
| 2013/0031006 | A1 | 1/2013 | McCullagh |
| 2013/0054337 | A1 | 2/2013 | Brendell |
| 2013/0054466 | A1 | 2/2013 | Muscato |
| 2013/0054470 | A1 | 2/2013 | Campos |
| 2013/0054474 | A1 | 2/2013 | Yeager |
| 2013/0080238 | A1 | 3/2013 | Kelly |
| 2013/0081122 | A1 | 3/2013 | Svigals |
| 2013/0090750 | A1 | 4/2013 | Herrman |
| 2013/0091028 | A1 | 4/2013 | Oder |
| 2013/0103574 | A1 | 4/2013 | Conrad |
| 2013/0110658 | A1 | 5/2013 | Lyman |
| 2013/0111599 | A1 | 5/2013 | Gargiulo |
| 2013/0117170 | A1 | 5/2013 | Coppinger |
| 2013/0117185 | A1 | 5/2013 | Collison |
| 2013/0124290 | A1 | 5/2013 | Fisher |
| 2013/0124291 | A1 | 5/2013 | Fisher |
| 2013/0124364 | A1 | 5/2013 | Mittal |
| 2013/0138525 | A1 | 5/2013 | Bercaw |
| 2013/0144785 | A1 | 6/2013 | Karpenko |
| 2013/0144888 | A1 | 6/2013 | Faith |
| 2013/0144957 | A1 | 6/2013 | Sherman |
| 2013/0145148 | A1 | 6/2013 | Shablygin |
| 2013/0145172 | A1 | 6/2013 | Shablygin |
| 2013/0151417 | A1 | 6/2013 | Gupta |
| 2013/0159081 | A1 | 6/2013 | Shastry |
| 2013/0159112 | A1 | 6/2013 | Schultz |
| 2013/0159178 | A1 | 6/2013 | Colon |
| 2013/0159184 | A1 | 6/2013 | Thaw |
| 2013/0166332 | A1 | 6/2013 | Hammad |
| 2013/0166402 | A1 | 6/2013 | Parento |
| 2013/0166456 | A1 | 6/2013 | Zhang |
| 2013/0166621 | A1 | 6/2013 | Zhu |
| 2013/0173736 | A1 | 7/2013 | Krzeminski |
| 2013/0179340 | A1 | 7/2013 | Alba |
| 2013/0185202 | A1 | 7/2013 | Goldthwaite |
| 2013/0191286 | A1 | 7/2013 | Cronic |
| 2013/0191289 | A1 | 7/2013 | Cronic |
| 2013/0198071 | A1 | 8/2013 | Jurss |
| 2013/0198080 | A1 | 8/2013 | Anderson |
| 2013/0200146 | A1 | 8/2013 | Moghadam |
| 2013/0204787 | A1 | 8/2013 | Dubois |
| 2013/0204793 | A1 | 8/2013 | Kerridge |
| 2013/0212007 | A1 | 8/2013 | Mattsson |
| 2013/0212017 | A1 | 8/2013 | Bangia |
| 2013/0212019 | A1 | 8/2013 | Mattsson |
| 2013/0212024 | A1 | 8/2013 | Mattsson |
| 2013/0212026 | A1 | 8/2013 | Powell |

(56) References Cited

U.S. PATENT DOCUMENTS

| | | | |
|---|---|---|---|
| 2013/0212666 | A1 | 8/2013 | Mattsson |
| 2013/0218640 | A1 | 8/2013 | Kidder |
| 2013/0218657 | A1 | 8/2013 | Salmon |
| 2013/0218698 | A1 | 8/2013 | Moon |
| 2013/0218721 | A1 | 8/2013 | Borhan |
| 2013/0218765 | A1 | 8/2013 | Hammad |
| 2013/0218769 | A1 | 8/2013 | Pourfallah |
| 2013/0226799 | A1 | 8/2013 | Raj |
| 2013/0226813 | A1 | 8/2013 | Voltz |
| 2013/0246199 | A1 | 9/2013 | Carlson |
| 2013/0246202 | A1 | 9/2013 | Tobin |
| 2013/0246203 | A1 | 9/2013 | Laracey |
| 2013/0246258 | A1 | 9/2013 | Dessert |
| 2013/0246259 | A1 | 9/2013 | Dessert |
| 2013/0246267 | A1 | 9/2013 | Tobin |
| 2013/0254028 | A1 | 9/2013 | Salci |
| 2013/0254052 | A1 | 9/2013 | Royyuru |
| 2013/0254102 | A1 | 9/2013 | Royyuru |
| 2013/0254117 | A1 | 9/2013 | von Mueller |
| 2013/0262296 | A1 | 10/2013 | Thomas |
| 2013/0262302 | A1 | 10/2013 | Lettow |
| 2013/0262315 | A1 | 10/2013 | Hruska |
| 2013/0262316 | A1 | 10/2013 | Hruska |
| 2013/0262317 | A1 | 10/2013 | Collinge |
| 2013/0275300 | A1 | 10/2013 | Killian |
| 2013/0275307 | A1 | 10/2013 | Khan |
| 2013/0275308 | A1 | 10/2013 | Paraskeva |
| 2013/0282502 | A1 | 10/2013 | Jooste |
| 2013/0282575 | A1 | 10/2013 | Mullen |
| 2013/0282588 | A1 | 10/2013 | Hruska |
| 2013/0297501 | A1 | 11/2013 | Monk |
| 2013/0297504 | A1 | 11/2013 | Nwokolo |
| 2013/0297508 | A1 | 11/2013 | Belamant |
| 2013/0304649 | A1 | 11/2013 | Cronic |
| 2013/0308778 | A1 | 11/2013 | Fosmark |
| 2013/0311382 | A1 | 11/2013 | Fosmark |
| 2013/0317982 | A1 | 11/2013 | Mengerink |
| 2013/0325579 | A1 | 12/2013 | Salmon |
| 2013/0332344 | A1 | 12/2013 | Weber |
| 2013/0339240 | A1 | 12/2013 | Anderson |
| 2013/0339253 | A1 | 12/2013 | Sincai |
| 2013/0346302 | A1 | 12/2013 | Purves |
| 2013/0346305 | A1 | 12/2013 | Mendes |
| 2013/0346314 | A1 | 12/2013 | Mogollon |
| 2014/0006198 | A1 | 1/2014 | Daly |
| 2014/0006283 | A1 | 1/2014 | Hogg |
| 2014/0007213 | A1 | 1/2014 | Sanin |
| 2014/0013106 | A1 | 1/2014 | Red path |
| 2014/0013114 | A1 | 1/2014 | Red path |
| 2014/0013452 | A1 | 1/2014 | Aissi |
| 2014/0019352 | A1 | 1/2014 | Shrivastava |
| 2014/0025581 | A1 | 1/2014 | Caiman |
| 2014/0025585 | A1 | 1/2014 | Caiman |
| 2014/0025958 | A1 | 1/2014 | Caiman |
| 2014/0032417 | A1 | 1/2014 | Mattsson |
| 2014/0032418 | A1 | 1/2014 | Weber |
| 2014/0040127 | A1 | 2/2014 | Chatterjee |
| 2014/0040137 | A1 | 2/2014 | Carlson |
| 2014/0040139 | A1 | 2/2014 | Brudnicki |
| 2014/0040144 | A1 | 2/2014 | Plomske |
| 2014/0040145 | A1 | 2/2014 | Ozvat |
| 2014/0040148 | A1 | 2/2014 | Ozvat |
| 2014/0040628 | A1 | 2/2014 | Fort |
| 2014/0041018 | A1 | 2/2014 | Bomar |
| 2014/0046853 | A1 | 2/2014 | Spies |
| 2014/0047517 | A1 | 2/2014 | Ding |
| 2014/0047551 | A1 | 2/2014 | Nagasundaram |
| 2014/0052532 | A1 | 2/2014 | Tsai |
| 2014/0052620 | A1 | 2/2014 | Rogers |
| 2014/0052637 | A1 | 2/2014 | Jooste |
| 2014/0068706 | A1 | 3/2014 | Aissi |
| 2014/0074637 | A1 | 3/2014 | Hammad |
| 2014/0095589 | A1 | 4/2014 | Johnson |
| 2014/0108172 | A1 | 4/2014 | Weber |
| 2014/0108197 | A1 | 4/2014 | Smith |
| 2014/0114857 | A1 | 4/2014 | Griggs |
| 2014/0136945 | A1 | 5/2014 | Ligman |
| 2014/0143137 | A1 | 5/2014 | Carlson |
| 2014/0164243 | A1 | 6/2014 | Aabye |
| 2014/0188586 | A1 | 7/2014 | Carpenter |
| 2014/0294701 | A1 | 10/2014 | Dai |
| 2014/0297534 | A1 | 10/2014 | Patterson |
| 2014/0310080 | A1 | 10/2014 | Salmon |
| 2014/0310183 | A1 | 10/2014 | Weber |
| 2014/0330721 | A1 | 11/2014 | Wang |
| 2014/0330722 | A1 | 11/2014 | Laxminarayanan |
| 2014/0331265 | A1 | 11/2014 | Mozell |
| 2014/0337175 | A1 | 11/2014 | Katzin |
| 2014/0337236 | A1 | 11/2014 | Wong |
| 2014/0344153 | A1 | 11/2014 | Raj |
| 2014/0365295 | A1 | 12/2014 | Postrel |
| 2014/0372308 | A1 | 12/2014 | Sheets |
| 2015/0019443 | A1 | 1/2015 | Sheets |
| 2015/0019944 | A1 | 1/2015 | Kalgi |
| 2015/0026049 | A1 | 1/2015 | Theurer |
| 2015/0032625 | A1 | 1/2015 | Dill |
| 2015/0032626 | A1 | 1/2015 | Dill |
| 2015/0032627 | A1 | 1/2015 | Dill |
| 2015/0046338 | A1 | 2/2015 | Laxminarayanan |
| 2015/0046339 | A1 | 2/2015 | Wong |
| 2015/0052064 | A1 | 2/2015 | Karpenko |
| 2015/0088756 | A1 | 3/2015 | Makhotin |
| 2015/0089350 | A1 | 3/2015 | Davis |
| 2015/0106239 | A1 | 4/2015 | Gaddam |
| 2015/0112870 | A1 | 4/2015 | Nagasundaram |
| 2015/0112871 | A1 | 4/2015 | Kumnick |
| 2015/0120472 | A1 | 4/2015 | Aabye |
| 2015/0127529 | A1 | 5/2015 | Makhotin |
| 2015/0127547 | A1 | 5/2015 | Powell |
| 2015/0140960 | A1 | 5/2015 | Powell |
| 2015/0142673 | A1 | 5/2015 | Nelsen |
| 2015/0161597 | A1 | 6/2015 | Subramanian |
| 2015/0178724 | A1 | 6/2015 | Ngo |
| 2015/0180836 | A1 | 6/2015 | Wong |
| 2015/0186864 | A1 | 7/2015 | Jones |
| 2015/0193222 | A1 | 7/2015 | Pirzadeh |
| 2015/0195133 | A1 | 7/2015 | Sheets |
| 2015/0199679 | A1 | 7/2015 | Palanisamy |
| 2015/0199689 | A1 | 7/2015 | Kumnick |
| 2015/0220917 | A1 | 8/2015 | Aabye |
| 2015/0269566 | A1 | 9/2015 | Gaddam |
| 2015/0302453 | A1 | 10/2015 | Tietzen |
| 2015/0312038 | A1 | 10/2015 | Palanisamy |
| 2015/0319158 | A1 | 11/2015 | Kumnick |
| 2015/0332262 | A1 | 11/2015 | Lingappa |
| 2015/0339767 | A1 | 11/2015 | Chen |
| 2015/0356560 | A1 | 12/2015 | Shastry |
| 2016/0028550 | A1 | 1/2016 | Gaddam |
| 2016/0042263 | A1 | 2/2016 | Gaddam |
| 2016/0065370 | A1 | 3/2016 | Le Saint |
| 2016/0092696 | A1 | 3/2016 | Guglani |
| 2016/0092872 | A1 | 3/2016 | Prakash |
| 2016/0103675 | A1 | 4/2016 | Aabye |
| 2016/0119296 | A1 | 4/2016 | Laxminarayanan |
| 2016/0224976 | A1 | 8/2016 | Basu |
| 2016/0291920 | A1 | 10/2016 | Sirpal |
| 2016/0379192 | A1 | 12/2016 | Purves |
| 2017/0046696 | A1 | 2/2017 | Powell |
| 2017/0103387 | A1 | 4/2017 | Weber |
| 2017/0134479 | A1 | 5/2017 | Kalgi |
| 2017/0220818 | A1 | 8/2017 | Nagasundaram |
| 2017/0228723 | A1 | 8/2017 | Taylor |
| 2017/0300314 | A1 | 10/2017 | Lopyrev |
| 2017/0346876 | A1 | 11/2017 | Lim |
| 2018/0075081 | A1 | 3/2018 | Chipman |

FOREIGN PATENT DOCUMENTS

| | | | |
|---|---|---|---|
| CN | 101075316 | A | 11/2007 |
| CN | 101231727 | A | 7/2008 |
| CN | 101388125 | A | 3/2009 |
| CN | 101840550 | A | 9/2010 |
| EP | 0745961 | A2 | 12/1996 |
| EP | 0855659 | A1 | 7/1998 |

(56) References Cited

FOREIGN PATENT DOCUMENTS

| | | | |
|---|---|---|---|
| EP | 1921578 | A1 | 5/2008 |
| EP | 2156397 | A1 | 2/2010 |
| JP | 2005004621 | A | 1/2005 |
| JP | 2008527495 | A | 7/2008 |
| JP | 2008545210 | A | 12/2008 |
| JP | 2009151730 | A | 7/2009 |
| JP | 2011186660 | A | 9/2011 |
| JP | 2012027824 | A | 2/2012 |
| KR | 20000058839 | A | 10/2000 |
| KR | 100432430 | B1 | 5/2004 |
| KR | 20060117177 | A | 11/2006 |
| KR | 20070104087 | A | 10/2007 |
| SG | 2013069539 | | 10/2013 |
| WO | 2000046769 | A1 | 8/2000 |
| WO | 2001035304 | A1 | 5/2001 |
| WO | 0165502 | A2 | 9/2001 |
| WO | 2003001866 | A1 | 1/2003 |
| WO | 03023674 | A1 | 3/2003 |
| WO | 2003046697 | A2 | 6/2003 |
| WO | 2003071386 | A2 | 8/2003 |
| WO | 2003083737 | A1 | 10/2003 |
| WO | 2004042536 | A2 | 5/2004 |
| WO | 2006113834 | A2 | 10/2006 |
| WO | 2009032523 | A1 | 3/2009 |
| WO | 2010078522 | A1 | 7/2010 |
| WO | 2010148704 | A1 | 12/2010 |
| WO | 2010148737 | A1 | 12/2010 |
| WO | 2012068078 | A2 | 5/2012 |
| WO | 2012098556 | A1 | 7/2012 |
| WO | 2012142370 | A2 | 10/2012 |
| WO | 2012167941 | A1 | 12/2012 |
| WO | 2013048538 | A1 | 4/2013 |
| WO | 2013056104 | A1 | 4/2013 |
| WO | 2013119914 | A1 | 8/2013 |
| WO | 2013179271 | A2 | 12/2013 |

OTHER PUBLICATIONS

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.

Gopalan, NP & Selvan, B Siva. TCP/IP Illustrated. Prentice-Hall. 2008. pp. 101-102, 175-176 and 235. 7 pages.

Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?amumber=5369384, pp. 449-452.

International Search Report and Written Opinion for PCT/US2010/048344 dated Nov. 15, 2010. (7 pages).

International Search Report and Written Opinion for PCT/US2010/041860 dated Feb. 1, 2011. (8 pages).

International Search Report for PCT/US11/49393 dated Dec. 5, 2011. (2 pages).

International Search Report and Written Opinion for PCT/US11/57179 dated Jan. 5, 2012. (7 pages).

International Search Report and Written Opinion for PCT/US11/57173 dated Mar. 15, 2012. (11 pages).

International Search Report for PCT/US11/65305 dated Apr. 16, 2012. 2 pages.

International Search Report for PCT/US12/23856 dated Jun. 6, 2012. 3 pages.

International Search Report for PCT/US12/24772 dated Jul. 24, 2012. 3 pages.

International Search Report for PCT/US12/25530 dated Aug. 7, 2012. 4 pages.

International Search Report PCT/US12/27620 dated Aug. 10, 2012. 3 pages.

International Search Report and Written Opinion for PCT/US12/41437 dated Aug. 24, 2012. (20 pages).

International Search Report for PCT/US12/39638 dated Sep. 24, 2012. 4 pages.

International Search Report for PCT/US12/45875 dated Nov. 16, 2012. 4 pages.

International Search Report and Written Opinion for PCT/US12/47092 dated Nov. 26, 2012. 11 pages.

International Search Report for PCT/US12/57577 dated Nov. 29, 2012. 2 pages.

International Search Report and Written Opinion for PCT/US12/57528 dated Dec. 17, 2012. 8 pages.

International Search Report and Written Opinion for PCT/US12/66898 dated Feb. 11, 2013. 14 pages.

International Search Report and Written Opinion for PCT/US12/56759 dated Feb. 25, 2013. 12 pages.

International Search Report and Written Opinion for PCT/US2013/020411 dated May 21, 2013. 18 pages.

Written Opinion for PCT/US12/27620 dated Aug. 10, 2012. 5 pages.

International Search Report and Written Opinion for PCT/US2010/033861 dated Dec. 9, 2010 (7 pages).

International Search Report for PCT/US2010/033547 dated Dec. 14, 2010 (3 pages).

International Search Report for PCT/US2010/045445 dated Feb. 24, 2011 (3 pages).

International Search Report for PCT/US2010/045500 dated Mar. 29, 2011 (3 pages).

International Search Report and Written Opinion for PCT/US2011/024941 dated Apr. 19, 2011 (6 pages).

International Search Report and Written Opinion for PCT/US2010/046833 dated Apr. 26, 2011 (8 pages).

International Search Report and Written Opinion for PCT/US2011/26734 dated Apr. 29, 2011 (7 pages).

International Search Report and Written Opinion for PCT/US2011/29790 dated May 19, 2011 (6 pages).

International Search Report for PCT/US2011/035268 dated Aug. 5, 2011 (3 pages).

International Search Report and Written Opinion for PCT/US2011/032093 dated Aug. 24, 2011 (11 pages).

International Search Report and Written Opinion for PCT/US12/37597 dated Sep. 21, 2012 (11 pages).

International Search Report and Written Opinion for PCT/US2012/045601 dated Feb. 1, 2013. 11 pages.

International Search Report and Written Opinion for PCT/US12/65738 dated Apr. 19, 2013. 9 pages.

U.S. Appl. No. 61/250,440, filed Oct. 9, 2009, entitled "Systems and Methods to Provide Loyalty Programs".

Australian Patent Office, Patent Examination Report No. 2 in Australian Patent Application No. 2012217606, dated Jun. 15, 2016, 6 pages.

Cash et al., U.S. Appl. No. 15/041,495 (unpublished), Peer Forward Authorization of Digital Requests filed on Feb. 11, 2016.

Dizaj, Mohammad Vahid Alizadeh, Moghaddam, Rexa Askari, Momenebellah, Samad, New Mobile Payment Protocol: Mobile Pay Center Protocol 2 (MPCP2) by Using New Key Agreement Protocol: VAM, 3d International Conference on Electronics Computer Technology, vol. 2, Apr. 2011, pp. 12-18.

State Intellectual Property Office of the People's Republic of China, First Office Action in Chinese Application No. 201280018719.7, dated Jul. 4, 2016, 15 pages.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Gaddam et al., U.S. Appl. No. 62/053,736 (unpublished), Completing Transactions Without a User Payment Device, filed Sep. 22, 2014.

Gao, Jerry, Kulkarni, Vijay, Ranavat, Himanshu, Chang, Lee, Mei, Hsing, A2D Barcode-Based Mobile Payment System, 3d International Conference on Multimedia and Ubiquitous Engineering, Jun. 2009, pp. 320-329.

International Search Report and Written Opinion for PCT/US2014/030517, dated Aug. 18, 2014. (9 pages).

(56) References Cited

OTHER PUBLICATIONS

International Search Report and Written Opinion for PCT/US2012/026205, dated May 29, 2012. 2 pages.
Kalgi et al., U.S. Appl. No. 62/024,426 (unpublished), Secure Transactions Using Mobile Devices, filed Jul. 14, 2014.
Kinagi, U.S. Appl. No. 62/117,291 (unpublished), Token and Cryptogram Using Transaction Specific Information filed Feb. 17, 2015.
Le Saint et al., U.S. Appl. No. 15/008,388 (unpublished), Methods for Secure Credential Provisioning, filed Jan. 27, 2016.
McGuire, U.S. Appl. No. 14/600,523 (unpublished), Secure Payment Processing Usnig Authorization Request, filed Jan. 20, 2015.
Patterson, U.S. Appl. No. 15/019,157 (unpublished), Token Processing Utilizing Multiple Authorizations, filed Feb. 9, 2016.
Patterson, U.S. Appl. No. 62/054,346 (unpublished), Mirrored Token Vault, filed Sep. 23, 2014.
Hoverson et al., U.S. Appl. No. 62/038,174 (unpublished), Customized Payment Gateway, filed Aug. 15, 2014.
Stubbs et al., U.S. Appl. No. 62/103,522 (unpublished), Methods and Systems for Wallet Provider Provisioning filed Jan. 14, 2015.
Prakash et al., U.S. Appl. No. 14/955,716 (unpublished), Provisioning Platform for Machine-To-Machine Devices, filed Dec. 1, 2015.
Prakash et al., U.S. Appl. No. 62/037,033 (unpublished), Sharing Payment Token, filed Aug. 13, 2014.
Galland et al., U.S. Appl. No. 62/128,709 (unpublished), Tokenizing Transaction Amounts, filed Mar. 5, 2015.
IP Australia, Patent Examination Report No. 1, Australian Application No. 2012220669, dated Sep. 8, 2014, 6 pages.
State Intellectual Property of the People's Republic of China, First Office Action in Chinese Application No. 201280019629.X, dated Aug. 1, 2016, 15 pages.
Smartphone e-payment and Google AD send blog, 'Google Wallet on Smartphone', <http://stockpedia.blogspot.kr/2011/06/google-wallet.html> Jun. 10, 2011, pp. 1-3.
Lowry P B XML data mediation and collaboration: a proposed comprehensive architecture and query requirements for using XML to mediate heterogeneous data sources and targets, Proceedings of the 34th Hawaii International Conference on System Sciences—2001, Jan. 3, 2001; Jan. 3, 2001-Jan. 6, 2001, IEEE, pp. 1-9.
Wang, U.S. Appl. No. 62/000,288 (unpublished), Payment System Canonical Address Format, filed May 19, 2014.
Wang, U.S. Appl. No. 62/042,050 (unpublished), Payment Device Authentication and Authorization System, filed Aug. 26, 2014.
Wong et al., U.S. Appl. No. 14/966,948 (unpublished), Automated Access Data Provisioning filed Dec. 11, 2015.
Wong et al., U.S. Appl. No. 61/879,362 (unpublished), Systems and Methods for Managing Mobile Cardholder Verification Methods filed Sep. 18, 2013.
European Patent Office, Supplementary European Search Report and European Search Opinion, in EP Application No. 12749451.6, dated Apr. 20, 2015, 7 pages.
International Search Report and Written Opinion for PCT/US13/46875, dated Oct. 24, 2013, 14 pages.
IP Australia, Patent Examination Report No. 2, Australian Application No. 2012220669, dated Jun. 8, 2016, 4 pages.
International Search Report and Writtten Opinion for PCT/US2011/039178 dated Sep. 16, 2011 (7 pages).
International Search Report and Written Opinion for PCT/US11/57180 dated Mar. 15, 2012 (11 pages).
International Search Report and Written Opinion for PCT/US12/55636 dated Nov. 30, 2012. 2 pages.
Powell, U.S. Appl. No. 61/892,407 (unpublished), Issuer Over-The-Air Update Method and System filed Oct. 17, 2013.
Dimmick, U.S. Appl. No. 14/952,444 (unpublished), Tokenization Request Via Access Device, filed Nov. 25, 2015.
Dimmick, U.S. Appl. No. 14/952,514 (unpublished), Systems Communications With Non-Sensitive Identifiers, filed Nov. 25, 2015.
International Preliminary Report on Patentability dated Jan. 14, 2014 cited in related/corresponding International PCT Appl. No. PCT/US2012/045875 filed Jul. 7, 2012. (11 pages).
Vitt, Elizabeth et al. Data Integration Solutions for Master Data Management (Feb. 2006). https://technet.microsoft.com/en-us/library/aa964123(v=sql.90).aspx (19 pages).
Vitt, Elizabeth, et al. "Microsoft SQL Server 2005 Analysis Services Performance Guide." White Paper, White Paper (2007). (116 pages).
Stack Exchange, Why aren't there automated translators from one programming language to another, 2010 (5 pages).
McCarney et al., "Tapas: Design, Implementation, and Usability Evaluation of a Password Manager," Copyright 2012, ACM 978 1-4503-1312-4/12/12 (10 pages).
International Search Report for PCT/US2010/033229 dated Dec. 29, 2010, 8 pages.
International Search Report for PCT/US12/21000 dated May 15, 2012. 2 pages.
International Search Report and Written Opinion for PCT/US2012/027043 dated Jul. 13, 2012. 15 pages.
Corrected Petition for Inter Partes Review of U.S. Pat. No. 8,533,860 Challenging Claims 1-30 Under 35 U.S.C. .sctn.312 and 37 C.F.R. sctn.42.104, dated Mar. 14, 2016, before the USPTO Patent Trial and Appeal Board, IPR 2016-00600, 65 pages.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Powell, U.S. Appl. No. 61/926,236 (unpublished), Methods and Systems for Provisioning Mobile Devices With Payment Credentials and Payment Token Identifiers filed Jan. 10, 2014.
Petition for Inter Partes Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.
International Search Report and Written Opinion for PCT/US2010/033229 dated Dec. 29, 2010. (8 pages).
International Search Report and Written Opinion for PCT/US2012/069557 dated Feb. 22, 2013. 8 pages.
International Search Report and Written Opinion for PCT/US2012/057528, dated May 29, 2012. (8 pages).
U.S. Appl. No. 12/940,664 (unpublished), entitled "System and Method for Determining Transaction Distance" filed Nov. 5, 2010.
International Search Report and Written Opinion issued in connection with PCT/US11/42062 dated Sep. 29, 2011 (8 pages).
International Search Report for PCT/US09/54921 dated Oct. 21, 2009. (2 pages).
International Search Report and Written Opinion for PCT/US2013/031084, dated Jun. 4, 2013. 9 pages.
ShopSavvy Blog. Feb. 2012. Retrieved from https://web.archive.Org/web/20120212104611/http://shopsavvy.com/blog. pp. 1-13 (Year: 2012).
Chipman, et al., U.S. Appl. No. 15/265,282 (Unpublished), Self-Cleaning Token Vault, filed Sep. 14, 2016.
U.S. Appl. No. 15/462,658 (Unpublished), Replacing Token on a Multi-Token User Device, filed Mar. 17, 2017.
Sabba et al., U.S. Appl. No. 15/011,366 (unpublished), Token Check Offline, filed Jan. 29, 2016.
Sharma et al., U.S. Appl. No. 62/003,717 (unpublished), Mobile Merchant Application filed May 28, 2014.
International Preliminary Report on Patentability dated Jan. 16, 2014 in related/corresponding PCT Patent Appl. No. PCT/US2012/045601 filed Jul. 5, 2012. (7 pages).
Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.
Petition for Inter Partes Review of U.S. Pat. No. 8,402,555 Challenging Claims 1-26 Under 35 U.S.C. 312 and 37 C.F.R. 42.104, dated Mar. 22, 2016, before the USPTO Patent Trial and Appeal Board, IPR 2016-00789, 65 pages.
Office Action dated Feb. 28, 2018 for U.S. Appl. No. 14/242,403 (pp. 1-11).

(56) References Cited

OTHER PUBLICATIONS

Office Action dated Apr. 12, 2018 for U.S. Appl. No. 13/520,481 (pp. 1-8).
International Search Report and Written Opinion for PCT/US2013/024538, dated May 31, 2013. 15 pages.
Charland et al., Mobile Application Development: Web vs. Native, Apr. 2011, 9 pages.
Lee et al., osgGap: scene graph library for mobile based on hybrid web app framework, Nov. 2013, 4 pages.
Immaneni et al., Hybrid retrieval from the unified web, Mar. 2007, 5 pages.
Gao et al., "A 2D Barcode-Based Mobile Payment System", (2009), XP031561633 (10 pages).
Australian Examination Report for AU2017203295 dated Apr. 19, 2018, 4 pages.
Ratha, N., and Bolle, R., 1. History of Fingerprint Pattern Recognition—1.1 Introduction; 1.2 The Development of Fingerprint Classification Systems "Automatic Fingerprint Recognition Systems," Springer-Verlag, (2004) (466 pages).
Office Action dated May 22, 2018 for U.S. Appl. No. 14/216,382 (pp. 1-8).
Chinese Office Action dated Oct. 10, 2017 for CN Application No. 201280019629.X, 7 pages.
Pan Kexian "Development of the Location-Based Service LBS Application of Intelligent Mobile Phone", Information Technologies, Oct. 25, 2009, pp. 134-137, cited on Oct. 10, 2017 in CN201280019629.
Yang Jingjing "Help Web: Life Search Forerunner" Scientific and Technological Information, Aug. 5, 2010, pp. 36-37, cited on Oct. 10, 2017 in CN201280019629.
Wang Lepeng et al. "Discuss of Foursquare Pattern and Its Deelopment Strategies in China" Scientific and Technological Information, Aug. 15, 2010, pp. 90-91, cited on Oct. 10, 2017 in CN201280019629.
Chinese Office Action dated Nov. 6, 2017 for CN Application No. 201280018719.7, 24 pages.
I. Malavolta, Web-based hybrid mobile apps: state of the practice and research opportunities, 2 pages (Year: 2016).
Notice of Allowance dated Jul. 23, 2018 for U.S. Appl. No. 15/406,325 (pp. 1-9).
Notice of Allowance dated Jun. 27, 2018 for U.S. Appl. No. 13/542,443 (pp. 1-13).
Office Action dated Jun. 22, 2018 for U.S. Appl. No. 13/629,006 (pp. 1-8).
Office Action dated Jun. 21, 2018 for U.S. Appl. No. 14/216,351 (pp. 1-12).
Office Action dated Jun. 27, 2018 for U.S. Appl. No. 15/717,409 (pp. 1-7).
Office Action dated Jul. 16, 2018 for U.S. Appl. No. 14/698,317 (pp. 1-13).
Office Action dated Sep. 21, 2018 for U.S. Appl. No. 15/839,493 (pp. 1-21).
Office Action dated Oct. 4, 2018 for U.S. Appl. No. 13/758,472 (pp. 1-22).
Notice of Allowance dated Oct. 11, 2018 for U.S. Appl. No. 13/520,481 (pp. 1-9).
Brick-and-mortar retailers snatching customers away from E-tailers. (Feb. 16, 2012). PR Newswire Retrieved from https:// dialog.proguest.com/professional/docview/1346330115?accountid=142257 (Year: 2012).
Notice of Allowance dated Oct. 10, 2018 for U.S. Appl. No. 14/242,403 (pp. 1-11).
Office Action dated Nov. 2, 2018 for U.S. Appl. No. 13/624,779 (pp. 1-18).

* cited by examiner

Example: Hybrid Application Distributed Model and View Processing

Example Data Flow: Hybrid Application Distributed View Processing

Example Data Flow: Hybrid Application Distributed View Processing

Example Logic Flow: Web-to-Native View Conversion, e.g., WVC Component

Example Logic Flow: Web-to-Native View Conversion, e.g., WVC Component

Example Logic Flow: Distributed View Value Insertion, e.g., DVI Component

Example Logic Flow: Distributed View Value Insertion, e.g., DVI Component

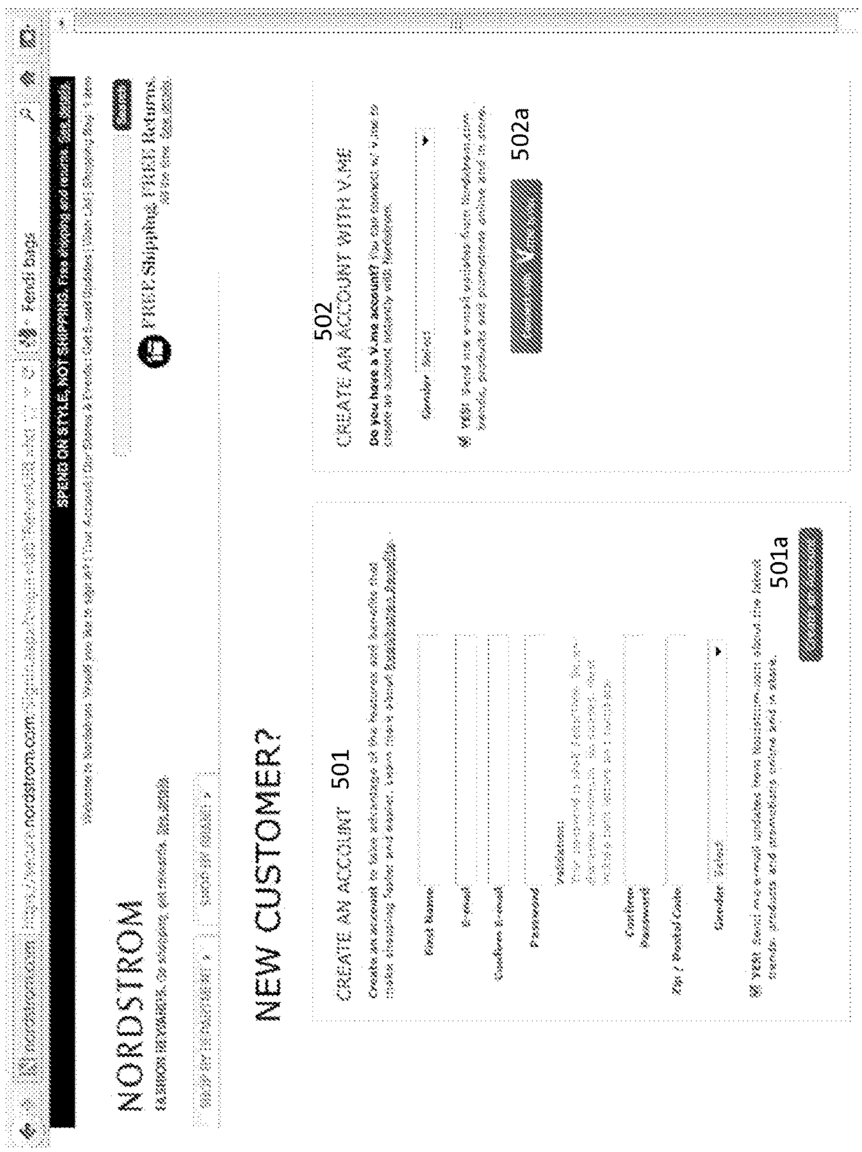
Figure 5A: Example Merchant Account Creation UI

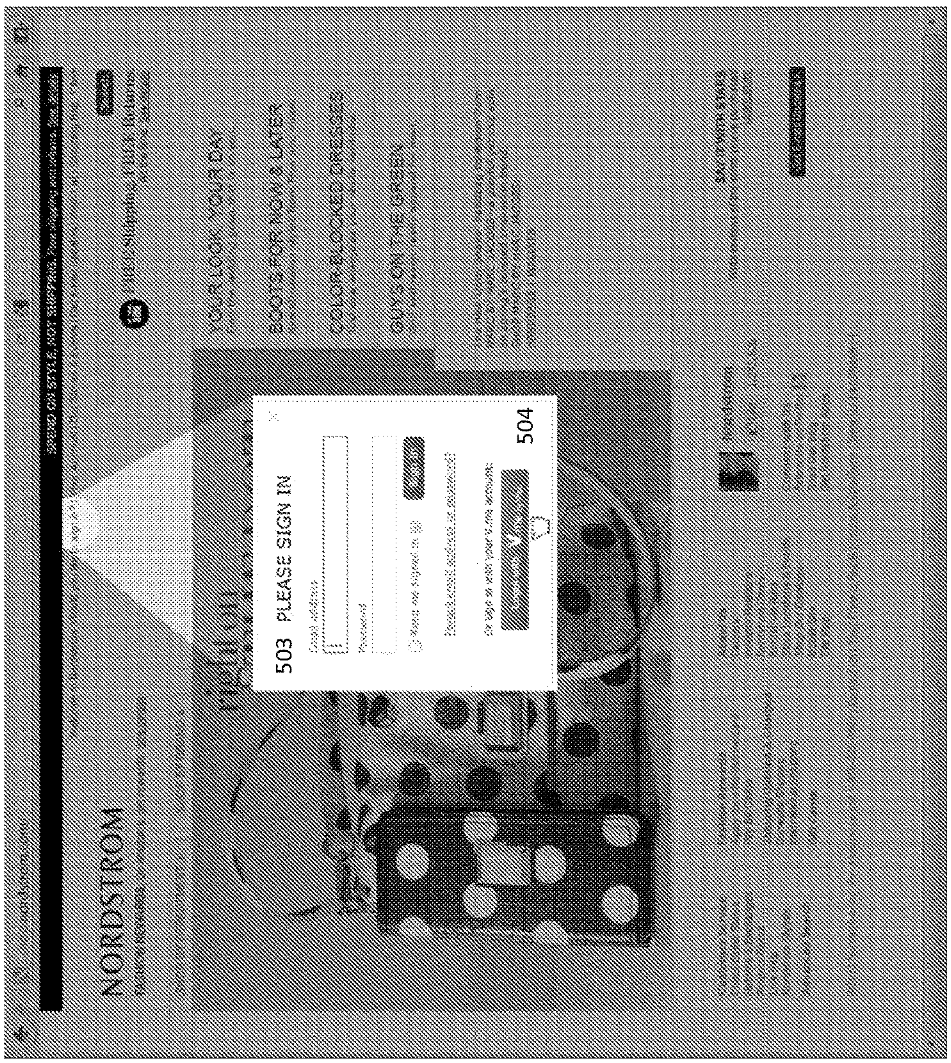
Figure 5B: Example Merchant Account Login UI

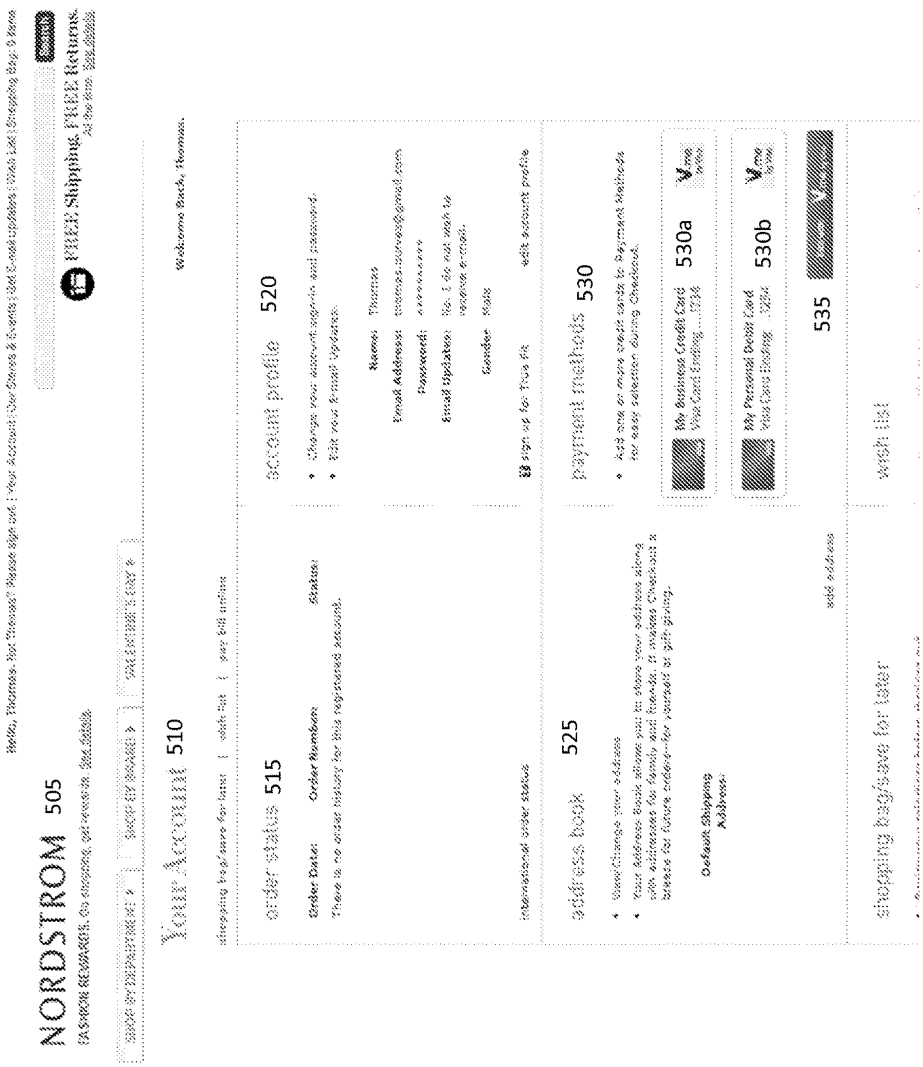
Figure 5C: Example Account Preference Management UI

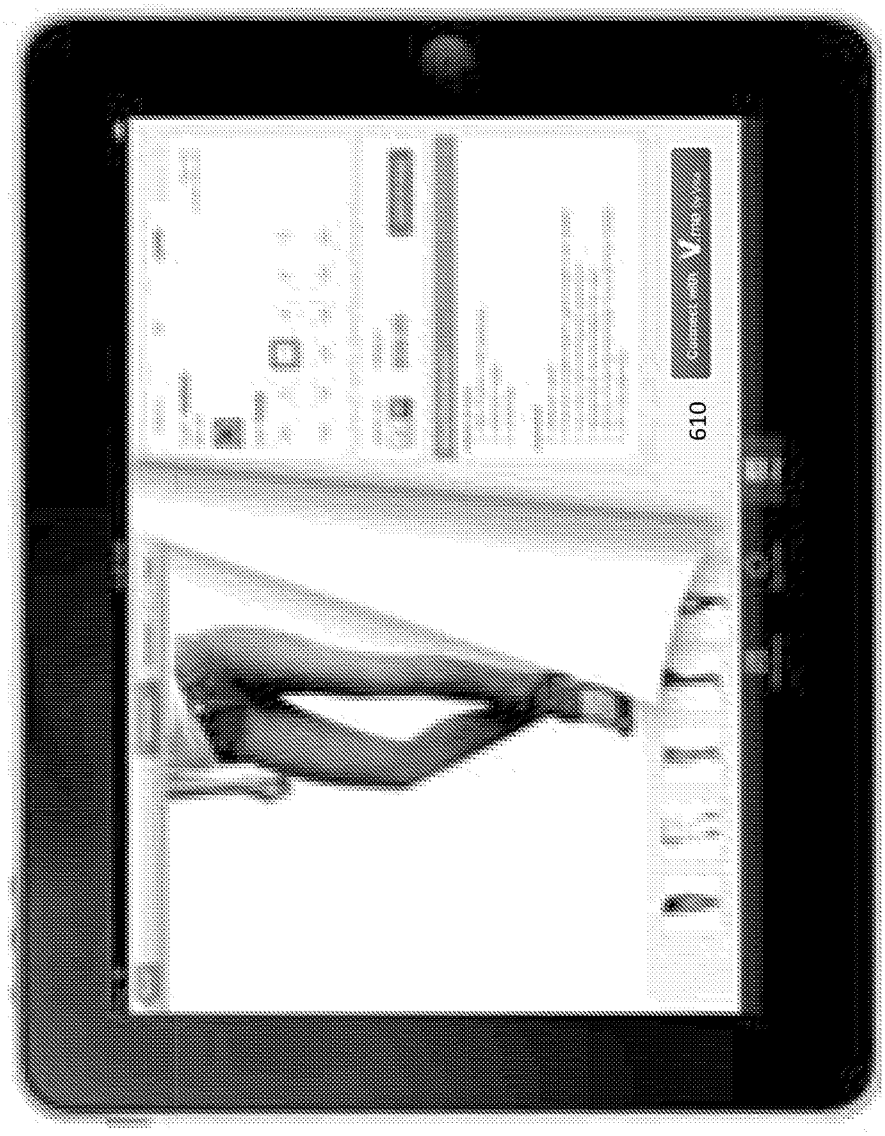
Figure 6: Example Cross Channel UI

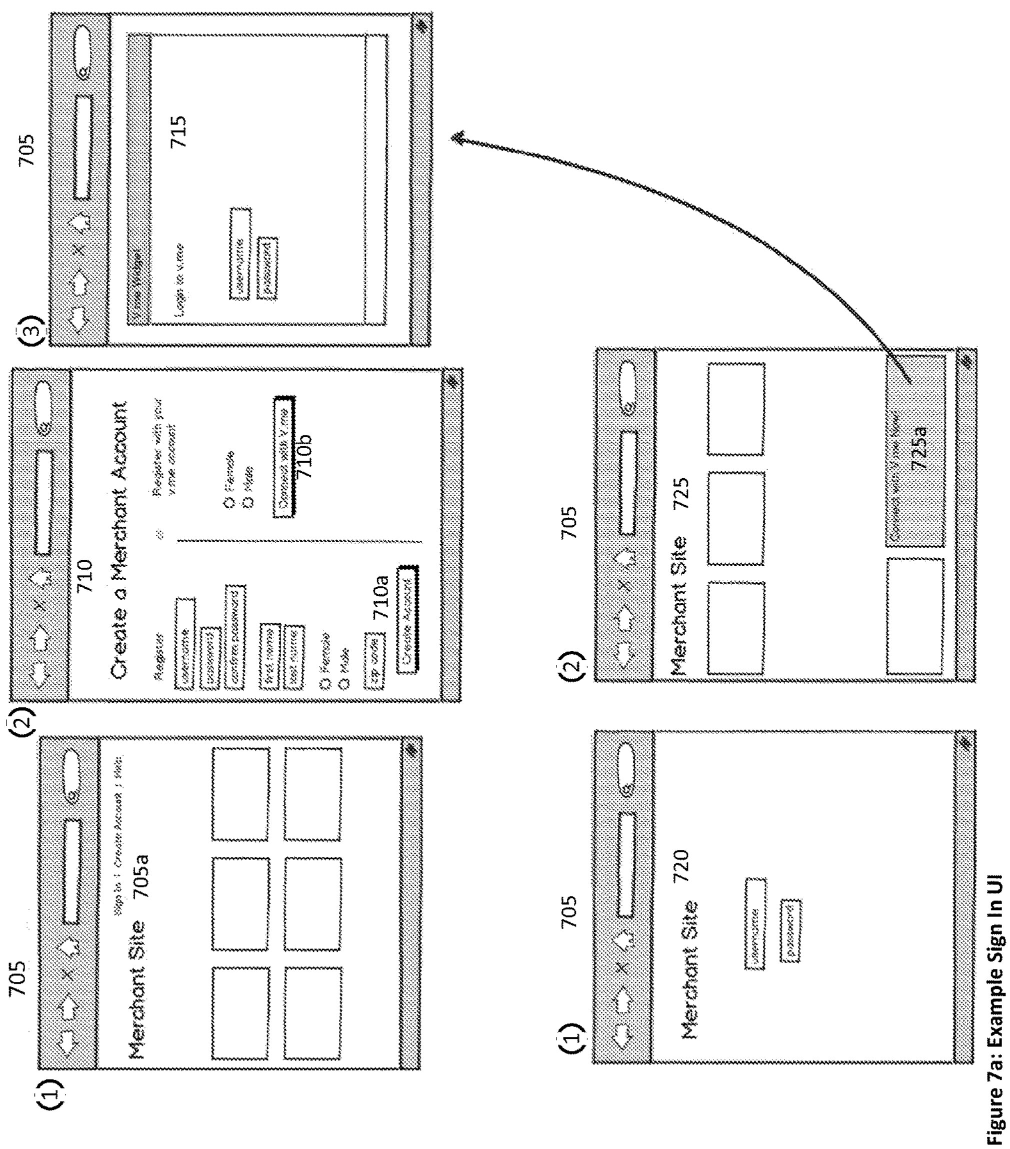
Figure 7a: Example Sign In UI

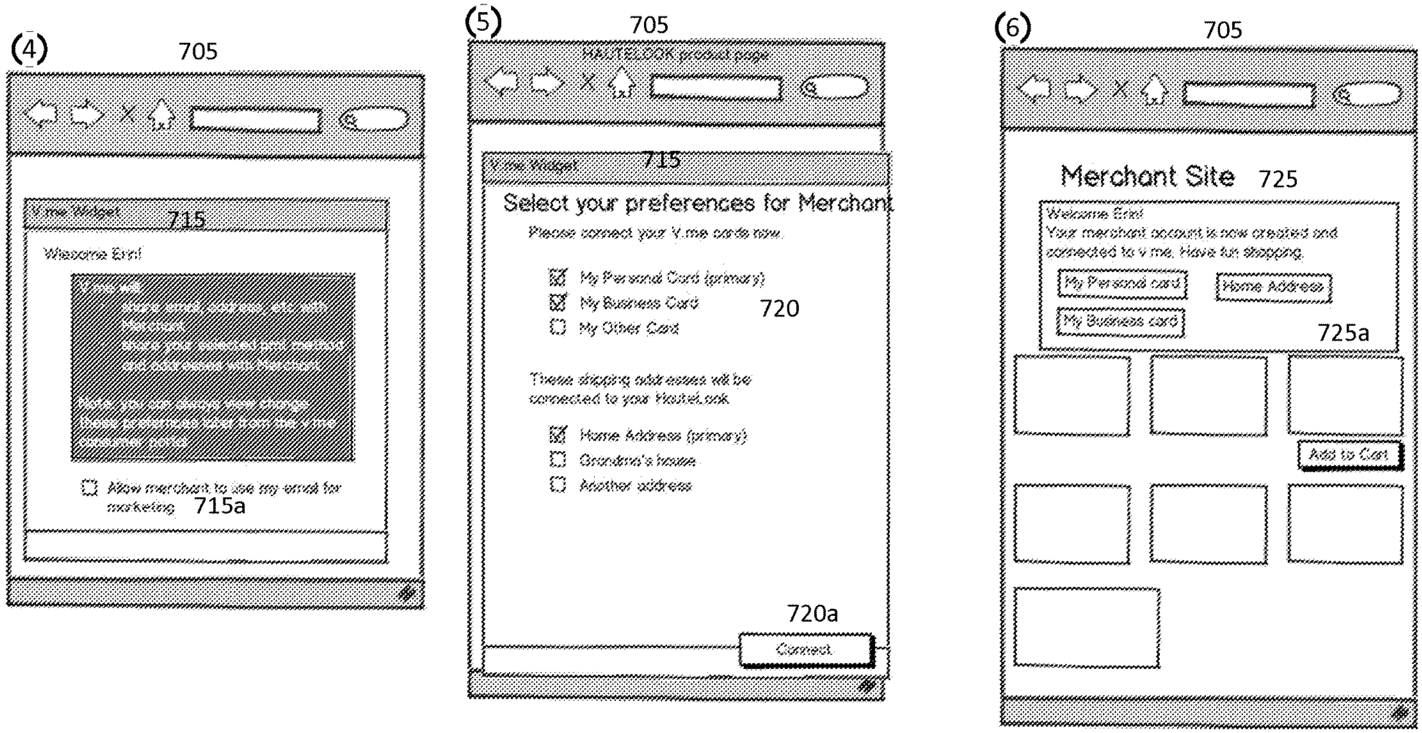
Figure 7b: Example Account Management UI

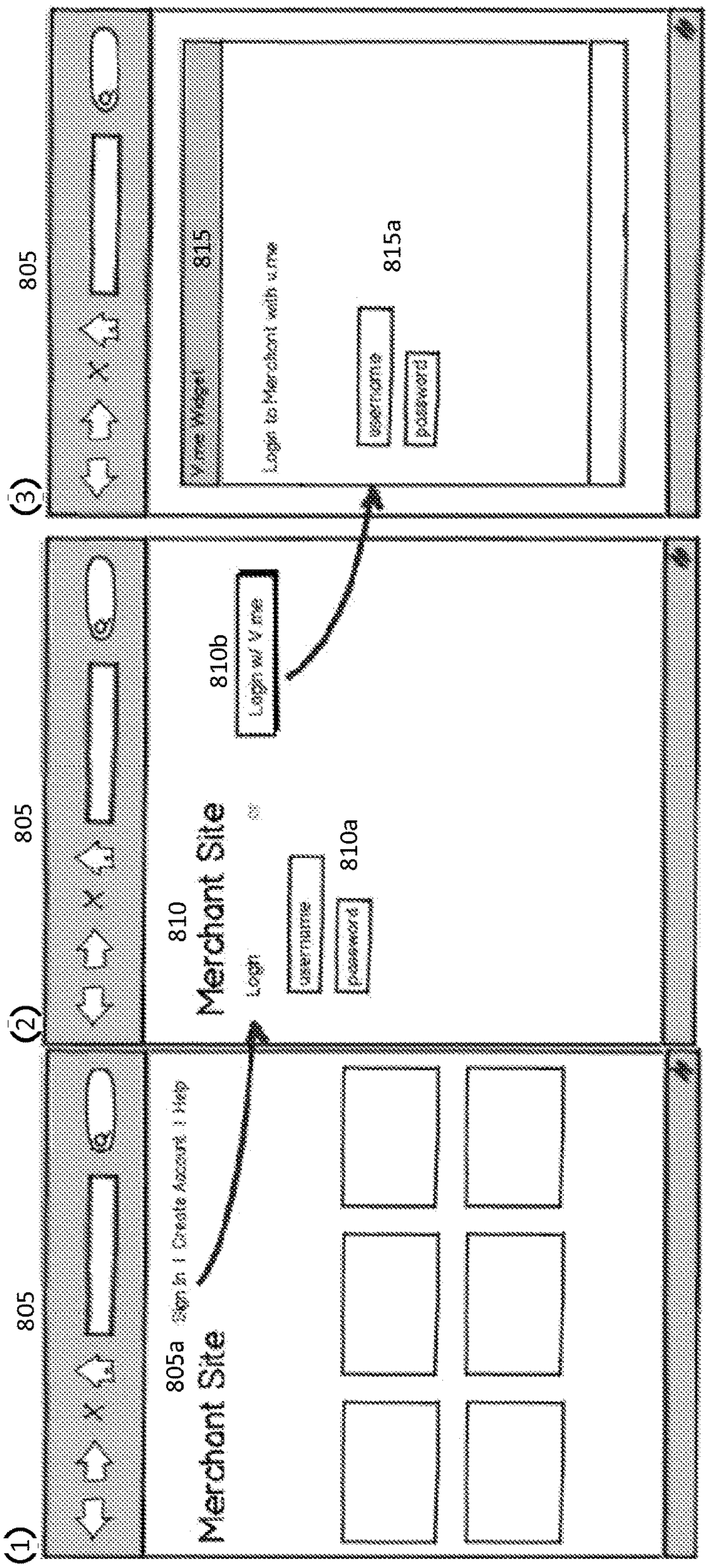
Figure 8a: Example Sign In UI

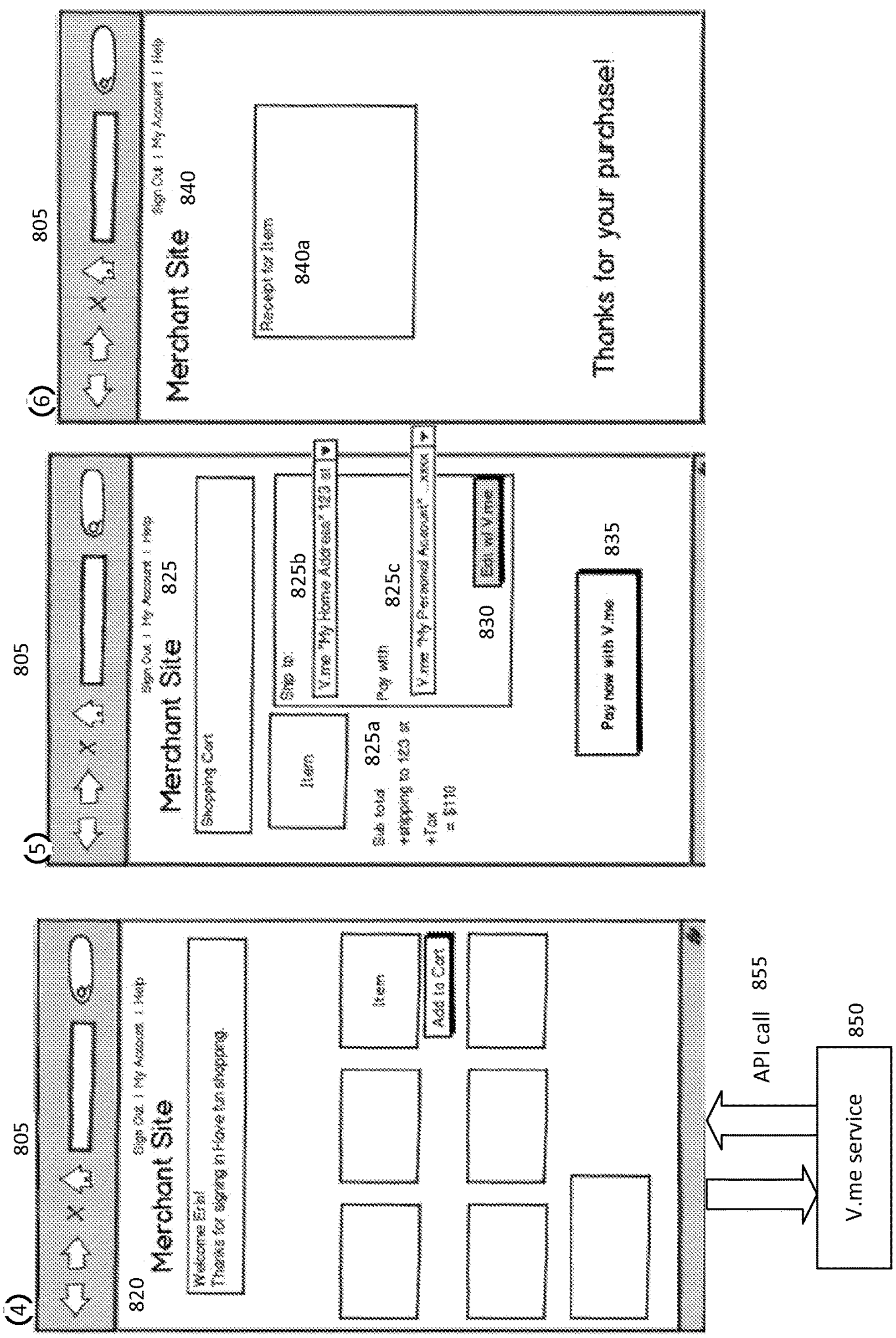
Figure 8b: Example Check-out UI

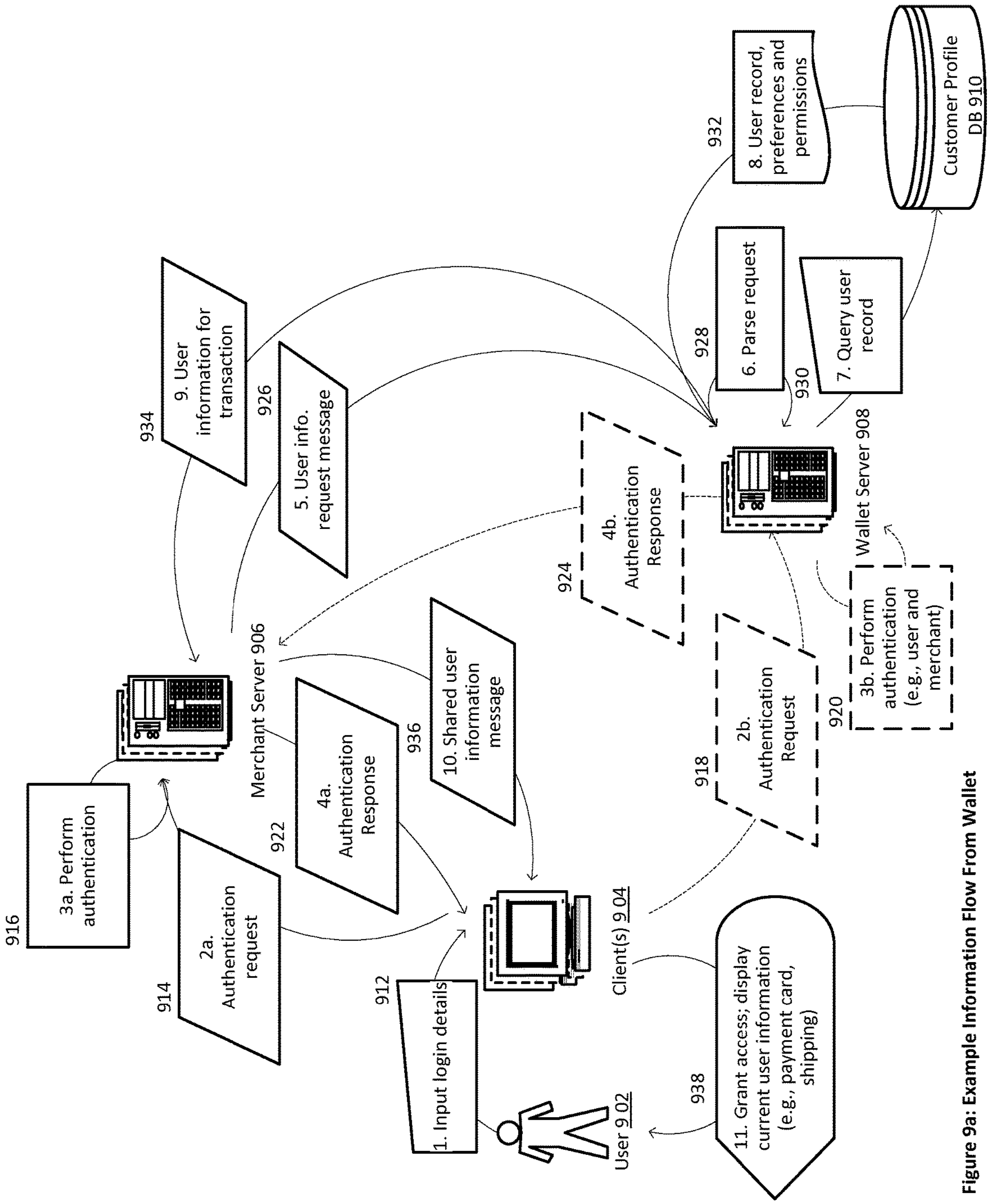
Figure 9a: Example Information Flow From Wallet

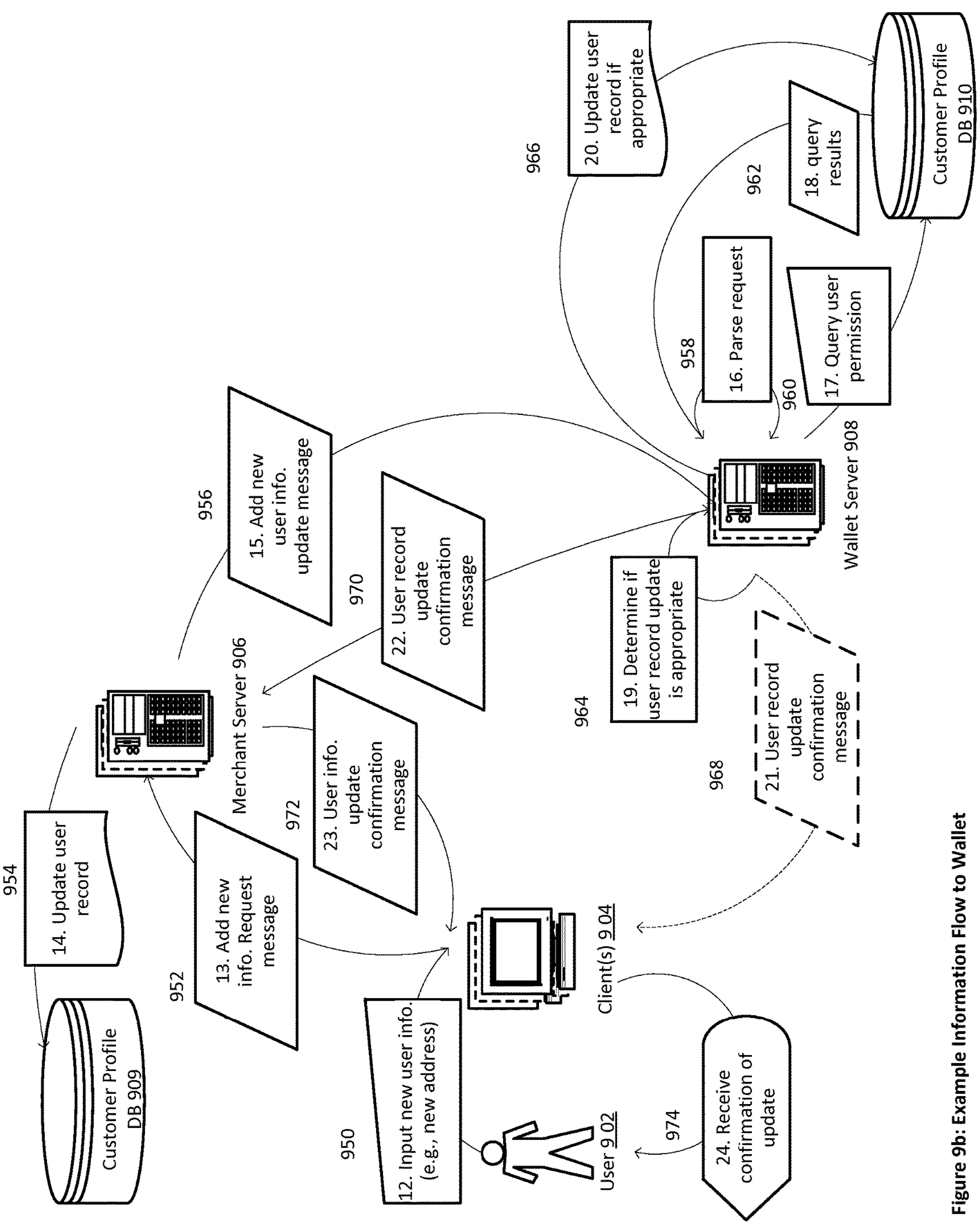
Figure 9b: Example Information Flow to Wallet

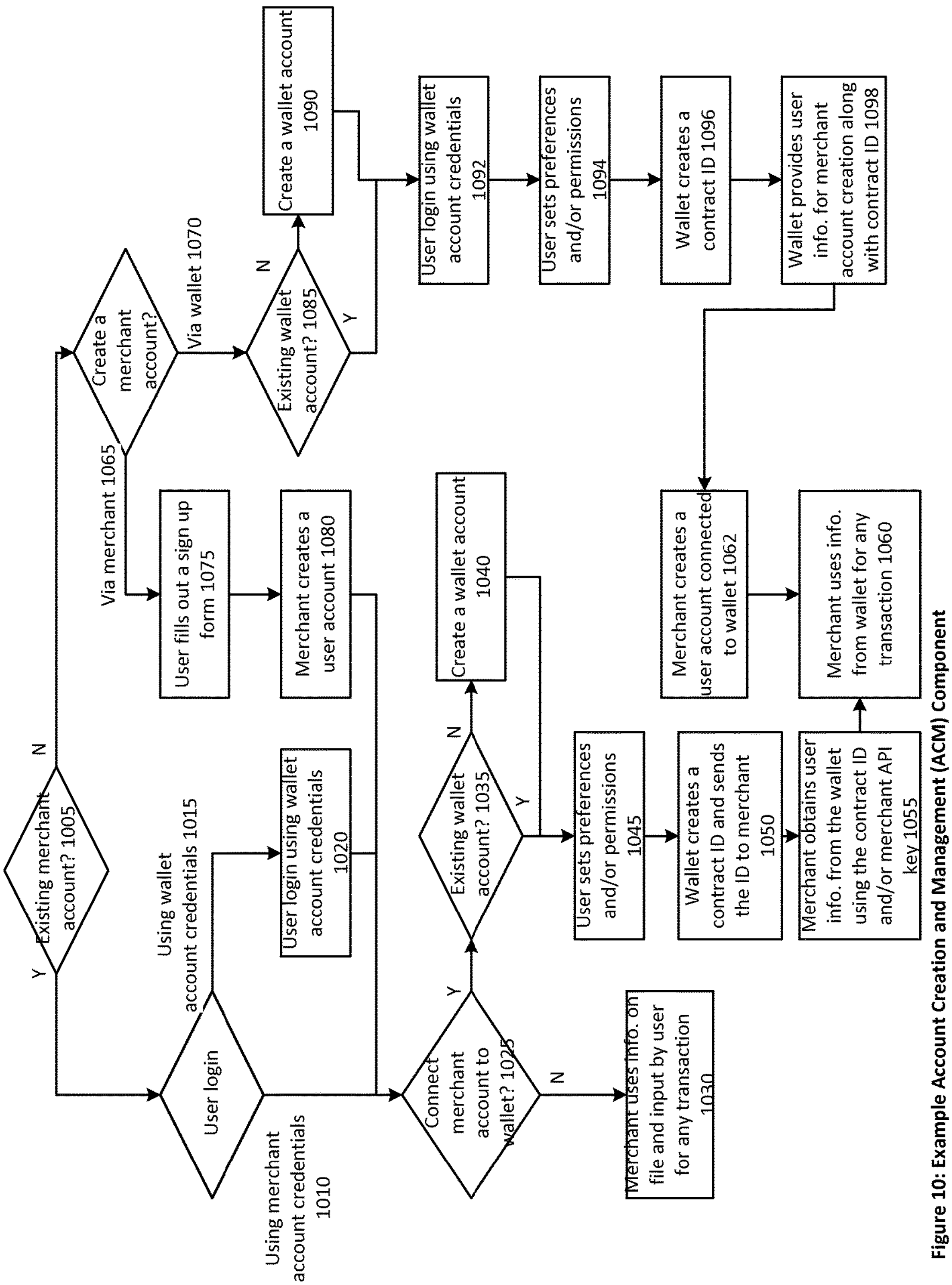
Figure 10: Example Account Creation and Management (ACM) Component

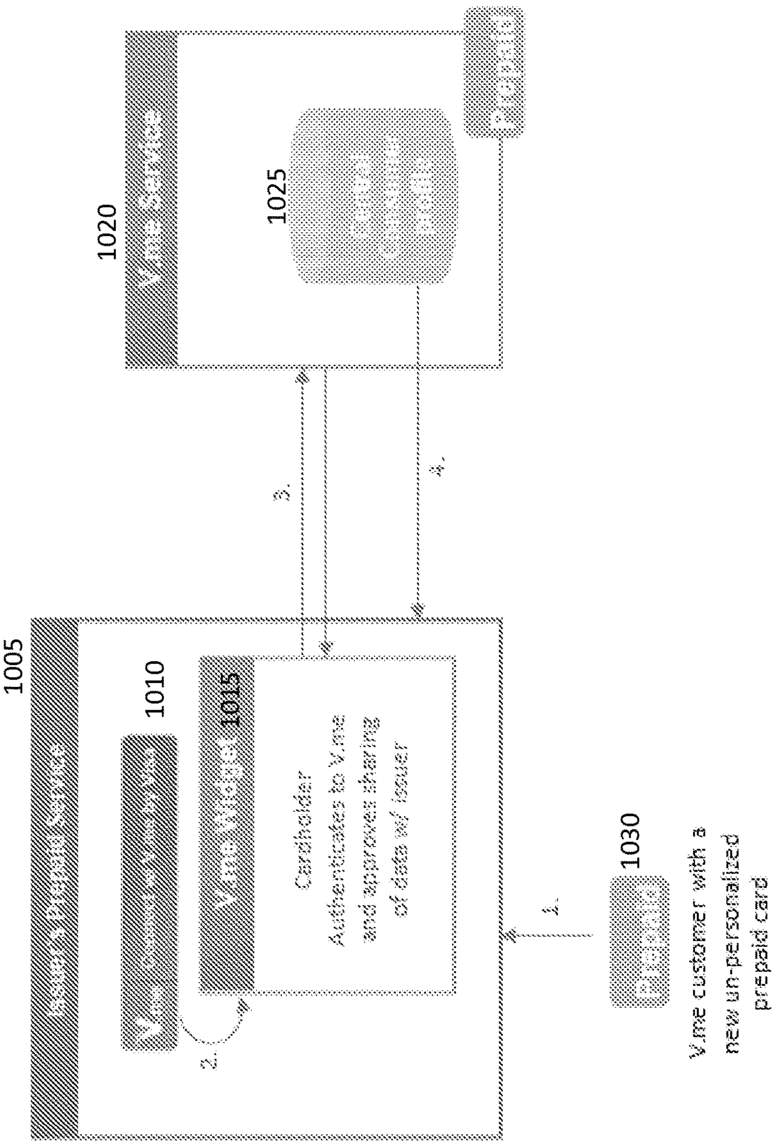
Figure 11: Example Prepaid Account Personalization

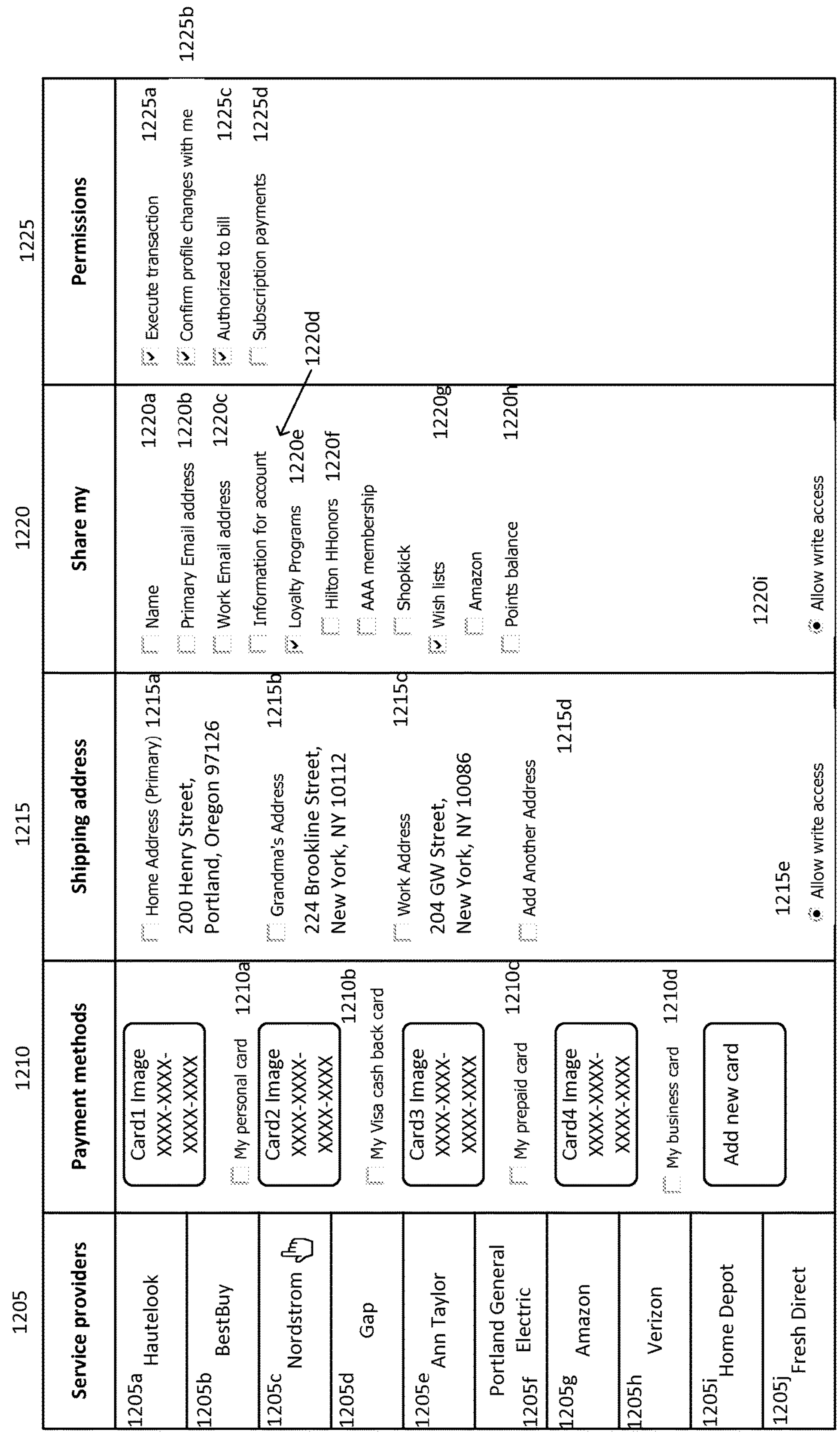
Figure 12: Example HAP Settings Control Panel

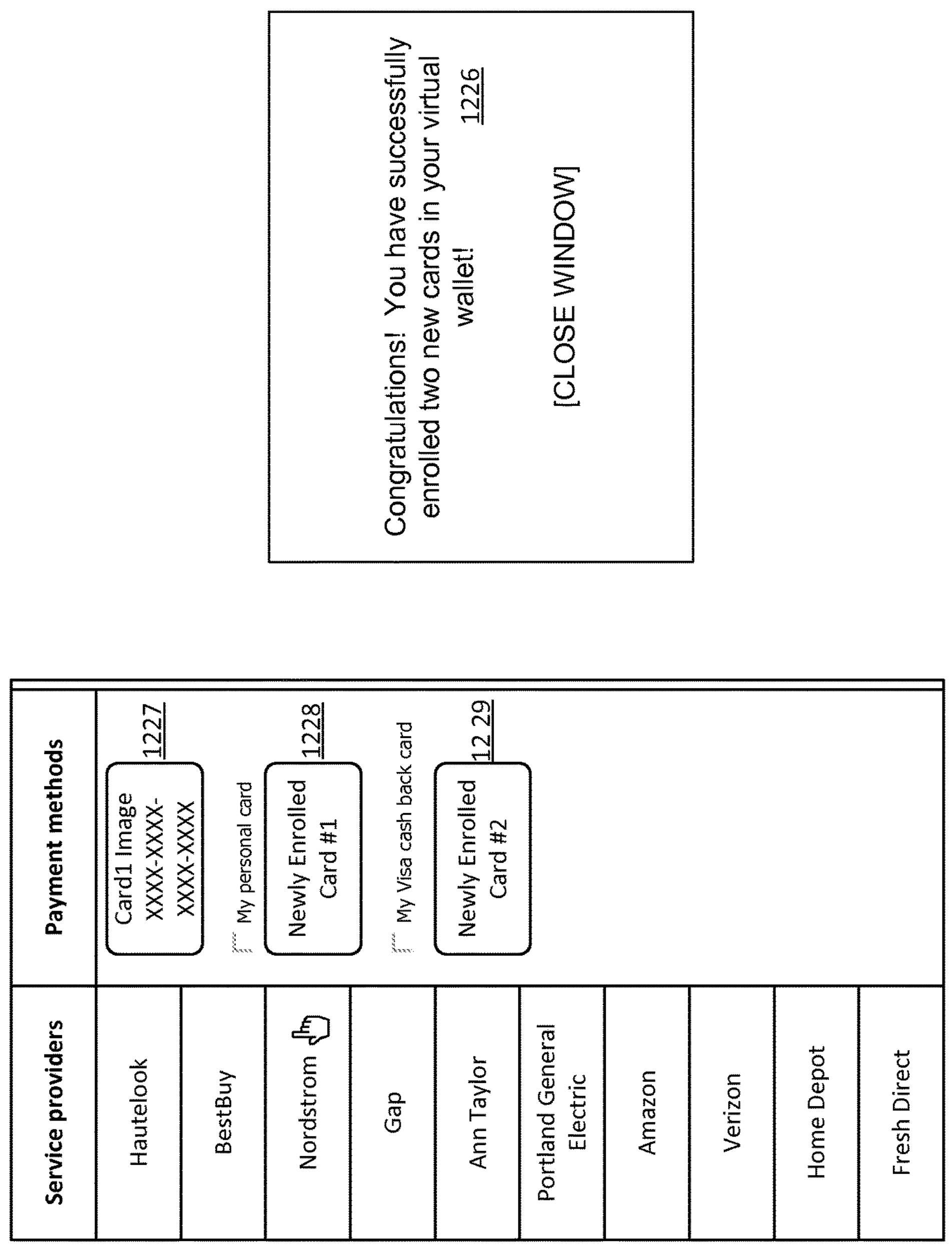
Figure 12a: Example New Card Enrollment Success

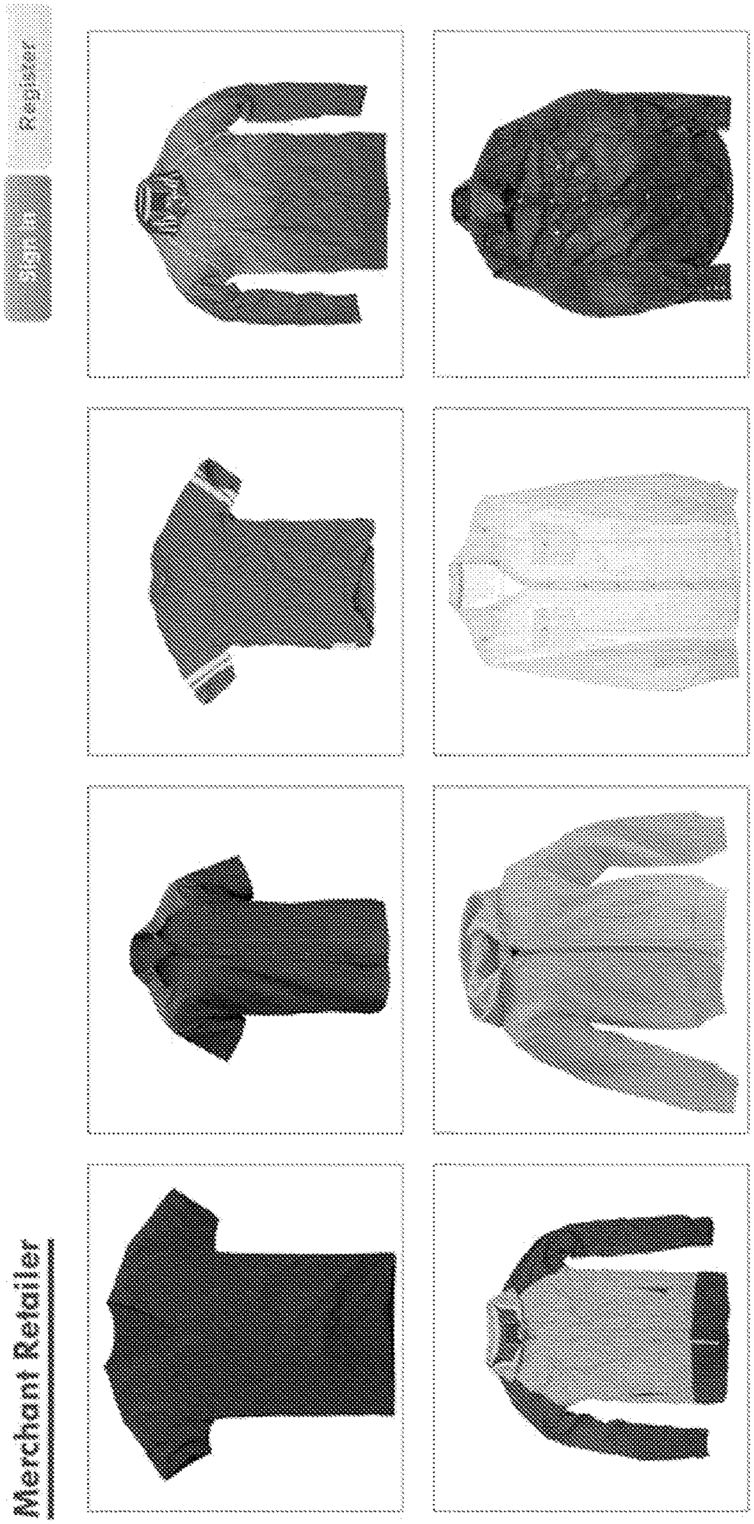
Figure 13a: Example HAP User Interface

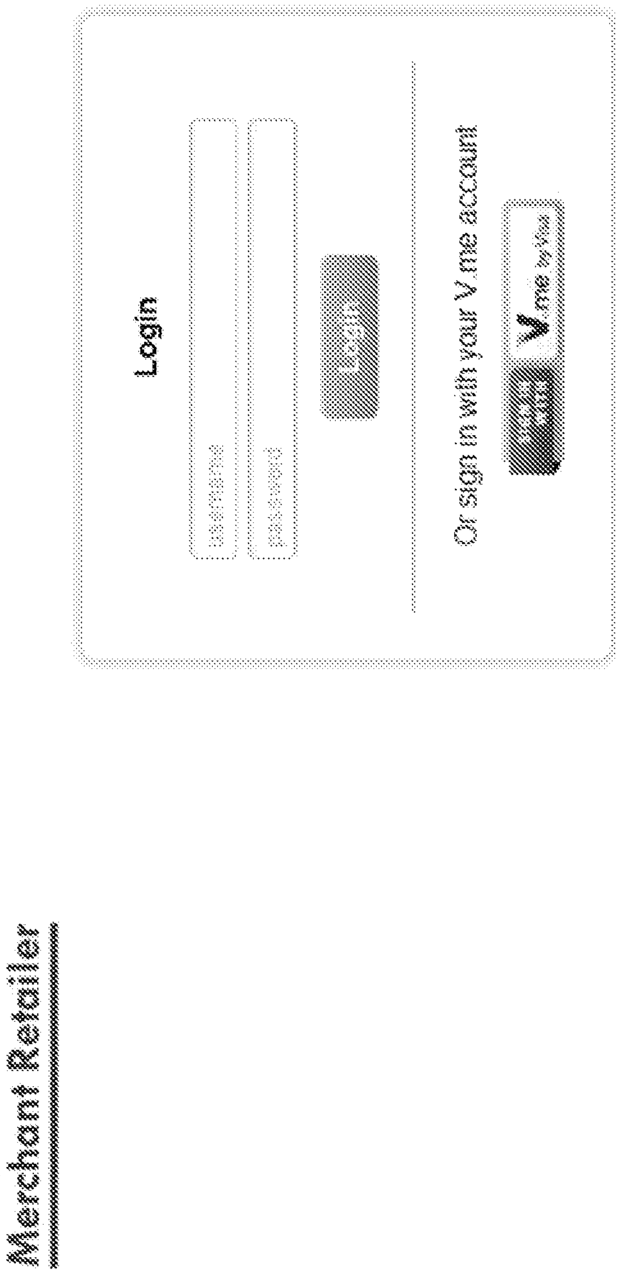
Figure 13b: Example HAP User Interface

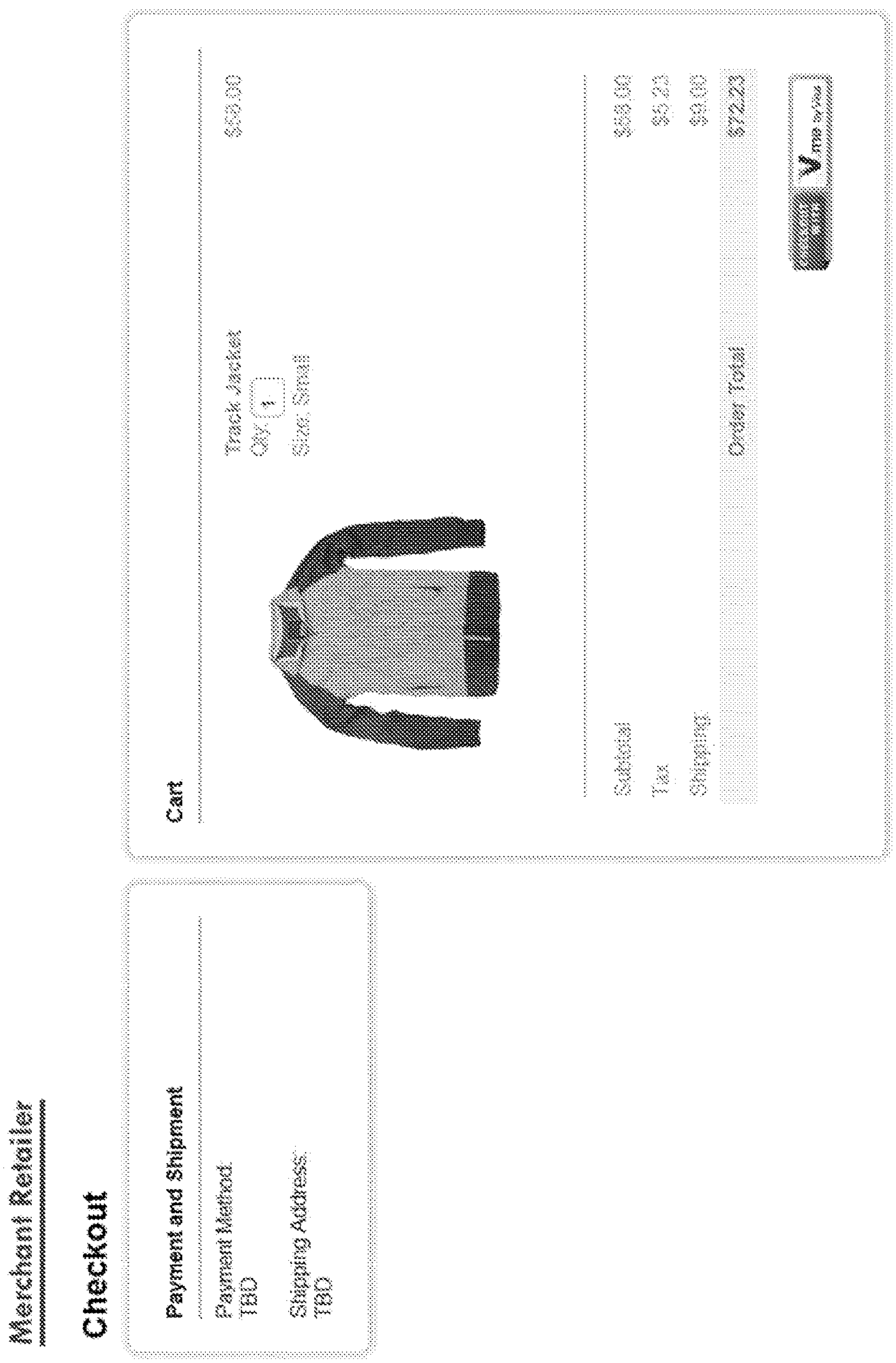
Figure 13c: Example HAP User Interface

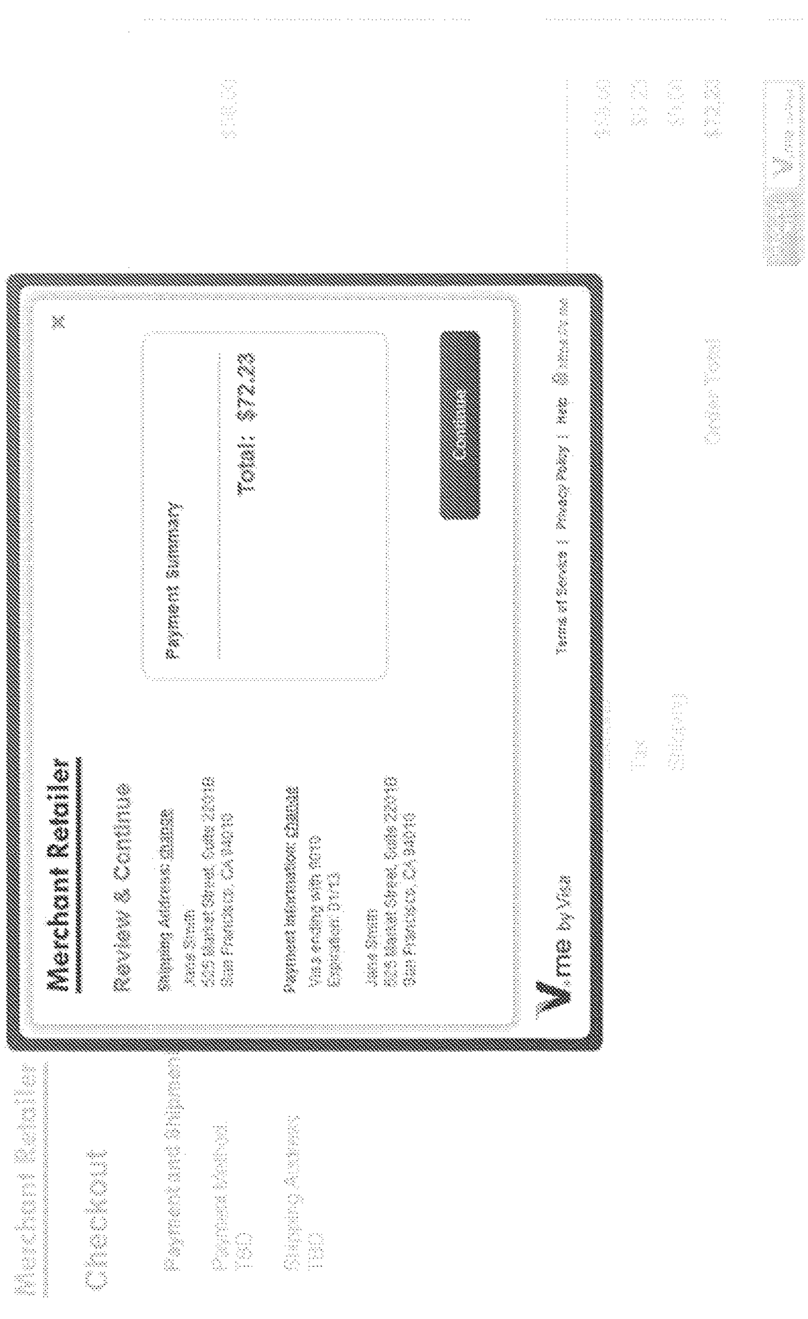
Figure 13d: Example HAP User Interface

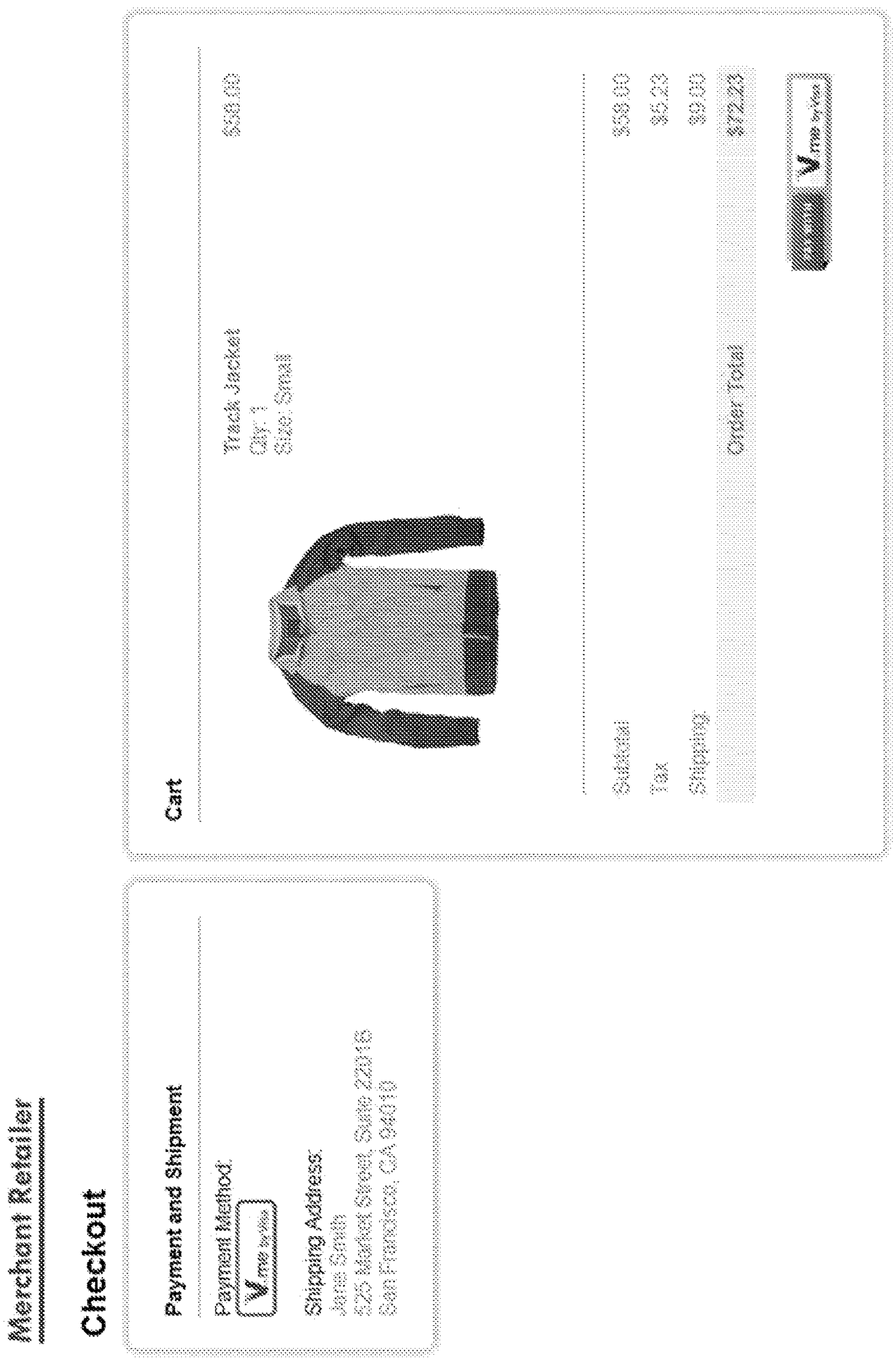
Figure 13e: Example HAP User Interface

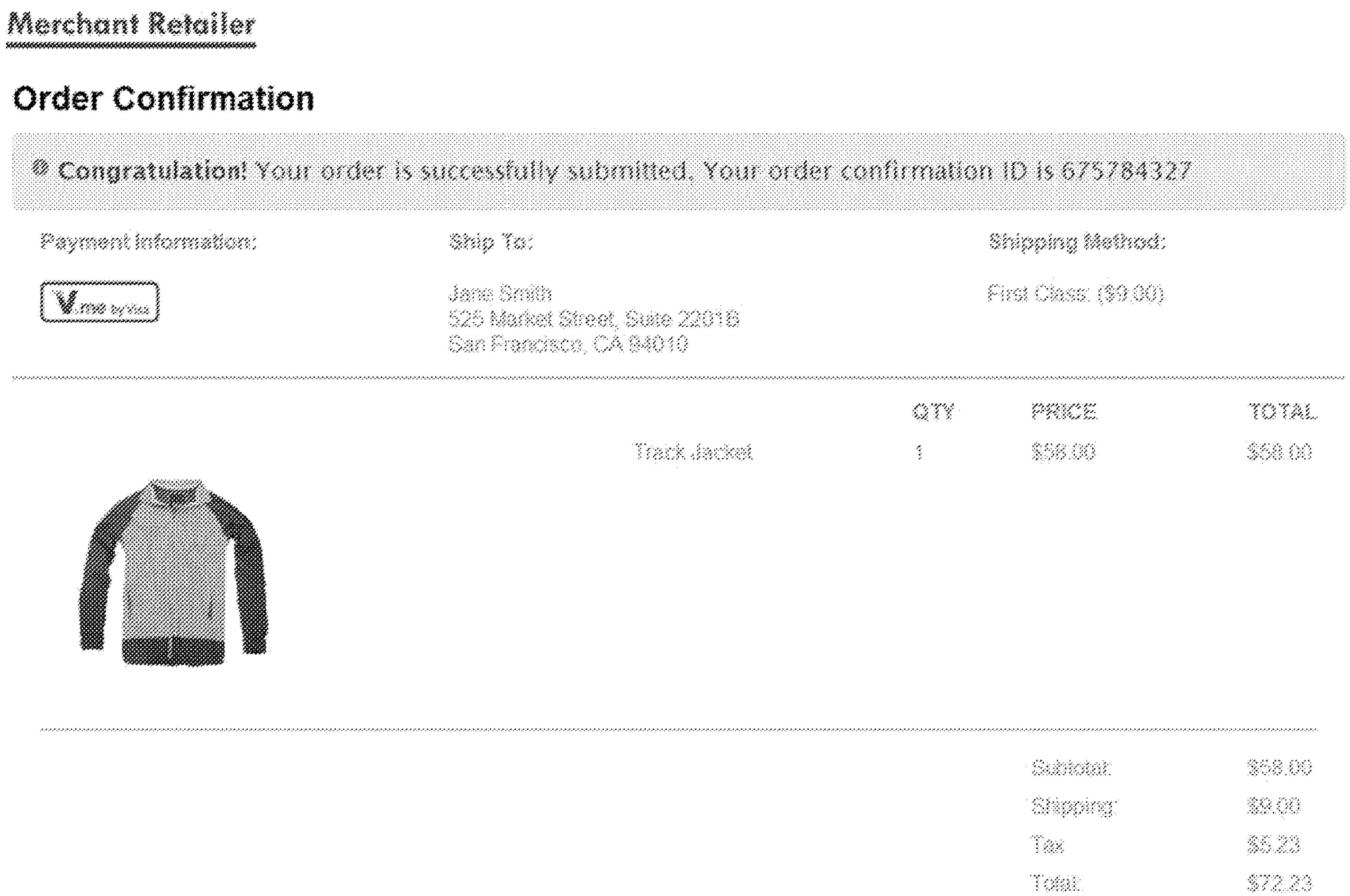
Figure 13f: Example HAP User Interface

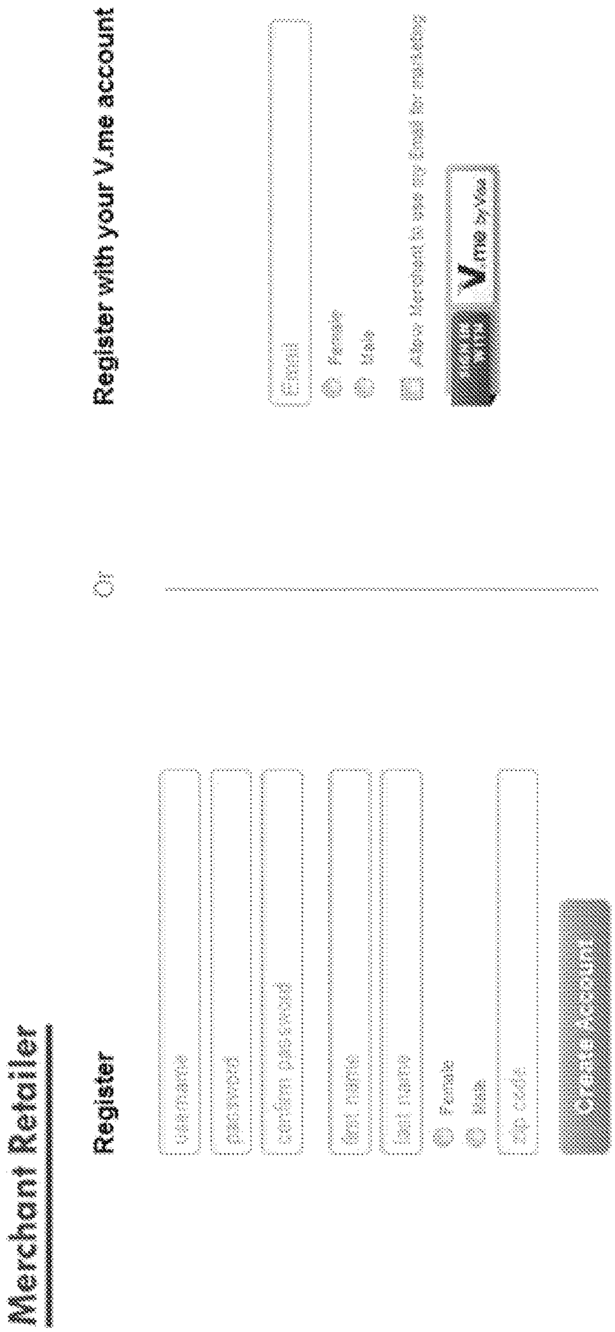
Figure 13g: Example HAP User Interface

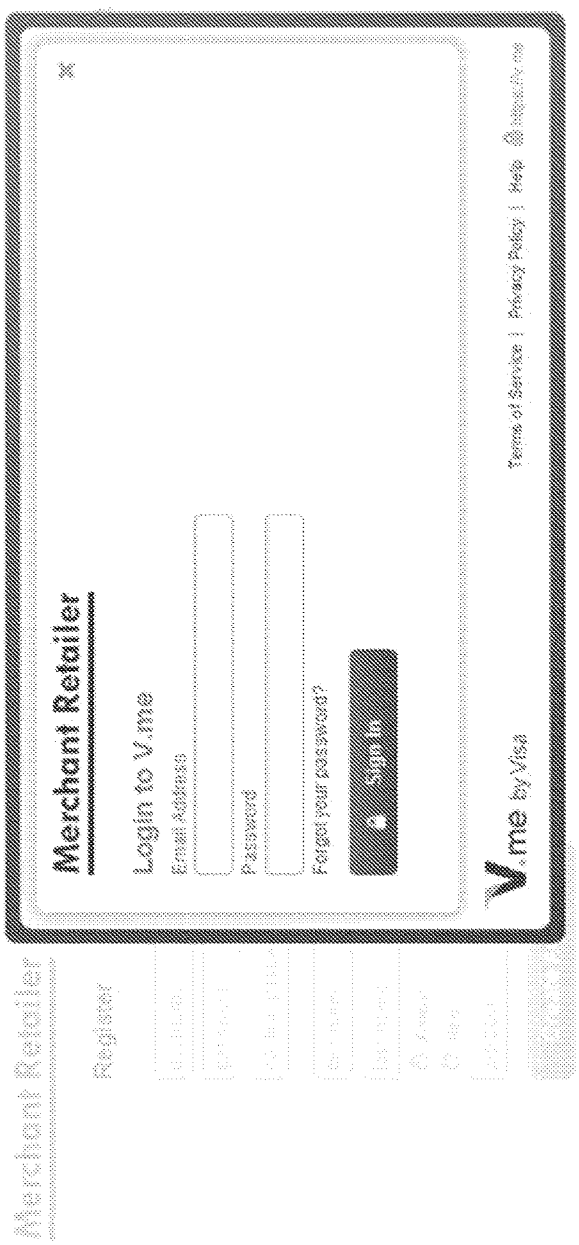
Figure 13h: Example HAP User Interface

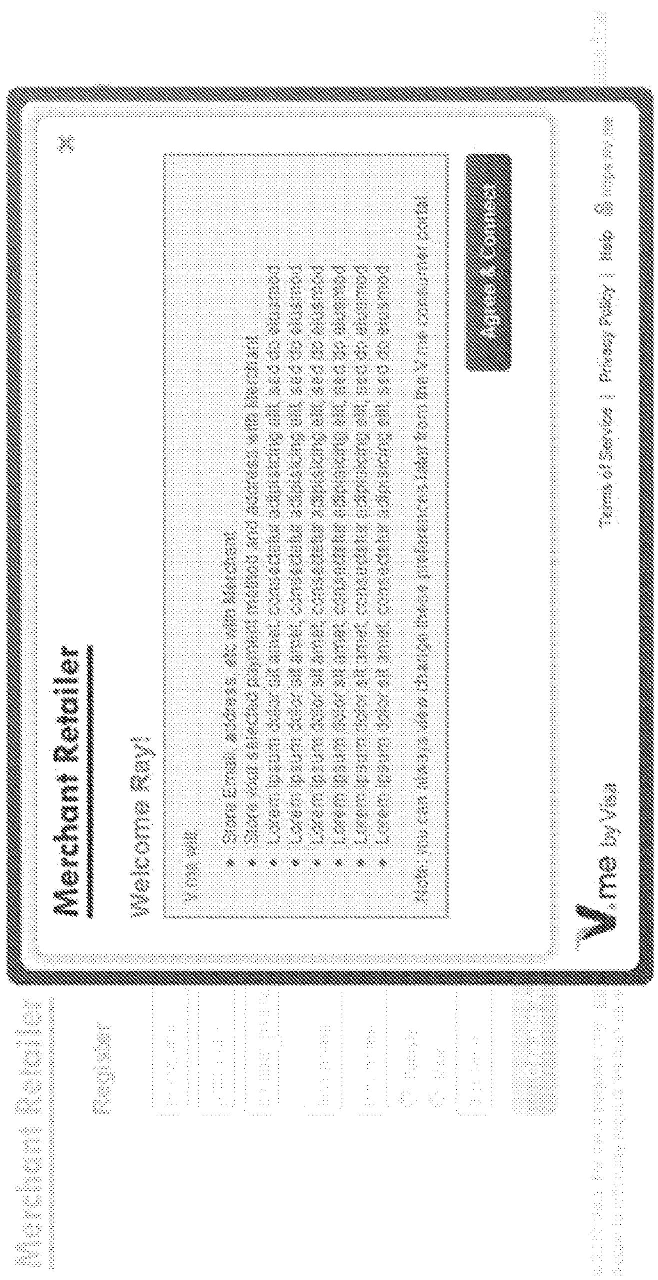
Figure 13i: Example HAP User Interface

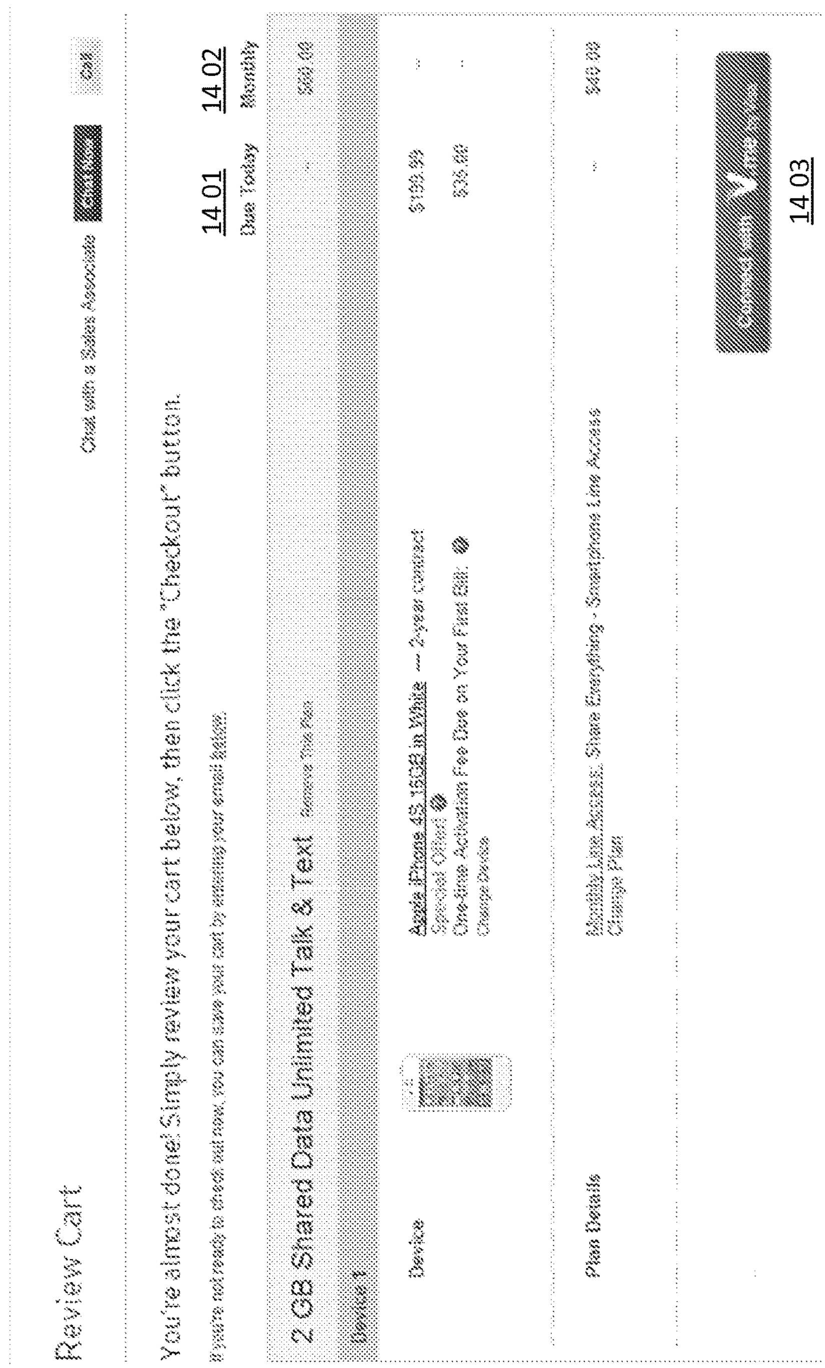
Figure 14: Example Reference Transaction Enrollment

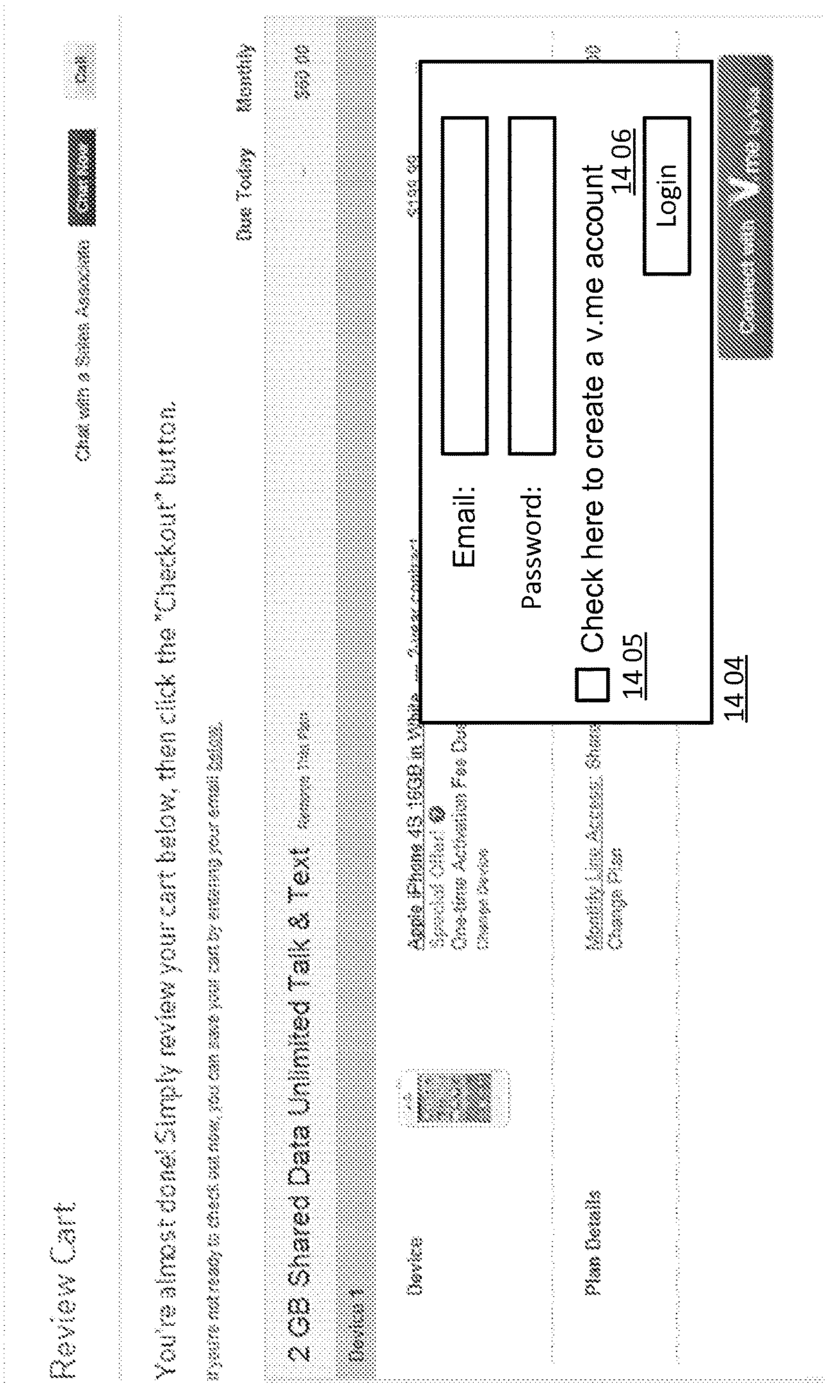
Figure 14a: Example Reference Transaction Enrollment

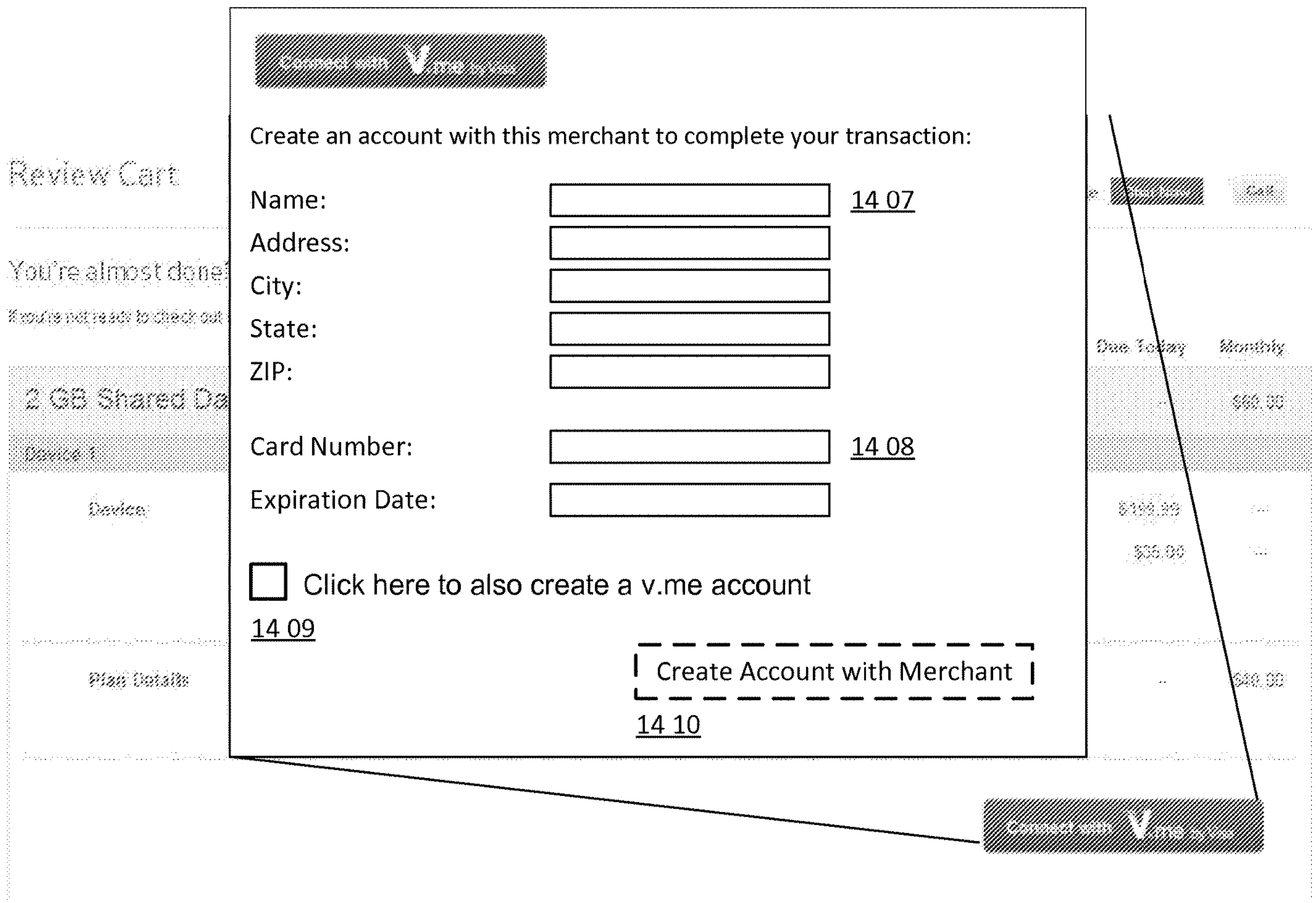
Figure 14b: Example Reference Transaction Enrollment

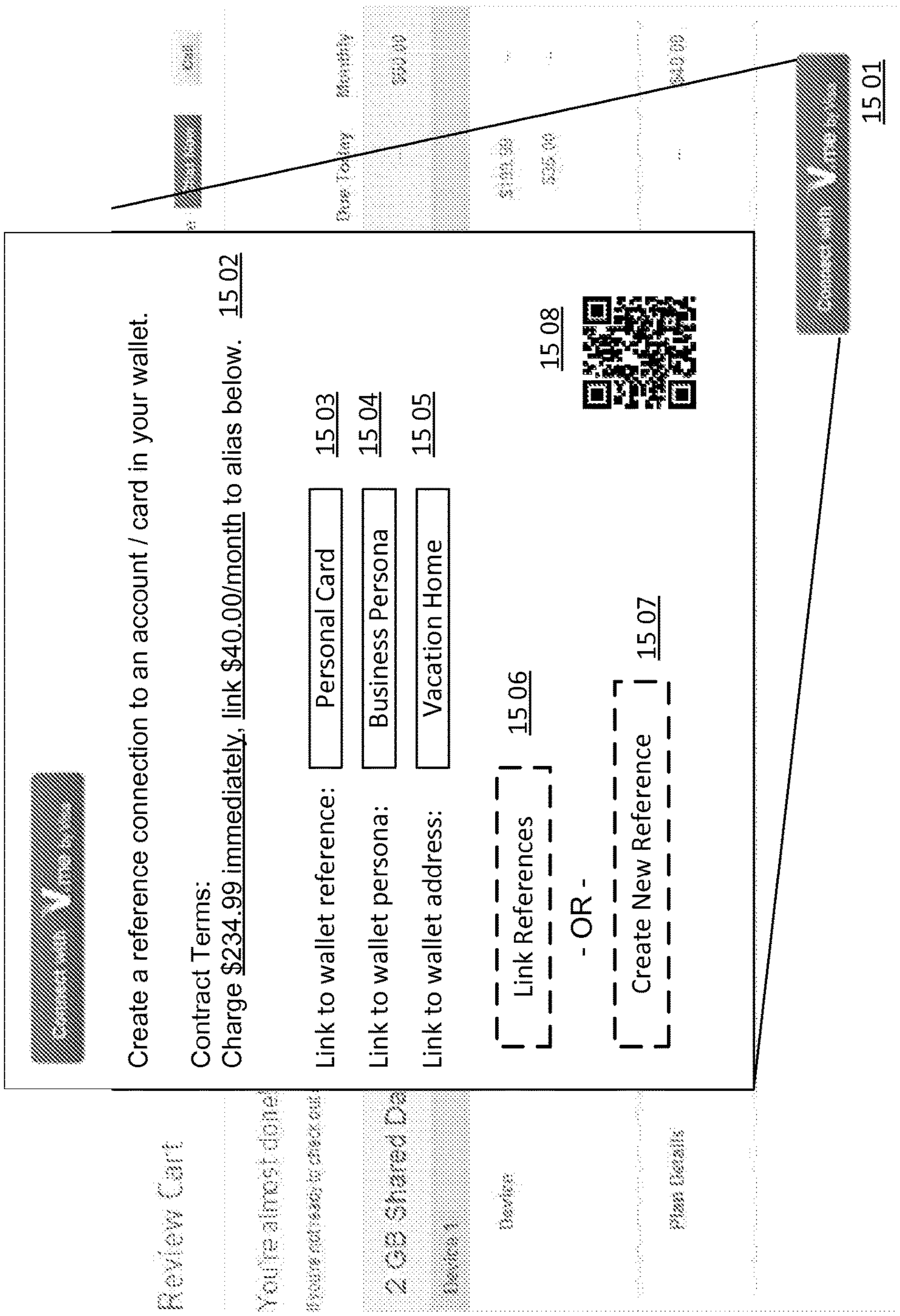
Figure 15: Example Reference Transaction Enrollment

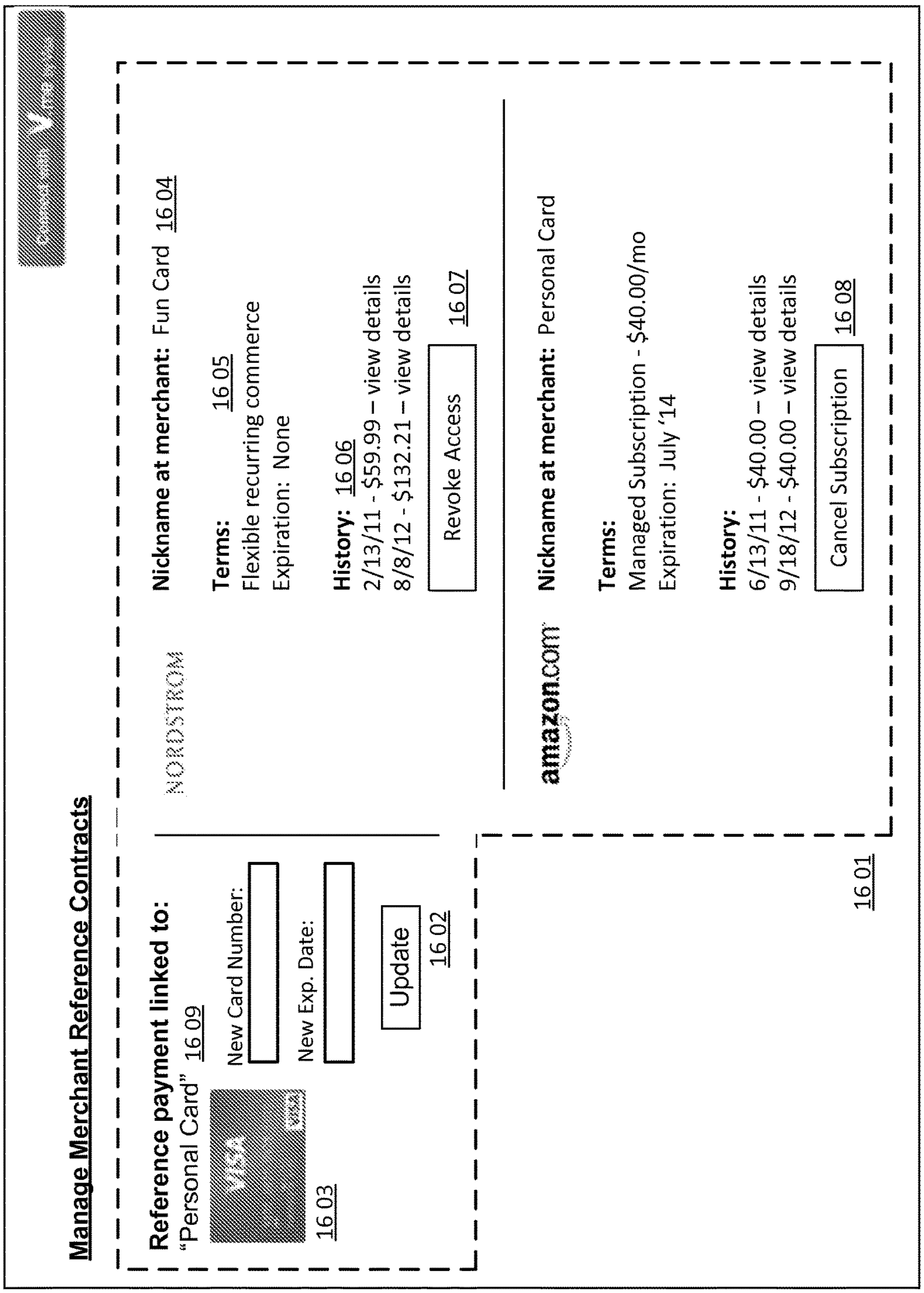
Figure 16: Example Reference Management Console

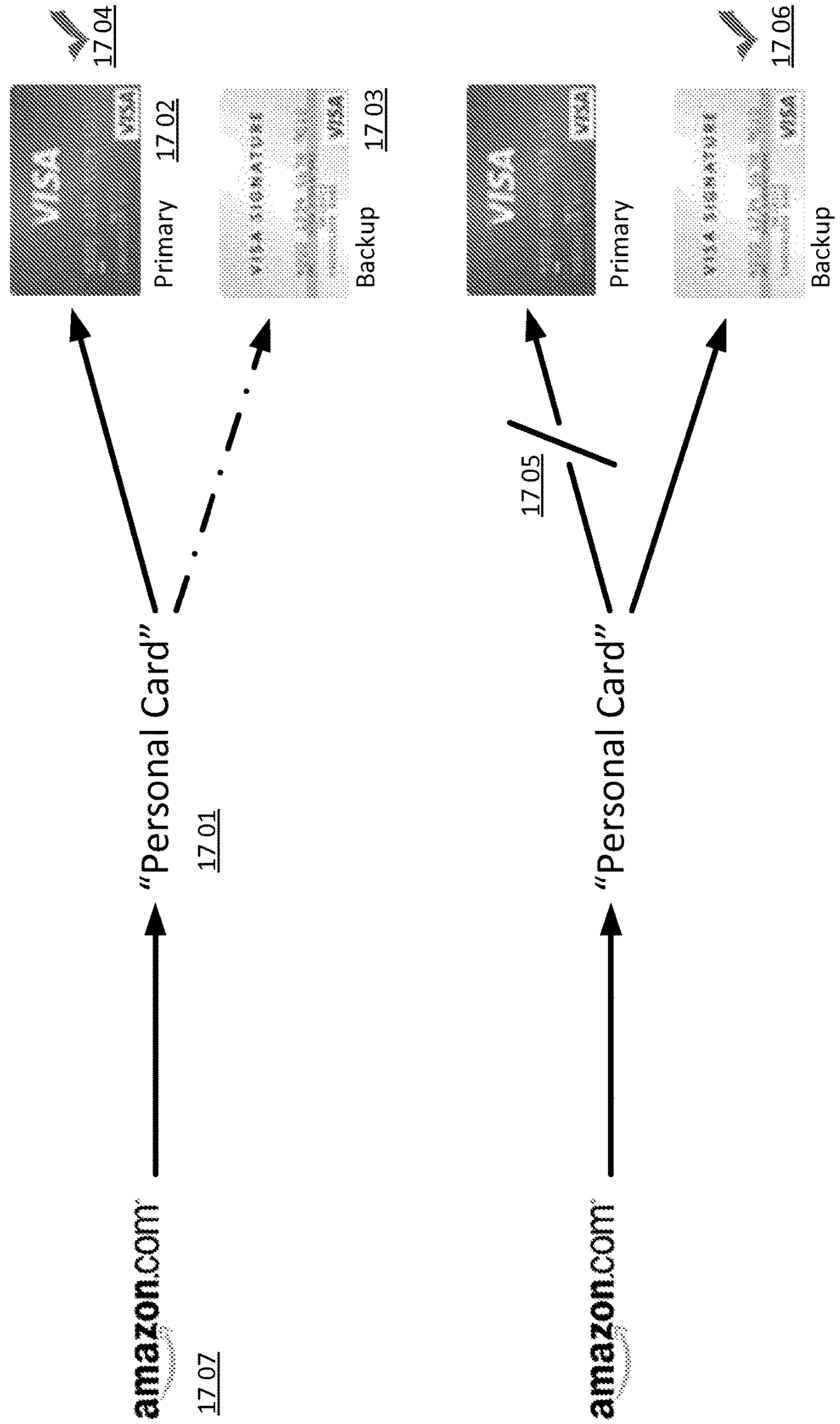
Figure 17: Example Reference Failover Transaction

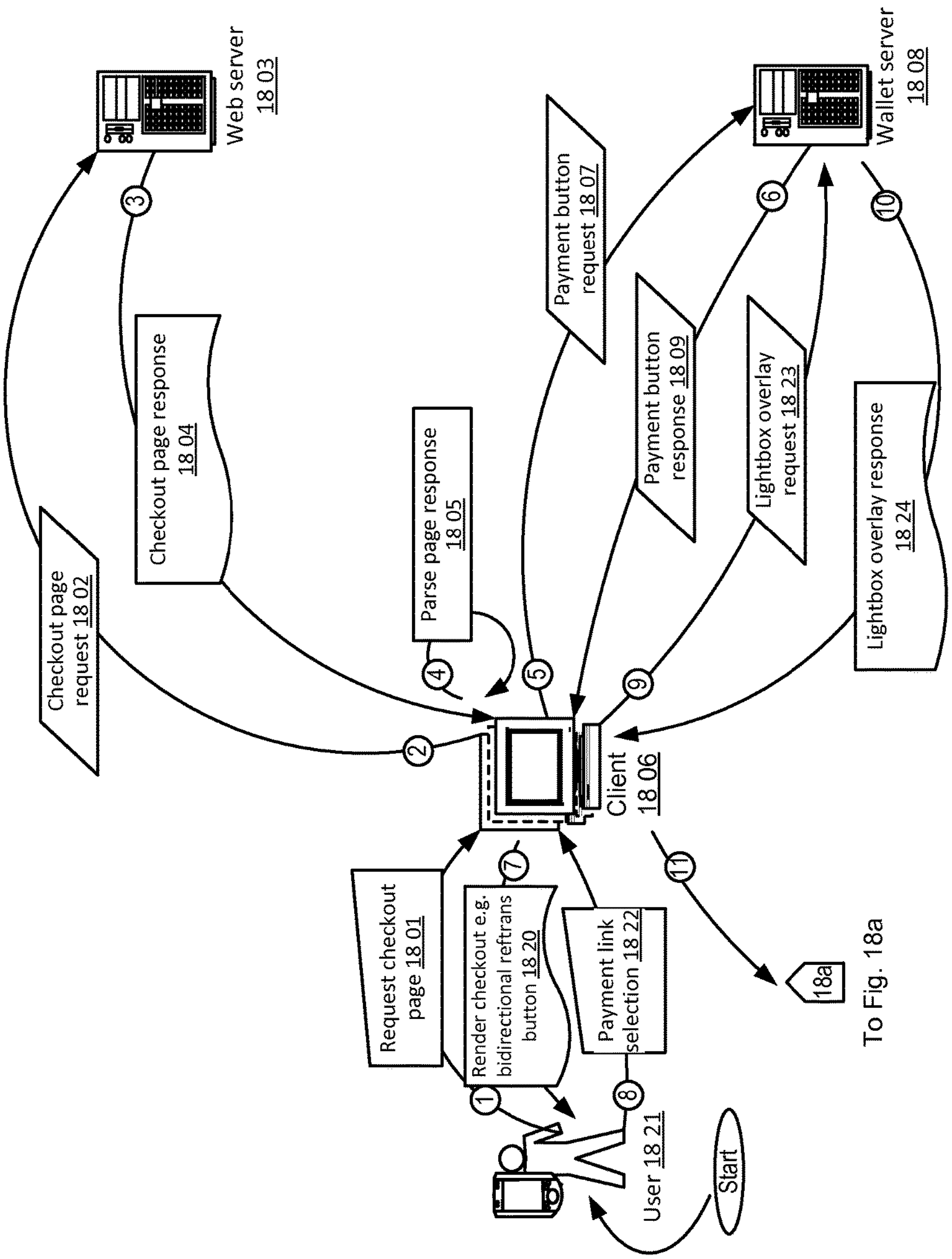
Figure 18: Example Reference Creation Datagram

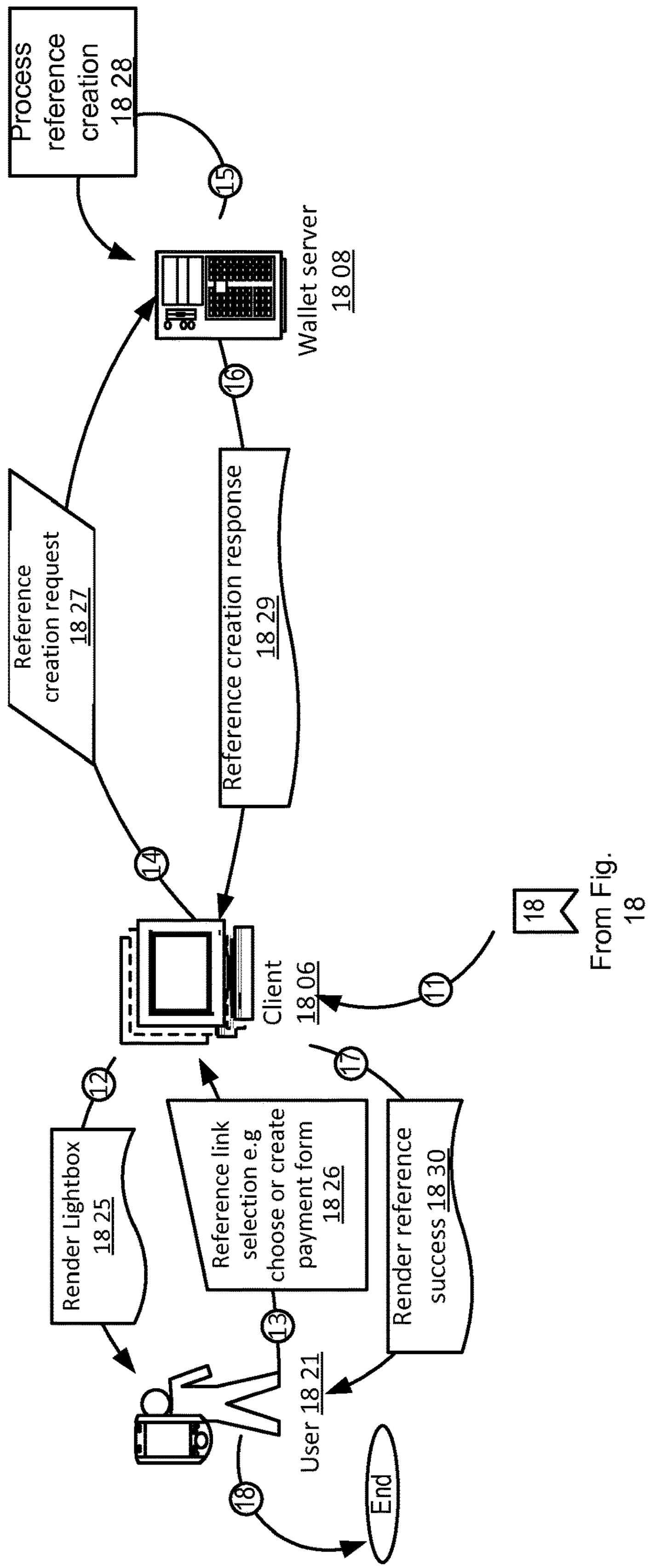
Figure 18a: Example Reference Creation Datagram

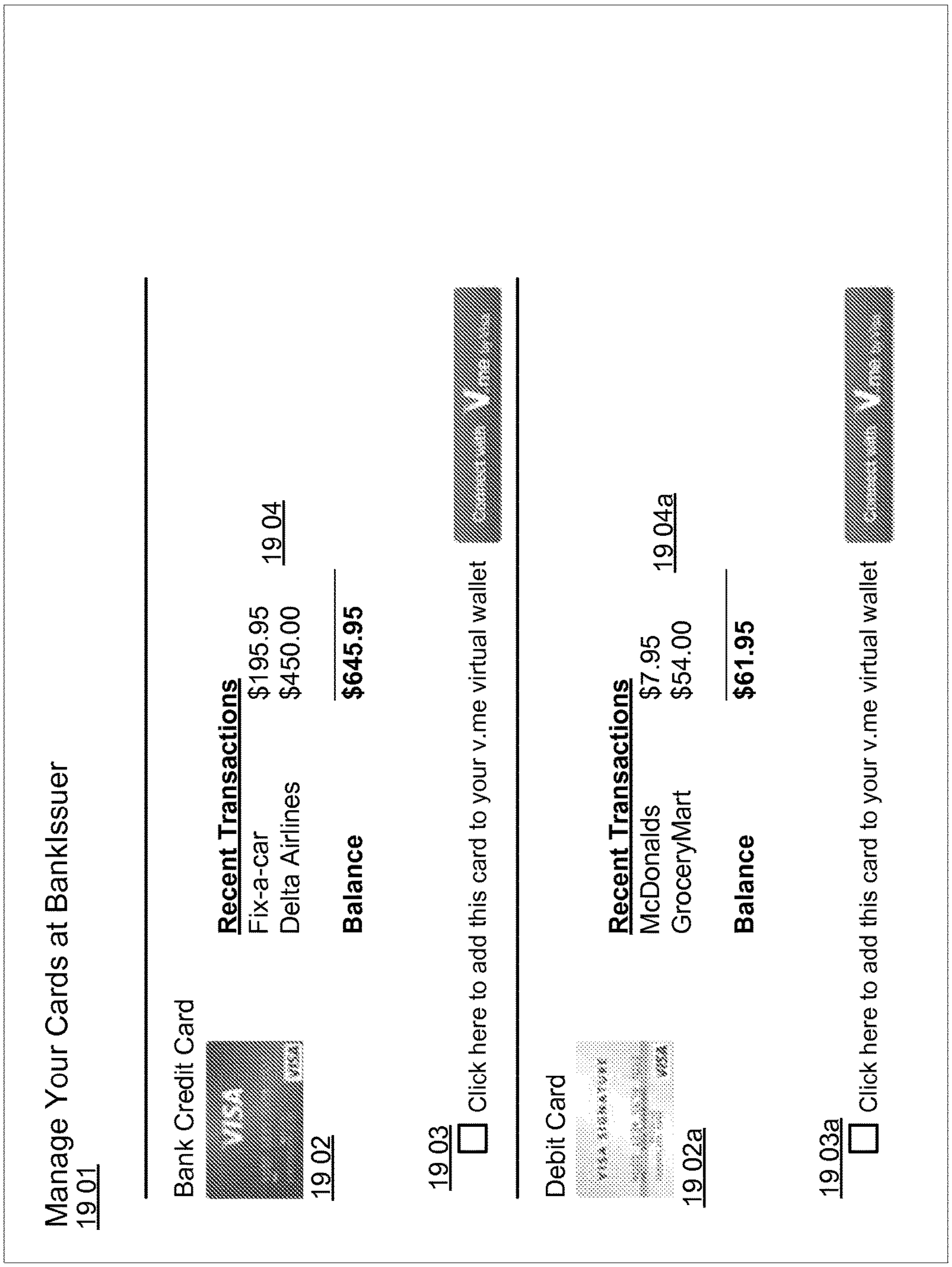
Figure 19: Example Issuer Side Wallet Service Enrollment

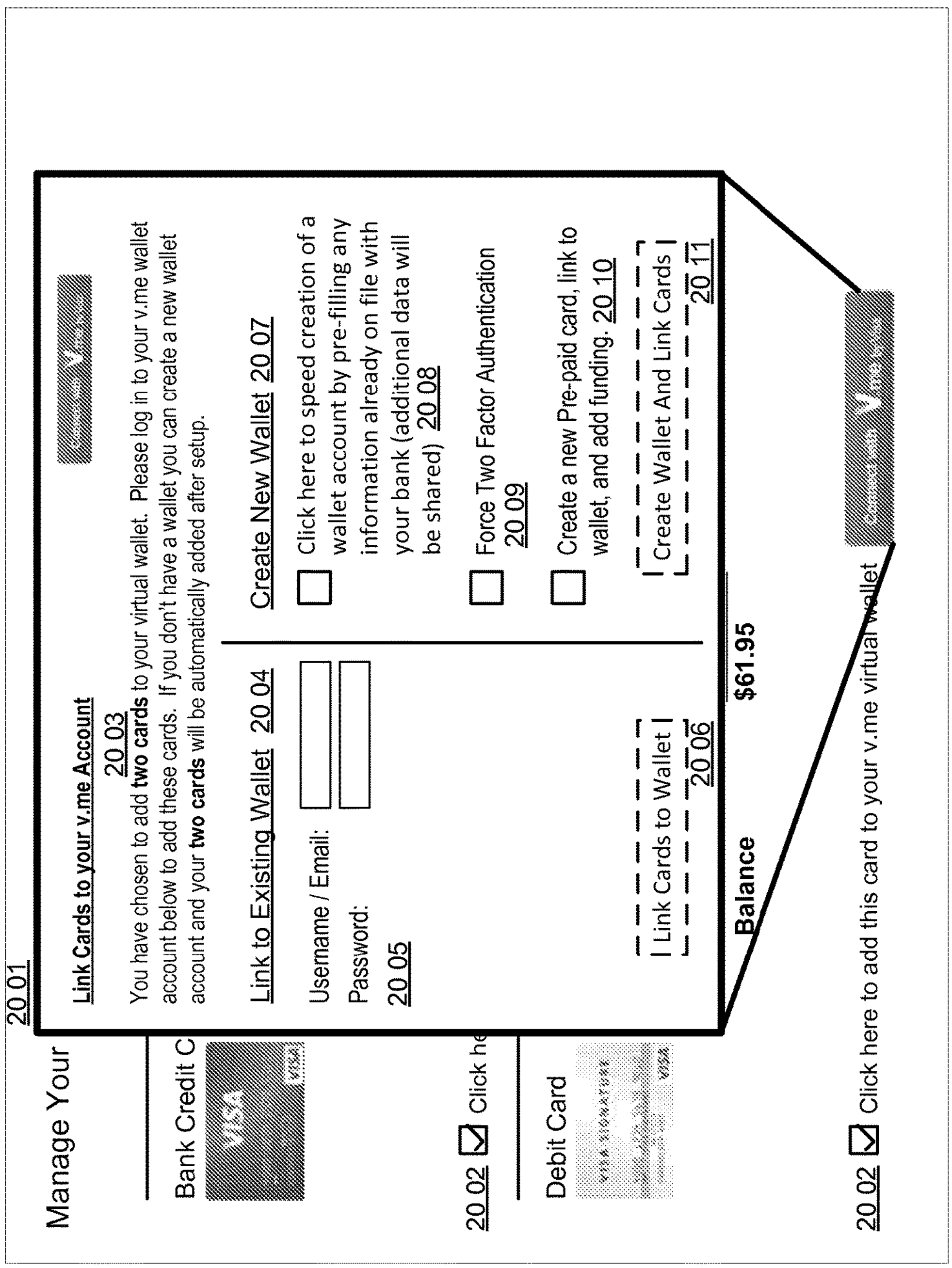
Figure 20a: Example Issuer Side Wallet Service Enrollment

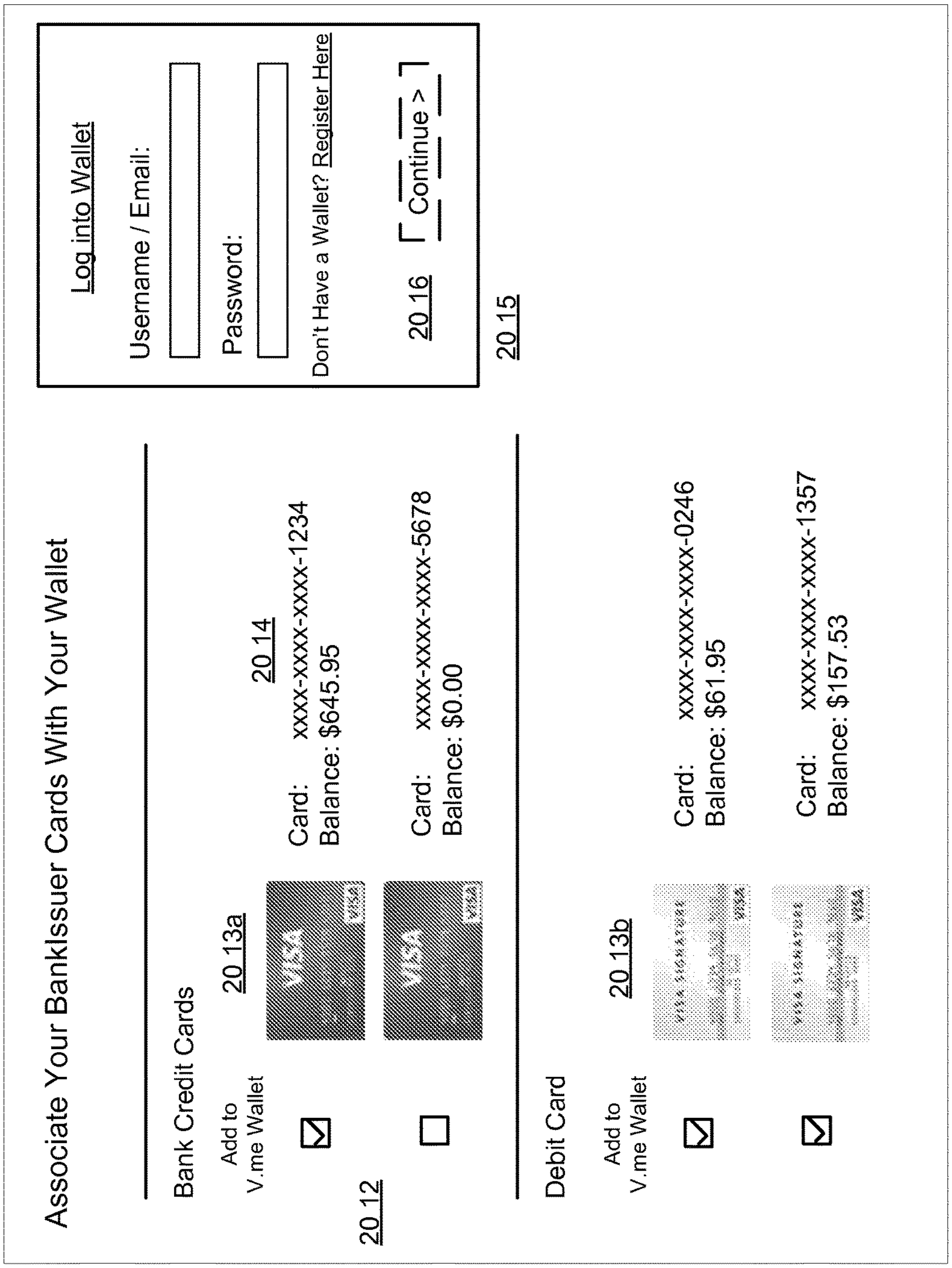
Figure 20b: Example Issuer Side Wallet Service Enrollment

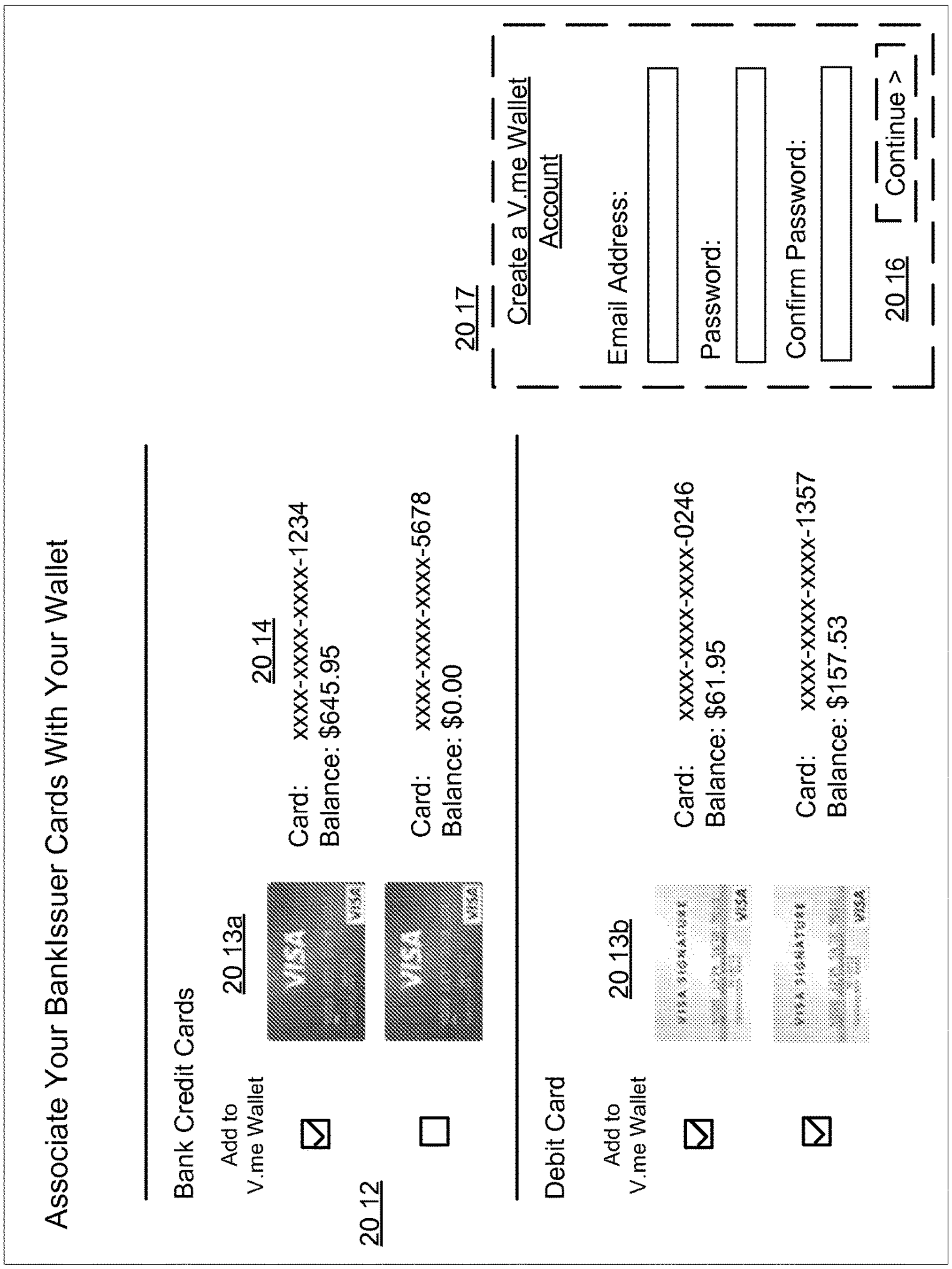
Figure 20c: Example Issuer Side Wallet Service Enrollment

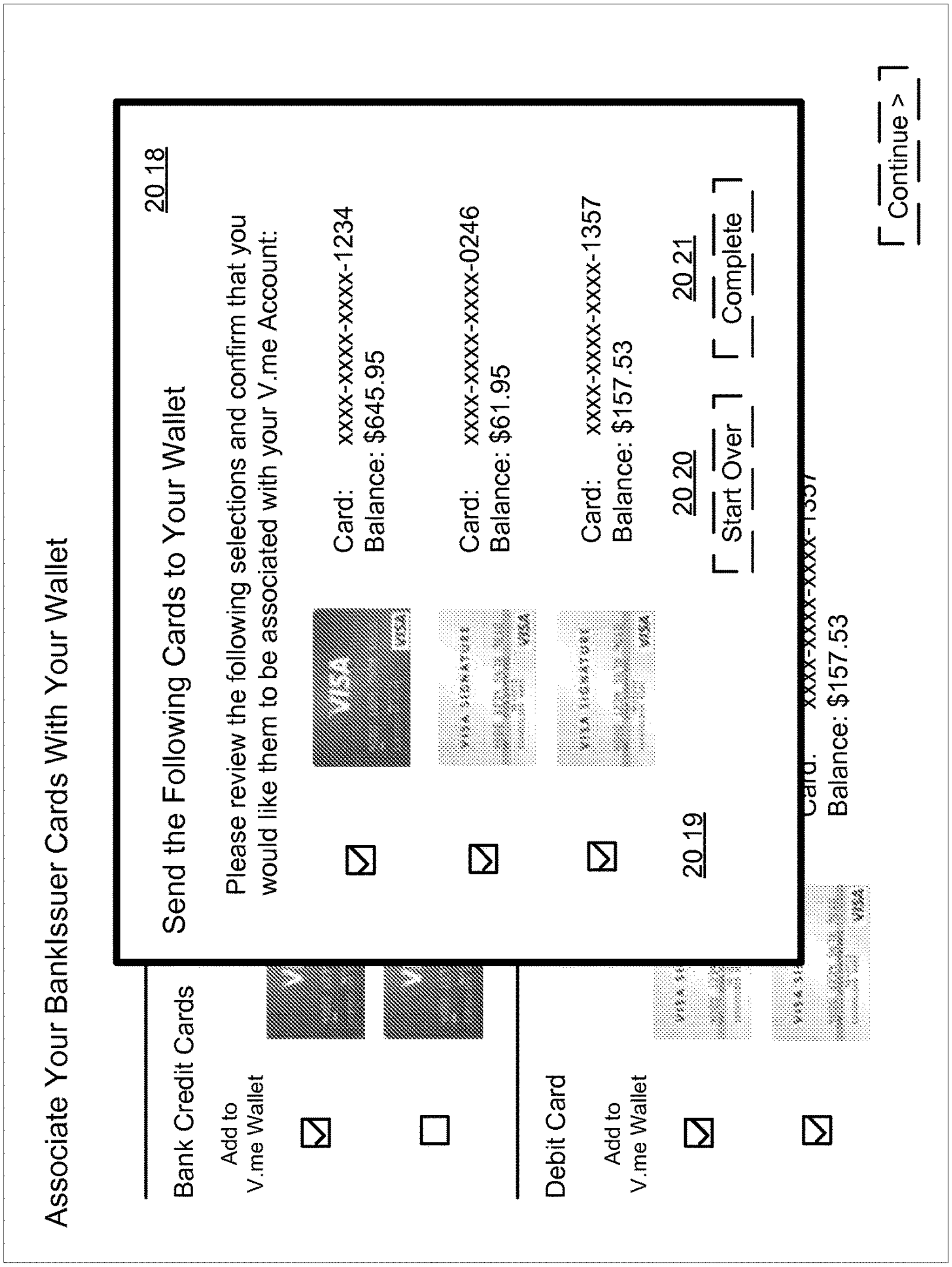
Figure 20d: Example Issuer Side Wallet Service Enrollment

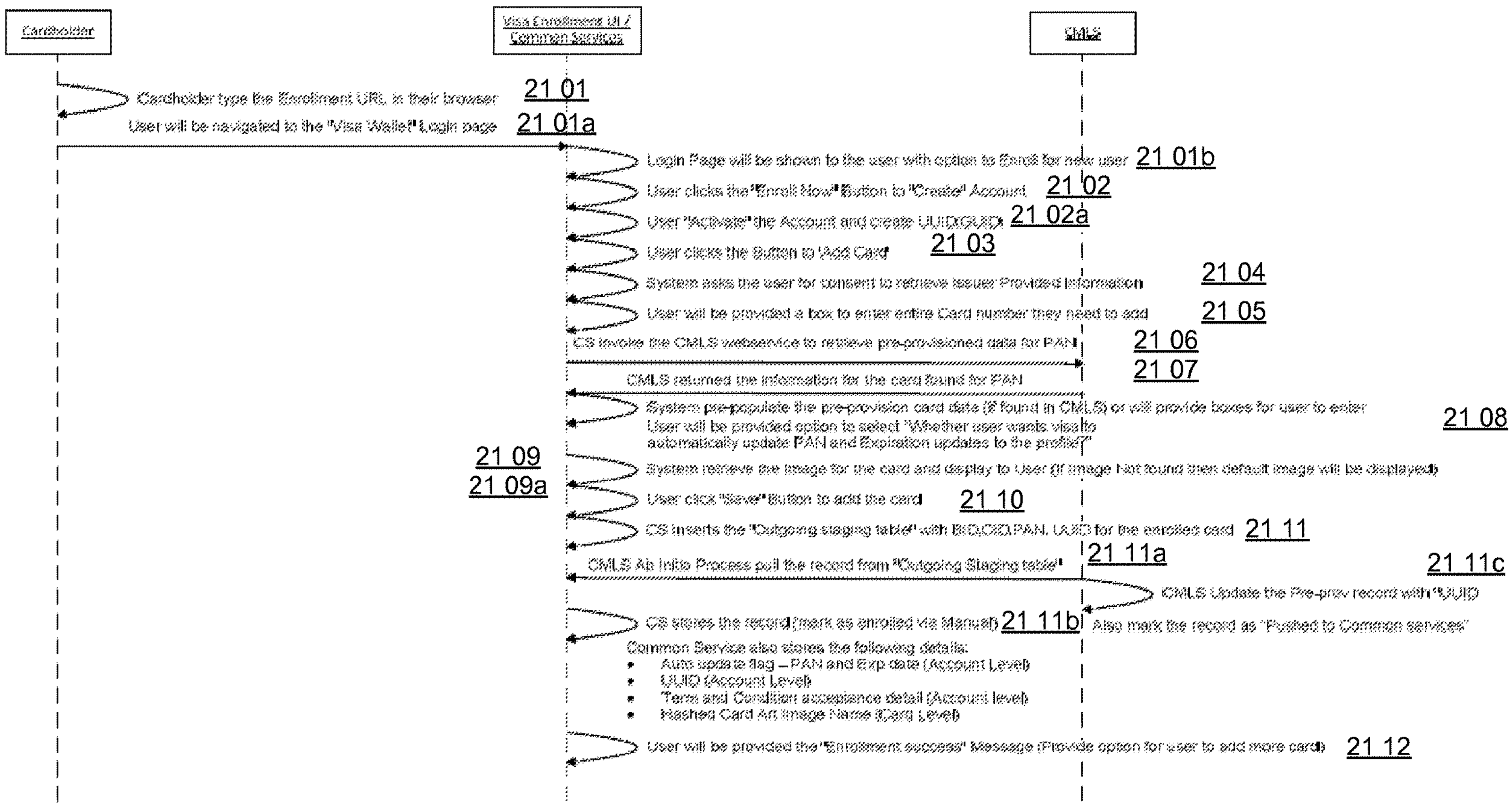
Figure 21: Example Wallet Service Enrollment (Issuer)

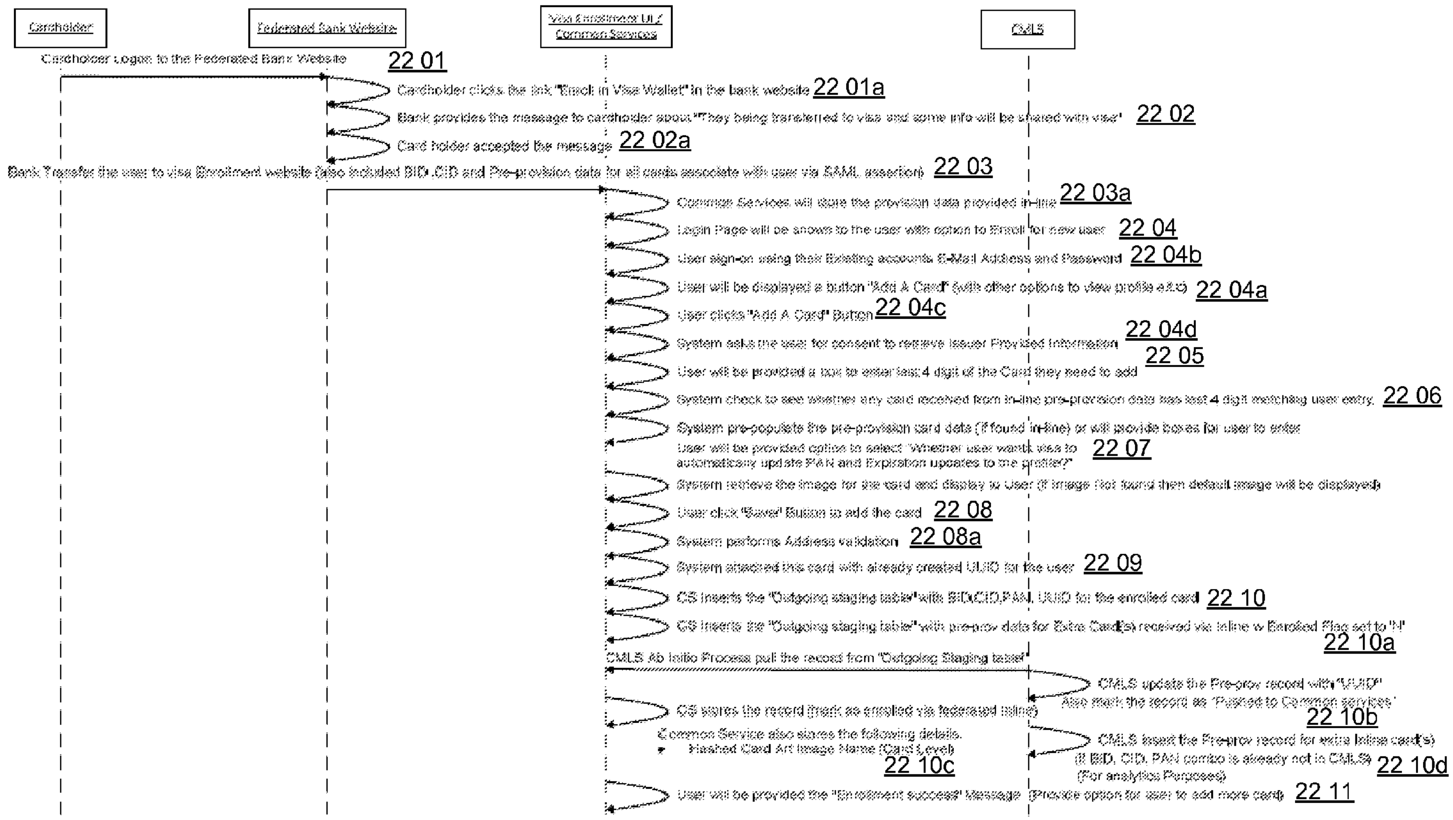
Figure 22a: Example Wallet Account Enrollment Using Issuer Data

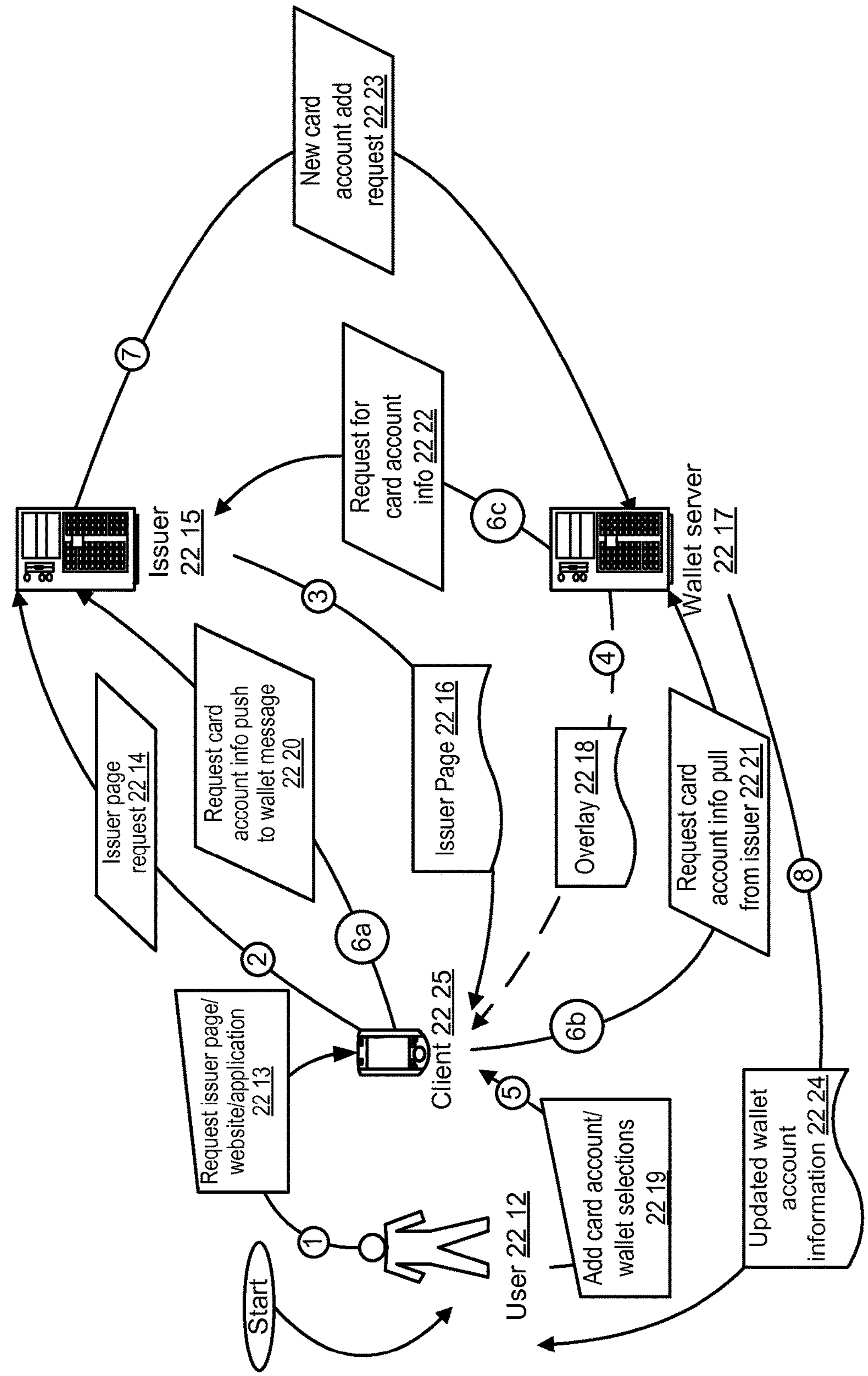
Figure 22b: Example Wallet Account Enrollment

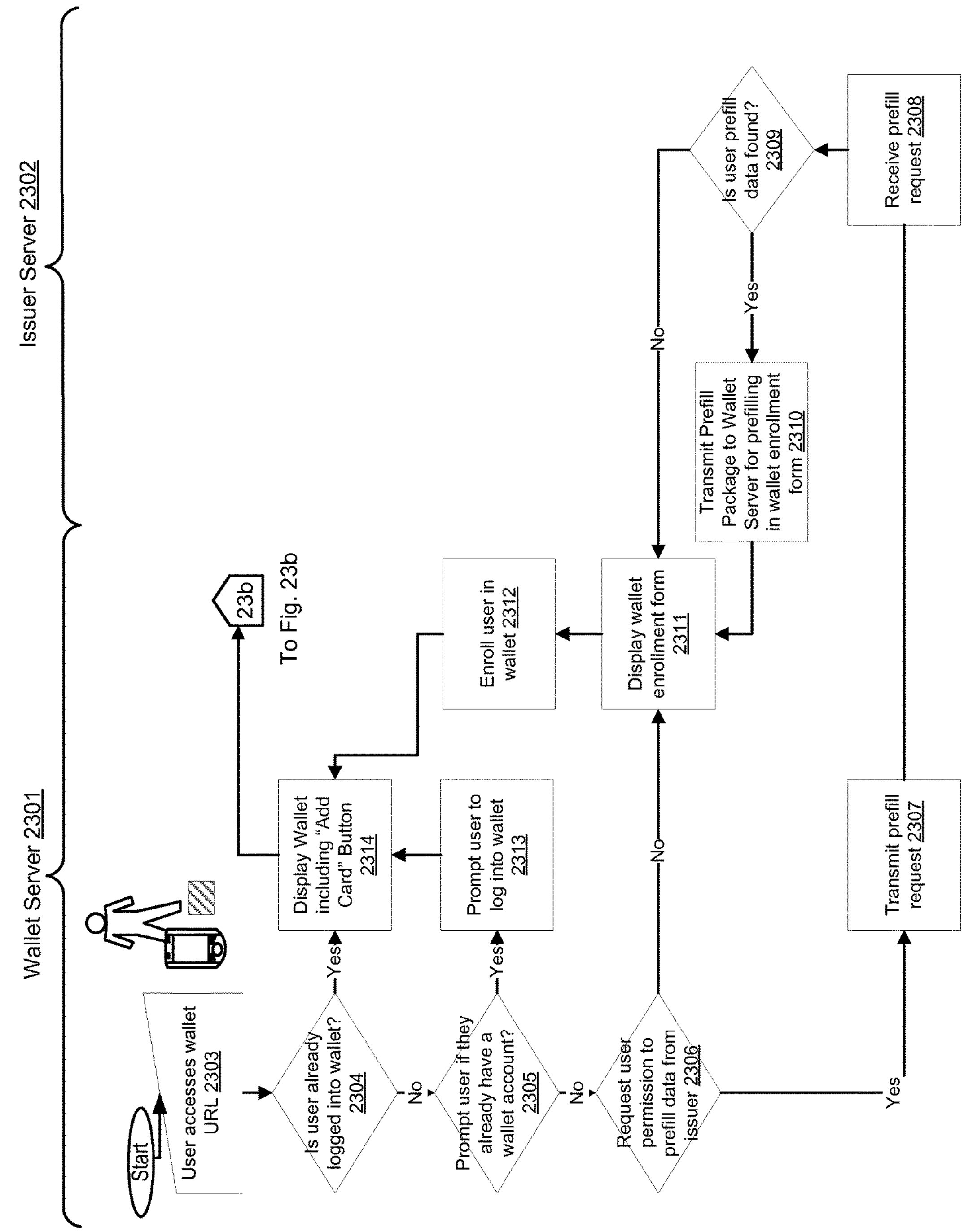
Figure 23a: Exemplary Wallet and Card Enrollment Logic Flow

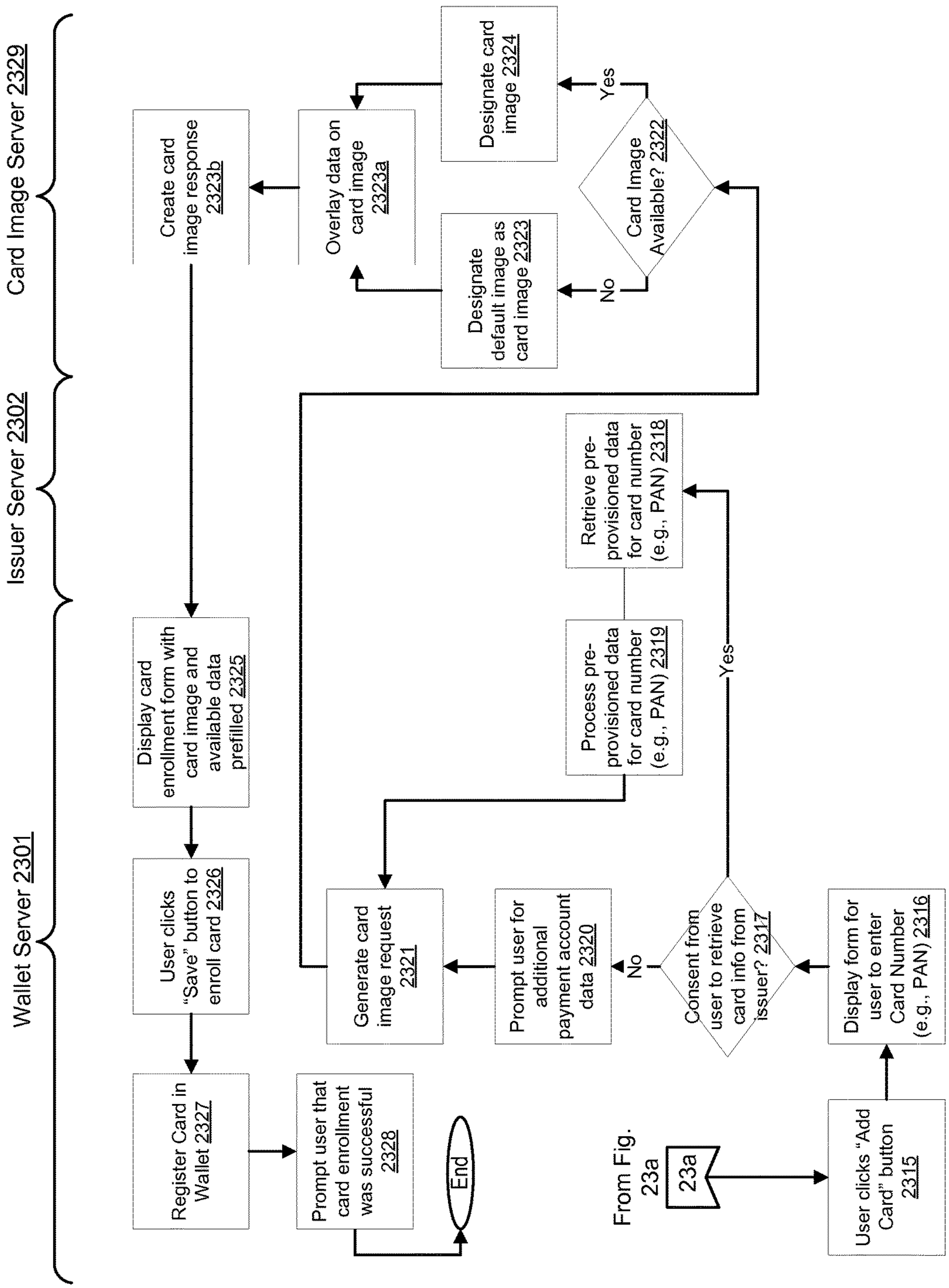
Figure 23b: Exemplary Wallet and Card Enrollment Logic Flow

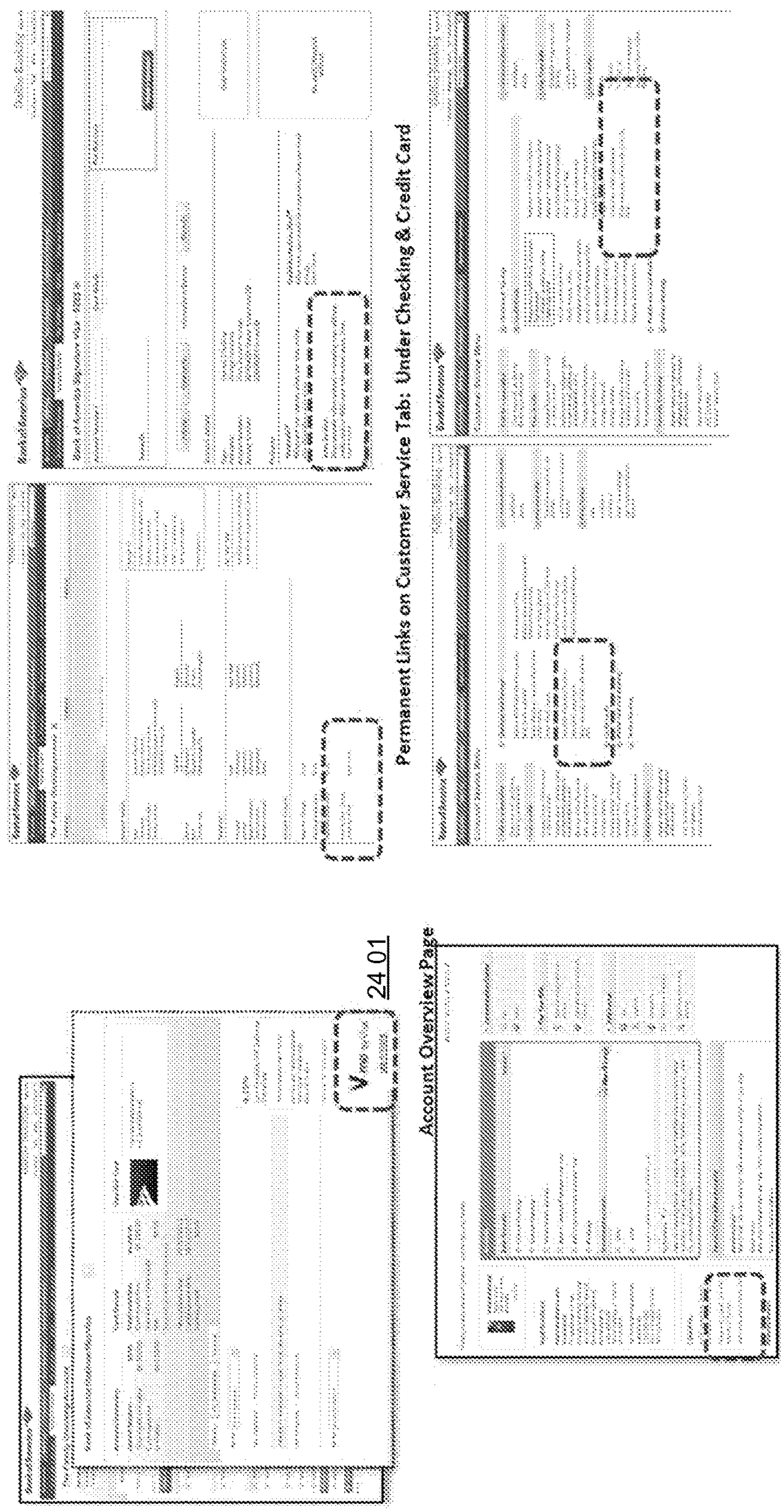
Figure 24a: Exemplary Wallet and Card Enrollment Screenshot

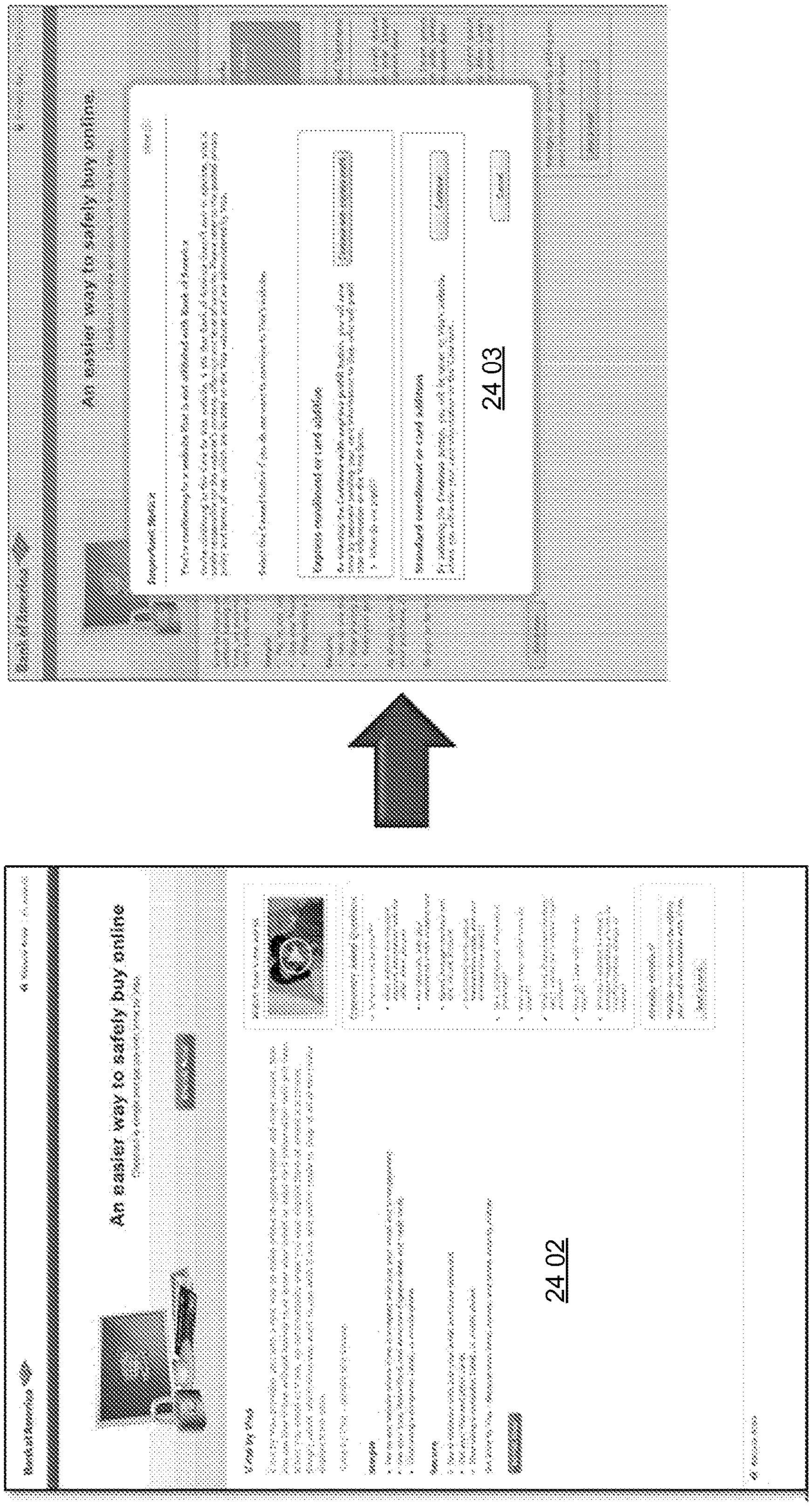
Figure 24b: Exemplary Wallet and Card Enrollment Screenshot

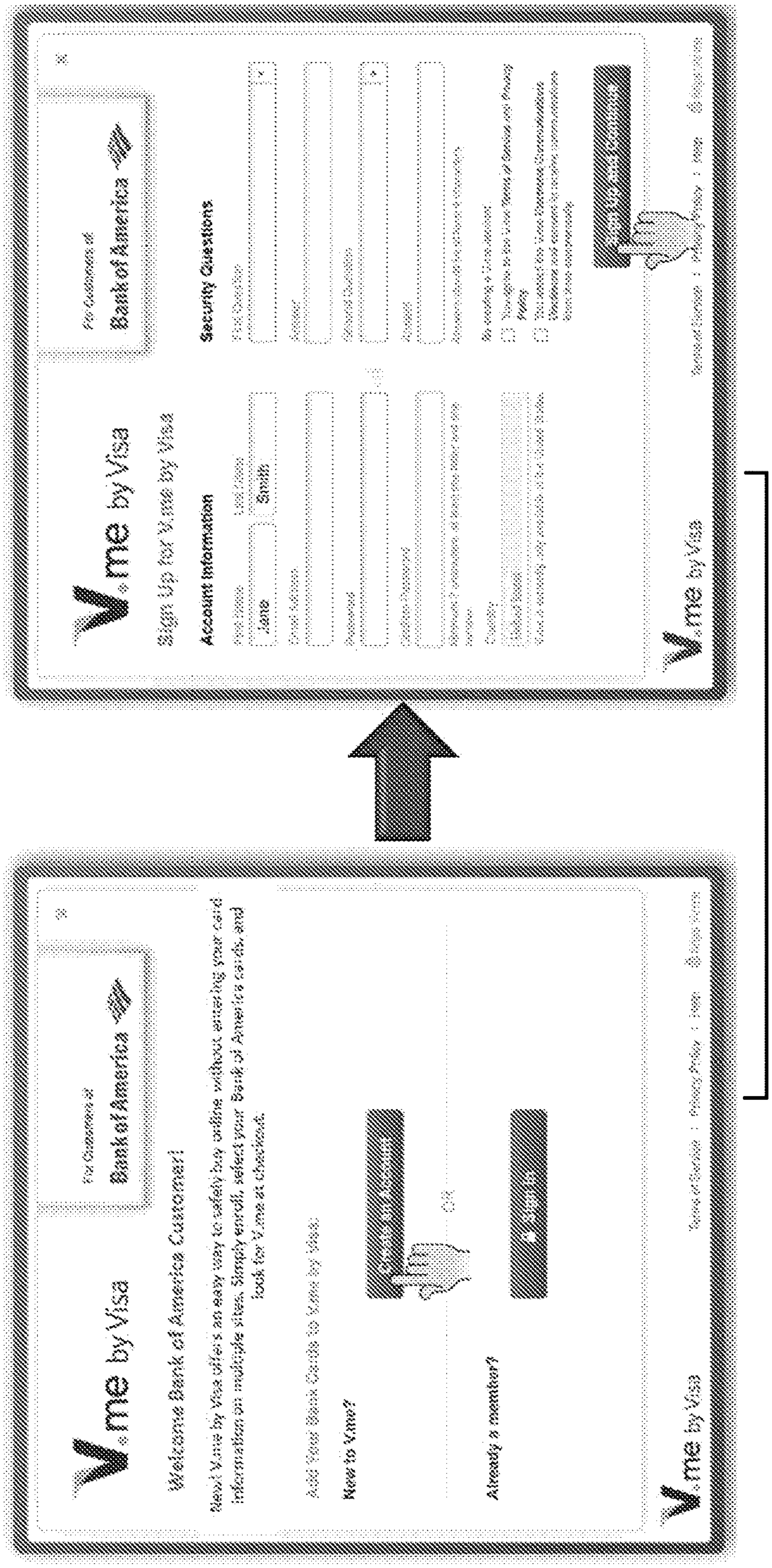
2404
Figure 24c: Exemplary Wallet and Card Enrollment Screenshot

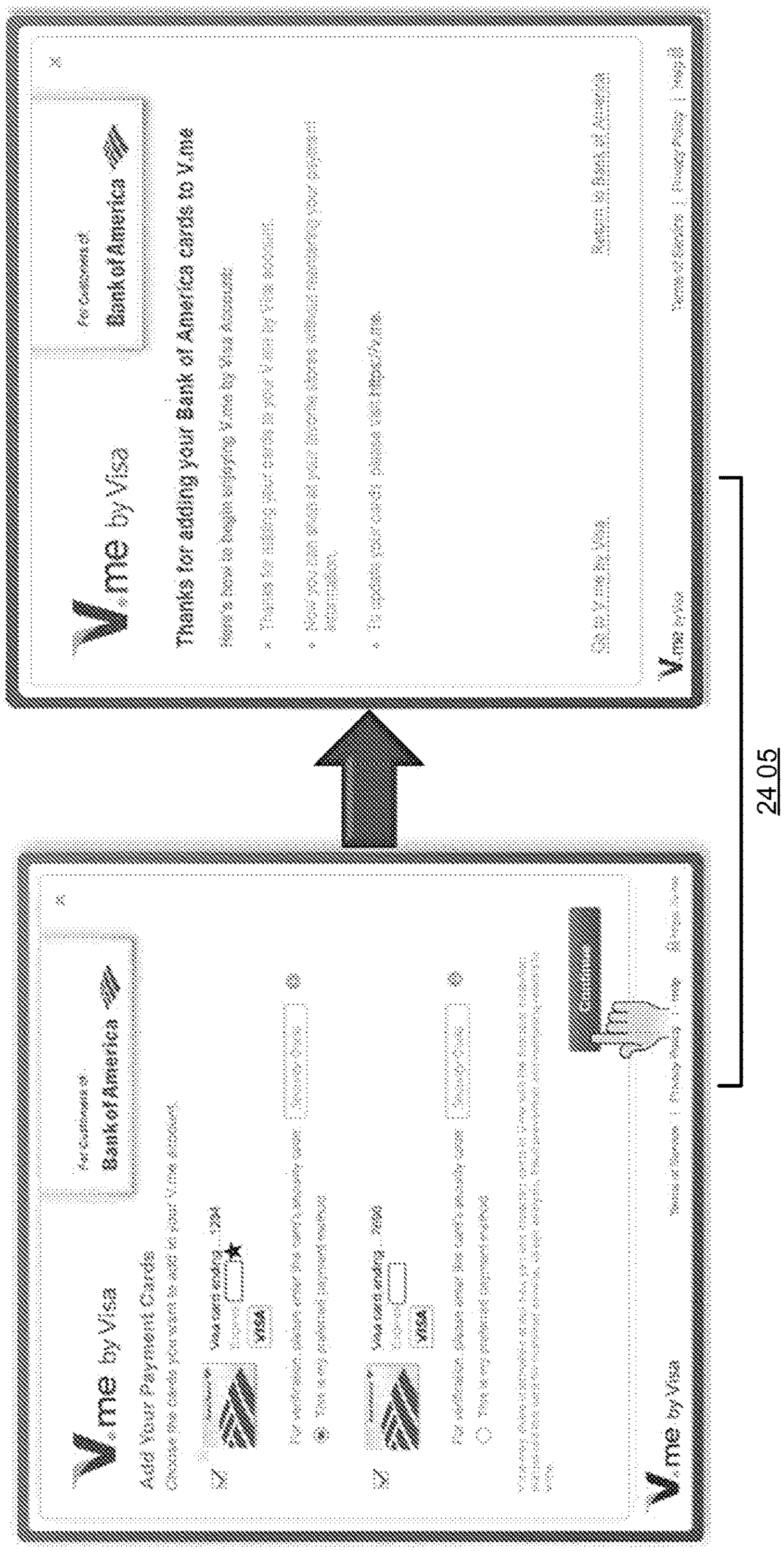
Figure 24d: Exemplary Wallet and Card Enrollment Screenshot

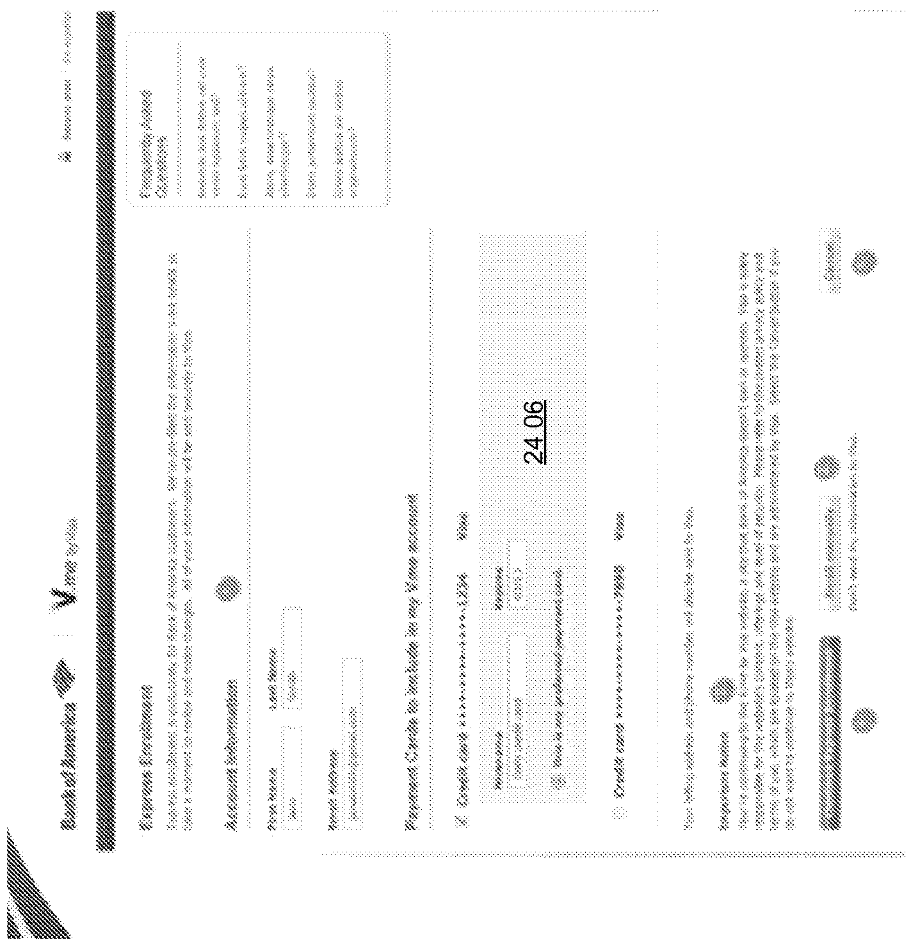
Figure 24e: Exemplary Wallet and Card Enrollment Screenshot

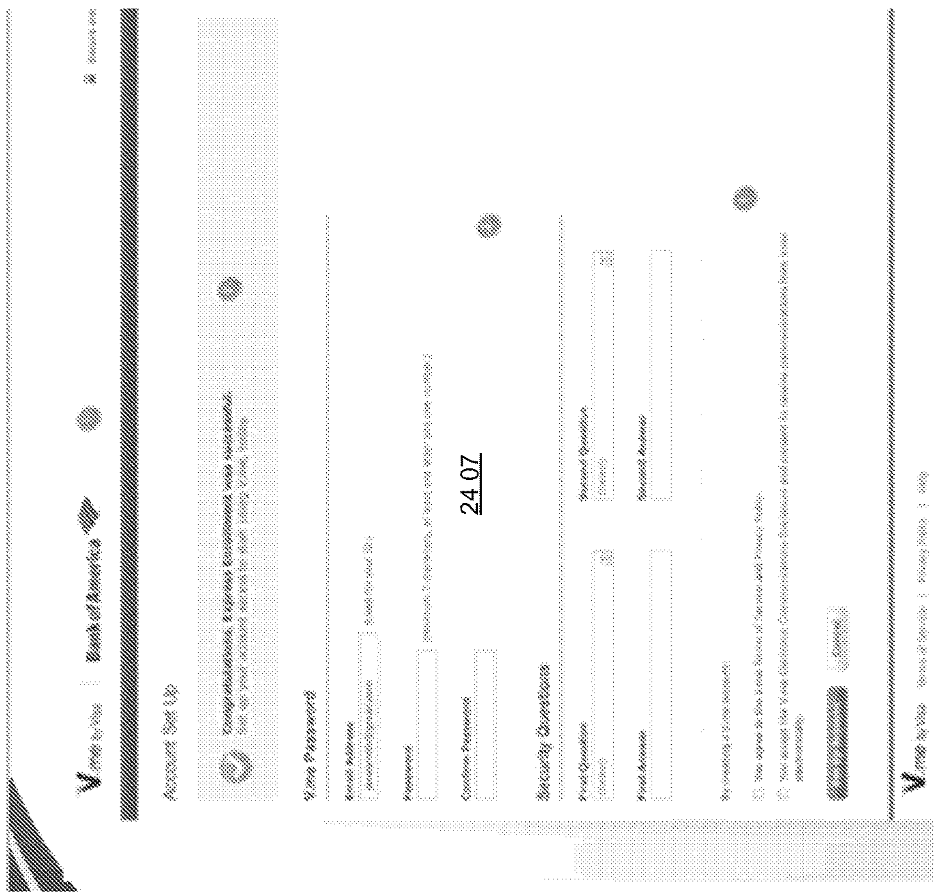
Figure 24f: Exemplary Wallet and Card Enrollment Screenshot

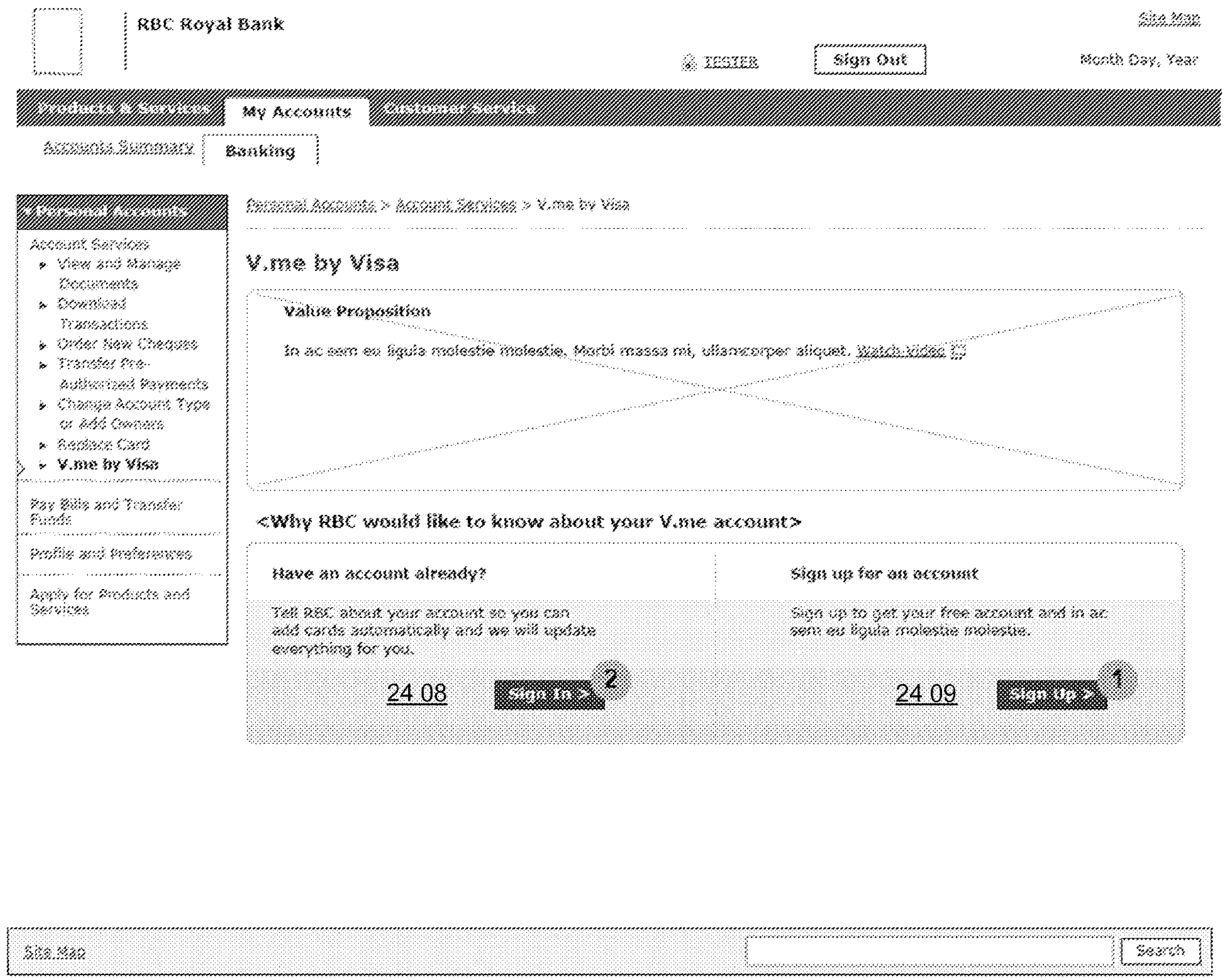
Figure 24g: Exemplary Wallet and Card Enrollment Screenshot

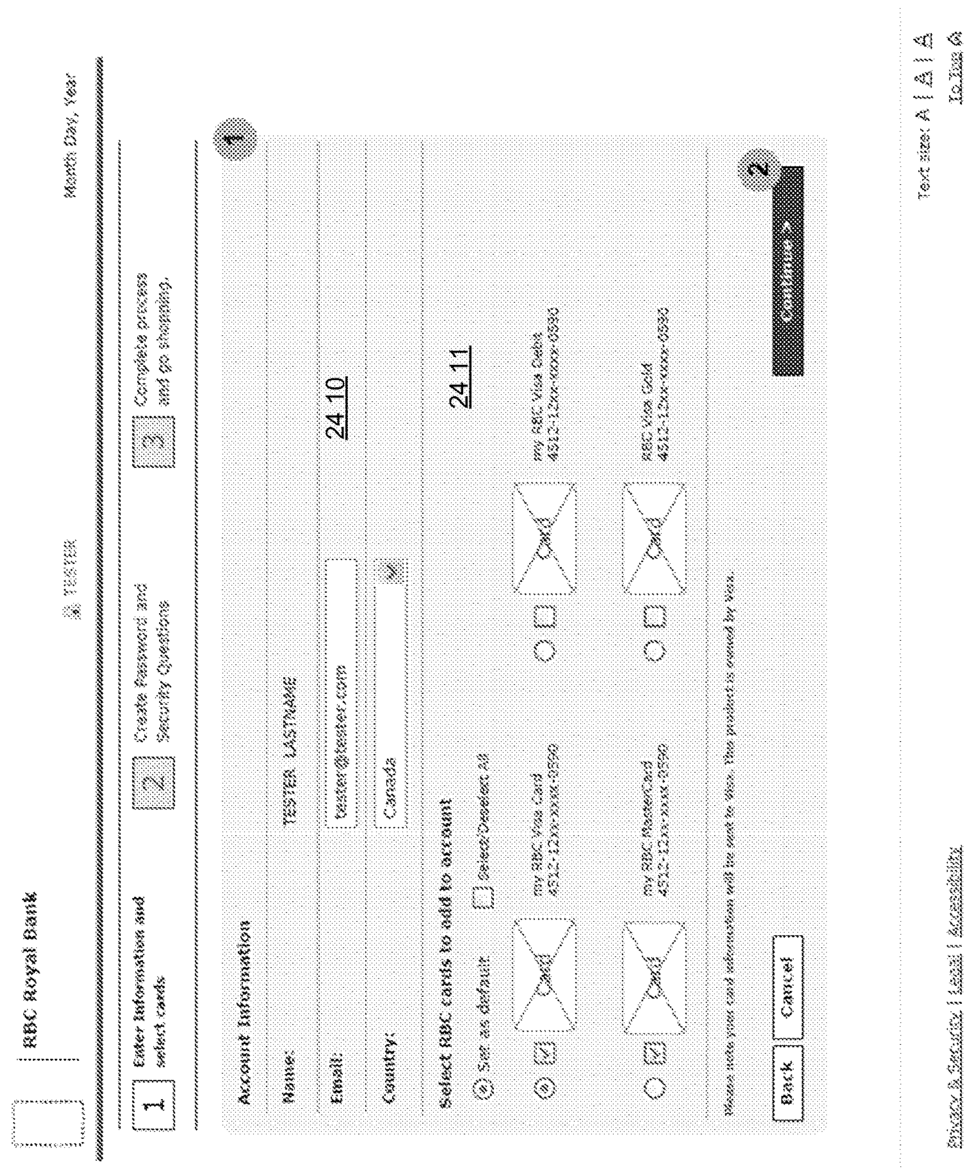
Figure 24h: Exemplary Wallet and Card Enrollment Screenshot

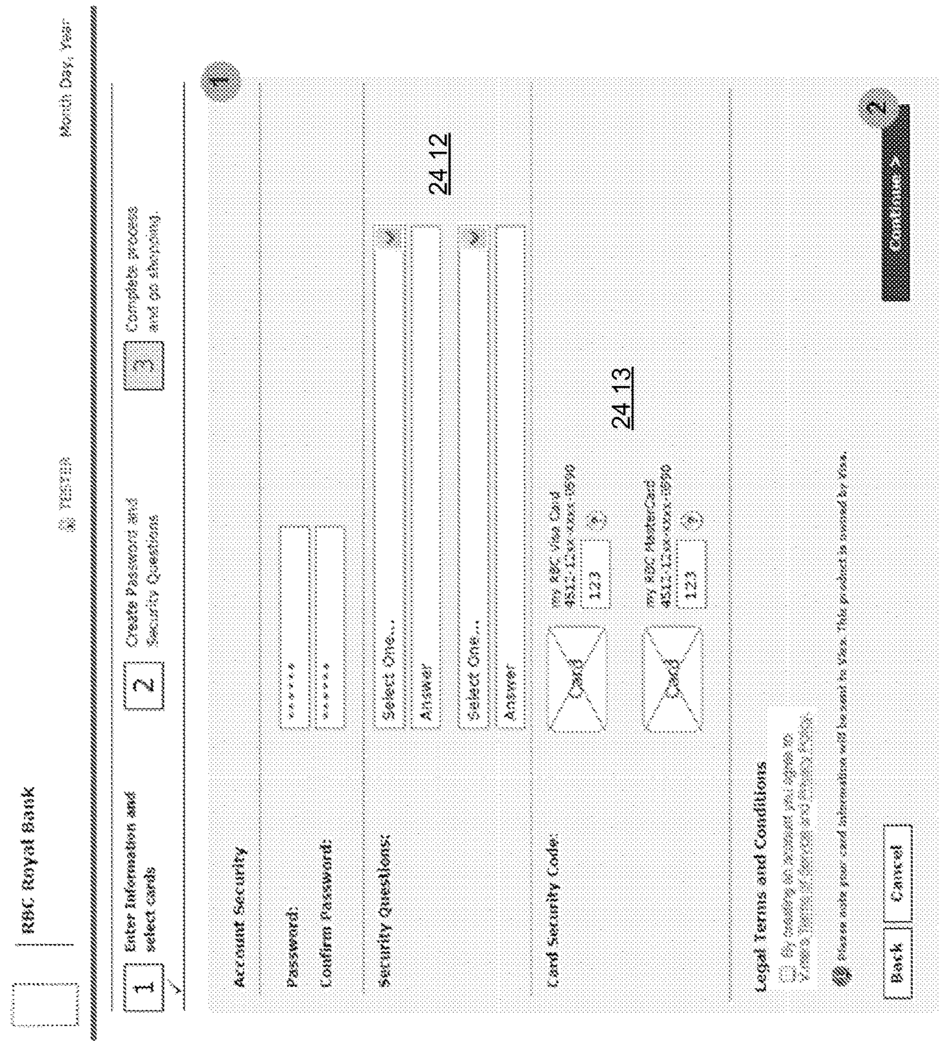
Figure 24i: Exemplary Wallet and Card Enrollment Screenshot

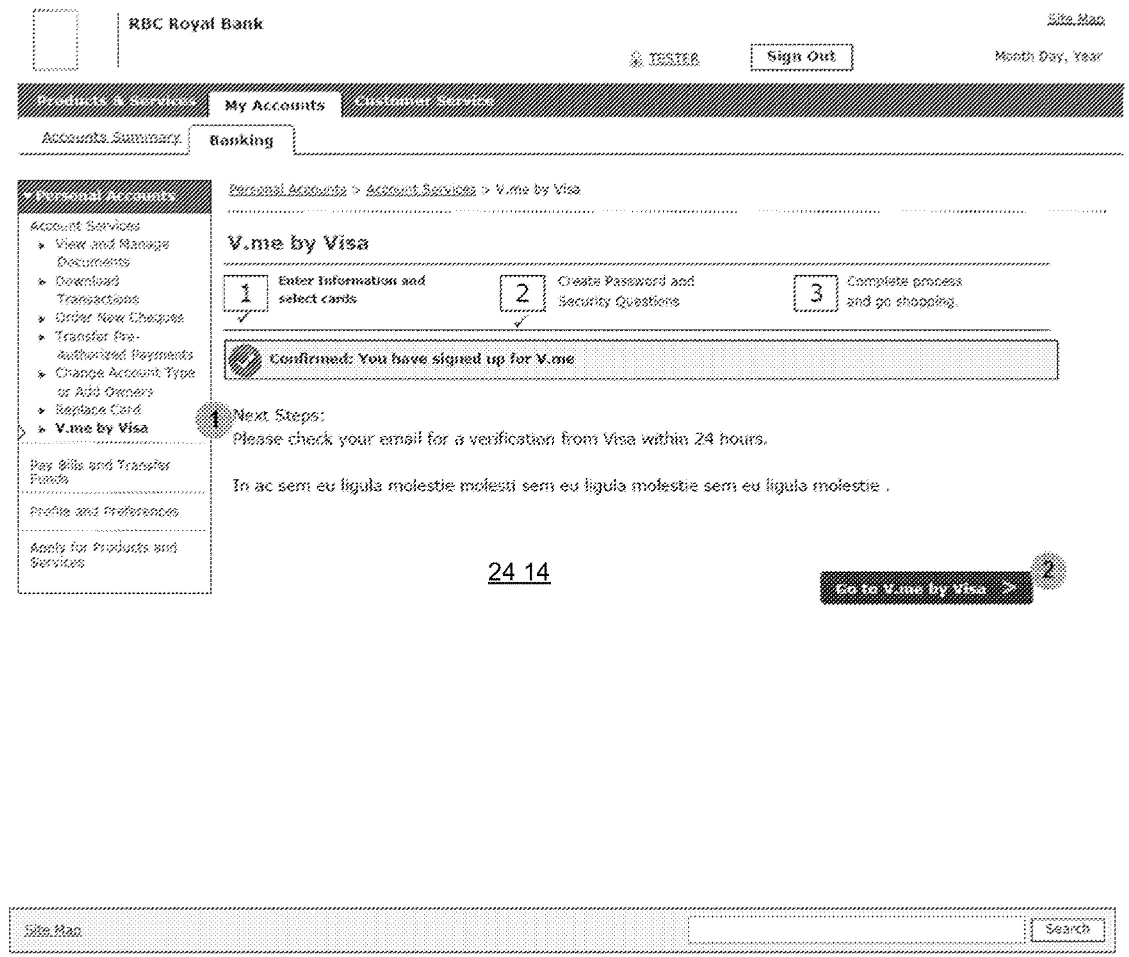
Figure 24j: Exemplary Wallet and Card Enrollment Screenshot

Example HAP Embodiments

Example HAP User Interface

Example HAP User Interface

Example HAP User Interface

Example HAP Data Flow

Example MDWC component

Example HAP Access Privileges

Example HAP Access Privileges

Example HAP Access Privileges

Access Control

29 37

Requestor: issuer
Context: mobile
Source: issuer
Target: issuer 29 51

29 47

29 49

| | View: tokenized | View: Masked | View: Full | Modify | Add | Delete | Execute | Transaction: money in | Transaction: money out: parameters |
|---|---|---|---|---|---|---|---|---|---|
| Profile | ☑ 29 49 | ☑ 🔒 | ☒ 29 53 | ☒ | ◈ | ◈ | ◈ | ☑ 🔒 | ☒ |
| Address Book | ☒ 🔒 | ☒ | ☒ | ☑ | ☑ | ☑ | ◈ | ☑ | ☒ |
| Payment Methods | ☑ | ☑ | ☒ | ☒ 🔒 | ☒ 🔒 | ☑ | ◈ | ☑ | ☒ 🔒 |
| Shipping Carriers | ☒ | ☒ | ☒ | ☒ | ☒ | ◈ | ◈ | ☑ | ☒ |
| Loyalty Programs | ☑ | ☑ 🔒 | ☒ | ☒ | ☑ | ☑ | ◈ | ☑ | ☒ |
| Preferences | ☒ | ☒ | ☒ | ◈ 🔒 | ☑ | ◈ | ◈ | ☑ | ☒ |
| Social Network | ☑ | ☑ | ☒ | ☑ | ◈ 29 55 | ☑ | ◈ | ☑ | ☒ |
| Transaction History | ☒ | ☒ | ☒ | ☒ | ◈ | ☑ | ◈ | ☑ | ☒ |

☑ permission allowed 29 39

☒ permission not allowed 29 41

◈ permission depends on conditions 29 43

🔒 permission locked 29 45

FIGURE 29D

Example HAP Access Privileges

Access Control

2957

Requestor: issuer
Context: mobile
Source: issuer
Target: BOA

| | View: tokenized | View: Masked | View: Full | Modify | Add | Delete | Execute | Transaction: money in | Transaction: money out: parameters |
|---|---|---|---|---|---|---|---|---|---|
| Profile | ◈ | ☑ | ☒ | ☑ 🔒 | ◈ | ◈ | ◈ | ☒ | ◈ |
| Address Book | ☒ | ☒ 🔒 | ☑ | ☒ | ☑ | ☑ | ◈ | ☒ | ◈ 🔒 |
| Payment Methods | ☑ | ☑ | ☑ | ☒ | ☒ 🔒 | ☑ | ◈ | ☒ | ◈ |
| Shipping Carriers | ☒ 🔒 | ☒ | ☒ | ☑ | ☒ | ◈ | ◈ | ☒ | ◈ |
| Loyalty Programs | ☒ | ☑ 🔒 | ☒ | ☑ | ☑ | ☑ | ☒ | ☑ | ☒ |
| Preferences | ☑ | ☒ | ◈ 🔒 | ☒ | ☑ | ◈ | ☒ | ☑ | ☒ |
| Social Network | ◈ | ☑ | ☑ | ☑ | ☒ 🔒 | ☑ | ☒ 🔒 | ☑ | ☒ |
| Transaction History | ◈ | ☒ | ☒ | ☒ | ☒ | ☑ | ☒ | ☑ | ☒ |

☑ permission allowed

☒ permission not allowed

◈ permission depends on conditions

🔒 permission locked

FIGURE 29E

Example HAP Access Privileges

Access Control

Requestor: issuer
Context: mobile
Source: BoA
Target: Amazon

| | View: tokenized | View: Masked | View: Full | Modify | Add | Delete | Execute | Transaction: money in | Transaction: money out: parameters |
|---|---|---|---|---|---|---|---|---|---|
| Profile | ☒ | ☑ 🔒 | ☒ | ◆ 🔒 | ☑ | ◆ | ◆ | ☒ | ☒ |
| Address Book | ☒ | ☒ | ☒ | ☑ | ☑ | ☑ | ◆ | ☒ | ☒ |
| Payment Methods | ☑ | ☑ | ☒ | ☒ 🔒 | ☒ 🔒 | ☑ | ◆ | ☑ | ☒ 🔒 |
| Shipping Carriers | ☒ | ☒ | ☒ | ☒ | ☒ | ◆ | ☒ | ☑ | ◆ |
| Loyalty Programs | ☑ | ☑ | ☒ | ☑ | ☑ 🔒 | ☑ | ☒ | ☑ | ◆ |
| Preferences | ☒ | ☒ 🔒 | ☑ | ☒ 🔒 | ☑ | ◆ | ☒ | ☑ | ◆ |
| Social Network | ☑ | ☑ | ☑ | ☑ | ☑ | ☑ | ☒ | ◆ | ◆ |
| Transaction History | ☒ | ☒ | ☒ | ☒ | ◆ | ☑ | ◆ | ◆ | ☒ |

☑ permission allowed

☒ permission not allowed

◆ permission depends on conditions

🔒 permission locked

FIGURE 29F

Example HAP Access Privileges

Access Control

Actions

- View: tokenized
- View: masked
- View: full
- Modify
- Add
- Delete
- Execute
- Transact: money in
- Transact: money out (parameters (x amount $)
- Transact: information in
- Transact: information out
- Alert
- Notify
- Redeem
- Refund
- Purchase
- Transfer
- Allow UI access to the wallet

Info Type

- Address book
- Payment methods
- shipping carriers
- Loyalty programs
- Preferences
- Social network
- Transaction History
- Browser cookies
- Offers/coupons
- Alerts (feeds and triggers)
- Other wallet accounts

FIGURE 29G

Example HAP Access Privileges

Example Embodiments: HAP Connecting Wallet with Issuers

Example Embodiments: HAP Connecting Wallet with Issuers

Example Embodiments: Wallet Overlay On Mobile Devices

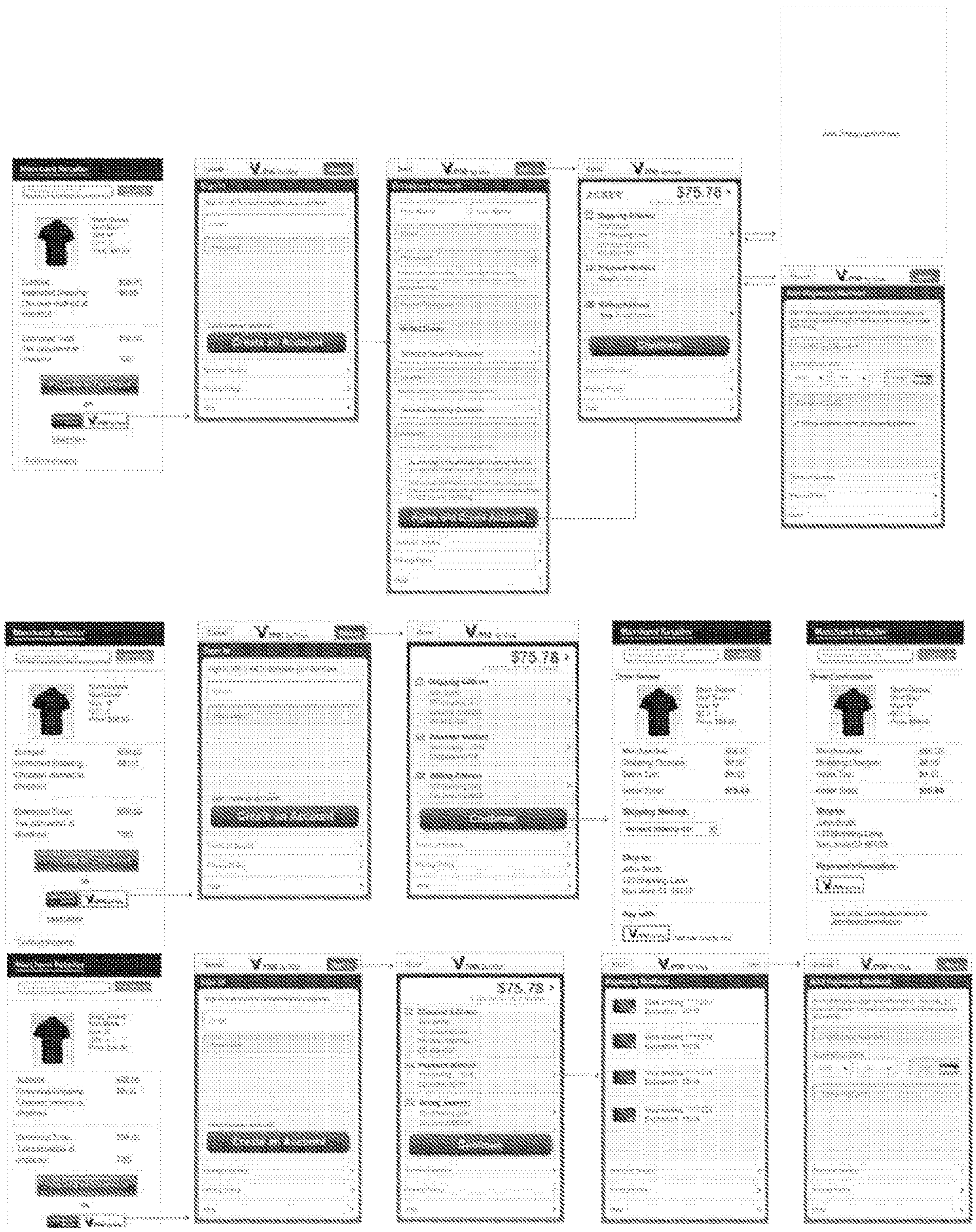
FIGURE 31B Example Embodiments: Wallet Overlay On Mobile Devices

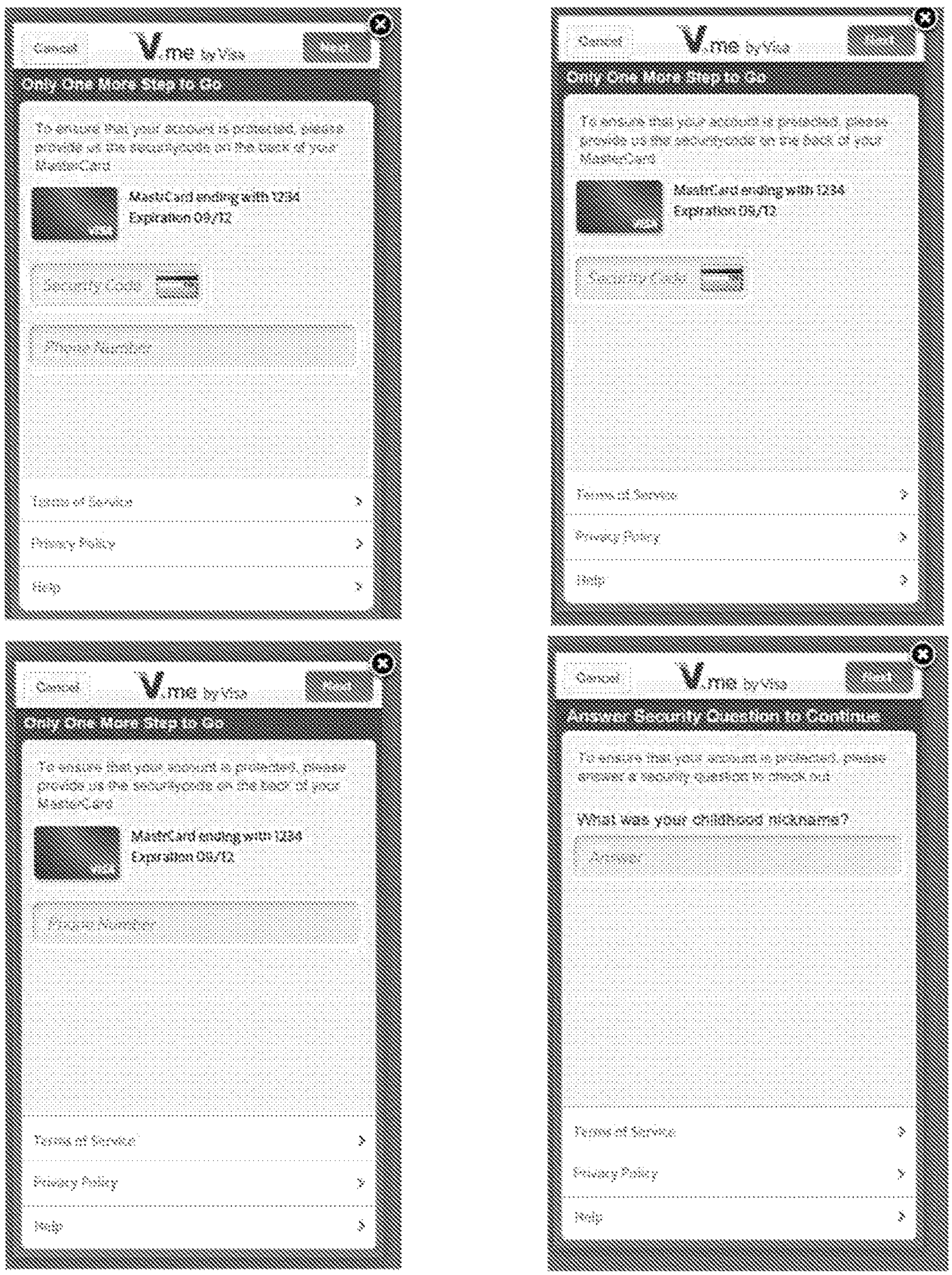
FIGURE 31C Example Embodiments: Wallet Overlay On Mobile Devices

Example Embodiments: Wallet Overlay On Mobile Devices

Example Embodiments: Wallet Overlay On Mobile Devices

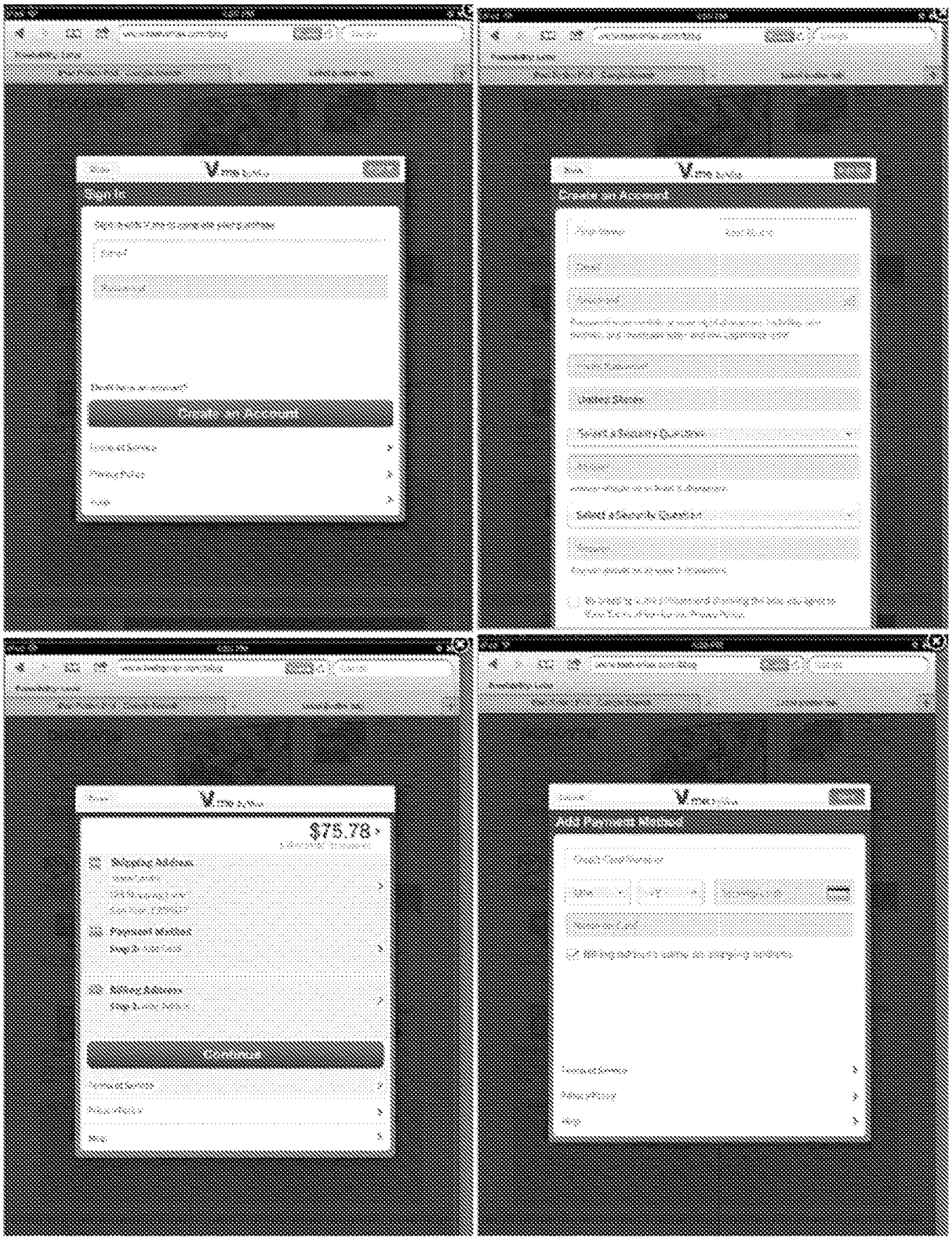
FIGURE 31F Example Embodiments: Wallet Overlay On Mobile Devices

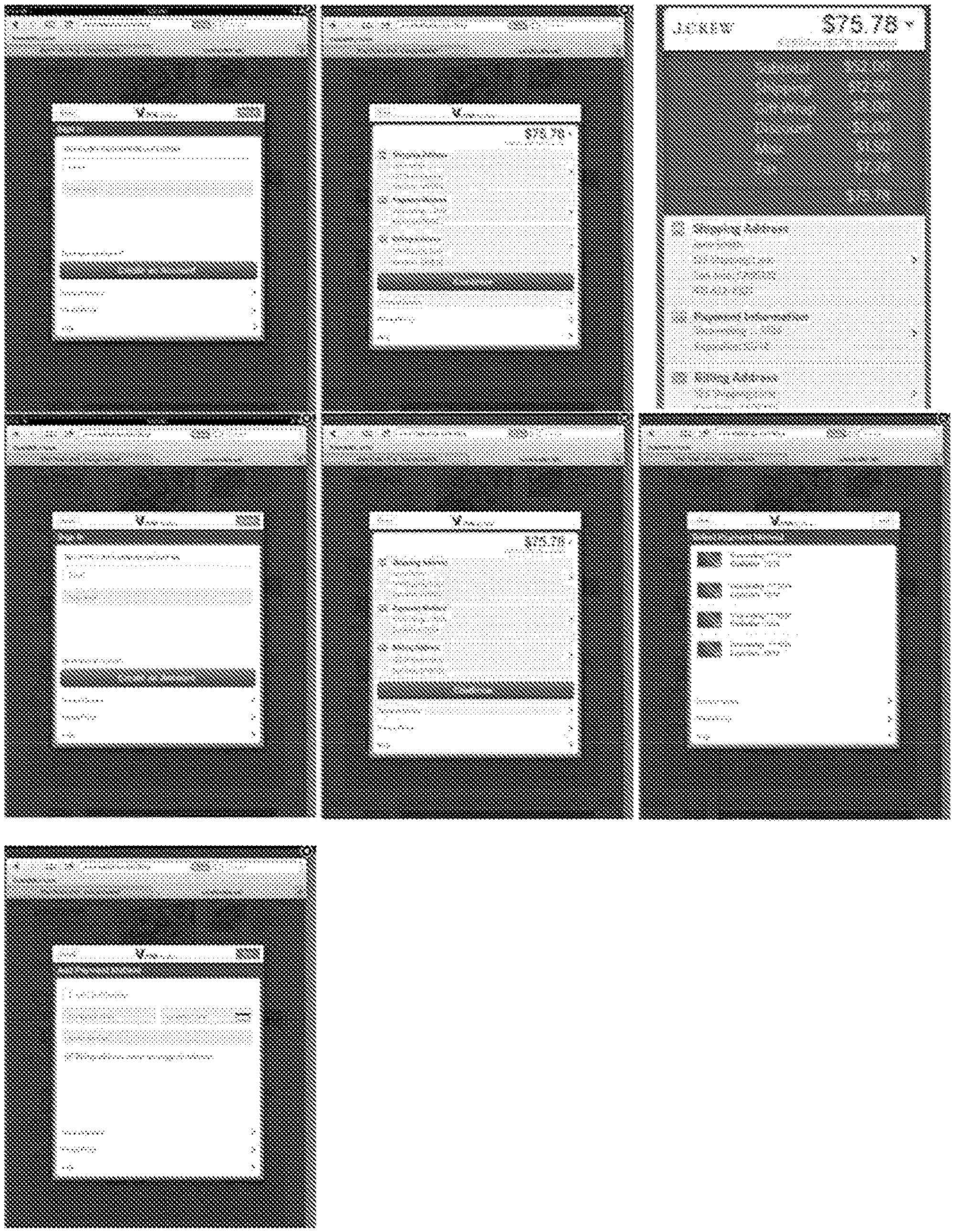
FIGURE 31G Example Embodiments: Wallet Overlay On Mobile Devices

Example Embodiments: Wallet Overlay On Mobile Devices

Example Mobile Wallet Overlay ("MWO") component

Example Embodiments: Value Added Wallet

Example Embodiments: Value Added Wallet

Example Embodiments: Value Added Wallet

Example Wallet Alert Interactions ("WAI") component

Example Embodiments: Value Added Wallet

Example Wallet View Payment ("WVP") component

Example Wallet User Subscription ("WUS") component

Example Wallet Alert Settings ("WAS") component

Example Wallet Subscription Alert ("WSA") component

Example Wallet Saves Alert Setting ("WSAS") component

Example Wallet Get Alert ("WGA") component

Example Wallet Client Saves Alert ("WCSA") component

Example Embodiments: Value Added Wallet

Example Embodiments: Value Added Wallet

Example VAS Life Cycle ("VASLC") component

Example VAS Onboarding ("VASO") component

Example VAS Subscription ("VASS") component

Example VAS User Settings ("VASUS") component

Example VAS Activity Notifications ("VASAN") component

Example Embodiments: Value Added Wallet

Example Embodiments: Value Added Wallet

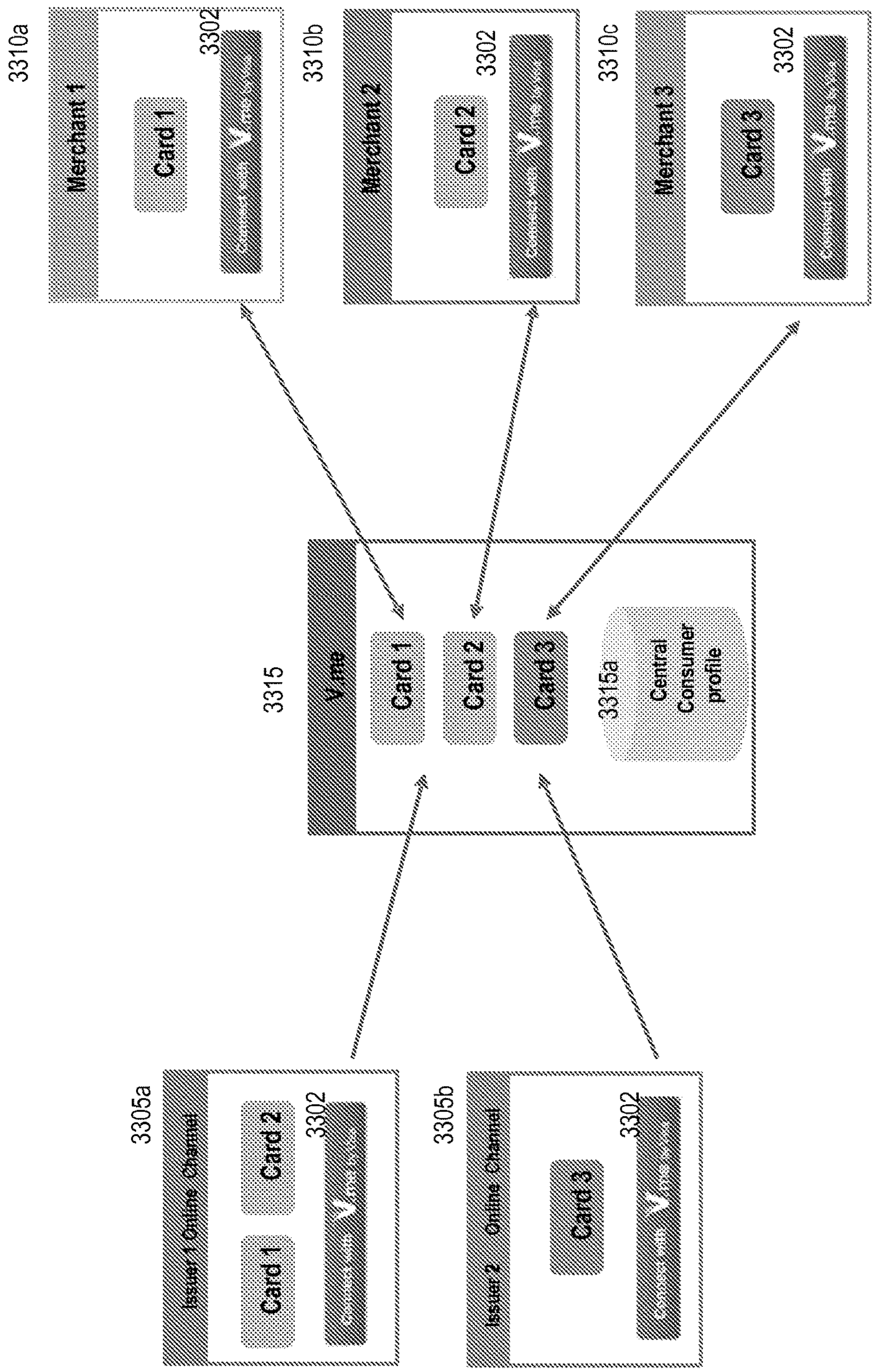
Figure 33: Example Service Connections

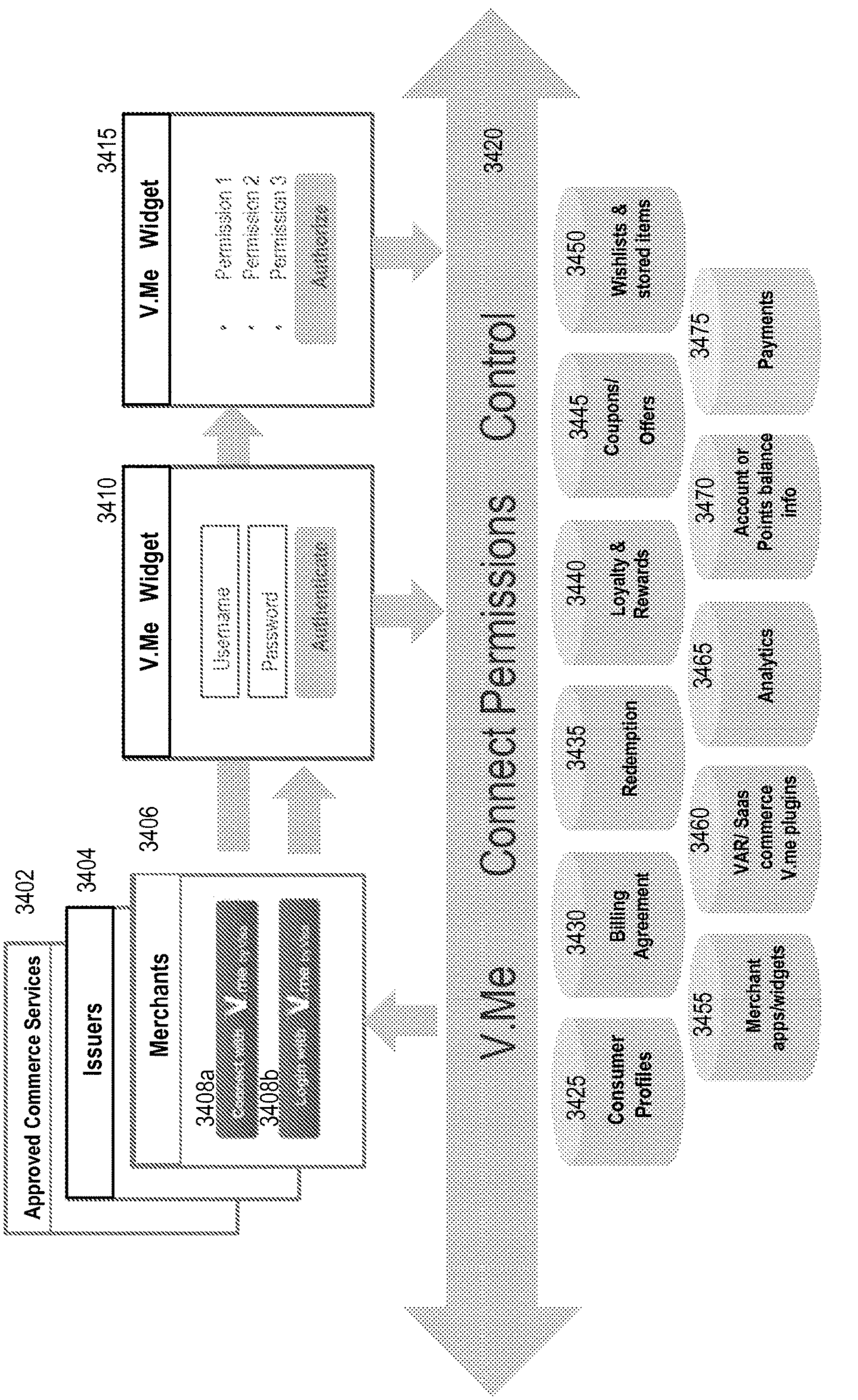
Figure 34: Example Connect Architecture

HYBRID APPLICATIONS UTILIZING DISTRIBUTED MODELS AND VIEWS APPARATUSES, METHODS AND SYSTEMS

CROSS-REFERENCE TO RELATED APPLICATIONS

This application is a continuation of and claims priority under 35 U.S.C. § 120 to U.S. patent application Ser. No. 15/406,325 filed Jan. 13, 2017, which issued as U.S. Pat. No. 10,154,084 on Dec. 11, 2018, entitled "HYBRID APPLICATIONS UTILIZING DISTRIBUTED MODELS AND VIEWS APPARATUSES, METHODS AND SYSTEMS," which is a continuation of and claims priority under 35 U.S.C. § 120 to U.S. patent application Ser. No. 14/156,025, filed Jan. 15, 2014, and entitled "HYBRID APPLICATIONS UTILIZING DISTRIBUTED MODELS AND VIEWS APPARATUSES, METHODS AND SYSTEMS," which issued as U.S. Pat. No. 9,582,598 on Feb. 28, 2017, which is a continuation-in-part of and claims priority under 35 U.S.C. § 120 to U.S. patent application Ser. No. 13/542,443 filed Jul. 5, 2012, entitled "ELECTRONIC WALLET CHECKOUT PLATFORM APPARATUSES, METHODS AND SYSTEMS," which in turn claims priority under 35 U.S.C. § 119 to U.S. provisional patent application Ser. No. 61/504,348, filed Jul. 5, 2011 and entitled "ELECTRONIC WALLET CHECKOUT PLATFORM APPARATUSES, METHODS AND SYSTEMS"; and U.S. patent application Ser. No. 13/802,658, filed Mar. 13, 2013 and entitled "MULTI-DIRECTIONAL WALLET CONNECTOR APPARATUSES, METHODS AND SYSTEMS," which issued as U.S. Pat. No. 9,355,393 on May 31, 2016, and which claims priority under 35 USC § 119 to U.S. provisional patent application Ser. No. 61/612,368 filed Mar. 18, 2012, entitled "BIDIRECTIONAL WALLET CONNECT SERVICE APPARATUSES, METHODS AND SYSTEMS," and which itself is a continuation-in-part of and claims priority under 35 U.S.C. § 120 to U.S. patent application Ser. No. 13/624,779, filed Sep. 21, 2012 and entitled "WALLET SERVICE ENROLLMENT PLATFORM APPARATUSES, METHODS AND SYSTEMS", which is a continuation-in-part and claims priority under 35 U.S.C. § 120 to U.S. patent application Ser. No. 13/589,053, filed Aug. 17, 2012 and entitled "WALLET SERVICE ENROLLMENT PLATFORM APPARATUSES, METHODS AND SYSTEMS," which in turn claims priority under 35 USC § 119 to: U.S. provisional patent application Ser. No. 61/525,168 filed Aug. 18, 2011, entitled "WALLET SERVICE ENROLLMENT PLATFORM APPARATUSES, METHODS AND SYSTEMS," U.S. provisional patent application Ser. No. 61/537,421 filed Sep. 21, 2011, entitled "CONSUMER WALLET ENROLLMENT APPARATUSES, METHODS AND SYSTEMS"; U.S. provisional patent application Ser. No. 61/588,620 filed Jan. 19, 2012, entitled "CONSUMER WALLET ENROLLMENT APPARATUSES, METHODS AND SYSTEMS"; and U.S. provisional patent application Ser. No. 61/668,441 filed Jul. 5, 2012, entitled "REFERENCE TRANSACTION APPARATUSES, METHODS AND SYSTEMS." The entire contents of the aforementioned applications are expressly incorporated by reference herein.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address the secure management of in-application data on a user mobile device, and more particularly, include HYBRID APPLICATIONS UTILIZING DISTRIBUTED MODELS AND VIEWS APPARATUSES, METHODS AND SYSTEMS.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Mobile devices provide near real-time access to sensitive data. Consumers may, for example, access their financial accounts remotely. Applications running on a mobile device are generally either compiled or interpreted and may be run natively or non-natively on the mobile device.

BRIEF DESCRIPTION OF THE DRAWINGS

The accompanying appendices and/or drawings illustrate various non-limiting, example, innovative aspects in accordance with the present descriptions:

FIG. 5A shows a screen shot illustrating example account creation in some embodiments of the HAP;

FIG. 5B shows a screen shot illustrating example merchant account login in some embodiments of the HAP;

FIG. 5C shows a screen shot illustrating example account preference management in some embodiments of the HAP;

FIG. 6 shows a screen shot illustrating an example cross-channel implementation of some embodiments of the HAP;

FIGS. 7*a-b* show user interfaces illustrating example sign-in and account management in some embodiments of the HAP;

FIGS. 8*a-b* show user interfaces illustrating example sign-in and checkout in some embodiments of the HAP;

FIGS. 9*a-b* show data flow diagrams illustrating example bi-directional federation in some embodiments of the HAP;

FIG. 10 shows a logic flow diagram illustrating an example account creation and management in some embodiments of the HAP;

FIG. 11 shows a block diagram illustrating an example prepaid card personalization in some embodiments of the HAP;

FIG. 12 shows a user interface illustrating an example HAP settings control panel in some embodiments of the HAP;

FIG. 12*a* is an example user interface illustrating a wallet account interface after the enrollment of new payment account(s), in some embodiments of the HAP;

FIGS. 13*a-i* show example user interfaces, in some embodiments of the HAP;

FIG. 14 shows a screenshot illustrating an example check-out containing current transactions and a contract for future transactions, in some embodiments of the HAP;

FIG. 14*a* is a screenshot illustrating an example login form for is accessing a HAP account and optionally creating a virtual wallet account, in some embodiments of the HAP;

FIG. 14*b* is a screenshot illustrating the creation of an account with a merchant and, optionally, creating a virtual wallet account, in some embodiments of the HAP;

FIG. 15 shows a screenshot illustrating an example reference transaction enrollment, in some embodiments of the HAP;

FIG. 16 shows a user interface illustrating an example embodiment of a reference transaction management console, in some embodiments of the HAP;

FIG. 17 shows a block diagram depicting example reference failover transaction behavior, in some embodiments of the HAP;

FIGS. 18-18*a* shows a logic flow diagram illustrating a reference transaction link creation, in some embodiments of the HAP;

FIG. 19 shows a user interface illustrating an example embodiment of an issuer web site containing virtual wallet enrollment elements, in some embodiments of the HAP;

FIGS. 20*a-d* show a user interface illustrating an example embodiment of a wallet service enrollment interface, in some embodiments of the HAP;

FIG. 21 shows an example wallet service enrollment data flow, in some embodiments of the HAP;

FIGS. 22*a*-22*b* show example wallet account enrollment data flow, in some embodiments of the HAP;

FIGS. 23*a*-23*b* show a logic flow diagram illustrating an example wallet and card enrollment logic flow, in some embodiments of the HAP;

FIGS. 24*a*-24*j* show screenshot diagrams illustrating example wallet 15 and card enrollment, in some embodiments of the HAP;

FIGS. 29A-29G show example access privileges, in some embodiments of the HAP;

FIGS. 31A-31I show example user interfaces and a logic flow diagram illustrating wallet overlay on mobile devices, in some embodiments of the HAP;

FIG. 33 shows a block diagram illustrating example service connections in some embodiments of the HAP;

FIG. 34 shows a block diagram illustrating example HAP architecture in some embodiments of the HAP.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

HAP

The HYBRID APPLICATIONS UTILIZING DISTRIBUTED MODELS AND VIEWS APPARATUSES, METHODS AND SYSTEMS (hereinafter "HAP" user interface) transform web-view application requests into native application web-view source code requests and populated models, via HAP components, in response to user interface activities. In some embodiments, this is carried out in real time.

Figure 1:
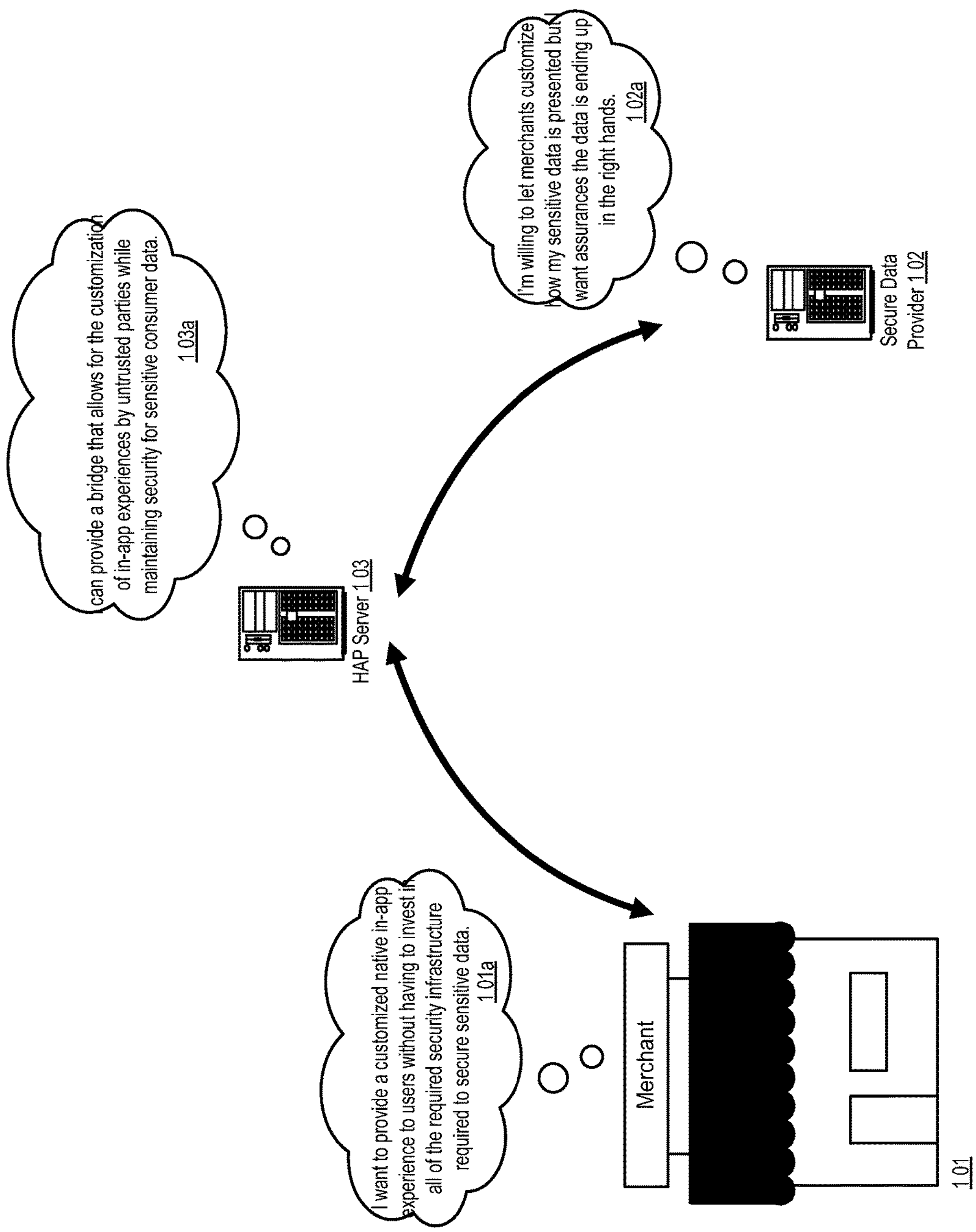
FIG. 1 shows an example block diagram illustrating aspects of the HAP, in one implementation of the HAP operation.

FIG. 1 shows an example block diagram illustrating aspects of the HAP, in one implementation of the HAP operation. In one embodiment, a merchant, 10 e.g. 101, may desire to provide a customized native in-App experience to users without having to invest in or create the security infrastructure required to secure sensitive data, e.g. 101*a*. Sensitive data may include, for example, financial data, data relating to user communications, user application usage data, user social media data, user location data, and/or the like.

In one embodiment, a secure data provider, e.g. 102, may be a financial services provider such as a card issuer, a social media provider, a bank, a merchant transaction processor, a health records aggregator, and/or the like. The secure data provider may be willing to let merchants and/or businesses customize how the sensitive data provided by the secure data provider 102 is presented but may desire additional assurances regarding the ultimate destination and or the handling of the data, e.g. 102*a*.

In one embodiment, the HAP, e.g. 103, may provide a bridge that allows the customization of in-App user experiences by on trusted parties such as, for example, merchant 101, while maintaining the security desired by a secure data provider such as, for example, secure data provider 102, e.g., 103*a*.

Figure 2A:
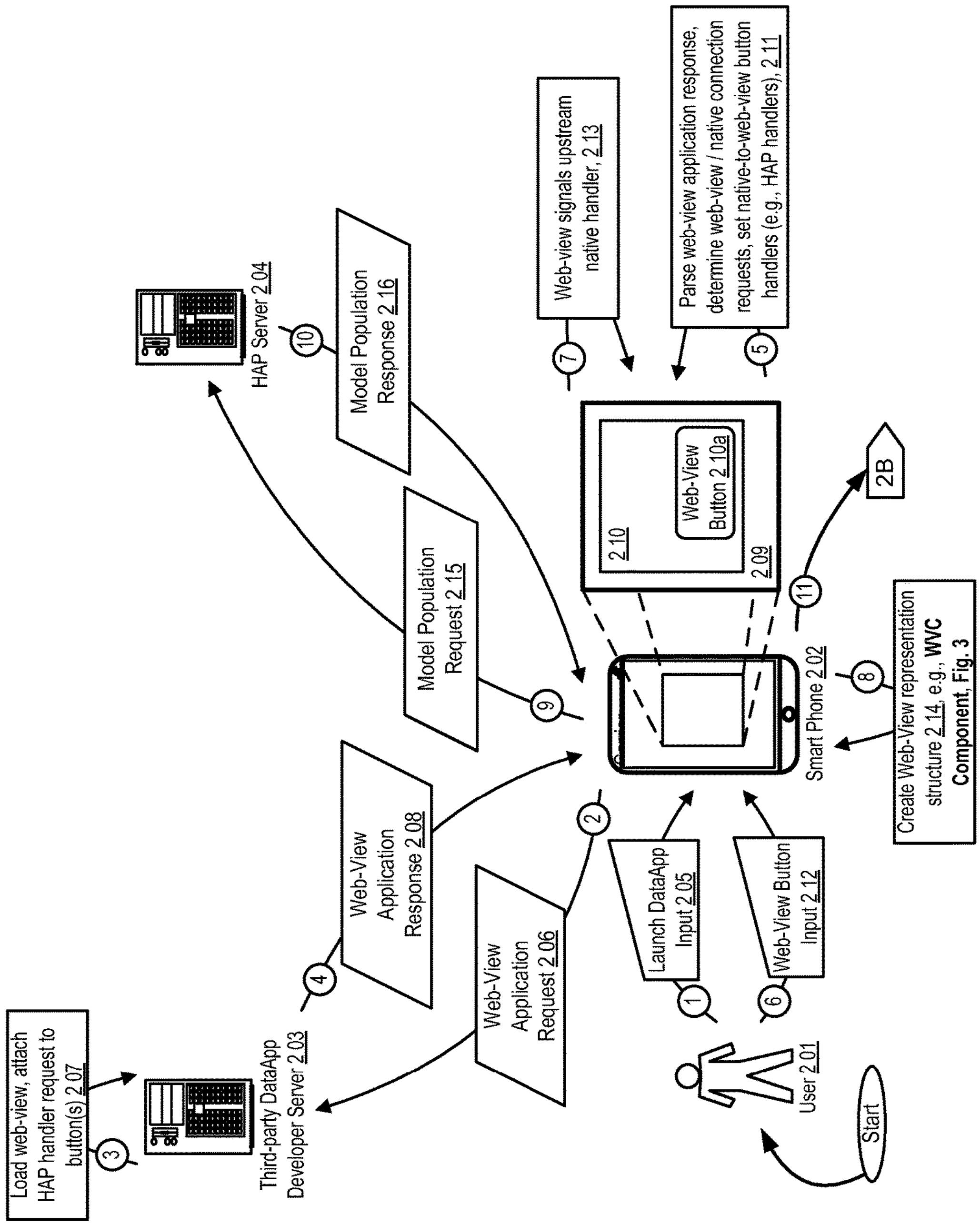
FIGS. 2A-B show an example data flow illustrating aspects of hybrid application distributed view processing, in one implementation of the HAP operation.
Figure 2B:
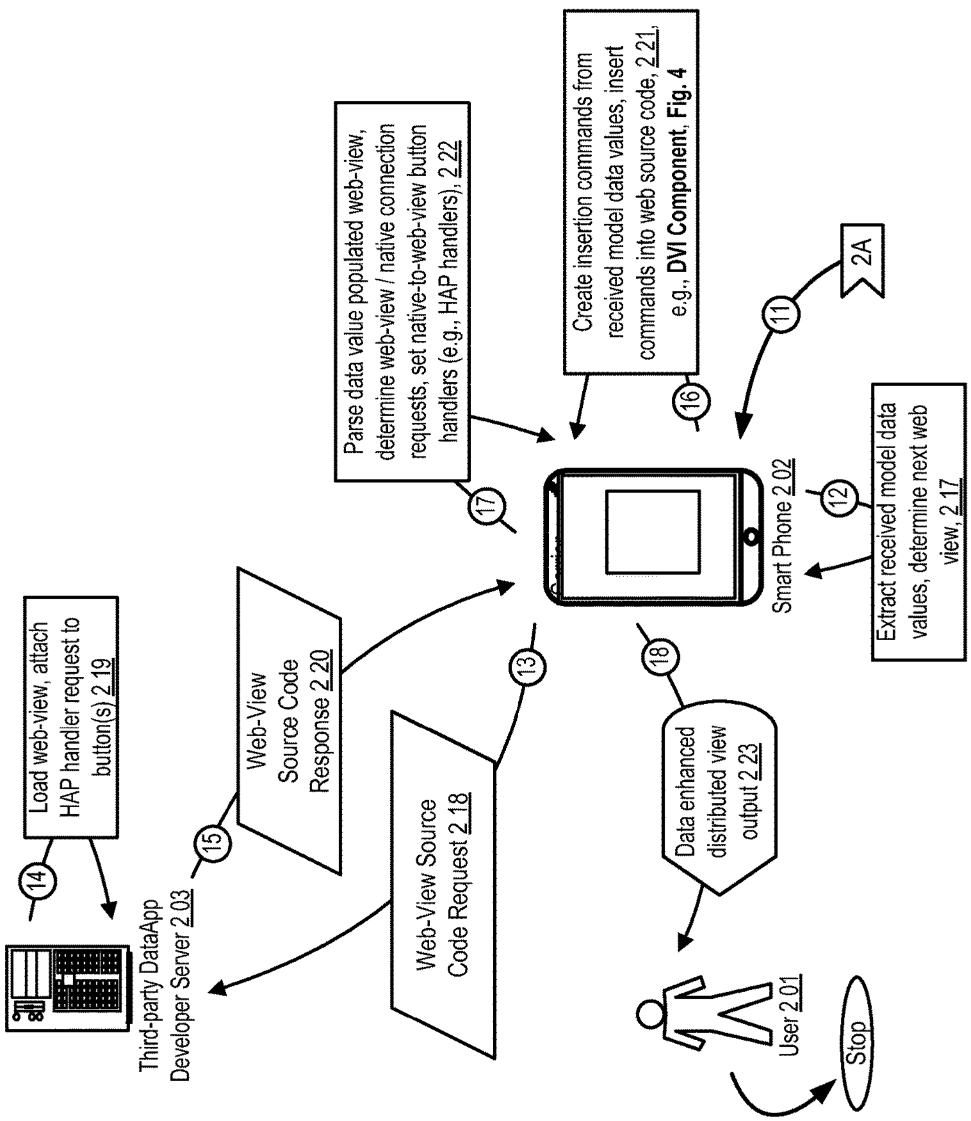

FIGS. 2A-B show an example data flow illustrating aspects of hybrid application distributed view processing, in one implementation of the HAP operation. In one embodiment, a user 201 may provide a launch data app input, e.g. 205, to a user mobile device such as a smart phone 202. A launch data app input may be, for example, a request to launch a native smart phone application provided by a payment card issuer, and/or the like. In one embodiment, the smart phone 202 may generate a web view application request, e.g. 206, and transmit the web view request to a third-party data app developer server, e.g. 203. In response, the third-party data app developer server may load the requesting web view and attach HAP handlers to one or more of the buttons or interfaces provided by the web view, e.g., 207. An HAP handler request may be a request by the third-party data app developer to enable their application, when running on a user mobile device, to access a secure data source in a manner that leverages heightened security of the smart phone's native application language, while simultaneously providing the enhanced assurances required by a sensitive data provider that the data provided will only be viewable by the smart phone user and not by the third-party data app developer. The HAP handler request may be, as in the current example, associated with a button within the interface provided. However, in alternative embodiments, the HAP handler may instead be associated with the interface itself, with the user, with the user device, with the HAP, with the third-party data app developer, with the web view, application, and/or the like. Furthermore, as used herein, button broadly refers to any user interface element with which the user may interact. For example, in other embodiments, the HAP handler may be associated with an entire is interface view port, with a tab within a user interface, a hyperlink, a portion of text displayed within the interface, an image, and/or the like.

In one embodiment, the third-party data app developer server 203 may provide a web view application response, e.g. 208, containing the web view as enhanced with the HAP handler requests. An example web-view application response 208, substantially in the form of an HTTP(S) POST message including XML-formatted data, is provided below:

```
POST /web_view_application_response.php HTTP/1.1
Host: www.userdevice.com
Content-Type: Application/XML
Content-Length: 667
<?XML version = "1.0" encoding = "UTF-8"?>
<web_view_application_response>
  <timestamp>2025-12-12 15:22:43</timestamp>
  <message_credentials type="device_api_key">
    <auth_key>h767kwjiwnfe456#niimidrtsxbi</auth_key>
  </message_credentials>
  <web _view_view>
    <table border="0" >
      <tr>
        <td>Display transaction history</td>
        <td>
          <form action="webviewviewtranshist.wv" >
          <input type="text" id="transhist_fromdate" />
          <input type="text" id="transhist_todate" />
          <input type="text" id="transhist_amount" />
          <input type="button" nativelang_handler="yes" id="1" />
          </form>
        </td>
      </tr>
      <tr>
        <td>Search for a transaction</td>
        <td>
          <form action="webview_view_search.wv" >
          <input type="button" id="2" />
          </form>
        </td>
      </tr>
      <tr>
        <td>Initiate a transaction dispute</td>
        <td>
          <form action="webview_view_dispute.wv" >
          <input type="button" id="3" />
          </form>
        </td>
      </tr>
      <tr>
        <td>Send money to a friend</td>
        <td>
          <form action="webview_view_sendmoney.wv" >
          <input type="button" id="4" />
          </form>
        </td>
```

-continued

```
      </tr>
    </table>
  </web view view>
</web_view_application_response>
```

In one embodiment, the user's smart phone 202 may then, within a native application 209, may instantiate a web view, e.g., 210, utilizing the application response 208. By encapsulating a web view within a native application structure, the HAP may enable the web view to communicate directly with the native application and, advantageously, interactions within the web view may be linked to actions upstream in the native application. For example, the web view application may contain a button to populate the web view with an individual's financial transaction data. If the application were provided merely as a web view with no corresponding native application encapsulation or linkage, the secure data provider would have reduced control over how the data is injected into and utilized by the web view application.

In one embodiment, the web view application response is parsed to determine interactions within the web view application that require connection with native application handlers, e.g. 211. For example, a web view button 210*a* may contain a designation that the button should be linked to a native application handler. Example code substantially in the form of JavaScript that may be utilized by a web view application to signal a native application that the user has pressed a button and/or completed and interaction within the web view application, is:

```
<script>
document.addEventListener('WebViewJavascriptBridgeReady',
function onBridgeReady(event) {
  var bridge = event.bridge
  bridge.init(function (message, responseCallback) {
    if (responseCallback) {
      responseCallback ("Hybrid application linked.")
    }
  } ) }, false) ;
  //calls handler buttonClickHandler residing
  //in obj c and passes identification of button clicked
  function sendtoObjC(button_id, event) {
    WebViewJavascriptBridge.callHandler("buttonClickHandler",
data = button_id);
  }
}
</script>
```

In one embodiment, after a time quantum, user 201 may, while interacting with the instantiated web view application, provide a web view button input 212. For example, a web view button input may be a tap, double tap, swipe, and/or the like with respect to web view button 210*a*. In response, the user smart phone 202 may, from the web view application, signal an upstream native application handler, e.g. 213. The upstream handler may, in some embodiments, be invoked from within the web view such that the upstream handler may determine an instantaneous state of the web view application, determine the required data needed to successfully process the web view button input, and request and retrieve high-security data such as financial data from a third-party in a manner that restricts the availability of the data to malicious code that may be present within the web view application response.

In one embodiment, the smart phone 202 may create a web view representation structure, e.g. 214, representing the current state of the rendered web view application view.

Further detail with respect to creating a web view representation structure may be found herein and particularly with respect to FIG. 3, e.g., an example WVC Component.

In one embodiment, the created web view representation structure may be packaged into a model population request, e.g. 215, and transmitted to HAP server 204. The HAP server may thereafter retrieve the user's personal financial data and supplement and/or append to a response the requested data. An example model population request 215, substantially in the form of an HTTP(S) POST message including XML-formatted data, is provided below:

```
POST /model_population_request.php HTTP/1.1
Host: www.HAPserver.com
Content-Type: Application/XML
Content-Length: 667
<?XML version = “1.0” encoding = “UTF-8”?>
<model_population_request>
  <timestamp>2025-12-12 15:22:43</timestamp>
  <message_credentials type=“device_api_key”>
    <auth_key>h767kwjiwnfe456#niimidrtsxbi</auth_key>
  </message_credentials>
  <model_for_population>
    <web_view_representation>
      <transhist_fromdate val=“20250201” />
      <transhist_todate val=“20250401” />
      <transhist_amount val=“500.00” />
    <web_view_representation>
    <model>
      <fields>
        <field name=“trans_date” />
        <field name=“trans_amount” />
        <field name=“merchant” />
        <field name=“result” />
        <field name=“payment_account” />
        <field name=“ereceipt” />
    </model>
  </model_for_population>
  </model_population_reguest>
```

In an alternative embodiment, such as that described herein and particularly with respect to FIGS. 5-35, an example model population request 215, substantially in the form of an HTTP(S) POST message including XML-formatted data, may be:

```
POST /model_population_request.php HTTP/1.1
Host: www.HAPserver.com
Content-Type: Application/XML
Content-Length: 667
<?XML version = “1.0” encoding = “UTF-8”?>
<security_template_level>subclass:abc
3.5</security_template_level>
<wallet_customer_ID>xyz123</wallet_customer_ID
<requestor type=“MobileDevice”>
  <context type=“mobile”>
      <role1 roleType=“source” val=“UserFinancialDataAccount” >
      <entity1>BoA</entity1>
      <BOA ID>abc123</BOA ID>
      <BOA_account_number>PAN 5678 1234 9012</
       BOA_account_number>
      <req_type>trans_data</req_type>
      <info_params>
        <transhist_fromdate val=“20250201” />
        <transhist_todate val=“20250401” />
        <transhist_amount val=“500.00” />
      </info_params>
      <action>retrieve:financial_trans_data</action>
    </role1>
    <role2 roleType=“target”>
      <entity2>UserMobileDevice</entity2>
      <device_credentials>
        <key type=“aes”>
          HTdNksOBDNz0ZdAAAAIBE
```

-continued

```
          CFTGR$%E87r4tdfcgtrf65
          SP6gLGH7Y5XHEjE9jhFo
        </key>
      </device_credentials>
      <info_type>trans_data</info_type>
      <action>populate:model_data</action>
    </role2>
  </context>
</requestor>
```

In one embodiment, upon retrieving the user's personal financial data, HAP server 204 may thereafter create a model population response containing, in one embodiment, the retrieved financial data. In other embodiments, the financial data may be itself parsed and injected into the web view representation structure that was received by HAP server 204 as part of model population request 215. Note that the retrieved information may be financial information as discussed herein, but in other embodiments the HAP may be configured to protect virtually any type of data with enhanced security. Furthermore, the relevant information may be obtained from virtually any source. However, additional advantages may be realized by obtaining the information from or in connection with a HAP server configured as discussed herein and particularly with respect to FIGS. 5-35 wherein the HAP may manage action and access privilege requests to provide the requisite secure information. An example model population response 216, substantially in the form of an HTTP(S) POST message including XML-formatted data, is provided below:

```
POST /model_population_response.php HTTP/1.1
Host: www.userdevice.com
Content-Type: Application/XML
Content-Length: 667
<?XML version = “1.0” encoding = “UTF-8”?>
<model_population_response>
  <timestamp>2025-12-12 15:22:43</timestamp>
  <message_credentials type=“device_api_key”>
    <auth_key>h767kwjiwnfe456#niimidrtsxbi</auth_key>
  </message_credentials>
  <response>
    <input_web_view_representation>
      <transhist_fromdate val=“20250201” />
      <transhist_todate val=“20250401” />
      <transhist_amount val=“500.00” />
    <input_web_view_representation>
    <input_model>
      <fields>
        <field name=“trans_date” />
        <field name=“trans_amount” />
        <field name=“merchant” />
        <field name=“result” />
        <field name=“payment_account” I>
        <field name=“ereceipt” />
    </input_model>
    <populated_model>
      <populated_model_data id=“1” >
        <trans_date val=“20250201” />
        <trans_amount val=“45.87” />
        <merchant val=“BestBuy” />
        <result val=“approved” />
        <payment_account val=“6554656555325454” />
        <ereceipt>
          <receipt_id>r6545678976</receipt_id>
          <validation_hash>h7ytftrre#@786</validation_hash>
          <content link=“merch.com/receipt/876654678” />
        </ereceipt>
```

-continued

```
        </populated_model_data>
      </populated_model>
    </response>
</model_population_response
```

By allowing the third-party data app developer server 203 to specify which interactions by a user within a web view application should generate a model population is request 215, the third-party data app developer is provided with flexibility to define multiple layers of web view button indication behavior. For example, in one embodiment, the HAP handler attached to a web view button may, after being invoked by the user, request that the user provide additional credentials needed by HAP server 204 to process the model population request. In this embodiment, since the user is only providing the enhanced credentials to smart phone 202, and advantageously through a native application not specified or controlled by the third-party data app developer server, the credentials provided are less likely to be subject to man in the middle attacks, caching by third parties, and/or the like.

In one embodiment, upon receiving the model population response 216, user smart phone 202 may extract the received model data values and determine a next web application view to render, e.g. 217. The determination of the next web view application view to render may be determined based on the model data values received, such as, for example, if a large number of financial records are received the next web view may be a view containing a tabular data structure for presentation of such content. In other embodiments, the next web application view to render may be determined by examining web view application response 208, the HAP handler associated with the web view button 2 ma, and/or the like. In one embodiment, after receiving the populated model, smart phone 202 may generate a web view source code request, e.g. 218, and transmit the request to third-party data app developer server 203. The web view source code request may be a request for the data app server to provide the underlying source code that may be used to generate a web view application view. In some embodiments, the source code may be in the form of a template with indicators for the placement of the secure financial data, and/or the like. An example web-view source code request 218, substantially in the form of an HTIT(S) POST message including XML-formatted data, is provided below:

```
POST /web_view_source_code_request.php HTTP/1.1
Host: www.dataappdeveloperserver.com
Content-Type: Application/XML
Content-Length: 667
<?XML version = "1.0" encoding = "UTF-8"?>
<web_view_source_code_request>
  <timestamp>2025-12-12 15:22:43</timestamp>
  <message_credentials type="device_api_key">
    <auth_key>h767kwjiwnfe456#niimidrtsxbi</auth_key>
  </message_credentials>
  <web_view_source_code>
    <populated_model val="true" />
    <web_view val="display_tabular_financial_trans" />
  </web_view_source_code>
</web_view_source_code_request>
```

In one embodiment, the data app developer server 203 may load the requested web view and again attach HAP handler requests to any buttons or interface elements that should be linked from the web view to a native application handler, e.g. 219. In so doing, the data app developer server 203 and its administrator may, in some embodiments, provide a way such that the user may appear to be interacting directly with their secure financial data yet in reality be interacting in a manner that allows the data app developer to provide the user interface while preventing the data app developer from having access to the underlying personal financial data of the user. This may be true even in instances where the data app developer is a nefarious developer that may desire to insert commands into either the web view source code or a web view application response that seeks to retrieve or intercept the user's personal financial data. As stated above, because of the nature and configuration of the hybrid application disclosed herein, the handling and management of the secure data for a user is managed a level of introspection above that which the data app developer and/or data app developer server 203 is made aware of or, indeed, has access to.

In one embodiment, after loading the web view application view and attaching the appropriate HAP handlers to the button for interface elements required by the web view, the data app developer server 203 may transmit a web view source code response 220 to the user's smart phone 202. An example web view source code response 220, substantially in the form of an HTTP(S) POST message including XML-formatted data, is provided below:

```
POST /web_view_source_code_response.php HTTP/1.1
Host: www.userdevice.com
Content-Type: Application/XML
Content-Length: 667
<?XML version = "1.0" encoding = "UTF-8"?>
<web_view_source_code_response>
  <timestamp>2025-12-12 15:22:43</timestamp>
  <message_credentials type="device_api_key">
    <auth_key>h767kwjiwnfe456#niimidrtsxbi</auth_key>
  </message_credentials>
  <web_view_source>
    <table border="0" >
      <tr>
        <td>Date</td>
        <td>Amount</td>
        <td>Merchant</td>
        <td>Result / Status</td>
        <td>E-Receipt</td>
      </tr>
      <tr>
        <td>[$date]</td>
        <td>[$amount]</td>
        <td>[$merchant]</td>
        <td>[$result]</td>
        <td>[$ereceipt]</td>
      </tr>
    </table>
    <form>Update:
    <input type="button" nativelang_handler="yes" id="1" />
    </form>
  </web_view_source>
</web_view_source_code_response>
```

Upon receipt of the web view source code response 220, the smart phone 202 may utilize the model data values extracted previously, e.g. 217, to create insertion commands to inject the model data values into the web view source code response such is that the web view source code response may be rendered as a web view application response as though the application response had been returned unadulterated from data app developer server 203, e.g. 221. The insertion commands may be, in some embodiments, customized to utilize a language that is parseable as a web view application view. In one example, the parseable web view application view language may be JavaScript. In other embodiments, PHP, C, C++, Java, and/or other interpreted or compiled languages may be utilized depending on the nature of the instantiated web view that is encapsulated by the native application. Further detail with' respect to creating insertion commands from received model data values and the insertion of such commands into received web source code may be found herein and particularly with respect to FIG. 4, e.g. an example DVI Component.

In one embodiment, the populated web view source code may then be rendered as a web view application view by smart phone 202 and native-language HAP handlers may be instantiated to handle further web view requests in the native smart phone application environment, e.g. 222. In one embodiment, user 201 may be presented with a data enhanced distributed view output 223, such as an output containing the user secure financial data.

Figure 3A:
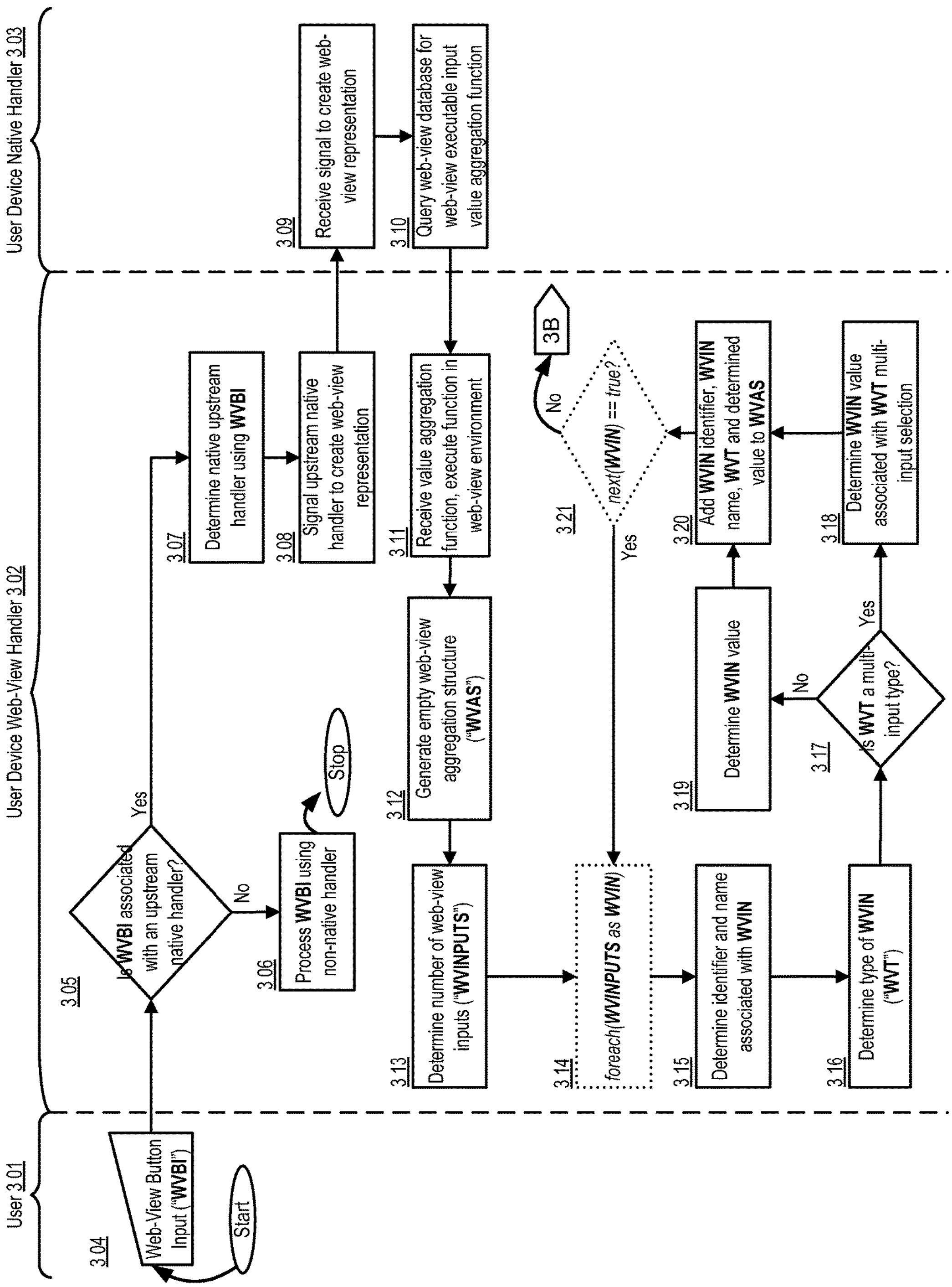
FIGS. 3A-B show an example logic flow illustrating aspects of web-to-native view conversion, e.g., an example WVC Component, in one implementation of the HAP operation.
Figure 3B:
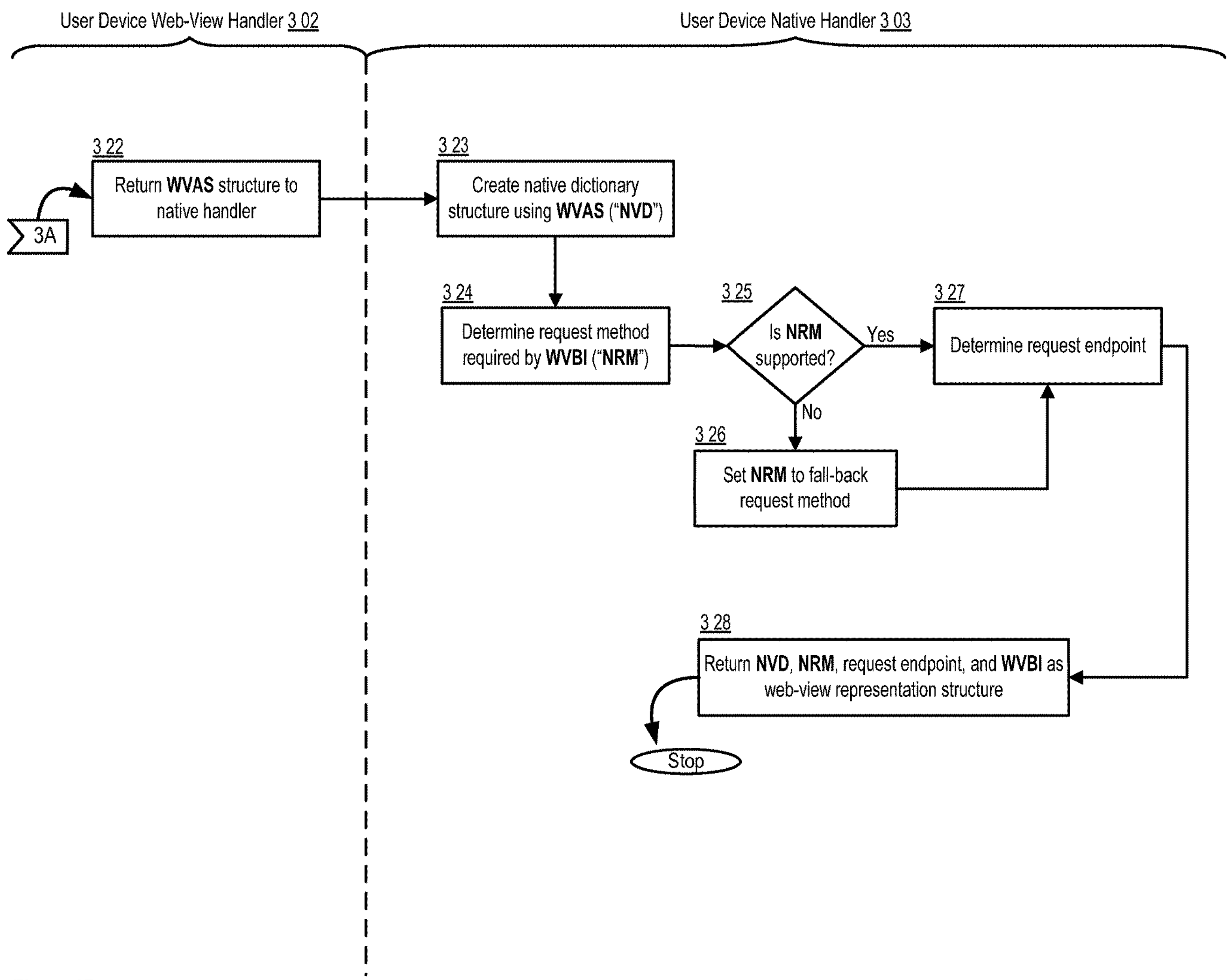

FIGS. 3A-B show an example logic flow illustrating aspects of web-to-native view conversion, e.g., an example WVC Component, in one implementation of the HAP operation. In one embodiment, user 301 may provide a web view button input, e.g. 304, to a user device which is running a web view handler 302. A web view handler may be, for example, a JavaScript engine (such as, for example, Rhino, V8, Futhark, and/or the like), a Java applet engine, a VBScript engine, a compiled language or interpreted language engine, and/or the like. In one embodiment, the user device web view handler 302 may determine if the web view button input is associated with an upstream native language handler, e.g. 305. If the input is not associated with an upstream native handler then the input may be processed using a non-native handler, such as for example the web view handler itself, via a remote and/or third-party server, and/or the like, e.g. 306. In one embodiment, if the web view button input is associated with an upstream native handler, the web view handler may determine the native upstream handler to be used to process the input, e.g. 307. Determining the native upstream handler may include, for example, determining the native handler class, method, parameters, and/or the like such that the web view button input may properly invoke the upstream native handler. In one embodiment, the web view handler 302 may signal the upstream native handler, such as by invoking a native-language method, to create a web view representation, e.g. 308. A web view representation may be, for example, a representation of the current state which may include but is not limited to the current input element values associated with the web view. In one embodiment, upon receiving the signal from the web view handler 302, the user device native handler 303 may receive the signal to create the web view representation, e.g. 309, and may query a web view database for a web view executable input value aggregation function, e.g. 310. A web view executable input value aggregation function may be, for example, a JavaScript function sufficient to read and encapsulate the web view state including, in some embodiments, the values associated with web view input elements such as text boxes, text areas, radio buttons, and/or the like. The web view executable input value aggregation function may then be transmitted or sent to the web view handler 302 which may receive and execute the function within the web view environment, e.g. 311. Thereafter, the web view handler 302 may generate an empty web view aggregation structure, e.g. 312. In one embodiment, the web view handler may determine the number of web view inputs to be aggregated, e.g. 313, such as for example by querying the web view document object model or DOM for a list of all of the inputs associated with the web view and their values. In one embodiment, for each web view input, e.g. 314, the web view handler aggregation function may determine an identifier and a name associated with the web view, e.g. 315. In one embodiment, the web view handler may to determine a type of input associated with the web view input, e.g. 316. Web view input types include, for example, a text input, a radio button, a select, a button, an image, a gesture, and/or the like. If the web view type is a multi-input type, e.g. 317, which may be a type capable of accepting more than one value or which may have a human discernible value and an actual value associated with the input, then the aggregation function may determine the web view input value associated with the web view type of the input selection, e.g. 318. If the web view type is not a multi-input type, e.g. 317, then the aggregation function may determine the web view input value as described herein, e.g. 319. In one embodiment, the web view input identifier, the web view input name, the web view type, and the determined value of the web input may be added to the web view aggregation structure previously generated with respect to 312, e.g. **32*o*. If there are not further web view inputs to process, e.g. 321, then the web view handler 302 may return the web view aggregation structure to the native handler, e.g. 322. In one embodiment, the user device native handler 303 may thereafter create a native language dictionary structure using the web view aggregation structure, e.g. 323. A native dictionary structure may be, for example, an associative array represented in the native-language which is configured to hold or represent the values returned in the web view aggregation structure, an Objective-C NSDictionary structure, and/or the like. In one embodiment, the native handler 303 may determine a request method required by the web view button input, e.g. 324. Example request methods may include a socket connection, an HTTP post, an HTTP get, a Wi-Fi connection signal stream, a Bluetooth connection, and/or the like. If the native handler determines that the required request method is not supported, e.g. 325, then a fallback request method may be utilized as, for example, a default, e.g. 326. In one embodiment, a default method may be one of the methods referred to herein, or it may be, for example, a method that caches or holds the request for later processing when the required request method is supported by the HAP. In one embodiment, the native handler 303 may determine a request endpoint, e.g. 327, which may be for example a URI. Thereafter, a web view representation structure may be formed utilizing the native dictionary structure, the request method, the request endpoint, the web view button input, and/or the like, e.g. 328**.

Figure 4A:
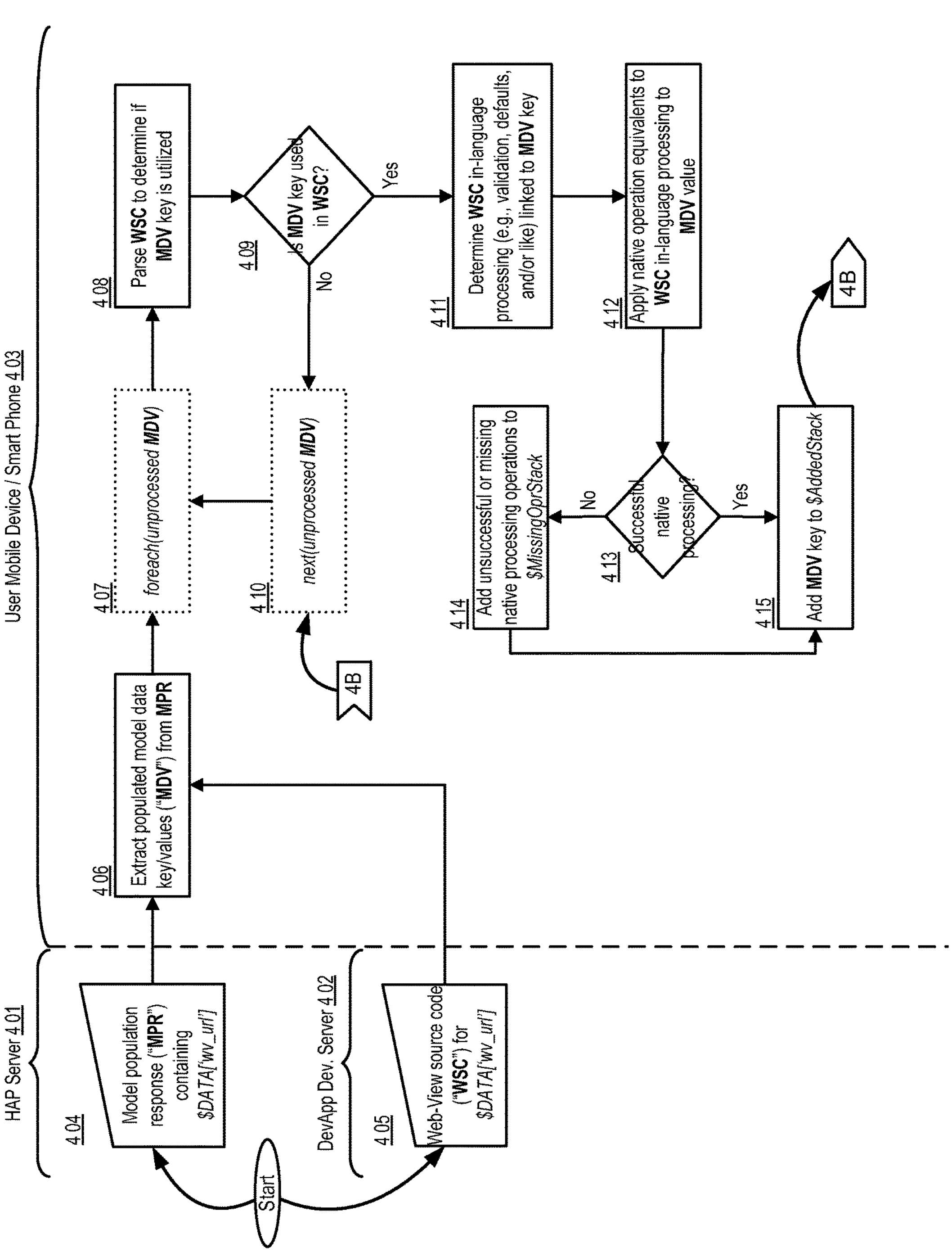
FIGS. 4A-B show an example logic flow illustrating aspects of distributed view value insertion, e.g., an example DVI Component, in one implementation of the HAP operation.
Figure 4B:
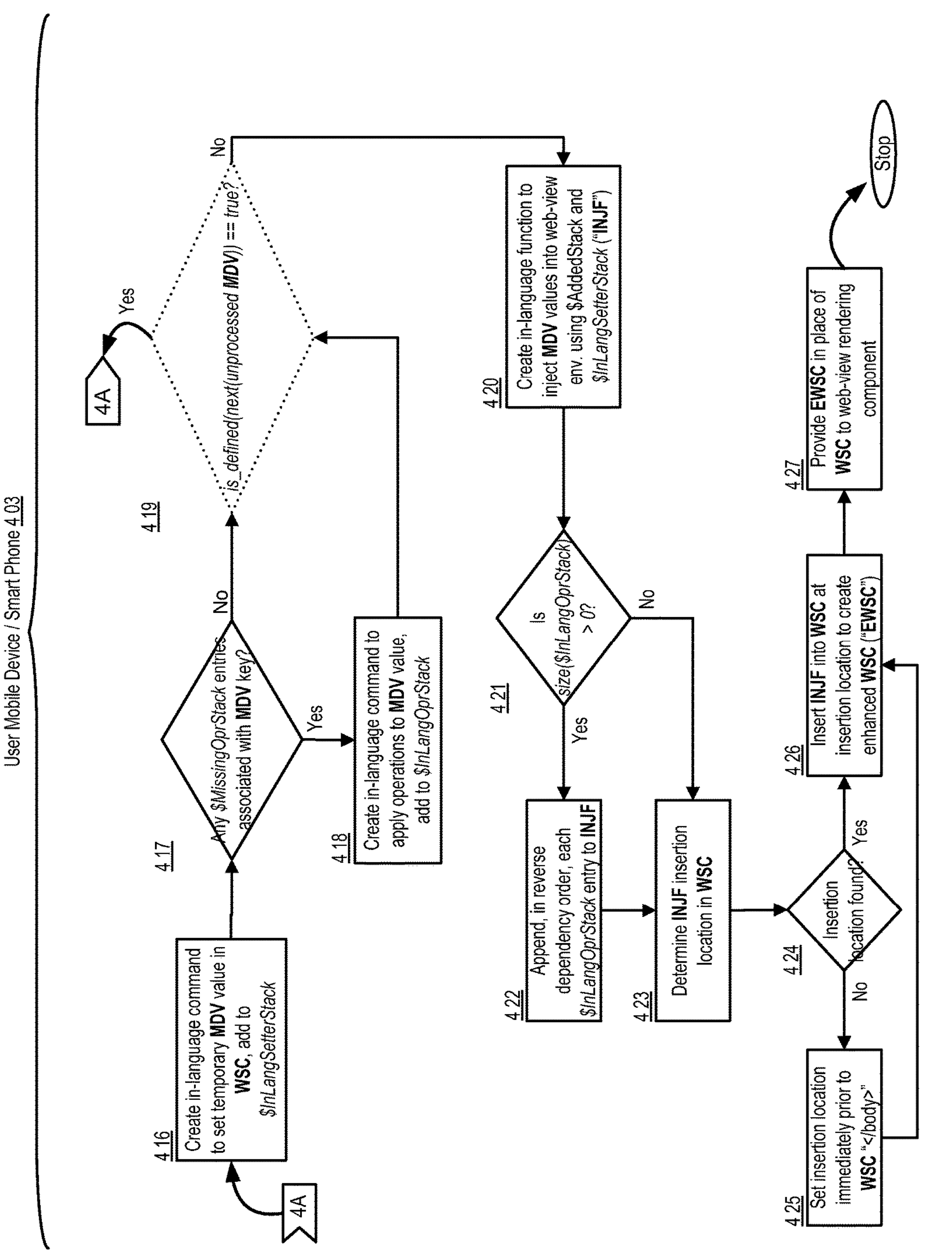

FIGS. 4A-B show an example logic flow illustrating aspects of distributed view value insertion, e.g., an example DVI Component, in one implementation of the HAP operation. In one embodiment, HAP server 401 may transmit a model population response 404 including, in one example, a web view URL, a populated model, and/or the like, to user mobile device and/or smart phone 403. In one embodiment, a third-party app developer server 402 may transmit web view source code associated with the model population response, e.g. 405, to user mobile device 403. In one embodiment, user mobile device 403 may extract the populated model data keys and/or values from the received model population response, e.g. 406. Thereafter, for each unprocessed model data key and/or value, e.g. 407, the user mobile device 403 may parse the received web view source code to determine if the current model data key is utilized in the source code, e.g. 408. If the key is not used, e.g. 409, then processing may continue for each of the remaining unprocessed model data keys and/or values, e.g. 410. In one embodiment, if the model data key is used in the web view source code, e.g. 409, then the user mobile device may determine a web view source code in language processing that is linked to the current model data value key. For example, if the current model data key is associated with a value corresponding to a user's payment card number, then appropriate card number validation or manipulation may be desired (e.g., Luhn function validation, removing spaces, adding markup tags, and/or the like). In one embodiment, the user mobile device may thereafter determine a native language operation that is an equivalent to the in language web view processing desired for the model data value. For example, if the web view validation associated with a transaction amount (e.g., a dollar amount of a transaction) was such that the amount would be rounded in the web view to two decimal places and a dollar sign placed before the amount, then the user mobile device may determine equivalent native language operations to effect similar value processing as would be conducted within the web view. If the value is not successfully processed by the native-language equivalent, e.g. 413, then the unsuccessful or missing native processing operations may be added to a missing operation stack for later processing, e.g., 414. For example, if the web view were to contain validation instructions to convert an ASCII input string to a UTF-8 string, but a no equivalent native-language capability was present, this conversion would be noted as an unsuccessful or missing native processing operation. In one embodiment, the user mobile device may thereafter add the model data key and/or value to a stack representing model keys that have been added to the web view, e.g. 415. In one embodiment, the user mobile device, in a native language environment, may thereafter create a web view in language command to set a temporary variable or value for the model data key/value in the web view source code environment. In so doing, the values is may be, in one embodiment, injected in one form as part of an in language function which is then executed wherein the execution will then copy the value to its ultimate location or destination within the web view. In one embodiment, for any unsuccessful is or missing native preprocessing operations, e.g., 417, a web view in language command is to apply the operations to the model data value may be created, e.g. 418. For example, continuing the example described above, if a native-language ASCII to UTF-8 conversion function was not available to preprocess the web view value for injection, then a web view in language command may thereafter be associated with the value such that, within the web view, prior to or concurrent with injecting the value to its ultimate location the remaining validation and/or manipulations will be performed on the value. The procedure described herein may be repeated until there are no remaining unprocessed model data keys and/or values, e.g. 419. In one embodiment, the user mobile device may create a web view in language function to inject the model data values into the web view environment, e.g. 420. In some embodiments, the web view in language function may itself set temporary variable values associated with the values to be injected and further contain web view in language commands to copy the value from the temporary variable to the ultimate web view destination, such as for example a form element value. Thereafter, if the web view in language command operation stack contains any values, e.g. 421, then the user mobile device may append to the created in language function, in reverse order, each web view in language command to be performed. In so doing, in instances where multiple web view in language commands are required to complete the processing that the native language was not able to complete, the web view language commands will be applied in the appropriate order. In one embodiment, the user mobile device may determine an insertion location in the source code at which to insert the created in language injection function, e.g. 423. If the insertion location is not specified or found, e.g. 424, then the insertion location may, in one embodiment, be set to the location immediately prior to the close body tag, e.g. 425. it Thereafter, the web view in language injection function may be inserted at the determined insertion location thereby creating an enhanced web view source code output, e.g. 426. This enhanced web view source code output may then be provided in place of the un-manipulated web view source code and used to render the desired web view application view, e.g. 427, in a manner that contains more secure data, additional HAP handler elements such as buttons, and/or the like.

FIG. 5A shows a screen shot illustrating example account creation in some embodiments of the HAP. Various embodiments of the HAP may be configured to facilitate the creation of a virtual wallet account. For example, a financial institution may already have information in their records such as payment accounts, billing address, credit history reports and/or the like. By providing this information to the wallet service provider, a wallet account may be established on behalf of the user. In some embodiments, the information provided by the financial institution may be sufficient itself to enable the creation of a virtual wallet account. This would be the case where the information requirements of the virtual wallet provider are such that the financial institution is able to provide sufficient information about the user to enable creation of a wallet account. In other embodiments, the information provided by the financial institution may only partly fulfill the information requirements of the virtual wallet provider, in which case the user may be prompted for additional information before the virtual wallet is created.

Other embodiments of the HAP enable frictionless enrollment of a consumer's payment accounts in a virtual wallet. In some embodiments, customers logged into a financial institution web site, such as an account issuer's web site, may desire to enroll payment accounts already established with that financial institution in their virtual wallet. In one embodiment, a consumer may be logged into the web site of its local bank and be able to access both a credit card and a debit card previously opened with that bank. Advantageously, the issuer bank may already have important information about the user that may facilitate the enrollment of the two payment accounts in a virtual wallet (e.g., billing address, PAN number, mother's maiden name, etc.) and/or the creation of a virtual wallet account. In one example, the consumer may indicate to the issuer that it desires for the issuer to transmit the account information the issuer has on file to a virtual wallet provider in order to pre-fill information in an enrollment form that may be used to enroll one or more payment accounts in a virtual wallet. The issuer may then share or transmit data to the wallet service provider to enable this enrollment. In one embodiment, the user may then provide additional information before the payment account is enrolled in the wallet. In other embodiments, no additional information may be provided by the user and the payment account may be automatically enrolled in the wallet after the issuer's transmission of the data. In still other embodiments, the issuer may be a merchant bank, pre-paid account provider, a non-financial institution, or an individual (i.e., a peer-to-peer enrollment facilitation).

In some embodiments of the HAP, the creation of a virtual wallet account or the enrollment of a payment account in a virtual wallet account may be supplemented by allowing the user to create a pre-paid payment account. In doing so, the user may fund the pre-paid account immediately or open the pre-paid account with no funding. In one embodiment, the consumer desires to add an existing payment account to their virtual wallet while logged into an issuer's web site. The consumer may therefore select an established account for enrollment in the virtual wallet. Additionally, the consumer may then also be prompted to create a pre-paid account in their virtual wallet. In some embodiments, after choosing to create a pre-paid account, the consumer may then choose an account with a financial institution from which to fund their pre-paid account. Advantageously, in this example, the consumer may also desire for the information about the pre-paid funding source account to be shared with the virtual wallet provider to enable the wallet provider to simultaneously create and fund a pre-paid account. In other embodiments, the HAP may allow a wallet service provider to retain information (e.g., account number, routing number, billing address, and/or the like) to enable future funding of the pre-paid account to occur without additional sharing of data from financial institution to wallet service provider. In still other embodiments, the consumer may create a funding threshold rule that would indicate to the wallet service provider to re-fill or top-up the pre-paid account from a designated funding source on the occurrence of a certain event, such as low funds. In doing so, the HAP enables a consumer to create a pre-paid account seamlessly while enrolling other payment accounts in the virtual wallet.

In other embodiments of the HAP, the creation of the pre-paid account may happen independently of a consumer's interaction with a third-party financial institution. For example, in some embodiments the virtual wallet may be accessed through a mobile application. In this embodiment, the wallet application on the user's mobile phone may prompt the user to establish a pre-paid account when it detects that the consumer has just received a large credit to one of their financial accounts. In doing so, the establishment of pre-paid accounts may be encouraged and facilitated by the zo HAP.

In some embodiments of the HAP, the virtual wallet account enrollment facility may be configured to automatically retrieve an image of the payment account being enrolled in the virtual wallet. In doing so, consumers may be presented with an image of the card representation of the payment account being enrolled. In some embodiments, this image may be used by the consumer to verify the authenticity of the payment account being added. In other embodiments, the image may be displayed to facilitate the selection of payment accounts for addition to the virtual wallet.

Various embodiments of the HAP facilitate the creation of persistent and re-assignable links between the consumer's virtual wallet and a merchant or other entity. In some embodiments, the HAP may allow the customer to link their virtual wallet to a merchant using reference aliases that are not permanently linked to a single payment account or method. In doing so, a consumer's accounts may change over time without breaking the persistent reference links that have been created to various merchants. This capability may facilitate a low friction user experience for payment transactions. In some embodiments, the consumer may designate a reference for an account using a merchant's web site. In doing so, the consumer may agree to allow future transactions to occur without requiring future affirmative consent. The consumer may then manage the reference connection through a virtual wallet or web site and update the reference aliases without requiring another visit to the merchant's web site.

Alternative embodiments of the HAP may also allow the consumer to create reference links between other information in their virtual wallet. For example, a consumer may desire to create a reference alias for an address frequently used in commerce transactions. Alternatively, the consumer may wish to create a reference alias to a name or persona that they may use in commerce. In doing so, the HAP may enable the consumer to maintain a degree of privacy while still enabling low friction commerce transactions.

In some embodiments of the HAP, the consumer may agree to or designate certain payment options to be used in recurrent transactions. For example, the consumer may permit flexible recurring commerce, wherein future transactions from a merchant may be billed to the reference alias without further intervention from the user. In other embodiments, the consumer may permit managed subscription commerce wherein the consumer and/or merchant agrees to various terms or conditions that may govern the current and/or future reference transactions with the consumer's virtual wallet account. For example, the consumer may designate a pre-set amount which the merchant may bill through the reference link monthly. For example, a consumer may enroll in a "Jam of the Month" club. In one embodiment, the consumer may choose to create a reference transaction authorization of $40.00 per month for 3 varieties of jam. In another embodiment, the jams may have variable prices (such as a rare Jam for $199.00) and the consumer may authorize full payment or partial payment with the remainder billed later through a reference transaction or alternative mechanism. Alternatively, the consumer may agree to allow the merchant to bill a capped total amount to their virtual wallet reference account before requiring affirmative consent from the consumer for future transactions. For example, the user may authorize a one year "Jam of the Month" subscription for $199.99 which may prompt the user in one year to optionally renew the subscription.

In some embodiments, the HAP may provide payment security features to the merchant. For example, the merchant may be given assurances that at least one payment account may be available for a given period of time using a reference link. Alternatively, the merchant may be alerted when a reference link is updated or revoked by a consumer.

In some embodiments, the HAP can enable the payment account issuer to update various parts of a reference transaction link without the intervention of the consumer. For example, if a consumer's card number is compromised as a result of fraud, the payment account issuer can automatically issue a new account number and update any references using that payment account. Additionally, a payment account issuer may change a consumer's account type (i.e. from 'Gold' to 'Platinum') and associate the updated account type with the reference transaction link. Advantageously, these capabilities may enable higher transaction clearance rates for consumers, merchants and payment account issuers.

In some embodiments, the HAP may provide enhanced security features to the consumer. For example, the consumer may be given additional options for restricting reference transactions if the merchant is a new merchant, located in a foreign country, has a history of fraudulent transactions, or other conditions are present that may be cause for enhanced security. In alternative embodiments, the consumer may receive alerts when a transaction is posted through a reference link. For example, the consumer may be alerted after every transaction, or only if the transaction is suspicious. In some embodiments, the consumer may be given the option to approve or cancel the reference transaction.

In some embodiments, the HAP may provide a control panel through which the consumer may manage the reference account links. For example, the consumer may desire to remove a payment account from their virtual wallet and re-assign any reference connections previously using that payment account to instead use another payment account. In other embodiments, a consumer may desire to simultaneously add a new payment account to their virtual wallet and use the newly added account to replace another account in their virtual wallet. In some embodiments, when a consumer deletes a payment account from their wallet they may be prompted to update any reference transaction links that use that reference payment account. In doing so, the consumer can provided uninterrupted linkage to payment references. In still other embodiments, the consumer may be permitted to view reports regarding their historical usage of a reference alias or any accounts linked thereto. In some embodiments, the consumer can update, edit, or revoke links between reference account ii aliases and various merchants.

Various embodiments of the HAP may enable the consumer to create rules governing the administration and use of reference aliases. As such, the consumer may be able to designate a hierarchy of payment accounts to be used for one reference alias in the event that some payment accounts are not available. In other embodiments, the consumer may be able to designate alternative reference payment methods such as frequent flyer accounts, merchant points accounts, coupons, virtual currencies, government benefits, future paychecks, accounts receivable, loans or lines of credit.

In some embodiments, the HAP may enable a merchant offering a checkout option to display a button on their web page including enhanced information. For example, the button may include text indicating that the transaction may be fulfilled using a reference alias in the consumer's virtual wallet. Alternatively, the button may display a reference address that the consumer has previously designated for use in such transactions. In some embodiments the consumer may interact with the button directly to change, update or view reference transaction information.

Various embodiments of the HAP facilitate a common, low friction user experience for consumers wishing to link a financial account, a merchant account, or any other participating commerce services to a digital wallet. In some embodiments, the HAP provides a standardized common user experience and control panel for allowing customers to view, grant and manage permissions for financial institutions, merchants or participating commerce-related services to interact with their digital wallet. In other embodiments, the HAP eliminates the need for consumers to remember and maintain multiple authentication passwords across many merchant, commerce and payment domains. In yet other embodiments, the HAP maintains an up-to-date payment and other relevant personal data across multiple merchants and commerce-related services. Various HAP embodiments may also solve for a usability friction for both merchants and consumers of having to authenticate twice, once to a merchant and once to wallet provider in order to conduct a wallet ecommerce transaction. Using HAP, consumers may log in once either via the merchant or the wallet and conduct an ecommerce to transaction.

Embodiments of the HAP may also facilitate storage and management of customer identity and other relevant information for merchants and other commerce related services. Some HAP embodiments may provide a faster and low friction new customer enrollment for customers who already have a wallet account. Other HAP embodiments may provide consumers their own centralized cloud-based account having a master copy of commerce-related personal and account information protected by a trusted brand. Some HAP embodiments may provide issuers branding and/or communication opportunities with cardholders even in shopping experiences like card-on-file purchases.

Some embodiments of the HAP may provide consumers facilities for easily and conveniently personalizing new prepaid accounts with their issuer using previously verified personal information stored in an online wallet, and expediting provisioning a prepaid account to a digital wallet. Once a prepaid card is connected with the wallet, the HAP provides the consumer an easy to remember authentication tool to sign on to view and manage their prepaid account either at the wallet destination website/application or through limited federation to the prepaid issuers online (or mobile) prepaid service application.

These and other embodiments of the HAP provide a secure and trusted bidirectional federation with a digital wallet by instituting a permissions system that allows services certain access privileges (e.g., read, write, transact, etc.) to the wallet only when appropriate and subject to both systematic and customer-managed controls.

In one embodiment, the HAP may facilitate acceleration of an account creation with a merchant by drawing customer data such as name, addresses, email, etc., from the wallet. Once connected, the wallet may keep the customer data up to date, e.g., 501*a*, and provide an easy way for the customer to sign in to the merchant account, e.g., 502, 502*a*. For example, as shown in FIG. 5A, a new customer may create an account with a merchant (e.g., Nordstrom) by filling out the form fields 501 (e.g., first name, last name, email, password, zip/postal code, gender, email preference, and/or the like). In one implementation, all of these fields may be replaced with information from the HAP and persistently linked to the customer's wallet profile when the customer opts to create an account via the HAP facilities of the wallet (e.g., Wallet wallet). The data entry 501 for creating an account with the wallet is much less with the HAP.

In some embodiments, the initial connection between an entity and Wallet creates a customer identifier unique to that relationship. Unlike storing card information with a merchant, which, if compromised, could be used at any merchant, the customer identifier can only be used by the designated entity. Any other entity attempting to use another entities identifier to access a customer's wallet account would be denied. In some implementations, the merchant may use this unique identifier to make calls to the wallet to retrieve and/or update commerce-relevant or other customer data. The customer has the option to maintain, in one place, address book, payment methods, and payment preferences. If the customer moves addresses for example, or obtains a new payment card, these changes may be remotely propagated to all the merchants they do ongoing business with. In some implementations, the merchant has a set of callbacks that the merchant can invoke to the wallet in order to offer seamless and uninterrupted service to the customer. Under the appropriate permissions, the merchant may make these calls independently and/or under certain triggers such as the appearance of the customer starting a new shopping session.

FIG. 5B shows a screen shot illustrating example merchant account login in some embodiments of the HAP. The HAP in some embodiments may facilitate expedited merchant sign in, where customers can skip merchant's login and password 503 with the click of the HAP button 504. The one click HAP check-in means customers log in with less friction and do not have to type, remember or forget and have to retrieve merchant passwords. The HAP may return the merchant's customer ID (or contract ID) to the merchant, and facilitate the customer login to the merchant account.

FIG. 5C shows a screen shot illustrating example account preference management in some embodiments of the HAP. The HAP, in some embodiments, may maintain dynamic linkage and branding for issuers, merchants and the wallet whether or not a lightbox (i.e., a payment widget) is used for every purchase flow. For example, in a merchant site 505, under the customer account 510, information relating to order ii status 515, account profile 520, address book 525, payment methods 530, and/or the like may be displayed. The merchant may have their own set of customer information (e.g., order information or size information) that they maintain in their customer database. However, other information such as primary shipping address and payment is methods may be dynamically linked and synced to HAP such that the merchant has access to the customer's preferred shipping address and payment methods. For ii example, address book 525 may display the default shipping address and the payment methods 530 may display a list of payment methods that are stored with the merchant for faster checkout. Using callbacks, the HAP may obtain not only payment methods and addresses, but also loyalty acc preferences, and/or the like.

In one implementation, each callback may include the customer ID that is unique to the customer-merchant relationship. In a further implementation, API calls to the HAP may include one or more API keys such as a public key and/or a shared secret key. An API key may be a string value that identifies the general API access configuration and settings for the site. In some embodiments, callbacks for HAP may include, without limitation, the following:

tive elements that are injected into the merchant's website. An example would be a widget that displays the nickname and associated card-art for payment methods stored on file with a merchant, similar to 530*a*, 530*b* shown in FIG. 5. A JAVASCRIPT call from the merchant may indicate the type, parameters, and customer ID for rendering the widget.

Referring again to FIG. 5C, a customer may also edit payment methods and other information in the wallet via the HAP button 535. Using the edit option, the customer may add, modify, delete, link/delink accounts and addresses, and, at a glance, confirm any new card they added to their wallet account last week is active with the merchant and their bill may process correctly.

FIG. 6 shows a screen shot illustrating an example cross-channel implementation of some embodiments of the HAP. In one implementation, the HAP button may be embedded in various channels including, for example, web sites, mobile devices, tablets, smart phones, web applications, mobile device application, and/or the like, as long as partners using the channels are enrolled in the HAP, and in some implementations, agreed to access control restrictions. Referring to FIG. 6, a HAP button 610 is placed in a tablet channel 605. Invoking the HAP button may trigger a wallet widget to either authenticate the customer or authenticate and connect the service, merchant, or application to the customer's wallet account. In some embodiments, the HAP button may be implemented in other channels and physical ii world scenarios such as point of sale interactions. For example, using a physical card swipe or chin/pin interaction may trigger a wallet account connection or login. As another example, using a quick response (QR) code scan, a near-field communication (NFC) tap or other mobile trigger in lieu of

TABLE 1

| Example Callbacks |
|---|
| Get Payment methods (returns card nicknames, brand and last 4 digits) |
| Get addresses (returns full addresses that customer has shared with merchant, address nickname, and indicator for default/primary address) |
| Get Loyalty accounts (returns active loyalty programs that customer has shared with merchant, program names and indicator for current default/primary loyalty program) |
| Make Payment authorizations (request to instantiate a purchase against the customer ID) |
| Get/Add Entitlements (retrieve and redeem previous purchase records for the customer, e.g. tickets, passes, pre-paid purchases, subscription codes, or other product codes defined by the merchant) |
| Get Payment preferences (e.g. receipting preferences and preferred shipping carriers) |

Various methods of callbacks may be utilized. In some embodiments of the HAP, API and inline widget methods, among others, may be implemented. Using the API method, the merchant server may make API calls to the V-Connect server to retrieve customer data. For example, a customer may log in to a merchant account to view their account preferences with the merchant. The merchant server may execute an API call to get payment methods from the HAP server. The merchant may then display the currently active payment method is a wallet (e.g., Wallet wallet) with account nickname and ending in digits xxxx. For example, referring to FIG. 5, the merchant may obtain payment methods 530*a* and 530*b* from HAP and display them using their nicknames such as "My Business Credit Card PaymentCard Ending . . . . 1234" (e.g., 530*a*) and "My Personal Debit Card PaymentCard Ending . . . . 1234" (e.g., 530*b*). In this way, via API calls, the merchant may display rich, up to date account information including card art.

Using the inline widget method, the merchant may display a wallet rendered "window" into a user's wallet account. Inline widgets may display rendered or is interaca HAP button may also trigger a wallet connection or login. As yet another example, using a voice password, repeatable gestures or action, biometrics, and/or the like may trigger a wallet connection or login.

FIGS. 7*a-b* show user interfaces illustrating example sign-in and account management in some embodiments of the HAP. Referring to FIG. 7*a*, in one implementation, a customer may launch a merchant site 705 and select the create account option 705*a*. Selection of the create account option may direct the customer to a merchant account creation page 710 in the merchant site 705. The customer may register for a merchant account by filling out the form 710*a*. Alternately, the customer may register a merchant account with the wallet account using the connect with wallet button 710*b*. When the connect with wallet button is selected, a wallet widget 715 may be launched within the merchant site 705. The customer may enter their wallet username and password (or other credentials) to gain access to the wallet widget configuration page 715*a* shown in FIG. 7*b*. Referring to FIG. 7*a*, in some implementations, the customer may already have a merchant account. The customer may enter their merchant site account credentials 720 and login to the merchant site page 725. The customer may, at this point, connect to the wallet by selecting the connect with wallet now button 725*a* which may launch the wallet widget 715.

Referring to FIG. 7*b*, the customer may configure merchant linkage to the wallet starting with option 715*a* for example. In one implementation, the customer may select preferences 720 for the merchant account in a more granular manner. For example, the customer may specify, for example, payment methods and shipping addresses to link to the merchant. Other preference management is discussed in further detail with respect to FIG. 12. Upon completing the preferences set up, the customer may select the connect button 720*a* to create the link between the merchant and the wallet. The wallet widget may then direct the customer to the merchant site 725. The wallet may also share or load or dynamically inject to the merchant site information according to the customer preferences. The merchant site 725 may obtain the shared ii information and display the shared payment methods, address, and other information 725*a* to the customer to confirm the connection between the merchant account and the wallet.

FIGS. 8*a-b* show user interfaces illustrating example sign-in and checkout in some embodiments of the HAP. Referring to FIG. 8*a*, in one is implementation, a customer may launch a merchant site 805 (or merchant application). Using the merchant sign in 805 option, the customer may be directed to a sign in page 810 in the merchant site 805, where the customer may login to the merchant site using username and password 8*ioa* for the merchant site. Alternately, the customer may login with the wallet using the login with wallet button 810*b*. When the login with wallet button is selected, a wallet widget 815 may be launched within the merchant site 805. The customer may provide wallet username and password 815*a* to login to the merchant site via the wallet. Referring to FIG. 8*b*, once the customer is authenticated via the wallet, the wallet may send the merchant the customer ID corresponding to the relationship between the customer and the merchant. The merchant, upon receiving the customer ID, and verifying that the customer ID corresponds to a customer record in their customer database, may allow the customer access to their merchant account 820. In one implementation, the customer sign in may be a trigger for the merchant to make an API/JAVASCRIPT call 855 to the wallet service 850 to obtain shipping details 825*b*, payment method 825*c*, and/or the like. The merchant site page 825 may use the shipping detail obtained from the wallet to calculate and display shipping and tax information. In one implementation, the payment method 825*c* obtained from the wallet may be a payment method nickname (e.g., my personal account). The merchant may not have the actual card or account number. The actual card or account number is resolved by the wallet once the customer selects the pay now with wallet button 835. In s one implementation, the customer may also edit shipping address, payment method and other details directly from the merchant site using the edit with wallet button 830. Upon successful transaction authorization, the merchant site 805 may display the page 840, including information such as receipt 840*a* relating to the transaction.

FIGS. 9*a-b* show data flow diagrams illustrating example bi-directional federation in some embodiments of the HAP. Referring to FIG. 9*a*, in one implementation, a user 902 may input login credentials (e.g., merchant account or wallet account username and password) at the merchant site or application on their client device 904 at 912. The client device may take the login credentials and generate an authentication request 914 for transmission to a merchant server 906. For example, the client may provide a (Secure) Hypertext Transfer Protocol ("HTTP(S)") POST message including data formatted according to the extensible Markup Language ("XML"). An example authentication request 914, substantially in the form of a HTTP(S) POST message including XML-formatted data, is provided below:

```
POST /authrequest.php HTTP/1.1
Host: www.merchant.com
Content-Type: Application/XML
Content-Length: 667
<?XML version = "1.0" encoding = "UTF-8"?>
<auth_request>
    <timestamp>2013-02-22 15:22:43</timestamp>
    <user details>
        <user_name>JDoe@gmail.com</user_name>
        <password>Tomcat123</password>
    </user details>
    <client_details>
        <clientIP>192.168.23.233</client IP>
        <client_type>smartphone</client_type>
        <client model>HTC Hero</client model>
        <OS>Android 2.2</OS>
        <app_installed_flag>true</app_installed_flag>
    </client detail>
</auth_request>
```

The merchant server 906 may receive the authentication request 914, and may parse the request to obtain user and/or client details such as username and password. The merchant server may perform authentication of the user and/or client details at 916. In one implementation, the merchant server may query its user/customer database to verify that the username and the password (or other credentials) are correct, and the user is authorized to access the account with the merchant (i.e., merchant account).

In another implementation, the user credentials may be authenticated by the wallet server 908. The user may select sign in with wallet button and may input wallet credentials in the wallet widget launched. The client 904 may generate an authentication request 918 using the user provided login credentials. An example wallet authentication request 918, substantially in the form of a HTTP(S) POST message including XML-formatted data, is provided below:

```
POST /authrequest.php HTTP/1.1
Host: www.wallet.com
Content-Type: Application/XML
Content-Length: 667
<?XML version = "1.0" encoding = "UTF-8"?>
<auth_request>
    <timestamp>2013-02-22 15:22:43</timestamp>
    <user_details>
        <user_name>JDoe1984</user_name>
        <password>thistryion56</password>
    </user_details>
    <widget_param>
        <apikey>aK2Lejj89j2A1_10n4s2</apikey>
    </widget_param>
    <client_details>
        <client_IP>192.168.23.233</client_IP>
        <client_type>smartphone</client_type>
        <client_model>HTC Hero</client_model>
        <OS>Android 2.2</OS>
        <app_installed_flag>true</app_installed_flag>
    </client_detail>
</auth_request>
```

At 920, the wallet server may authenticate the user. In one implementation, OAuth protocol may be utilized to authenticate the user on behalf of the merchant. In one implementation, the wallet server may use the username and/or password, one or more widget parameters such as API key in the authorization request 918*b*, and/or the like to obtain a customer ID associated with the user/customer and the merchant. The wallet server may send the customer ID in an authorization response 924 to the merchant. In one implementation, the authorization response 924 may be a back-end notification message sent from the wallet server to the merchant. An example notification message in POST method in XML format is provided below: <?XML version

```
= “1.0” encoding = “UTF-8”?>
  <notification-auth>
    <timestamp>2013-02-22 15:22:43</timestamp>
    <customer_ID>56470898786687</customer_ID>
    <apikey>aK2Lejj89j2A1_10n4s2</apikey>
  </notification-auth>
```

The merchant server may receive the customer ID in the authorization response message 924, and query their database to confirm that the customer ID matches a customer record in their customer database. Upon verification or successful authentication at 916, the merchant server may send an authentication response 922 to the client 904. The authentication response, in one implementation, may be the requested web page that is rendered by the client 904 and displayed to the user at 938.

In one implementation, the merchant server may use the user sign as a trigger to request current user information from the wallet server. The merchant server may generate and send a user information request message 926 to the wallet server. The user information request message 926 may include, without limitation, the customer ID that is unique to the customer and the merchant relationship, a token, an API key, a digital certificate, and/or the like. In one implementation, the token may be generated using one or more parameters such as the merchant's API key, customer ID, merchant ID, merchant name, customer name, and/or the like. In a further implementation, the token may be encrypted. In one implementation, the token may be a string that is created by the MD5 Message Digest algorithm hash of one or more of the parameters listed above. In one implementation, the merchant server may utilize callbacks via APIs, inline widgets, etc., to pull user information from the wallet. For example, the merchant server may call the getPayment API to obtain payment method details such as card nicknames, brand, last 4 digits, etc. An exemplary GET request method for making the call is provided below.

```
http://server1.vwallet.com/wallet/api/getPayment?callid=
100008&callno=1&apikey=aK2Lejj89j2A1_10n4s2&token=
u:o6a5941420cf67578986abe8e09a8299&customerid=
56470898786687
```

The wallet server may obtain the request 926 and may parse the request at 928. In one implementation, the wallet server may validate the request by confirming the customer ID, API key and/or the token are correct. At 930, the wallet server may use the customer ID, for example, to query one or more databases (e.g., customer profile database 910) for user records. The wallet server may retrieve the user record, preferences, and/or permissions 932 from the customer profile database. In one implementation, the wallet server may use the associated preferences and permissions specified by the user to determine payment methods that the user has approved for sharing with the merchant. The wallet server may then generate the user information response message 934 for transmission to the merchant. An example response message 934 substantially in the form of a HTTP(S) POST message including XML-formatted data, is provided below:

```
<?XML version = “1.0” encoding = “UTF-8”?>
<payment_methods>
    <timestamp>2013-02-22 15:22:43</timestamp>
    <customer_ID>56470898786687</customer_ID>
    <call_ID>3</call_ID>
    <card1_details>
      <nickname>My personal card</nickname>
      <brand>Visa</brand>
      <digits>4554</digits>
    </card1_details>
    <card2_details>
      <nickname>My cashback card</nickname>
      <brand>Visa</brand>
      <digits>4557</digits>
    </card2_details>
    <card3_details>
      <nickname>My prepaid card</nickname>
      <brand>Amex</brand>
      <digits>5555</digits>
    </card3_details>
  </payment_methods>
```

The merchant server may receive the response message 934, and may send the shared user information message 936 to the client, which renders the received message to display the current user information to the user at 928. Although only getPayment API call is discussed in detail, other API calls such as those listed in Table 1 may also be called by the merchant server to obtain information including address nick name, indicator for default/primary address, active loyalty programs, program names, indicator for current/primary loyalty program, request to instantiate a purchase against the customer ID, retrieve and redeem previous purchase records for the customer, and/or the like. In an alternate implementation, instead of the merchant making the API calls to obtain the user information, the wallet server may push user information to the merchant. In some implementations, the information push may be a one-time event, for example, when the user connects a new service (e.g., a merchant) to a wallet. In other implementations, the information push may be triggered by events such as the user signing in to a service account via the wallet.

Referring to FIG. 9*b*, in one implementation, the user may input new information to their merchant account. For example, the user may add a new shipping address to their merchant account. The client may take the user input and package it as an add new information request 952 to the merchant server. An example add new information request 952, substantially in the form of a HTTP(S) POST message including XML-formatted data, is provided below:

```
POST /addnewinfo.php HTTP/1.1
Host: www.merchant.com
Content-Type: Application/XML
Content-Length: 667
<?XML version = “1.0” encoding = “UTF-8”?>
<auth_request>
    <timestamp>2013-02-22 15:22:43</timestamp>
    <user details>
      <user_name>JDoe@gmail.com</user_name>
      <password>Tomcat123</password>
    </user_details>
    <new_info>
```

-continued

```
            <shipping_address>
               <street_name>400 Turtle bay road</street_name>
               <apt_unit>6H</apt_unit>
               <city>New York</city>
               <zip_code>10086</zip_code>
            </shipping_address>
         </new_info>
         <client_details>
            <client_IP>192.168.23.233</client_IP>
            <client_type>smartphone</client_type>
            <client_model>HTC Hero</client_model>
            <OS>Android 2.2</OS>
            <app_installed_flag>true</app_installed_flag>
         </client_detail>
      </auth_request>
```

In one implementation, after receiving the new information request 952, the merchant server may parse the message, and retrieve the user record from the one or more databases and/or tables (e.g., customer profile database 909). The merchant server may then update the user record and store the updated user record 954 to the customer profile database 909. An exemplary listing, written substantially in the form of PHP/SQL commands, to update the user record 954 in the customer profile database, is provided below:

```
<?PHP
header('Content-Type: text/plain');
// store input data in a database
mysgl_connect("201.408.185.132",$DBserver,$password);
// access database server
mysgl_select("Customer_Profile_DB.SQL"); // select database to append
mysql_query("UPDATE UserTable
SET street_name = '400 Turtle bay road', apt_unit = '6H', city =
'New York',
zip_code ='10086' timestamp = '2013-02-22 15:22:43'
WHERE username = 'JDoe@gmail.com'");
mysql_close("CSF_DB.SQL"); // close connection to database
?>
```

In one implementation, the merchant may send the new user information message 956 to the wallet server. An example new user information message 956, substantially in the form of a HTTP(S) POST message including XML-formatted data, is provided below:

```
      POST /addnewinfo.php HTTP/1.1
      Host: www.vwallet.com
      Content-Type: Application/XML
      Content-Length: 667
   <?XML version = "1.0" encoding = "UTF-8"?>
      <add newinfo>
         <timestamp>2013-02-22 15:22:43</timestamp>
         <apikey>aK2Lejj89j2A1_10n4s2</apikey>
         <token>u:c6a5941420cf67578986abe8e09a8299</token>
         <customer_ID>56470898786687</customer_ID>
         <new_info>
            <shipping_address>
               <street_name>400 Turtle bay road</street_name>
               <apt_unit>6H</apt_unit>
               <city>New York</city>
               <zip_code>10086</zip_code>
            </shipping_address>
         </new_info>
      </add_newinfo>
```

The wallet server may receive the new user information message 956 from the merchant, along with customer ID. The wallet server may parse the received information at 958. Using the customer ID extracted from the received information, the wallet server may query one or more customer profile databases at 960. At 962, the server may obtain query results. In one implementation, the query may be performed to determine whether the field of new user information is a field that is permitted for updating using information from the merchant source. For example, in one implementation, shipping information may not be a field that is permitted for updating based on information from the connected service such as the merchant while other information such as a new telephone number received from the merchant may be used to update the customer record in the database (e.g., 910). Such permissions for adding, removing, changing, updating, etc., information to and from the wallet may be specified by the user via the permission control panel discussed in detail with respect to FIG. 12. In some other implementations, whether information flowing from the merchant to the wallet server can be accepted by the wallet server, and used to update the customer records, may depend on the merchant trust level, how critical the update or change is (e.g., changing a payment method versus changing a telephone number), and/or the like. At 966, depending on whether it is appropriate to update the customer record, the wallet server may or may not update the record. At 970, the wallet server may send a confirmation message to the merchant server to confirm whether the new information was accepted, and the current information that is on the records in the wallet. At 972, the merchant server may send the client a confirmation message whether the update was successful or not. The client may display the confirmation message at 974. In one implementation, the wallet server may directly communicate with the user (e.g., via email, SMS, MMS, phone, etc.,) at 968 and solicit and/or provide confirmation of the addition of the new information.

FIG. 10 shows a logic flow diagram illustrating an example account creation and management in some embodiments of the HAP. In one implementation, at 1005, if a customer has an existing merchant account, the customer may login using is merchant account credentials 1010. Alternately, the customer may login using their wallet account credentials 1015. If the customer selects login via the wallet, a wallet widget may be provided at 1020 for the customer to enter their wallet credentials. At 1025, if the customer does not wish to connect their wallet to their merchant account, the merchant may use the customer's information on file or solicit information from the customer to complete a transaction at 1030. On the other hand, if the customer requests connection between the merchant account and the wallet account, and the customer is already authenticated by the wallet at 1035, the customer may set preferences and permissions at 1045. If the customer has not been authenticated, a wallet widget may be launched to obtain wallet credentials from the user for authentication at 1040. At 1050, the wallet may create a customer ID as a record of the relationship between the customer and the merchant, and the associated preferences and permissions. The customer ID may be sent to the merchant. Using the customer ID and/or API keys or tokens, the merchant may request customer information such as shipping address, payment method, and/or the like at 1055. The wallet may provide the merchant the information that is permitted for sharing by the customer preferences and permissions. At 1060, the merchant may use the information from the wallet to conduct a transaction. In one implementation, the transaction may be via the wallet. In another implementation, the transaction may be via a lightbox widget rendered within the merchant site.

In one implementation, if there is no existing merchant account as determined at 1005, the customer may create a new merchant account. In one implementation, the customer may create a new merchant account via the merchant 1065 where the user may fill out a form with fields for name, address, email, username, password, and/or the like at 1075. At 1080, the merchant may use the customer provided information to create a new account for the customer and the decision may move to 1025. If, on the other hand, the customer selects an option to create a new merchant account via the wallet 1070, the HAP may determine whether the customer has an existing wallet account at 1085. If the customer does not have a wallet account, the HAP may request the user to create a wallet account at 1090. Once there is an existing wallet account, the HAP may obtain customer wallet credentials, and may authenticate the user at 1092. At 1094, the HAP may obtain preferences and/or permissions for the merchant account. At 1096, the HAP may create a customer ID that establishes the relationship between the merchant and the customer. In one implementation, the HAP may store the preferences and/or permissions along with the customer ID in its customer database. At 1098, the HAP may provide user information allowed by the preferences and permissions to the merchant along with the customer ID. At 1062, the merchant may receive the provided information and may create a merchant account for the customer. At 1060, the merchant may use the wallet provided information to transact with the customer.

In some embodiments, the HAP framework may be leveraged for prepaid card provisioning and personalization. An online wallet service such as Wallet by Payment may store consumer information for a number of purposed including for expediting online shopping and checkout. Cardholder information (such as name, account number, contact information, billing and shipping addresses etc.) flows originally from an issuer through a provisioning process to the wallet and then by instruction of the consumer to a merchant at the time of checkout. Some embodiments of the HAP entail reversing the flow of information, such that an online wallet may provision account information with an issuer and at the same time link the account records at the wallet with the account records of the prepaid issuer.

FIG. 11 shows a block diagram illustrating an example prepaid card personalization in some embodiments of the HAP. In one implementation, a consumer having a wallet account may obtain a new gift card (open loop or closed loop) or a reloadable prepaid card 1130. The consumer may personalize the card for online or offline usage and be able to view and service the account with the issuer. In one implementation, through the issuer's online or mobile service channel 1105, the consumer may click a HAP button 1110. In a further implementation, the HAP button may spawn a modal widget 1115 powered by the wallet. The consumer may authenticate to the wallet and may confirm their wish to personalize the new card and share the personalization information with the issuer. In one implementation, the personalization information may include information from the consumer profile in the wallet's central consumer profile database 1125 such as name, contact information, billing address, shipping address, card nickname, and/or the like. The wallet, upon receiving confirmation from the consumer, may share the consumer's personalization information with the issuer's prepaid platform service 1105. The prepaid card may then be loaded and stored in the consumer's wallet profile. In one implementation, once the prepaid card is linked to the wallet, the consumer may log in to the issuer's prepaid service using their wallet credentials (saving them having to remember additional usernames and passwords for every prepaid account). In a further implementation, the HAP provides an option for prepaid platforms to integrate all prepaid card management and services directly into wallet platform. In some implementations, APIs for the wallet platform may be available to query current available balances and transaction history from issuer cards linked to the wallet service.

FIG. 12 shows a user interface illustrating an example HAP settings control panel in some embodiments of the HAP. The HAP control panel may provide common customer experiences across different parties that are connected via the HAP facilities to the wallet. Using the HAP control panel, the customer may manage permissions and preferences for all parties connected to the wallet and establish a set of flexible standards to define which parties can read, write, update/modify or publish what customer profile information, which parties can execute transaction against the wallet account, or inject plug-ins and widgets to the wallet, and/or the like. Customers, including those who are concerned about how much data they should trust with various parties they do business with or use their services, may leverage the framework of the HAP control panel to manage their identities and payments at various service providers such as merchants, utility providers, loyalty providers, money transfer services, and any other service providers ("merchants"). The components of the permissions/settings control panel may enforce terms of connection relations. For example all API calls by the service may be validated against the permissions and business rules expressly agreed to by the customer.

In one implementation, the HAP control panel may include several panels such as service providers 1205, payment methods 1210, shipping address 1215, share 1220, permissions 1225, and/or the like. The service providers may include, without limitation, any party that a customer may do business with. The customer may have an identity, payment relationship, etc., established with such parties. The customer may select any one, multiple or all of the service providers 1205*a-j* for individual or group preference and permission management. In one implementation, the customer may select the merchant NORDSTROM 1205*c*. The customer may then configure each of the payment methods, shipping addresses, share, and permissions for the selected merchant 1205*c*. The payment methods panel 1210 may list one or more payment methods 1210*a-d* that are present in the wallet. The panel 1210 may display an image of the card (e.g., from the issuer), a nickname for the card, card identifier, card brand, and/or the like. The payment methods may also include bank or other financial accounts, debit cards, credit cards, prepaid cards, gift cards, and/or the like. In some implementations, the customer may also add new card to the wallet directly from the control panel interface. The customer may select one or more of these payment methods for sharing with the merchant 1205*c*. When the wallet provides the shared payment method to the selected service provider, only select information such as the nickname, brand, and last four digits of the card number, etc., may be shared. In some implementations, the actual card or account number may not be shared with the service provider.

The customer, using the permissions panel 1225, may authorize the service provider to execute transactions (option 1225*a*) against the wallet using the selected payment methods. In some implementations, the customer may also set up, using the permissions panel 1225, recurring billing authorization 1225*c*, subscription payments 1225*d*, and/or the like. For example, at the end of a month, a merchant (e.g., AT&T) may request authorization from the wallet to bill a monthly charge amount (e.g., $120.55) against the standing instructions for a "default" payment method by a customer having a customer ID. The wallet may be storing the standing payment instructions for "default" payment method in slot 1 of the wallet and a back up payment method in slot 2 of the wallet. The wallet may map slot 1 to an actual payment method and authorize billing using the actual payment method, without the merchant knowing the actual payment 16 method. In one implementation, depending on the merchant request, a tiered authentication may be employed to more rigorously authenticate the merchant/customer. For example, a merchant that usually transacts against the primary card and primary shipping address may request to execute a transaction against another is shipping address (e.g., grandma's address). Such a request may then cause the wallet to step up the authentication protocol (e.g., get customer confirmation, request digital certification, etc.) to ensure that the transaction being executed is not a fraudulent transaction.

In one embodiment, the HAP may leverage its facilities to determine liability for transactions that happen based on trust relationships. For example, depending upon whether the merchant tries to bill the customer with or without popping up an extra widget to log on could affect the liability for the transaction. Using TSM (trusted service manager) protocols where a secure key from an issuer is passed to put on a phone or other client device, so that the wallet knows a secure key from the issuer was present during the transaction, may also prevent fraud and affect the liability for the transaction. Similar trust relationship could also be used for liabilities relating to change requests, for card not present transactions, and/or the like.

In some implementations, the customer may set up shipping address preferences for the service provider. The shipping address panel 1215 may display a list of shipping addresses 1215*a*-1215*c* stored in the customer profile with the wallet. Each of the shipping addresses may be nick named. The customer may select one or more of the shipping addresses for sharing with the merchant, and may add another address 1215*d* to the wallet directly from the shipping address panel 1215. In some implementations, the customer may allow shipping address to be a field which the service provider may have write access to by configuring the allow write access option 1215*e*. Such authorization for write access to the shipping address field of the customer profile record in the wallet's customer database may allow any changes the customer may make to the shipping information from the service provider interface to propagate to the wallet. Such a bi-directional flow of information may ensure true syncing of user information across various service providers and the wallet. In some implementations, the customer may configure, using the permissions panel 1225, that any profile changes may be confirmed with the customer (option 1225*b*). The wallet, in such a case, may send the customer a request to review and/or confirm the profile change, and may update its customer profile upon explicit approval from the customer.

In some implementations, the control panel's share panel 1220 may display a list of information fields that may be shared by the customer with the service provider. Examples of the fields of information include, without limitation, name 1220*a*, primary email address 1220*b*, work email address 1220*c*, information for account creation 1220*d*, loyalty programs 1220*e*, specific loyalty programs 1220*f*, wish lists 1220*g*, points balance 1220*h*, and/or the like. In one implementation, one or more of these fields may be configured for write access 1220*i*. Using the permissions panel 1225, the customer may further configure whether the service provider is allowed to execute transactions against the wallet 1225*a*, authorized to bill the customer 1225*c*, authorized the wallet to make/bill for subscription payments 1225*d*, require confirmation before modifying the customer profile 1225*b*, and/or the like. Various other permissions and panels for configuring and managing customer information federation are within the scope of the embodiments of the HAP.

FIG. 12*a* is an example embodiment of a HAP configured to display a success confirmation 1226 screen after the enrollment of new payment cards 1228,1229 in a virtual wallet account. In some embodiments, the wallet account may already been established and contain cards previously added 1227.

FIGS. 13*a-i* show example user interfaces in some embodiments of the HAP.

FIG. 14 shows an exemplary screenshot depicting a merchant a checkout system. In one embodiment, the HAP may facilitate the administration of payments to merchants that contain a current transaction 1401 and a future transaction 1402. In some embodiments, the merchant may place a button 1403 on their web page that may facilitate the creation of a reference account link. The button may, in some embodiments, contain information from the available reference transaction links previously created by the consumer. For example, the button may designate which reference account may be used for the transaction. In another example, the button may designate a reference for a shipping address to be used for the transaction or a persona that the user may wish to engage in the transaction using. Other embodiments may contain any manner of consumer information that may be subject to change over time.

FIG. 14*a* shows an exemplary screenshot depicting an inline login for accessing a consumer's HAP account 1404. In some embodiments, a user may log in using their email address and a password 1406. In other embodiments, the user may optionally choose to create a virtual wallet account 1405 to facilitate future transactions with the current or other merchants.

FIG. 14*b* shows an exemplary screenshot depicting a merchant account creation screen facilitated by the HAP. In this and other embodiments, the consumer may choose to create an account 1410 with the merchant and provide contact/shipping information 1407 and/or payment information 1408 to complete the transaction. Optionally, the consumer may choose to simultaneously create a virtual wallet account 1409 to facilitate future transactions with either the current merchant or other merchants.

FIG. 15 shows an example enrollment lightbox for creating a HAP link between a user's virtual wallet and a merchant. In some embodiments, the enrollment form may contain details about the transactions authorized 1502. The transactions may be one-time transactions, periodic transactions, recurring transactions, or any combination thereof. Additional terms may be included or associated with the reference transaction link. For example, some reference transaction links may have expiration dates, frequency caps, amount caps, alert requirements, heightened security requirements, or other desired limitations. In some embodiments, the user may be prompted to agree to the requirements for the current or future transactions. A consumer may designate a payment account reference 1503 to use for the transactions. In some embodiments, the consumer may choose more than one payment reference account for the transactions. In alternative embodiments, the consumer may choose one payment account reference for the current transaction and a different payment account reference for future transactions. The consumer may also designate other information by reference either alone or in combination with reference payment transactions. For example, the consumer may designate a reference persona 1504 for the transaction. In some embodiments, the reference persona may contain contact information for the consumer. In other embodiments, the reference persona may is contain contact information for another party. In still other embodiments, the reference persona may contain privacy enhanced information that limits the merchant's knowledge of some of the consumer's personal information or details. In some embodiments, the consumer may designate a reference address 1505 for use in the transaction. The reference address may be a user's preferred shipping address for a transaction. In other embodiments, the reference address may contain multiple addresses for use in various parts of the transactional relationship with the merchant. In still other embodiments, the reference address may be a designation that resolves to a third party that may then forward shipments to the consumer. In this embodiment, the consumer may advantageously be able to receive shipments using a reference address from a merchant without disclosing their actual address information to the merchant. Third parties may act as intermediaries for different types of reference links in various embodiments. In some embodiments, the consumer may click a button in the lightbox 1506 to link the selected references to the merchant. In other embodiments, the consumer may click a button 1507 to create a new reference. In doing so, the consumer may be prompted for information required to establish the reference link, such as adding a card to the consumer's wallet, adding an address for the reference link, or adding a persona to a virtual wallet. In some embodiments, the consumer may be presented with a QR code 1508, bar code, or other visual element suitable for scanning by a mobile device. In doing so, the user may be able to establish the reference link with heightened security, less user input, or by sharing less information directly with the merchant. In some embodiments, the reference transaction link may be established to facilitate future refunds to the consumer. For example, a user may enroll a reference transaction link with an insurance provider to facilitate future claim refunds to the user's virtual wallet. In other embodiments, the refund reference link may be used by a merchant that has previously charged the user for a transaction. In alternative embodiments, the refund reference link is only used to facilitate refunds and may not be used for payments.

FIG. 16 shows an example user interface illustrating a reference management console. In some embodiments, the consumer can see the merchants associated with a payment reference 1601. A nickname for a payment reference 1609 is may be displayed in some embodiments. A consumer may update the nickname associated with a reference 1609 or the payment account the reference uses 1603 by clicking a button 1602 in one embodiment of the interface. In some embodiments, multiple payment accounts may be linked to one reference account. The nickname the user has chosen for the reference payment link 1609 may also be customized for various merchants using the reference 1604 to facilitate recognition of the reference account in the context of a merchant's web site. In some embodiments, the reference management console may show the terms of the financial relationship 1605 that the consumer has established with the merchants. The terms, in other embodiments, may be other than payment terms. For instance, terms may be product specifications, shipment standards, on-account credit agreements, or other aspects of the consumer's relationship with a merchant. In some embodiments, a transaction history is available in the management console or elsewhere in the HAP. A consumer may also administer the reference transaction links from within the reference management console or elsewhere in the HAP. For example, the consumer may revoke access to a merchant linked to a reference payment 1607. A consumer may also cancel a recurrent subscription with a merchant from within the HAP. In alternative embodiments, the consumer may request more favorable payment terms, incentives, value added services, or a refund through the reference management console or elsewhere throughout the HAP.

FIG. 17 shows a block level diagram depicting exemplary failover payment capabilities of a reference transaction payment link. In one embodiment, the user may designate a reference name for a collection of payment accounts 1701. The user may choose a primary account to be used if sufficient funds are available 1702 and a backup account to be used in the event the primary account link fails 1703. A failure may be caused by insufficient funds, account closure, or other events. In an example transaction, merchant 1707 may use reference 1701 to execute a transaction that resolves to payment account 1702 and successfully processes the payment 1704. In another example, if the reference link to the primary payment method is broken 1705, the transaction may still resolve to backup payment method 1706. In alternative embodiments, the consumer may designate rules regarding the order in which payment is accounts should be used by a reference link and what criteria should determine the order. For example, a consumer may decide that all transactions from a certain type of merchant (i.e., grocery transactions, foreign travel transactions, etc.) should be processed through one payment account associated with the reference payment link. The consumer may also designate other payment accounts to handle transactions of other types.

FIGS. 18 and 18*a* are exemplary datagrams depicting the creation of a reference payment link between a merchant and a user. In FIG. 18, user 1821 requests a checkout page using a client terminal 1806. The checkout page request 1802 is dispatched to a merchant web server 1803. The merchant web server then replies to client 1806 with a checkout page response 1804. The checkout page response 1804 is embedded with code that causes client to initiate a second request to a wallet server. The client 1806 parses the checkout page response 1805. The client then dispatches a second request 1807 to a wallet server for a payment button. The wallet server responds with a payment button 1809, which is rendered by the client terminal 1820. The user then designates the payment button using an input device such as a mouse or finger 1822. The client 1806 then dispatches a request for a lightbox 1823 to wallet server 1808. The wallet server replies with a lightbox response 1824 containing reference transaction link information. In some embodiments, the lightbox response is substantially in the form of an HTTP(S) message including XML-formatted data, as provided below:

```
Host: www.merchant.com
Content-Type: Application/XML
Content-Length: 667
<?XML version = "1.0" encoding = "UTF-8"?>
<lightbox_response>
  <timestamp>2013-02-22 15:22:43</timestamp>
  <user_details>
    <user_name>JDoe@gmail.com</user_name>
    <password>Tomcat123</password>
  </user details>
  <reference>
```

-continued

```
    <refname>Personal Card</refname>
    <type>reference payment</type>
    <contract id>1Z4567248987321</contract_id>
    <contract_trms>234.99,immediate/40.00,permonth</contract_trms>
  </reference>
  <reference>
    <refname>Secret Name</refname>
    <type>reference_persona</>
    <name>Alias Name</name>
  </reference>
  <reference>
    <refname>Vacation Address</refname>g
    <type>reference_address</>
    <addr>500 Main St.</addr>
    <city>Anycity</city>
    <state>NY</state>
    <zip>12345</zip>
  </reference>
</lightbox_response>
```

The datagram in FIG. 18 then continues in FIG. 18*a*. Client 1806 then renders the lightbox 1825. In some embodiments, the lightbox appears overlaid on the merchant's web site. In other embodiments, the lightbox appears in a different window. Upon rendering of the lightbox, user 1821 is then presented with reference links that have already been created. In some embodiments, the user may re-use a previously created reference payment, persona, address, or other link by selecting its alias from the lightbox. In other embodiments, the user can create a new reference link from within the lightbox. In some embodiments, the reference creation request 1827 may be substantially in the form of an HTTP(S) message including XML-formatted data, as provided below:

```
Host: www.merchant.com
Content-Type: Application/XML
Content-Length: 667
<?XML version = "1.0" encoding = "UTF-8"?>
<reference_creation_request>
  <timestamp>2013-02-22 5:22:43</timestamp>
  <user_details>
    <user_name>JDoe@gmail.com</user_name>
    <password>Tomcat123</password>
  </user_details>
  <new_reference>
    <refname>New Business Card</refname>
    <type>reference_payment</>
    <card_num>1234123412341234</card_num>
    <contract_trms>234.99,immediate/40.00,permonth</contract_trms>
  </new_reference>
</reference_creation_request>
```

In some embodiments, wallet server 1808 may then process the reference creation request. For example, the wallet server may verify that the reference payment may be linked to the merchant. The wallet server may also verify that the reference payment account has sufficient funds to cover the current or future transactions. The wallet server 1808 then may reply to client 1806 with a reference creation response indication successful or failed reference creation. The client 1806 may then render response 1830.

FIG. 19 illustrates an example issuer side wallet enrollment interface user interface. In some embodiments of the HAP, a consumer may be logged into their bank issuer's web site or mobile application 1901. The web site may provide a listing of accounts that are associated with the consumer 1902-1902*a*. Additionally, recent transaction and balance information 1904-1904*a* may be provided to the consumer. In one embodiment, a consumer may add one or more accounts to a virtual wallet by indicating which accounts from the accounts associated with the issuer should be added to the virtual wallet 1903-1903*a*. In other embodiments, the consumer may be able to s select multiple cards for simultaneous addition to a virtual wallet.

FIG. 20*a* illustrates a lightbox window 2001 for linking payment accounts to a virtual wallet, creating a virtual wallet, and/or simultaneously creating a virtual wallet and linking payment accounts to the newly created wallet account. In some embodiments, the lightbox is generated from a third-party provider through the use of Server-Side-Includes, absolute URL's, JavaScript, or other like inclusion mechanism. In other embodiments, the lightbox may instead by displayed after forwarding the user to a third-party web site and/or in a form that encompasses an entire browser window. In some embodiments, the consumer may desire to enroll more than one card 2002 simultaneously in their wallet account. As such, the lightbox may is facilitate through one interface the simultaneous addition 2003 of multiple cards to a wallet account. In some embodiments, the user may already have a virtual wallet account that they wish to associate the payment accounts with 2004. As such, the lightbox may solicit from the user credentials sufficient to identify the virtual wallet account to which the payment accounts should be added. In some embodiments, the credentials may be in the form of a user name/password combination, a user name/Email combination, and/or the like 2005. Once the user has entered the appropriate wallet credentials, they may then link the payment accounts to the wallet 2006. This may result in the lightbox (e.g., from an issuer, merchant, and/or a like source) creating message 2221 and pulling the information from the issuer server (see FIG. 22*b*). In other embodiments, the consumer may desire to simultaneously create a virtual wallet account and add the selected payment accounts to the wallet 2007. Advantageously, in some embodiments the consumer may desire to allow the issuer of the payment accounts to send information regarding the consumer's financial account with the issuer and/or the consumer's payment accounts with the issuer to the virtual wallet account provider 2008. In doing so, the consumer may be assisted in the creation of a virtual wallet account by avoiding the entry of repetitive data that the issuer already has on file. This pre-fill of data may also be advantageously used in the establishment of other account types, including pre-paid accounts, reward accounts, savings accounts, and/or the like. In other embodiments, the consumer may indicate that the virtual wallet account is to be set up with the requirement for two factor authentication 2009. Two factor authentication is a form of authentication that requires two distinct types of information in order to authenticate a user. For example, a user may be required to provide a user name/password combination and a one-time code generated by their mobile device. Alternatively, the user may be required to identify an image of a friend and provide a thumbprint. Any two types of information that are known to a consumer may be used to enable two-factor authentication using the HAP. In other embodiments, the consumer may be prompted to simultaneously create a pre-paid payment account while they are creating a new wallet and/or linking payment accounts to an existing wallet. In some embodiments, if a consumer chooses to create a pre-paid account they may be prompted to select a payment account from which to fund the pre-paid account. In other embodiments, the consumer may then enter the account information (e.g., account number, billing address, etc.). In still other embodiments, the account information may be retrieved from the account issuer or from the issuer the consumer is currently logged into. In some embodiments, the consumer may desire to create a rule set that may define the conditions in which the pre-paid account may be replenished with funds. Some example rules include the re-filling of the pre-paid account when the account balance reaches a threshold, the re-filling of the pre-paid account when a user's chosen financial account(s) reach a certain balance amount and/or receive a deposit of a certain size, and/or the like. In doing so, the HAP may enable a user to easily create a pre-paid account while linking another account to their virtual wallet, creating a virtual wallet, and/or the like. In some embodiments, the pre-paid card creation request 2010 may be substantially in the form of an HTTP(S) message including XML-formatted data, as provided below:

```
Host: www.foo.com
Content-Type: Application/XML
Content-Length: 667
<?XML version = "1.0" encoding = "UTF-8"?>
<prepaid_creation_request>
  <timestamp>2020-02-22 15:22:43</timestamp>
  <user_details>
   <user_name>JDoe@gmail.com</user_name>
   <password>Tomcat123</password>
   <billing_address>123 Main St.</billing_address>
   <billing_state>VA</billing_state>
   <billing_zip>12345</billing_zip>
  </user details>
  <prefill_data_source>
   <type>prefillfromissuer_account_data</type>
   <account number>456456456456</account number>
  </prefill_data_source>
  <new_prepaid_card>
   <name>Lunch Money Prepaid Card</name>
   <type>prepaid</type>
   <funding_source>
    <type>rewards_points_account</type>
    <initial_deposit>10000points</initial_deposit>
    <currency_value>$124.52</currency_value>
   </funding_source>
   <funding_source>
    <type>savings_account</type>
    <account_number>1234123412341234</account_number>
    <routing_number>012345678</routing_number>
    <initial_deposit>$500.50</initial_deposit>
   </funding_source>
   <funding_source>
    //...n-sources of funding...
   </funding_source>
   <replenishment_rule>
    <type>low_prepaidbalance_initiate_deposit</type>
    <trigger_value>$20.00</trigger_value>
    <expires>2010-01-01</expires>
   </replenishment_rule>
   <replenishment_rule>
    <type>date</type>
    <frequency>monthly</frequency>
    <day>15</day>
    <expires>never</expires>
   </replenishment_rule>
  </new_prepaid_card>
 </prepaid_creation_request>
```

In some embodiments, the user may desire to simultaneously pre-fill information at the virtual wallet provider, force two-factor authentication before using the virtual wallet account, and/or establish a pre-paid payment account 2011.

FIGS. 20*b*-20*d* show an example alternate embodiment of the ii interface as described in FIG. 20*a*. In some implementations, the user may be presented to a card management screen (e.g., from an issuer, merchant, and/or like source) that allows the user to select 2012 bank credit cards 2013*a* and/or debit cards 2013*b* to be used in the user's virtual wallet. In some implementations, information 2014 related to each card may be displayed with the card selection, including the card is number, the card balance, images of the card, and/or like identifying information. After entering sign-in information 2015 for the user's virtual wallet account (e.g., a username or email address, a password, and/or like information), the user may click a button 2016 to submit the chosen cards and to log into the user's virtual wallet account. This may result in the website (e.g., from an issuer, merchant, and/or a like source) creating message 2220 and pushing the information to the virtual wallet server (see FIG. 22*b*).

If the user does not have a virtual wallet account, the user may sign up via filling out a form 2017 as shown in FIG. 20*c*, which may ask the user for identification information (e.g., a name, username, and/or the like), an email address, a password for the account, other information (e.g. gender, address, and/or the like), and/or like information. Once the user has entered said information, the user may click the continue button 2016 to submit the request for an account and the card selections to be associated with the newly-created account.

In some implementations, the HAP, before submitting the card selections, may present the user with lightbox 2018, which may indicate which cards have been selected. The user may have the ability to confirm the card selections by leaving all of the selections 2019 as-is and clicking the complete button 2021, may deselect one or more of the selected cards and click the complete button, or may click the start over button 2020 in order to clear all selections and to return to the card selection interface. As such, in such implementations, only the accounts checked or otherwise selected by the user may be passed to the virtual server and added to the user's virtual wallet. Once the user has clicked the complete button, the bank issuer may package the information received from the user, and may send it to the HAP. The HAP may then send a request to a virtual wallet server, authenticating the user's account via the submitted login data, and requesting that the virtual wallet server associate the specified cards with the user's s virtual wallet. If the user submitted information for creating a new virtual wallet account, the HAP may instead send a request that creates a virtual wallet account for the user and associates the specified cards with the user's virtual wallet.

FIG. 21 is an example data and logic flow illustrating the enrollment of a consumer account in a virtual wallet service and the utilization of a pre-fill service to pre-populate information necessary for wallet enrollment. In some embodiments, the consumer is directed to the virtual wallet enrollment page by directly typing the enrollment URL in a web browser 2101. In some embodiments, the consumer is navigated to a wallet login page where they may log into a wallet or create a new wallet account 2101*a*. In other embodiments, the consumer may enroll in the virtual wallet is through a link in their issuer's web site, credit card company, rewards online access account, and/or the like. In some embodiments, the user may then create a virtual wallet account 2102. In other embodiments, the user may log into their pre-existing virtual wallet account. The user may then activate the wallet account 2102*a*. The user may then indicate that they desire to add a new payment account to their virtual wallet 2103. The HAP may then request that the user consent to the retrieval of their payment account information from the payment account issuer 2104. The user may be asked to provide the account number of the payment account that the user wishes to link to their virtual wallet account 2105. The HAP may then use the user's account number or other credential such as a username/password combination or the like to initiate a request for retrieval of pre-provisioned data associated with the payment account 2106. In some embodiments, the request for retrieval of pre-provisioned data 2106 (e.g., "prefill data") may be in the form of an HTTP(S) message including XML-formatted data containing fields substantially similar to the following:

| Element Name | Description | Field Size | Element Type | Business Rule |
|---|---|---|---|---|
| BID | Business ID of the Issuer | | Numeric | For Federated Scenarios BID and CID |
| CID | Customer ID of the Cardholder | | Numeric | |
| PAN | PAN Number of the Cardholder | | Numeric | For Manual scenario PAN entered by the user |

In some embodiments, the request for retrieval of pre-provisioned data 2106 (e.g., "prefill data") may be substantially in the form of an HTTP(S) message including XML-formatted data, as provided below:

```
Host: www.server.com
Content-Type: Application/XML
Content-Length: 667
<?XML version = "1.0" encoding = "UTF-8"?>
<preprovisioned_prefill_request>
  <BID>247581</BID>
  <CID>9854254</CID>
  <PAN>1234123412341234</PAN>
  <wallet_id>RW987856</wallet_id>
</preprovisioned_prefill_request>
```

In some embodiments, the issuer may then use the data in the request to perform a lookup of account and/or prefill information that may be shared with the requesting service. In some embodiments, the issuer may have a permissions rule set that governs what data may be shared with requesting services. Example rules include, "Never share my business account number," "Default to my personal account," "Never share my billing address," and/or the like. In some embodiments, the issuer may then respond to the virtual wallet server 2107 with a prefill data package containing user, user account, user financial account, and/or similar data for use in establishing a virtual wallet account, pre-paid account, enrolling a payment account in a virtual wallet, and/or the like. In some embodiments, the pre-provisioned data response 2107 (e.g., "prefill data") may be in the form of an HTTP(S) message including XML-formatted data containing fields substantially similar to the following:

| Element Name | Description | Field Size | Element Type | Business Rule |
|---|---|---|---|---|
| | | | <User Details > | |
| BID | Business ID of the leaner | 8 | Alpha Numeric | Identification of the bank |
| CID | Customer ID of the cardholder | 19 | Numeric | The CID<br>The Customer ID is a unique identifier for the user for the given Issuer. This field is used to link the accounts (PANs) for a given user for the BID |
| Name Prefix | | 5 | Alpha Numeric | |
| First Name | I cardholder first name | 15 | Alpha Numeric | |
| Middle Initial | Cardholder middle name | 1 | Alpha Numeric | |
| Last Name | cardholder last name | 25 | Alpha Numeric | |
| Name Suffix | Cardholder suffix | 5 | Alpha Numeric | |
| Company Name | | 40 | Alpha Numeric | Company name if the account is help by a company instead of an individual |
| Country Code | | 3 | Alpha Numeric | Country of Residence of the cardholder<br>Numeric country code<br>ISO Numeric Currency Code.<br>USA: 840 Canada: 124 |
| Language Code | Cardholder language as set with the Issuer | 8 | Alpha Numeric | Cardholder language as set with the issuer |
| | | | <Card Details> | |
| Account Number | PAN Number of the Cardholder | 19 | Alpha Numeric | Card Number |
| Card Expiry Date | Expiration date of the card | 4 | UN | The expiration date as provided on the earn<br>Format: YYMM |
| Card Brand | | 4 | Alpha Numeric | Example of the card brand:<br>Visa |
| Company Name | | 40 | Alpha Numeric | |
| Name on the Card | | 26 | Alpha Numeric | |
| Phone Number on bac)(of the card | | 10 | UN | |
| Billing cycle Start Date | | 8 | UN | Account Billing Cycle start date, used for spend accumulations and reminders |
| Street Number | | 10 | AN | Billing Address street number |
| Address Line 2 | | 40 | AN | |
| Street Name | | 40 | AN | Billing Address street name |
| Unit Number | | 10 | AN | |
| PO Box Number | | 10 | AN | |

-continued

| Element Name | Description | Field Size | Element Type | Business Rule |
|---|---|---|---|---|
| Qty | | 30 | AN | Billing Address City |
| Stale | | 2 | AN | Billing Address state For US |
| Province | | 10 | AN | Billing Address province For Canada |
| ZIP | | 10 | UN | Billing Address Zip code |
| Country | | 3 | AN | Billing Address Country |
| Product type | | 10 | AN | The product type as provided on the card: * Credit * Debit Prepaid |
| Card Image Name | | 50 | AN | |
| Reason code | | | | |

In some embodiments, the pre-provisioned data response 2107 (e.g., "prefill data") may be in the form of an HTIP(S) message including XML-formatted data substantially similar to the following:

```
Host: www.server.com
Content-Type: Application/XML
Content-Length: 667
<?XML version = "1.0" encoding = "UTF-8"?>
<preprovisioned prefill response>
  <BID>247581</BID>
  <CID></CID>
  <wallet id>AK21574</wallet id>
  <name_prefix></name_prefix>
   //reference link may be used in place of data
  <first name>
 ref_link=http://visanet.com/?walletid=AK21574&user_id=9548field=first_name
 </first name>
  <middle initial></middle initial>
  <last name>Doe</last name>
  <name suffix></name suffix>
  <company_name></company name>
  <country_code></country_code>
  <language_code></language_code>
  <account number>
ref_link=http://visanet.com/?walletid=AK21574&user_id=9548field=account_number
 </account number>
  //alternatively, parameters (e.g. card expiration date)
  //can be made a, live link requiring no parsing
  <card_expiry_date
ref_link=http://visanet.com/?walletid=AK21574&user_id=9548field=card_expiry_dat
 e>09/2020</card_expiry_date>
  <card_brand>Visa</card brand>
  <product_identifier></product_identifier>
  <company_name></company_name>
  <name_on_card
 ref_link=http://visanet.com/?walletid=AK21574&user_id=9548field=name_on_card
 >John Doe</name on card>
  <phone_number_on_card></phone_number_on_card>
  <billing_cycle_start_date></billing_cycle_start_date>
  <street_number
ref_link=http://visanet.com/?walletid=AK21574&user_id=9548field=street_number
 >58</street number>
  <address line2></address line_2>
  <street_name
 ref_link=http://visanet.com/?walletid=AK21574&user_id=9548field=street_name
 >Main St.</street name>
  <unit number></unit number>
  <pobox_number></pobox_number>
  <city
 ref_link=http://visanet.com/?walletid=AK21574&user_id=9548field7city_name
 >Anytown</city>
  <state
ref_link=http://visanet.com/?walletid=AK21574&user_id=9548field=state>VA</state
  <province></province>
  <zip
 ref link=http://visanet.com/?walletid=AK21574&user id=9548field=zip>11547</zip>
  <country></country>
  <product type></product type>
```

-continued

```
  <card image
ref link=http://visanet.com/?walletid-AK21574&user id=9548field=cardimage>http
://www.imageserver.com/DRESKKJHKUHU/?76476576S765</card image>
  <reason_code></reason_code>
</preprovisioned_prefill_response>
```

In some embodiments, the pre-provisioned data response 2107 may contain reference links (e.g., 1503, 1504, 1505 and/or the like) allowing dynamic updating of the data in the virtual wallet and/or at the payment card issuer. In some embodiments, the virtual wallet may then pre-populate the provided information 2108 into a form for enrollment of the user's payment account, rewards account, and/or like in the user's virtual wallet. In some embodiments, the HAP may then make a request to retrieve an image for the card and/or payment account being added to the virtual wallet 2109. In some embodiments, the card image may be a default image. The wallet server may store the card images locally, in a cache, or retrieve the card images via a web service such as XML-RPC, SOAP, and/or the like. In some embodiments, the image retrieval request 2109 may be in the form of an HTTP(S) message including XML-formatted data containing fields substantially similar to the following:

| Element Name | Description | Field Size | Element Type | Business Rule |
|---|---|---|---|---|
| Account Number | PAN Number of the Cardholder | 1 9 | Alpha Numeric | For Manual scenario PAN entered by the user |

In other embodiments, the image retrieval request 2109 may be substantially in the form of an HTTP(S) message including XML-formatted data, as provided below:

```
Host: www.accountcardimageserver.com
Content-Type: Application/XML
Content-Length: 667
<?XML version= "1.0" encoding = "UTF-8"?>
<retrieve_image_request>
  <timestamp>2020-02-22 15:22:43</timestamp>
  <account_number>1234123412341234</account_number>
  <user_identifier>987654874</user_identifier>
  <image_resolution_desired>400x200</image_resolution_desired>
  <image_formats_desired>
    <type preference=1>JPG</type>
```

-continued

```
    <type preference=2>PNG</type>
    <type preference=3>HTML</type>
  </image_formats_desired>
  <image_formats_accepted>
    <type>JPG</type>
    <type>PNG</type>
    <type>HTML</type>
    <type>GIF</type>
  </image_formats_accepted>
</retrieve_image request>
```

In some embodiments, the card image server may then query a data store for an image of the card. An example PHP/SQL listing for querying a database for a card image is provided below:

```
<?PHP
header('Content-Type: text/plain');
mysql_connect("254.93.179.112",$DBserver,$password); //access database server
mysql select db("CARDIMAGES.SQL"); //select database table to search
//create query for token arbitrators
$query = "SELECT card id, file location, file format FROM CardTemplate WHERE
card type LIKE '%' $usercardtype";
$result= mysql query($query); //perform the search query
mysqlclose("ARBITRATORS.SQL"); //close database access
?>
```

The card may be a card virtually identical to the card the consumer is enrolling, or the card may be of a similar kind but of a more generic type (e.g., "green card," "gold card," "loyalty card," and/or the like). The data store may have multiple versions of the card available in various size/pixel resolutions and/or image formats. In some embodiments, the card image most closely matching the user's request may be returned to the user. In other embodiments, all card images meeting any of the criteria may be returned. In still other embodiments, the card image server may create an image "on the fly" in real-time using a dynamic image creation tool and/or a template tool such as ImageMagik, Gimp, Photoshop droplets, and/or the like. In one embodiment of the invention, the card template image retrieved from 2419*i* may be overlayed with a logo, photo of the user, or other similar data using Bash ImageMagik UNIX instructions substantially similar to:

```
#!/bin/bash
composite -compose  -geometry -13-17 card_overlay.png card_template.pn
atop
card_output.png
```

The card image server may then return a data package containing descriptive information about the images returned, user data, account data, actual image data, and/or the like. In some embodiments, the image retrieval response 2109*a* may be substantially m the form of an HTTP(S) message including XML-formatted data containing fields substantially similar to the following:

| Element Name | Description | Field Size | Element Type | Business Rule |
|---|---|---|---|---|
| BID | Business ID of the Issuer | 8 | Alpha Numeric | Identification of the bank |
| CID | customer ID of the Cardholder | 19 | Numeric | The CID The Customer ID is a unique Identifier for the user for the given Issuer. This field is used to link the accounts (PANs) for a given user for the BID |
| Account Number | PAN Number of the Cardholder | 19 | Numeric | |
| Card Image File Name Reason code | | 50 | Alpha | |

In still other embodiments, the image retrieval response 2109*a* may be substantially in the form of an HTTP(S) message including XML-formatted data, as provided below:

```
Host: www.accountcardimageserver.com
Content-Type: Application/XML
Content-Length: 667
<?XML version = "1.0" encoding = "UTF-8"?>
<retrieve image response>
  <timestamp>2020-02-22 15:22:43</timestamp>
  <account number>1234123412341234</account number>
  <image format>JPG</image format>
  <image generated type>on-the-fly-generated</image generated type>
  <image binary data>
    SDFRDTCXREERXFDGXFDXRESRXREXTREBB#W#B
    JIJGYTFTRCCBBJHGFEERA&&AYHGJNJKOIBJJVH
    NMJNKJYT%TYFVVYTYVVBGUGUYGUYERSESWCGVU
    VDRTGCDSERFDCVUE$RDTYYYYGVTYFTDGUHIUNI
  </image binary data>
  <image url>http://imageserver.com/abc/image.jpg</image_uri>
  <cachelavailable_until>2030-02-22 15:22:43</cache_available_until>
</retrieve_image_response>
```

In some embodiments, the image response may contain a cache control indication. The image server may indicate that it may cache the image for use by the wallet server, user, and/or like until a certain date or time. Alternatively, the cache date may be set to a date in the past, which indicates that the image may not be cached. By using a cached version of the image, the card image server may advantageously be able to provide individually customized versions of the card images for card image requesters without having to frequently re-generate customized card images (e.g. images containing a logo, or the user's name and/or photo) frequently. After the card image has been retrieved, the user may click a "Save" button to enroll the card in the wallet. In other embodiments, no card image is retrieved. In still other embodiments, the payment account is automatically added to the wallet. Additional logging and/or data storage may take place on the wallet server and/or data may be stored in a staging table 2111, such as delayed processing of card enrollment requests during heavy periods of load. In some embodiments, the enrolled payment account and/or wallet enrollment data may be stored in a staging table for later processing 2111*a*. In some embodiments, the data stored in the staging table 2111*a* may be substantially similar to the following:

| Element Name | Description | Field Size | Element Type | Business Rule |
|---|---|---|---|---|
| BID | Business ID of the Issuer | 8 | Alpha Numeric | |

-continued

| Element Name | Description | Field Size | Element Type | Business Rule |
|---|---|---|---|---|
| CID | customer ID of the Cardholder | 19 | Numeric | |
| Account Number | PAN Number of the cardholder | 19 | Alpha Numeric | |
| Replaced Account Number | | 19 | Alpha Numeric | Old Account Number |
| URI | | | | /vManage/v1/account/{GUID}/paymentInstruments/{paymentsInstrumentID} |
| Name Prefix | | 5 | Alpha Numeric | |
| First Name | cardholder first name | 15 | Alpha Numeric | |
| Middle Initial | cardholder middle name initials | 1 | Alpha Numeric | |
| Last Name | Cardholder last name | 25 | Alpha Numeric | |
| Name Suffix | Cardholder suffix | 5 | Alpha Numeric | |
| Company Name | | 40 | Alpha Numeric | Company name if the account is help by a company instead of an individual |
| Country Code | | 3 | Alpha Numeric | Country of Residence of the cardholder Numeric Country code ISO Numeric Currency Code: * USA: 840; Canada: 124 |
| Language Code | Cardholder language as set with the Issuer | 8 | Alpha Numeric | Cardholder language as set with the issuer |
| Primary E-Mail Address | | 50 | Alpha Numeric | Cardholder primary email address, this field may be used as the user ID in the wallet |
| Primary E-Mail Address Verification | | 1 | Alpha Numeric | This field indicates whether this email address has been verified as a valid email address for the cardholder |
| Secondary E-Mail Address | | 50 | Alpha Numeric | Cardholder alternate or secondary email address |
| Secondary E-Mail Address Verification | | 1 | Alpha Numeric | This field indicates whether this email address has been verified as a valid email address for the cardholder. |
| Home Phone Number Country Code | | 3 | UN | Country Code prefix<br>* USA: 001<br>* Canada: 001 |
| Home Phone Number | | 10 | Alpha Numeric | |
| Primary Mobile Phone Number Country Code | | 3 | UN | Country Code prefix<br>* USA: 001<br>* Canada: 001 |
| Primary Mobile Number | | 10 | UN | |
| Primary Mobile Number Verification | | 1 | Alpha Numeric | This field indicates whether this mobile number has been verified as a valid mobile number for the cardholder. |
| Alternate Mobile Phone Number Country Code | | 3 | UN | Country Code prefix<br>* USA: 001<br>* Canada: 001 |
| Alternate Mobile Number | | 10 | UN | |
| Alternate Mobile Number Verification | | 1 | Alpha Numeric | This field indicates whether this mobile number has been verified as a valid mobile number for the cardholder. |
| Work Phone Number Country Code | | 3 | UN | Country Code prefix<br>* USA: 001; * Canada: 001 |
| Work Phone Number | | 10 | UN | |
| Work Phone Number Extension | | 10 | UN | |
| Fax Number Country Code | | 3 | UN | Country Code prefix<br>* USA: 001; * Canada: 001 |
| Fax Number | | 10 | UN | |
| Card Brand | | 4 | Alpha Numeric | Example of the card brand: Visa<br>• |
| Product Identifier | | 2 | Alpha Numeric | |
| Company Name | | 40 | Alpha Numeric | |
| Name on the Card | | 26 | Alpha Numeric | |
| Phone Number on back of the card | | 10 | UN | |
| Billing Cycle Start Date | | 8 | UN | Account Billing Cycle start date, used for spend accumulations and reminders |
| Street Number | | 10 | AN | Billing Address street number |
| Address Line 2 | | 40 | AN | |

-continued

| Element Name | Description | Field Size | Element Type | Business Rule |
|---|---|---|---|---|
| street Name | | 40 | AN | Billing Address street name |
| Unit Number | | 10 | AN | |
| PO Box Number | AN | 0 | | |
| City | | 30 | AN | Billing Address City |
| State | | 2 | AN | Billing Address state |
| Province | | 0 | AN | Billing Address province<br>For Canada |
| ZIP | | 10 | UN | Billing Address Zip code<br>For United States and Canada |
| Country | | 3 | AN | Billing Address country |
| Product type | | 10 | AN | The product type as provided on !he card. * Credit * Debit<br>•<br>Prepaid |
| Card Image Name | | 50 | Alpha Numeric | |
| Enrolled Indicator | Alpha Numeric | 1 | | |
| Card Added Method | | 25 | Alpha Numeric | Federated<br>Manual |

The pre-provisioned data record may then be updated with the new wallet s UUID 2111*c*. In some embodiments, the record may be marked with an indication of 6 enrollment method (such as "manual") and additional data may be associated with the record such as an auto-update flag used in reference transactions, an account level identifier for associating child accounts with a parent account, acceptance of a terms and conditions, and/or a hashed card art image name 2111*b*. In some embodiments, the user may receive an indication that they have completed the payment account enrollment in the virtual wallet 2112, creation of the wallet account, and/or the like.

FIG. 22*a* is an example wallet account enrollment optionally using prefill data from a payment account issuer. In some embodiments, the consumer is logged into an issuer's web site 2201. The consumer may click a button indicating that they wish to enroll payment accounts associated with the issuer in a virtual wallet 2201*a*. The consumer may indicate that they wish to enroll some or all of their payment accounts with the issuer in a virtual wallet service 2201*a*. As such, the user may be asked to give their consent to their account information being transferred from the issuer to a virtual wallet provider 2202. The user may accept the message 2202*a*. In some embodiments, the issuer may then transfer the prefill and/or pre-provision data for all of the cards associated with a consumer user via a SAML assertion or other transfer mechanism 2203, which may be achieved using a data structure for each account similar to the above discussed pre-provisioned data response 2107. In some embodiments, payment account data may by stored by the wallet server 2203*a*. In other embodiments, the consumer may select which accounts information they desire to be transferred to the virtual wallet provider. In some embodiments, the consumer may then be transferred to the virtual wallet provider's web site 2203. A log-in page is then shown to the consumer 2204 to enable the consumer to log into their virtual wallet account. In some embodiments, the consumer may be automatically logged into their virtual wallet. In some embodiments, the consumer may log into their existing wallet using an email address and password and/or other similar means 2204*b*. A consumer may then indicate that they wish to enroll a card in a virtual wallet, such as by clicking an "Add Card" button 2204*a*, 2204*c*. The HAP may request that the user consent to retrieve card prefill data from an issuer 2204*d*. In other embodiments, the consumer may be presented with a list of the payment accounts transferred from the issuer and/or images of the card accounts transferred and select which accounts to link to their virtual wallet. In some embodiments, the consumer may type the number of the account that they wish to add to their virtual wallet 2205. The HAP may then verify that the account number is associated with one of the accounts with data transferred from the issuer as pre-fill and/or pre-provision data 2206. In some embodiments, the system may then pre-populate appropriate data in the enrollment form and request that the user indicate if they would like automatic updating of data after enrolled 2207. Examples of automatic updating (references) can include account number (e.g. PAN) and/or expiration dates 2207. In some embodiments, the HAP may then advantageously pre-populate the pre-provision and/or pre-fill data into input boxes for the user to enroll their payment account. The user may then enroll their card in the virtual wallet by clicking a "Save" button 2208. In other embodiments, the payment account is automatically added to the virtual wallet without user interaction. The HAP may perform address validation or verification 2208*a* prior to attaching the card to a virtual wallet. In some embodiments, the HAP may then associate the added payment account(s) to the user's pre-existing virtual wallet 2209. In other embodiments, a new virtual wallet may be created. The HAP may additionally create an entry in a staging table 2210, using means substantially similar to 2111, 2111*a* and/or 2111*b*. The prefilled/preprovisioned data may be inserted into the staging table with an enrolled designation 2210*a*. Later, records may be pulled from the staging table by an automated process and/or similar means, processed, and pushed to a common services platform 2210*b*. A record may be stored by the wallet server or otherwise indicating that the consumer was enrolled in a wallet account or payment accounts were enrolled via a federated bank website 2210*c*. Additionally, data about additional cards may be stored for analytics purposes or other purposes 2210*d*. The consumer may be presented with a confirmation of successful enrollment after the payment account and/or wallet service has been enrolled and/or the staging table entry has been made 2211 (see FIG. 12*a* for an example card account success enrollment interface).

FIG. 22*b* is a block diagram showing an exemplary process of enrolling card accounts in a wallet account. In some embodiments, the user 2212 may request an issuer page, website, or application 2213 via their electronic device 2225. The device may send an issuer page request 2214 to the issuer's server 2215, which may return the issuer's page, website, and/or application 2216 to the electronic device (see FIGS. 24*b* and 24*g*).

In some embodiments, the user may provide card account selections to add to the wallet 2219 to the electronic device (see FIGS. 24*e* and 24*h-i*). The electronic device may send said selections to the issuer server via a request card account info push to a wallet message 2220. In some implementations, the XML-encoded push to wallet message 2220 may take a form similar to the following:

```
POST /pushtowalletrequest.php HTTP/1.1
Host: www.merchant.com
Content-Type: Application/XML
Content-Length: 667
<?XML version = "1.0" encoding = "UTF-8"?>
<push request>
 <timestamp>2013-02-22 15:22:43</timestamp>
 <auth params>
 <digital_cert>http://cert_request_server.com/cert_request_1236789.cer
t</digital cert>
 </auth_params>
 <wallet params>
  <wallet name>Wallet Wallet</wallet name>
  <wallet-address>http://v.me/</wallet address>
  <wallet=type>online</wallet_type>
 </wallet_params>
 etc.
```

In some embodiments, the message may contain card selection information, user account information for the issuer, user account information for the wallet service, and/or the like. The issuer server may then push the selection information via a new card account add request 2223 to the wallet server 2217. In some implementations, the XML-encoded request 2223 may take a form similar to the following:

```
POST /newcardrequest.php HTTP/1.1
Host: www.merchant.com
Content-Type: Application/XML
Content-Length: 667
<?XML version = "1.0" encoding = "UTF-8"?>
<new card request>
 <timestamp>2013-02-22 15:22:43</timestamp>
 <auth params>
  <passcode>my password</passcode>
 </auth params>
 <user details>
  <user name>JDoe@gmail.com</account name>
  etc.
```

The wallet server may then use any information received from the issuer server to modify the user's wallet account via a MySQL database command similar to the following:

```
INSERT INTO user cards (number, security code, ID, address, expire)
VALUES(card number, card_security, card ID, card address, card expire);
```

In some implementations, the electronic device may instead send the user selections to the wallet server via a request for a pull for card account information from the issuer 2221 that is sent by a wallet overlay 2218 (see FIGS. 24*c-d*). In some implementations, the XML-encoded pull request 2221 may resemble the following:

```
POST /pullrequest.php HTTP/1.1
Host: www.merchant.com
Content-Type: Application/XML
Content-Length: 667
<?XML version = "1.0" encoding = "UTF-8"?>
<pull request>
 <timestamp>2013-02-22 15:22:43</timestamp>
 <auth_params>
  <auth code>123ABC09B</auth code>
 </auth params>
 <issueryarams>
  <issuer name>Bank of America</issuer name>
  <issuer-type>bank</issuer type>
  <issuer-address>http://bankofamerica.com/accts</issuer address>
 </issuer params>
 <issuer auth params>
  <issuer auth username>my username1</issuer_auth_username>
  <issuer auth password>my password1</issuer_auth_password>
  <issuer auth ID>12678HJK</issuer auth ID>
 </issuer auth arams>
 <user details>
  -<user name>JDoe@gmail.com</user name>
  etc.
```

The wallet server may use any identifying information (such as the user's account number with the issuer, the user's card number(s), and/or the like) provided in the request for card account information to create a new request 2222 to the issuer server. The wallet server may request any information necessary to link the card account to the wallet service, including permission from the issuer, more information about the card account not provided by the user (e.g., a card account ID, and/or the like). The issuer server may, after receiving such a request, send a new card account add request 2223 which may include all information requested by the wallet server.

FIG. 23*a* is an exemplary virtual wallet and card enrollment logic and data flow. In some embodiments, the user accesses a wallet URL using a mobile device 2303. In other embodiments, the wallet URL is accessed from the user's computer, the user's issuer web site, and/or the like. In some embodiments, the wallet may be accessed either via a wallet-implemented JavaScript overlay, via the issuer's site directly, and/or the like. If the wallet is accessed via the overlay, the wallet may pull card account information from the issuer. If the wallet is accessed via the issuer's website, the wallet may push the card account data to the wallet server. If the user is already logged into their wallet account 2304, as indicated in one embodiment by a cookie on the user's computer, the user is directed to a wallet display including an "Add Card" button 2314. If the user is not logged into a virtual wallet account, the HAP may then prompt the user to indicate if they already have a virtual wallet account 2305 and if so, prompt the user to log into their account 2313. In some embodiments, the consumer may be asked to consent to the retrieval of pre-fill data from a payment account issuer 2306. If the user does not consent, they may be directed to a wallet enrollment form with no pre-fill data pre-populated. Should the user consent to the issuer sharing pre-fill data, the wallet server 2301 may transmit a request to the issuer for data 2307 and the issuer server may receive 2308 and process the request. If the user account and/or pre-fill data is found by the issuer 2309, the data may be transmitted to the wallet server 2310 for use in pre-filling/pre-populating fields in the wallet enrollment form 2311. If no pre-fill data is found by the issuer, the user is directed to the wallet enrollment form 2311. In some embodiments, the issuer is a bank. In other embodiments, the issuer is a rewards account provider. In still other embodiments, the issuer is a non-financial company and/or an individual (as in peer-to-peer enrollment). The consumer may then complete any data required by the wallet enrollment form 2311. In some embodiments, the pre-fill data is filled into the enrollment form for the user. Example data is user name, user billing address, user account identifier, mother's maiden name, security question and answer, and/or the like. In other embodiments, some fields of the enrollment form 2311 may be hidden if pre-fill data is available for those fields. Upon completion of the enrollment form, the user is enrolled into the wallet 2312 and logged into the wallet with an option to add accounts 2314. The logic and data flow continues in FIG. 23*b*.

FIG. 23*b* is a continuation of an exemplary virtual wallet and card enrollment logic and data flow. In some embodiments, the user clicks a button to "Add Card" to their wallet. In other embodiments, no user interaction is required. A user may then be prompted to enter their card number, account number, PAN number, and/or similar 2316. In some embodiments, a user may be asked to consent to the retrieval of the account information from an account issuer 2317. In other embodiments, this user consent may be assumed. If the user does not consent to the retrieval of account information from the issuer 2317, then the user may be prompted to input additional information about the payment account to facilitate enrollment of the account in the wallet 2320. If the user does consent to the retrieval of card information from the issuer 2317, account data such as billing address, user name, credit history, and/or the like is retrieved from the issuer 2318 and processed by the wallet server 2319. In some embodiments, the HAP may generate a request for a card image 2321. The request may be sent to a card image server 2329. If the card image is available 2322, the card image server 2329 may designate a template image for the card 2324. Alternatively, if no image us available a default template image may be used 2323. In some embodiments, the card image server may create an "on the fly" image to represent the card and overlay that image with appropriate consumer specific data such as name, photo, and/or the like 2323*a*. In some embodiments, confidential data such as PAN number, account number and/or the like may be obscured from the overlaid data using ii a tool such as ImageMagik. In doing so, the card image server may protect confidential consumer information. The image server may then create a card image response to send the card image data and/or card image(s) to the requesting service. In some embodiments, the card image response is substantially in the form described in 2109*a*. In some embodiments, the HAP may then display a payment account and/or card enrollment form with the retrieved card image and any data retrieved from the account issuer pre-filled 2325. The consumer may then complete any remaining information is required by the enrollment form and save the account in their virtual wallet 2326. In some embodiments, the HAP may then register or associate the payment account with the consumer's virtual wallet 2327 and prompt the user that the account has been linked to their wallet 2328 (see FIG. 12*a* for an example card account success enrollment interface).

FIGS. 24*a-j* illustrate alternate embodiments of wallet and card enrollment via the HAP. In some embodiments, the wallet and card enrollment may occur on a normal web interface, a mobile web interface, a voice-controlled interface, and/or other interfaces. FIG. 24*a* illustrates alternate embodiments of linking 2401 a website for an issuer, merchant, and/or a like web service to the wallet service. FIGS. 24*b-d* illustrate example embodiments of providing users a method of enrolling in a wallet program through an issuer's website. For example, in some embodiments, the user may access an introductory screen 2402 which may provide detail on the wallet service, and the user may be presented a number of options in enrolling in the wallet service 2403 (including an express enrollment or card addition option, a standard enrollment or card addition option, and/or the like). The user may then be presented with wallet-implemented overlays 2404 in which to enter wallet account information (either for a new or existing account), wallet-implemented overlays 2404 being alternative overlays to wallet overlay 2003. The user may use card selection overlays 2405 to choose cards to associate with the wallet account, and may confirm the selection. The overlays 2404 and 2405 may send all collected information directly to the wallet server.

FIGS. 24*e-f* illustrate further alternate example embodiments of providing to users a way of enrolling in the wallet program. For example, the user may, while exclusively using the issuer's website, enter card selections 2406 (alternatively, the user may do so similar to the embodiment provided in FIGS. 20*c-d*). While remaining on the issuer's website, the user may also provide information for logging into, or signing up for, a wallet account 2407.

FIGS. 24*g-j* illustrate further alternate example embodiments of the interface in FIGS. 20*b-d*. In some embodiments, the wallet login and sign-up options 2015 and 2017 may resemble 2408 and 2409, respectively. The sign-up form for a wallet account may be included on the main page as shown at 2410. Similar to 2012, the user may be presented with a set of available cards 2411 which may be selectable for a wallet account. The user may also be able to specify which card to set as a default card for the wallet. In addition to the information collected in FIGS. 20*b-d*, the issuer may request that the user provide a set of security questions and answers 2412, as well as security codes 2413. The issuer may provide the user with a confirmation screen 2414 once the process has been completed.

Figure 25:
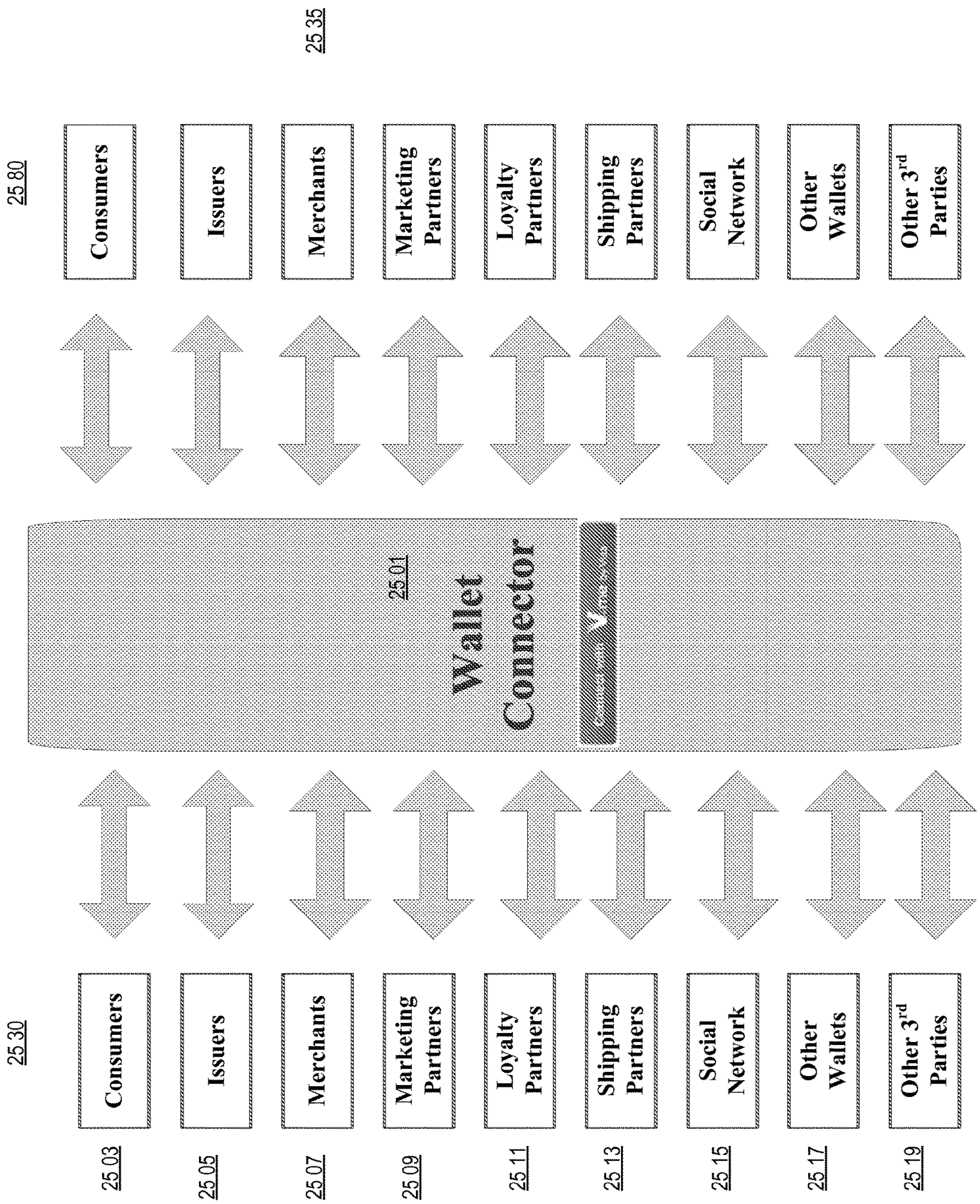
FIG. 25 shows a block diagram illustrating example multi-directional service connections, in some embodiments of the HAP.

FIG. 25 shows a block diagram illustrating example multi-directional service connections in some embodiments of the HAP. In some embodiments, the HAP 2501 enables seamless multi-directional connections and communications among multiple entities, including, but not limited to, consumers 2503, issuers 2505, merchants 2507, marketing partners 2509, loyalty partners 2511, shipping partners 2513, social network 2515, other wallet services 2517, and/or other third parties 2519. Entities on the left 2530 may connect to either entity on the right 258*o* through the HAP. In one implementation, for example, a consumer may request his bank issuer 2505 to update, through the HAP, the newly issued credit card number with all merchants 2535 on the HAP consumer profile.

Figure 26A:
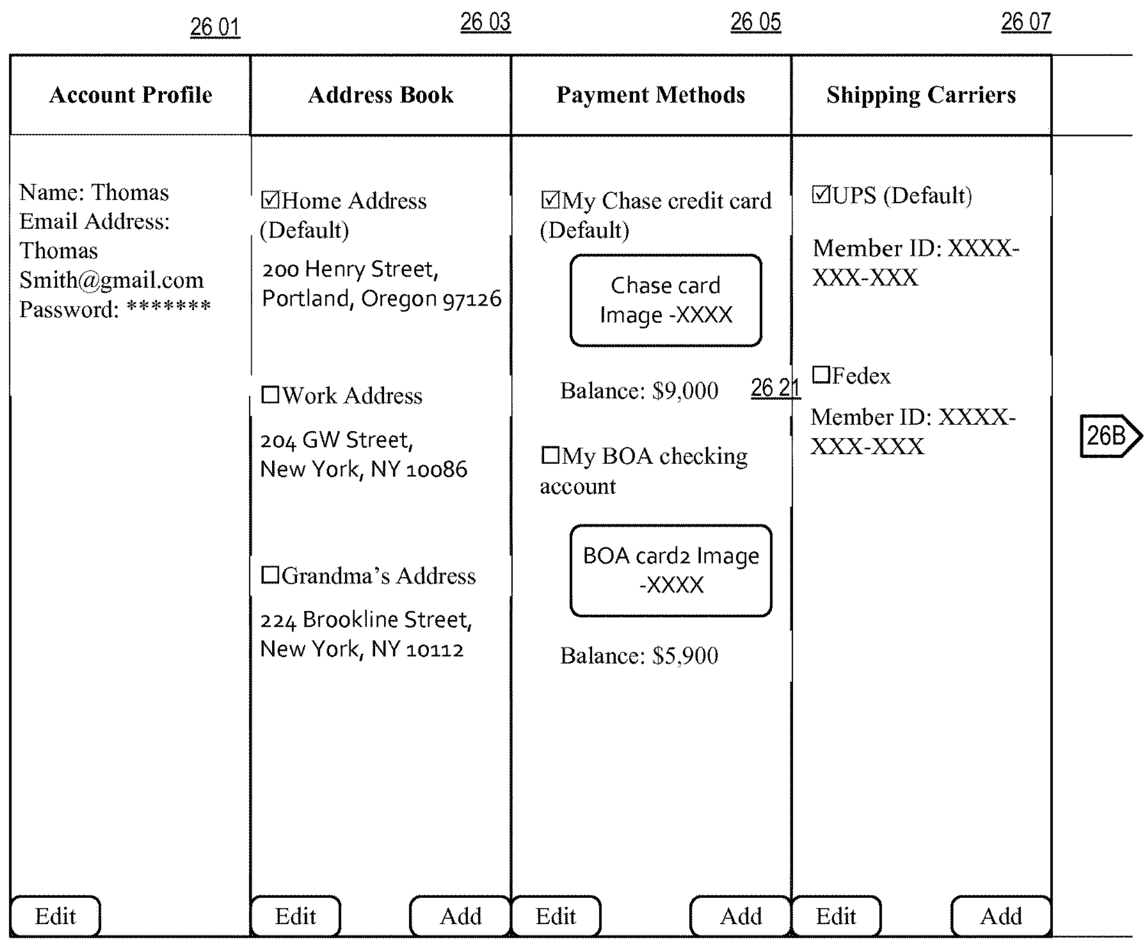
FIGS. 26A-26C show example user interfaces, in some embodiments of the HAP.
Figure 26B:
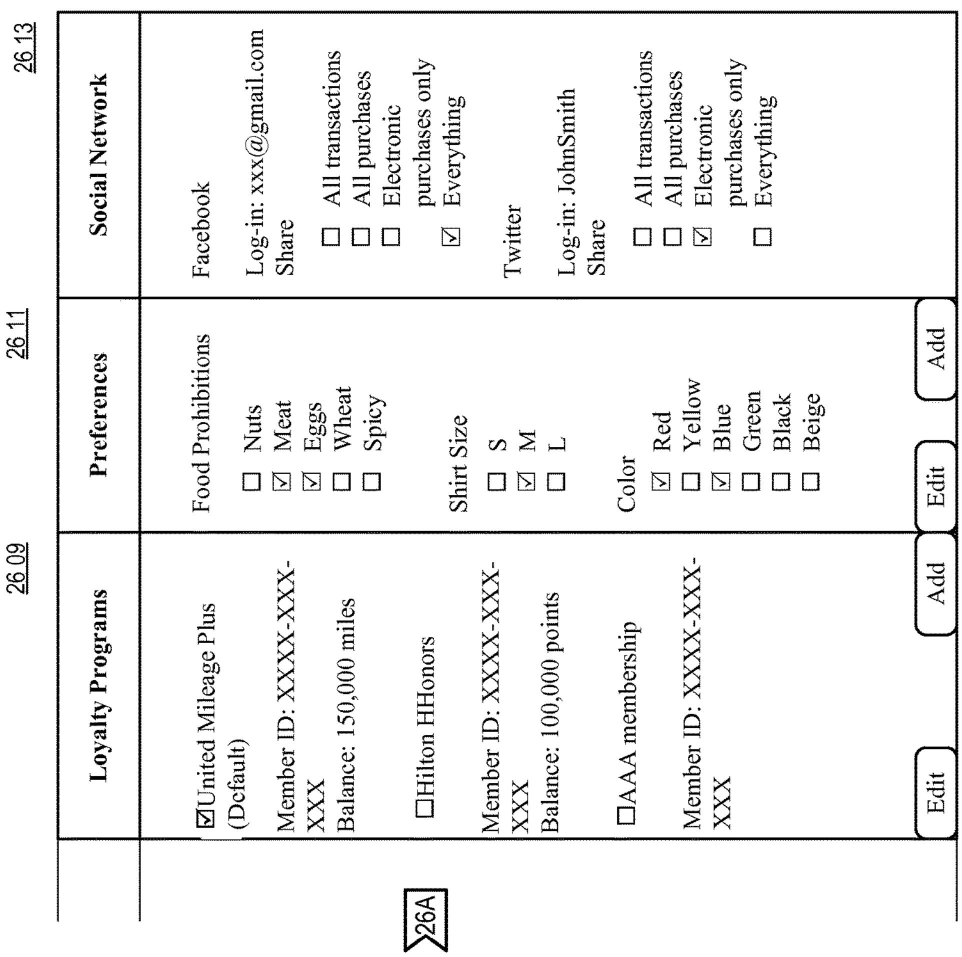
Figure 26C:
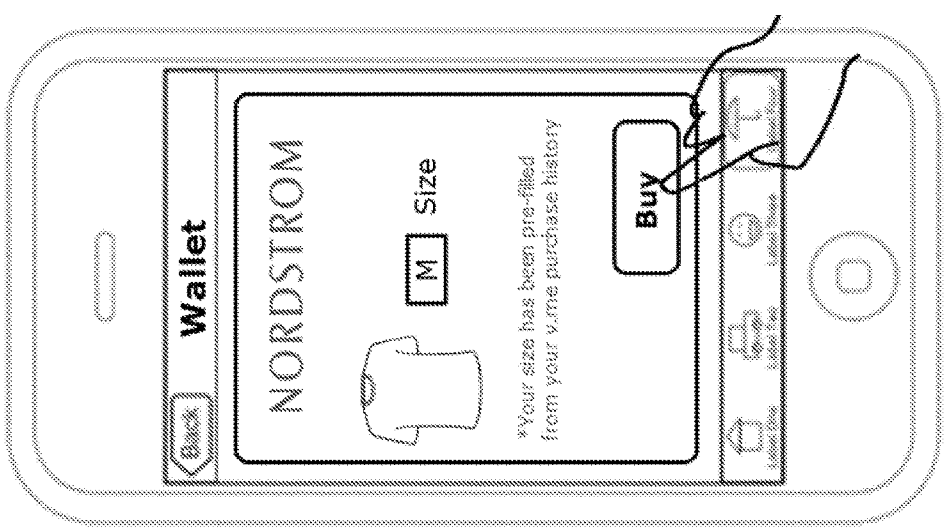

FIGS. 26A-26C show example user interfaces in some embodiments of the HAP. In some embodiments, a consumer may log-in the HAP account and access and/or edit the account information. The account information may include, such as, but not limited to: account profile 2601, address book 2603, payment methods 2605, shipping carriers 2607, loyalty programs 2609, preferences 2611, social network 2613, transaction history, browser cookies, offers, coupons, alerts, other wallet accounts, and/or the like. Account profile 2601 may include such as, but not limited to, user name, user email address, user log-in credentials, user log-in password, and/or the like. The address book may include more than one address, and the user may select an address to use as default shipping and/or billing addresses. The user may provide payment methods 2605 and choose default payment method to use for purchases. In some implementations, the user may request issuers to provide payment methods to the account through the HAP. In some implementations, the balance 2621 of each payment method may display for user's convenience. The user, or the shipping carriers, or other entities, may provide user shipping accounts. Referring to FIG. 26B, the user or loyalty program providers, or other entities, may provide user's loyalty accounts and respective balance on the loyalty accounts to the HAP account. The user may also provide and/or edit user preferences. The user preferences 2611 may provide user's preferences on any products. It may be provided by the user, or other entities. It may be aggregated from user's prior purchases. For example, when user orders food through a merchant website and noted that user is allergic to peanuts and wishes no peanuts should be contained in any food orders from the user. The HAP may store this food preference into the user's account. When the user makes food orders through this or other merchant, the no-peanuts user preference may be pre-populated to the orders so that the user may not need to enter this again. Other user preferences such as clothes sizes, color, and/or the like may be added. The user or other entities may provide his social network account to the HAP and provide controls as to the share privileges 2613. FIG. 26C shows an example user interface illustrating HAP pre-populating shirt size during purchase to provide seamless user experience in some embodiment of the HAP.

Figure 27:
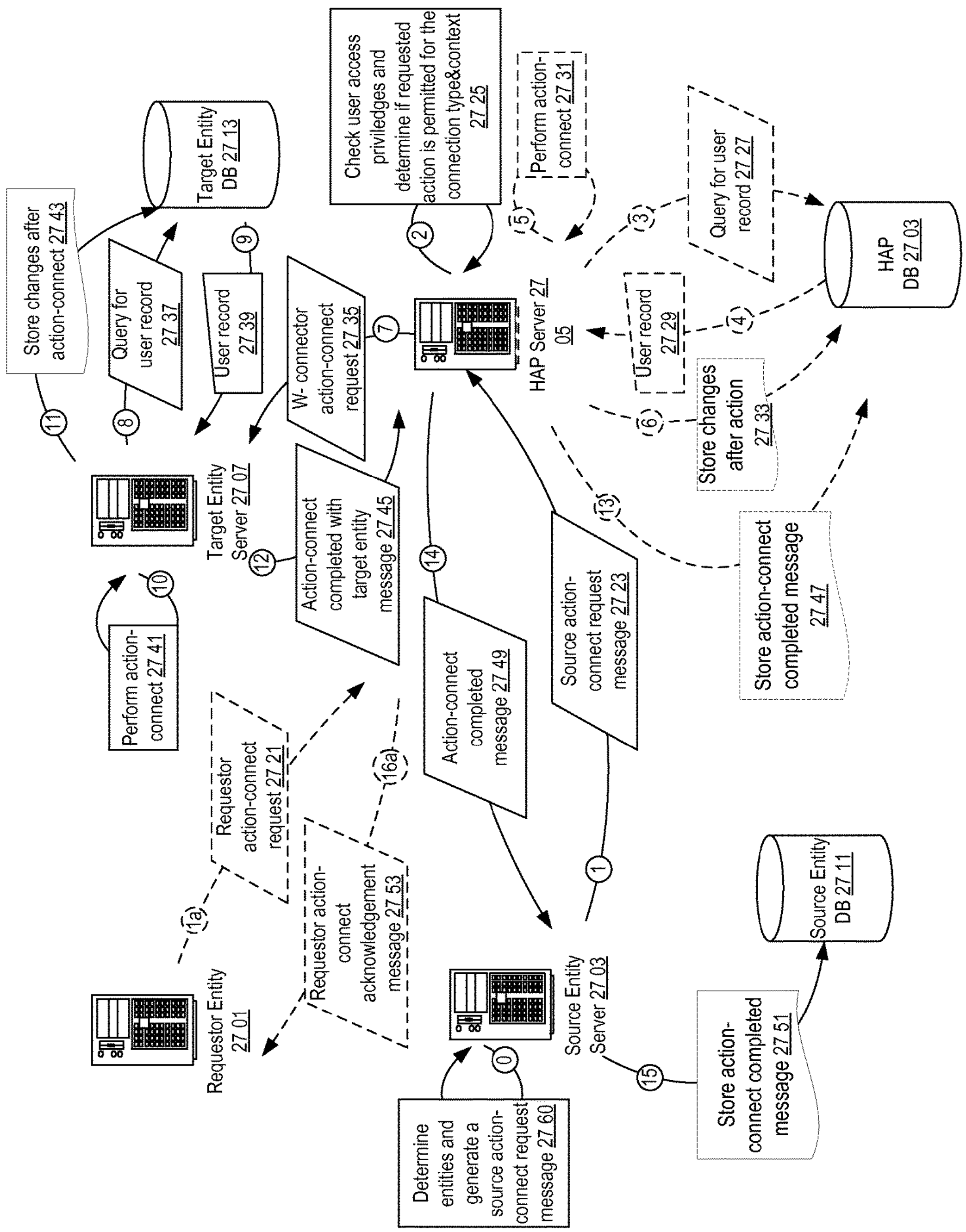
FIG. 27 shows a data flow diagram illustrating example multi-directional connections, in some embodiments of the HAP.

FIG. 27 shows a data flow diagram illustrating example multi-directional connections in some embodiments of the HAP. As discussed in FIG. 25, source entities, target entities, and requestor entities may include entities such as, but not limited to: consumers, issuers, merchants, marketing partners, loyalty partners, shipping partners, social network, other wallet services, and/or other third parties. In some embodiments, the Source Entity Server 2703 may first determine which entities need to be involved in fulfilling the connection, and generate a source action-connect to request message 2760. In one embodiment, some entities may give the HAP server a general inquiry regarding a consumer's account and inquire if it needs any updates. The HAP server may access the source entity server information about the account and compare the information with the accounts stemming from the consumer's account and see if the source entity needs any updates. If so, the HAP server may generate an action-connect request 2723 on behalf of the source server. It may provide this action-connect request message allowing the source entity to effect this message. Alternatively, in one embodiment, the HAP server may itself generate this message and send it on behalf of the source entity to the target entity. For example, if it is determined an address at the merchant is a newer address because the modification date for the address field is newer than that stored in the source entity server, the HAP may generate an update action for the address information type by populating the source entity and the target entity information into an action-connect request message (e.g., the source entity being the entity having the newer date address information, and the target entity being the entity having the older date address information). For example, an example PHP/SQL command listing, illustrating substantive aspects of querying the Bank of America database for modification date of default address, is provided below:

```
<?PHP
header('Content-Type: text/plain');
mysql_connect("254.93.179.112",$DBserver,$password); // access database server
mysql_select_db("BoACustomerProfile.SQL"); // select database table to search
//create query for BoACustomerprofile data
 $query = "SELECT modification_date FROM BoACustomerProfileTable WHERE
 customer_ID LIKE '%' $123abc" default_address LIKE '%' $address";
 $result = mysql_query($query); // perform the search query
 Mysql_close("BoACustomerProfile.SQL"); // close database access
```

An example PHP/SQL command listing, illustrating substantive aspects of querying the Amazon database for modification date of address, is provided below:

```
<?PHP
header('Content-Type: text/plain');
mysql_connect("254.93.179.112",$DEserver,Spassword); // access database server
mysql_select_db("AmazonCustomerProfile.SQL"); // select database table to
search
//create query for AmazonCustomerProfile data
$query = "SELECT modification_date FROM AmazonCustomerProfileTable WHERE
customer ID LIKE '%' $123abc" default_address LIKE '%' $address";
$result = mysql_query($query); // perform the search query
mysql_close("AmazonCustomerProfile.SQL"); // close database access
?>
```

First, the HAP may load an action template from an action template table of the HAP database. An example of the action template is provided as follows:

```
POST /updateaddress.php HTTP/1.1
Host: www.HAP.com
Content-Type: Application/XML
Content-Length: 667
<?XML version = "1.0" encoding = "UTF-8"?>
<security_template_level>subclass:abc 3.5</security_template_level>
<wallet_customer_ID>xyz123</wallet_customer_ID
<requestor>
 <context>
  <role1>source
   <entity1> </entity1>
   <info_type></info_type>
   <action></action>
  </role1>
  <role2>target
   <entity2> </entity2>
   <info_type> </info_type>
   <action> </action>
```

-continued

```
    </role2>
  </context>
</requestor>
```

When the return values are newer for BoA, the HAP may determine (e.g., as a role) that any newer modified entity is a source for that information type. As such, it will pre-populate a request as follows:

```
POST /updateaddress.php HTTP/1.1
Host: www.HAP.com
Content-Type: Application/XML
Content-Length: 667
<?XML version = "1.0" encoding = "UTF-8"?>
<security_template_level>subclass:abc 3.5</security_template_level>
<wallet_customer_ID>xyz123</wallet_customer_ID
<requestor>BoA
  <context>mobile
    <role1>source
      <entity1>BoA</entity1>
        <BOA ID>abc123</BOA ID>
        <BOA account number>PAN 5678 1234
9012</BOA account number>
      <info_type>Address</info_type>
        <current_default_address> 123 peace st., New
York, NY 10001</current_default_address>
      <action>update:BoA address value$</action>
    </role1>
    <role2>target
      <entity2> </entity2>
      <info_type> </info_type>
      <action> </action>
    </role2>
  </context>
</requestor>
```

Then the HAP may determine which fields require updates at target and pre-populate the request info as follows:

```
POST /updateaddress.php HTTP/1.1
Host: www.HAP.com
Content-Type: Application/XML
Content-Length: 667
<?XML version = "1.0" encoding = "UTF-8"?>
<security_template_level>subclass:abc 3.5</security_template_level>
<wallet_customer_ID>xyz123</wallet_customer_ID
<requestor>BoA
  <context>mobile
    <role1>source
      <entity1>BoA</entity1>
        <BOA ID>abc123</BOA ID>
        <BOA account_number>PAN 5678 1234
9012</BOA account number>
      <info_type>Address</info_type>
        <current_default_address> 123 peace st., New
York, NY 10001</current default address>
      <action>update:address value$</action>
    </role1>
    <role2>target
      <entity2>Amazon</entity2>
        <Amazon ID>joesmith@gmail.com</Amazon_ID>
        <Amazon_password>jkwe%d134</Amazon_password>
      <info_type>Address</info_type>
#Current address on file prior to update: 567 Fashion Avenue,
Charlotte, NC 270001#
      <action>update:address value$</action>
#Address now updated to: 123 peace st., New York, NY 10001#
    </role2>
  </context>
</requestor>
```

In some embodiments, the Source Entity Server 2703 may send a source action-connect request message 2723 (e.g., see examples below associated with messages 2735 and 2721) to the HAP Server 2705. The source action-connect request message is constructed based on the determined entities, roles and context. Then the HAP Server may check the user access privileges and determine if the requested action is permitted for the connection type and context. Following that the HAP Server may query for user record 2727 from the HAP Database 2703. For example, the database may be a relational database responsive to Structured Query Language ("SQL") commands. The HAP server may execute a hypertext preprocessor ("PHP") script including SQL commands to query the database for details of the user record. For example, if an address needs to be updated between entities (as discussed below in example message 2721), an example PHP/SQL command listing, illustrating substantive aspects of querying the HAP database 2727, is provided below:

```
<?PHP
header('Content-Type: text/plain');
mysql_connect("254.93.179.112",$DEserver,$password); // access
database server
mysql_select_db("CustomerProfile.SQL"); // select database table to search
//create query for Customerprofile data
$query = "SELECT Address_book FROM CustomerProfileTable WHERE
customer_ID LIKE '%' $123abc";
//other info type may be put here depending on the context
$result = mysql_query(5query); // perform the search query
mysql_close("CustomerProfile.SQL"); // close database access
?>
```

Then the HAP Database may reply with the user record 2729. After receiving the user record the HAP Server may perform action-connect 2731. Then the HAP Server may store the changes after the action 2733. For example, the HAP server may issue PHP/SQL commands similar to the example listing below to store the changes after action data 2733 in a database:

```
<?PHP
header('Content-Type: text/plain');
mysql_connect("254.92.185.103",$DBserver,$password); // access
database server
mysql_select("CustomerProfile.SQL"); // select database to append
mysql_query("INSERT INTO CustomerProfileTable
(timestamp Address_book)
VALUES (time( ),$Address_book"): // add data to table in database
mysql_close("CustomerProfile.SQL"); // close connection to database
7>
//other info type may be put here depending on the context
```

After that the HAP Server may send a HAP action-connect request 2735 (e.g., see examples below associated with messages 2721) to the Target Entity Server 2707. When the HAP action-connect request is received, the Target Entity Server may query for user record 2737 from Target Entity Database 2713. An example command listing, illustrating querying the Target Entity Database 2737 may be at least the same form as 2727. Then the Target Entity Database may return the user record 2739. After that the Target Entity Server may perform the action-connect 2741. Following that the Target Entity Server may store the changes after the action-connect 2743 to the Target Entity Database. Then the Target Entity Server may send an action-connect completed message with the target entity 2745 to the HAP Server. After receiving the action-connect completed message the HAP Server may store the message 2747 in the HAP Database. Following that the HAP Server may send an action-connect completed message 2749 to the Source Entity Server. An example action-connect completed message substantially in the form of a HTTP(S) POST message including XML-formatted data, 2749, is provided below:

```
POST /actioncomplete.php HTTP/1.1
Host: www.HAP.com
Content-Type: Application/XML
Content-Length: 667
<?XML version = "1.0" encoding = "UTF-8"?>
<wallet_customer_ID>xyz123</wallet_customer_ID
<action_request>
 <requestor>BoA</requestor>
 <source>BoA</source>
 <target>Amazon</target>
 <action>update: address value$</action>
<action_request>
<action_acknowledgment>
 <timestamp>2006-01-12 12:00</timestamp>
 <current_default_address>123 peace st., New York, NY
10001</current_default_address>
 <updated_entities>Amazon</updated_entities>
</action_acknowledgment>
```

Finally the Source Entity Server may store the action-connect completed message 2751 to the Source Entity Database 2711. Alternatively, the Requestor Entity 2701 may send a requestor action-connect request 2721 to the HAP Server. An example action-connect request (e.g., issuer Bank of America ("BoA") requests the issuer Bank of America to update default address with merchant Amazon), substantially in the form of a HTTP(S) POST message including XML-formatted data, (e.g., 2723, 2721, 2735), is provided below:

```
POST /updateaddress.php HTTP/1.1
Host: www.HAP.com
Content-Type: Application/XML
Content-Length: 667
<?XML version = "1.0" encoding = "UTF-8"?>
<security_template_level>subclass:abc 3.5</security_template_level>
<wallet_customer_ID>xyz123</wallet_customer_ID
<requestor>BoA
 <context>mobile
  <role1>source
   <entity1>BoA</entity1>
    <BOA ID>abc123</BOA ID>
    <BOA account number>PAN 5678 1234
9012</BOA account number>
   <info_type>Address</info_type>
    <current_default_address> 123 peace st., New
York, NY 10001</current_default_address>
   <action>update:BoA address value$</action>
  </role1>
  <role2>target
   <entity2>Amazon</entity2>
    <Amazon_ID>joesmith@gmail.com</Amazon_ID>
    <Amazon_password>jkwe%d134</Amazon_password>
   <info_type>Address</info_type>
//Current address on file prior to update: 567 Fashion Avenue,
Charlotte, NC //270001
   <action>update:BoA_address value$</action>
//Address now updated to: 123 peace st., New York, NY 10001
  </role2>
 </context>
</requestor>
```

Another example action-connect request (e.g., payment network Visa requests the issuer Chase to update card new expiration date with merchant Best Buy), substantially in the form of a HTTP(S) POST message including XML-formatted data, (e.g., 2723, 2721, 2735), is provided below:

```
POST /updatecardexpirationdate.php HTTP/1.1
Host: www.HAP.com
Content-Type: Application/XML
Content-Length: 667
<?XML version = "1.0" encoding = "UTF-8"?>
<security_template_level>subclass:yua 1.3</security_template_level>
<wallet_customer_ID>xyz123</wallet_customer_ID
<requestor>payment network:Visa
 <context>web
  <role1>source
   <entity1>Chase</entity1>
    <Chase ID>ewa123</Chase ID>
    <Chase_account_number>PAN 1234 9876
1098</Chase account number>
   <info_type>Chase_card_expiration_date</info_type>
   <action>read: Chase_card_expiration_date value$</action>
  </role1>
  <role2>target
   <entity2>Best Buy</entity2>
    <BestBuy_ID>joesmith@gmail.com</BestBuy_ID>
    <BestBuy_password>jkwe%d134</BestBuy_password>
   <info_type>Chase_card_expiration_date</info_type>
//Current Chase card expiration date on file prior to update: 10/2005
   <action>update: Chase_card expiration date
value$</action>
//Chase card expiration date now updated to: 10/2010
  </role2>
 </context>
</requestor>
```

Another example action-connect request (e.g., wallet provider Wallet requests the merchant Amazon to T-shirt size profile with V.me), substantially in the form of a HTTP(S) POST message including XML-formatted data, (e.g., 2723, 2721, 2735), is provided below:

```
POST /updateTshirtsize.php HTTP/1.1
Host: www.HAP.com
Content-Type: Application/XML
Content-Length: 667
<?XML version = "1.0" encoding = "UTF-8"?>
<security_template_level>subclass:dfg 2.2</security_template_level>
<wallet_customer_ID>xyz123</wallet_customer_ID
<requestor>wallet provider: V.me
 <context>mobile
  <role1>source
   <entity1>merchant:Amazon</entity1>
    <Amazon_ID>joesmith@gmail.com</Amazon_ID>
    <Amazon password>jkwe%d134</Amazon_password>
   <info_type>Preferences: Tshirt_size</info_type>
   <action>read: Preferences: Tshirt_size value$</action>
  </role1>
  <role2>target
   <entity2>wallet_provider: V.me</entity2>
    <Vme_ID>joesmith@gmail.com</Vme_ID>
    <Vme_password>jkwe%d134</Vme_password>
   <info_type> Preferences: Tshirt_size</info_type>
//Currently no T-shirt size on file
   <action>update:tshirt size value$</action>
//T-shirt size now added: large#
  </role2>
 </context>
</requestor>
```

After the requestor action-request is completed, the HAP Server may send a requestor action-connect acknowledgement message 2753 back to the Requestor Entity.

Figure 28:
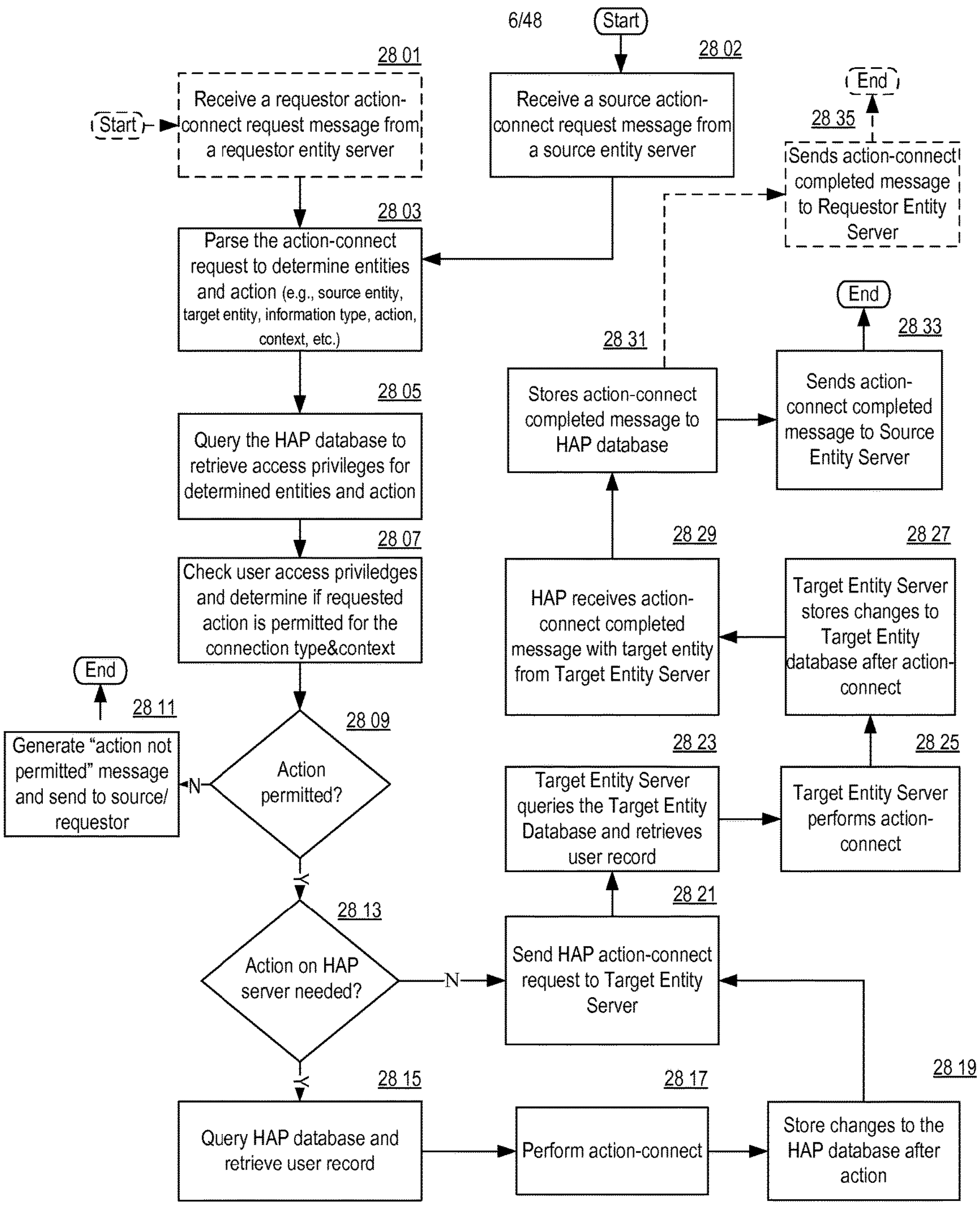
FIG. 28 shows a logic flow diagram illustrating example multi-directional connections, in some embodiments of the HAP.

FIG. 28 shows a logic flow diagram illustrating example multi-directional connections in some embodiments of the HAP. First the HAP Server may receive a source action-connect request message from a source entity server 2802. Then the HAP Server may parse the action-connect request to determine entities and action (e.g., the source entity, target entity, information type, action, context, and so forth) 2803. After that the HAP Server may query the HAP database to retrieve access privileges for the determined entities and action 2805. Following that the HAP Server may check the user access privileges to determine if the requested action is permitted for the connection type and context 2807. If the requested action is not permitted, then the HAP Server may generate an "action not permitted" message and send to the source requestor 2811, and the processor may end. If the requested action is permitted, then the HAP Server may check if any action on it is needed 2813. If an action is needed, then the HAP Server may query the HAP Database and retrieve the user record 2815. After that the HAP Server may perform an action-connect 2817. Following that the HAP Server may store the changes to the HAP Database after the action 2819. Then the HAP Server may send a HAP action-connect request to the Target Entity Server 2821. After receiving the request the Target Entity Server may query the Target Entity Database and retrieve the user record 2823. Then the Target Entity Server may perform an action-connect 2825. Following that the Target Entity Server may store the changes to the Target Entity Database after the action-connect 2827. The HAP Server may receive the action-connect completed message with target entity from the Target Entity Server 2829. After receiving the action-connect completed message the HAP Server may store the action-connect completed messages to the HAP Database 2831. Then the HAP Server may send the action-connect completed message to the Source Entity Server 2833. Finally the Source Entity Server may store the action-connect completed message to the Source Entity Database. Alternatively the HAP Server may receive a requestor action-connect request message from a Requestor Entity Server 2801. After the requestor action-connect request is completed the HAP Server may send a requestor action-connect completed message to the Requestor Entity Server 2835.

Figure 29A:
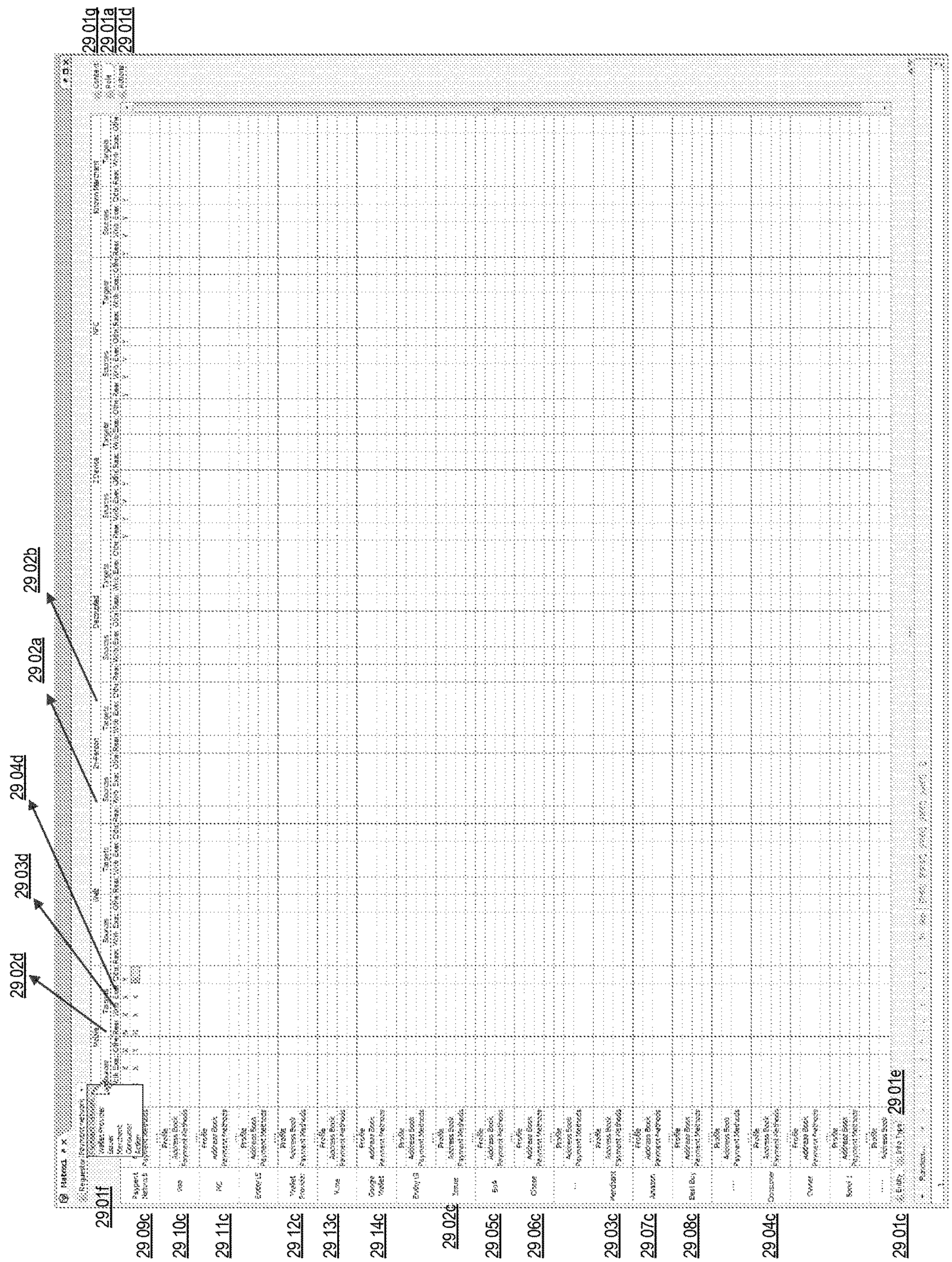

FIGS. 29A-29G show example access privileges in some embodiments of the HAP. Referring to FIG. 29A, in some embodiments, the user access privileges settings are n-dimensional including axes of settings. For example, one axis of settings may be role1 2901*a*, which may be sources. One axis may be role2, which may be targets 2902*b*. One axis may be entity 2901*c*, which may include general entities such as, but not limited to: issuers 2902*c*, merchants 2903*c*, consumers 2904*c*, payment network 2909*c*, wallet provider 2912*c*; and specific entities such as, but not limited, Bank of America 2905*c*, Chase 2906*c*, Amazon 2907*c*, Best Buy 2908*c*, Visa 2910*c*, Mastcard 2911*c*, Wallet2913*c*, google wallet 2914*c*; and/or the like. A list of general entities is discussed in FIG. 25. Another axis of settings may be actions 2901*d*, which may include read 2902*d*, write 2903*d*, execute 2904*d*, and others. A list of action types is discussed in more details in FIG. 29G. Yet another axis may be information type 2901*e*, which may include profile, address book, payment methods, and others. A list of information type is discussed in more details in FIG. 29G. Another axis may be requestors 2901*f*, which may include any entities discussed above. Another axis may be context 2901*g*, which may include mobile, web, in person, decoupled transactions, device transactions, near field communication, known merchant. All axes may be reconfigured in many different ways and still maintain its settings.

In some embodiments, a data structure may be generated for any cell in the n-dimensional array of settings, where each axis of array may be represented by these visual access handles (e.g., 2901*a*, 2901*e*, 2901*f*, 2901*g*, etc.). Alternatively, the axes dimensions may be represented by database tables, wherein any of the value fields in the database tables may be key fields that are joinable with other database tables.

Figure 29B:
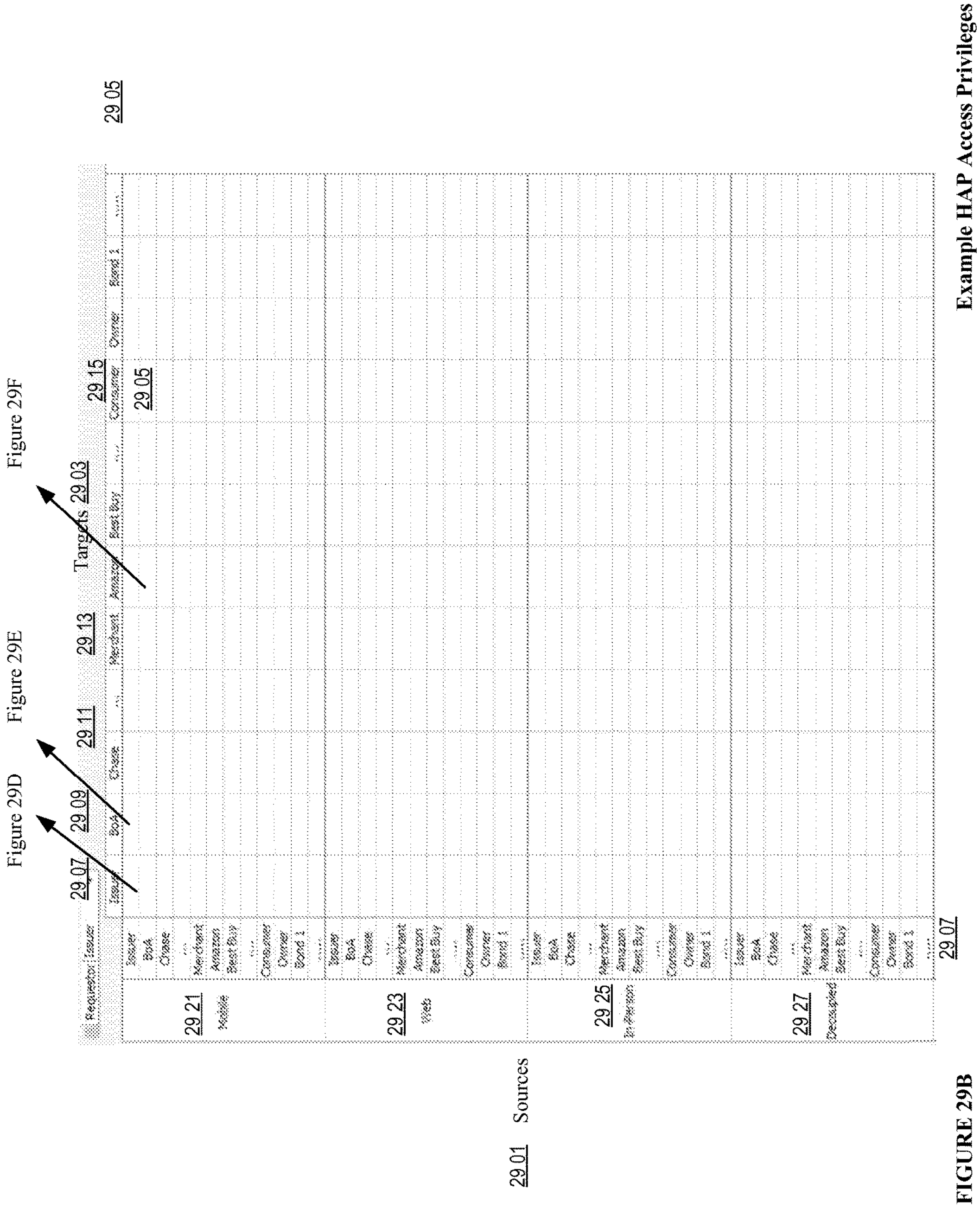
Figure 29C:
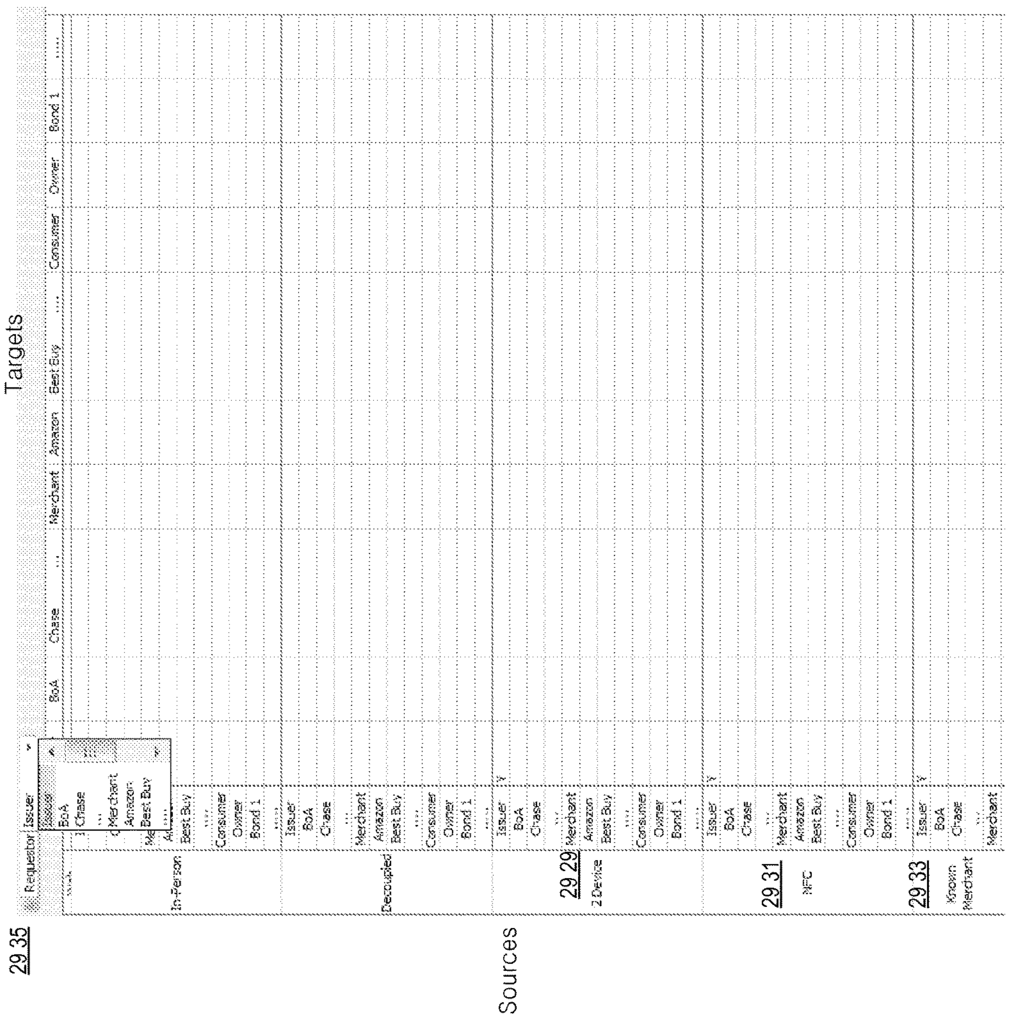

Referring to FIGS. 29B and 29C, in some embodiments, an access privilege may be defined between a source entity 2901 and a target entity 2903. Access privileges may also be defined for an entity category, for example, issuers 2907, merchants 2913, consumers 2915, and/or the like, and it may also be defined for a specific entity, for example, issuers like Bank of America (BoA) 2909, Chase 2911, merchants like Amazon, BestBuy, consumers like owner, bond 1 (spouse of the owner), bond 2 (child 1 of the owner), shipping carriers like Fedex, UPS, and/or the like. In some embodiments, when the HAP enables a connection between entities, the access privileges may be checked to determine what actions and information types are allowed for this connection. Detailed discussions of access privileges between a source and a target are shown in FIGS. 29D-29F.

In some embodiments, access privileges may be different for different contexts of the connection. The connection may be requested via contexts including but not limited to, mobile 2921, web 2923, in-person 2925, decoupled transactions 2927, 2-device transactions 2929, near field communication ("NFC") 2931, known merchant 2933, and/or the like. In some embodiments, decoupled transactions allow decoupling a digital wallet checkout experience from having to completed in the same domain or platform where it started. Decoupled transactions enable consumers to manage and authorize transactions through their own personal preferred channel (e.g., a personal device) regardless of the platform there were on initially. Two-device transactions may 25 allow transactions to be authorized by two difference devices of the owners.

In some embodiments, a connection may be initiated by a source entity or a target entity to communicate between the source and the target through the HAP. In other embodiments, a connection may be initiated by a requestor entity 2935 which requests communication between a source entity and a target entity through the HAP. For example, an issuer may initiate a connection to a target entity to push a newly issued card information to the target entity. For another example, a consumer may initiate a connection and request a merchant, as a source entity, to update address with an issuer, as a target entity. Any entity in FIG. 25 may be a requestor entity.

FIG. 29D shows example access privileges when the requestor entity, source entity, and the target entity are issuers, and the transaction context takes place in a mobile environment 2937. Access privilege is shown for each action type 2947 and information type 2949. A list of example actions and information types is discussed in FIG. 29G. Referring to FIG. 29D, when connection is requested to be established by a first issuer between a second issuer and a third issuer in a mobile environment, for an example, profile may be viewed with tokenized 2949, while full view is not allowed 2953. Masked view is allowed and also locked 2951 so that this privilege type may not be changed. For another example, social network may be added 2955 based on conditions.

FIG. 29E shows example access privileges when the requestor entity is an issuer, the source entity is an issuer, the target entity is Bank of America, and the transaction context takes place in a mobile environment 2957. As an issuer, Bank of America may include some access privileges that may be the same as FIG. 29D, and some access privileges that may be unique. FIG. 29F shows example access privileges when the requestor entity is an issuer, the source entity Bank of America, the target entity is merchant Amazon, and the transaction context takes place in a mobile environment.

FIG. 29G shows a list of example actions and information types.

Figure 30A:
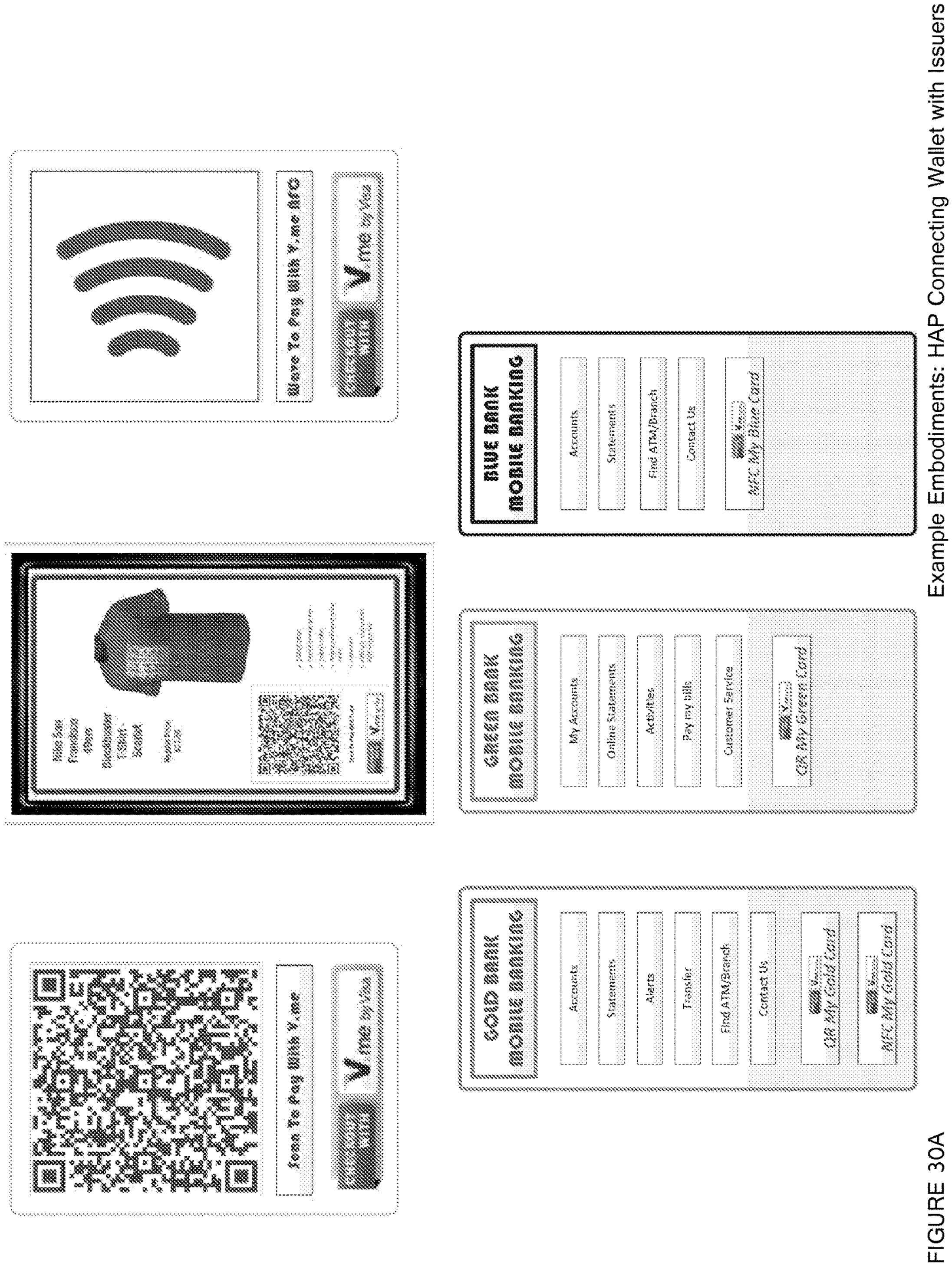
FIGS. 30A-30B show example user interfaces illustrating HAP connecting wallet with issuers, in some embodiments of the HAP.
Figure 30B:
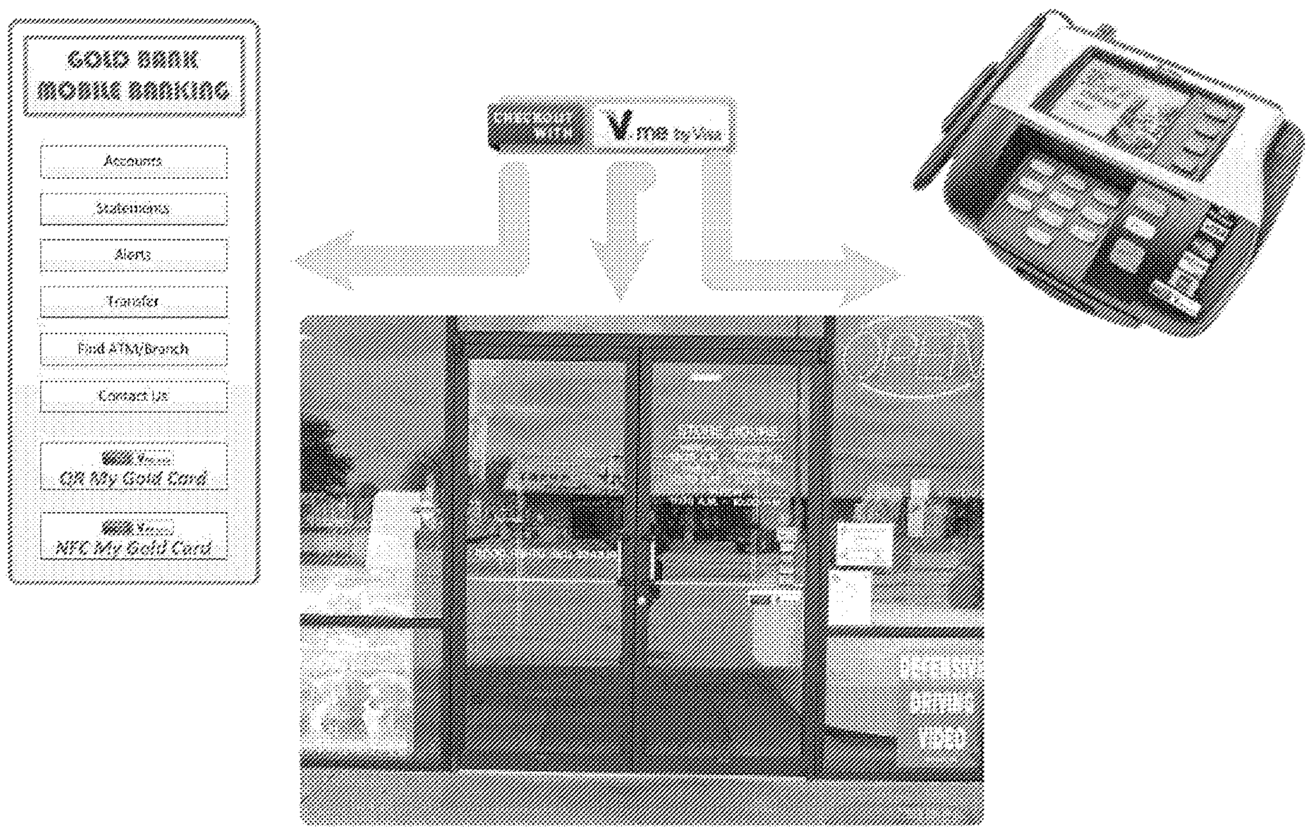
Figure 31A:
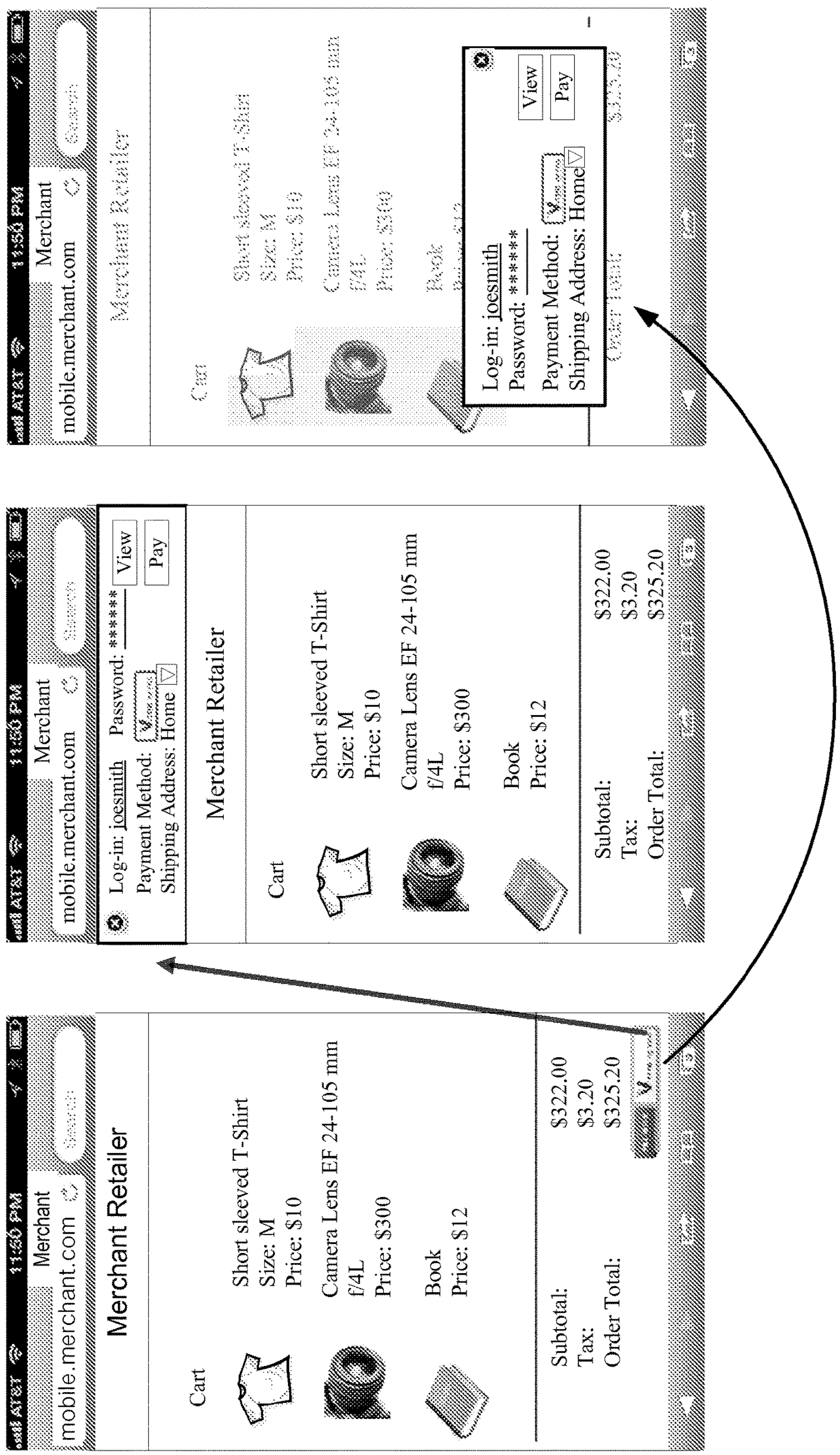
Figure 31D:
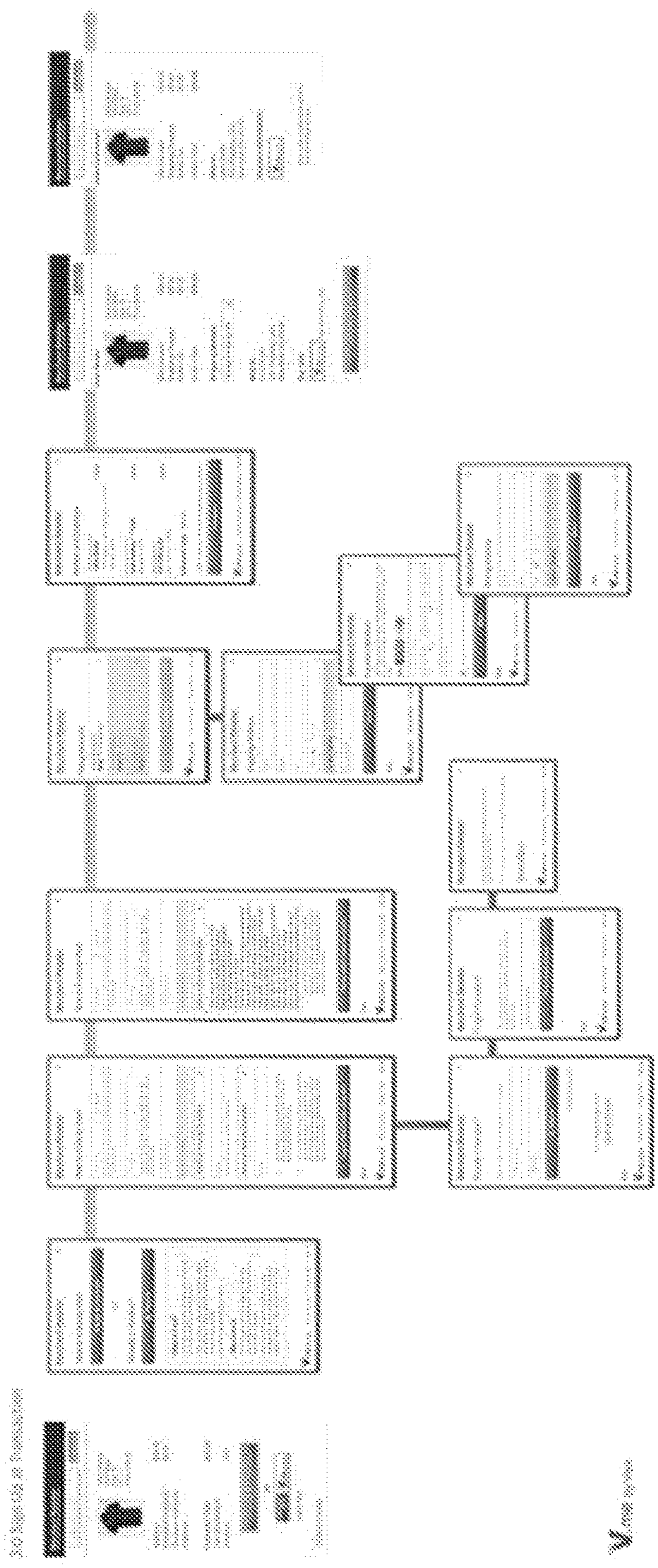
Figure 31E:
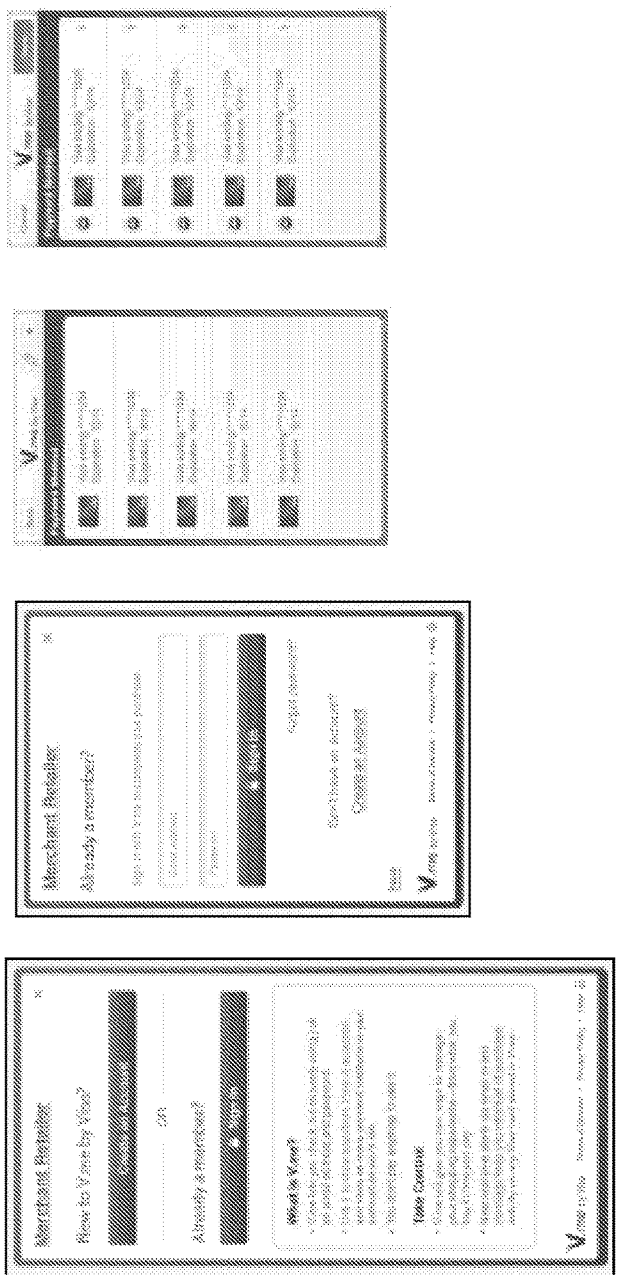
Figure 31H:
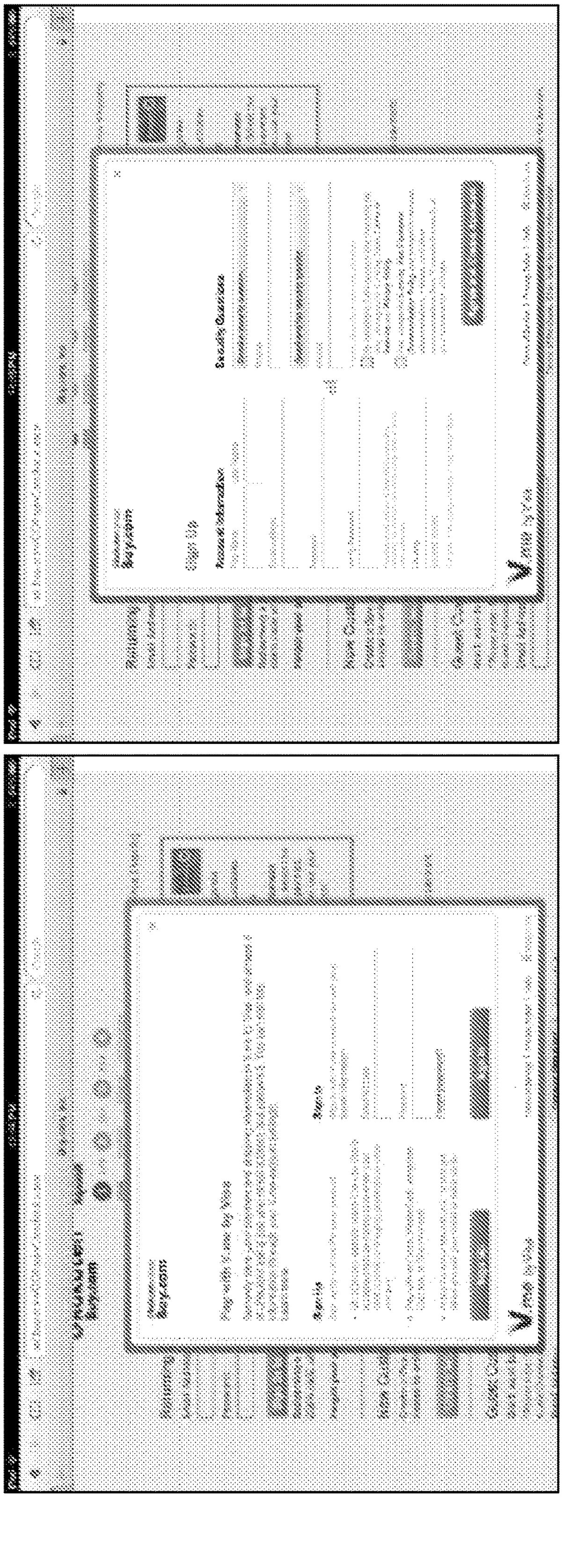
Figure 31I:
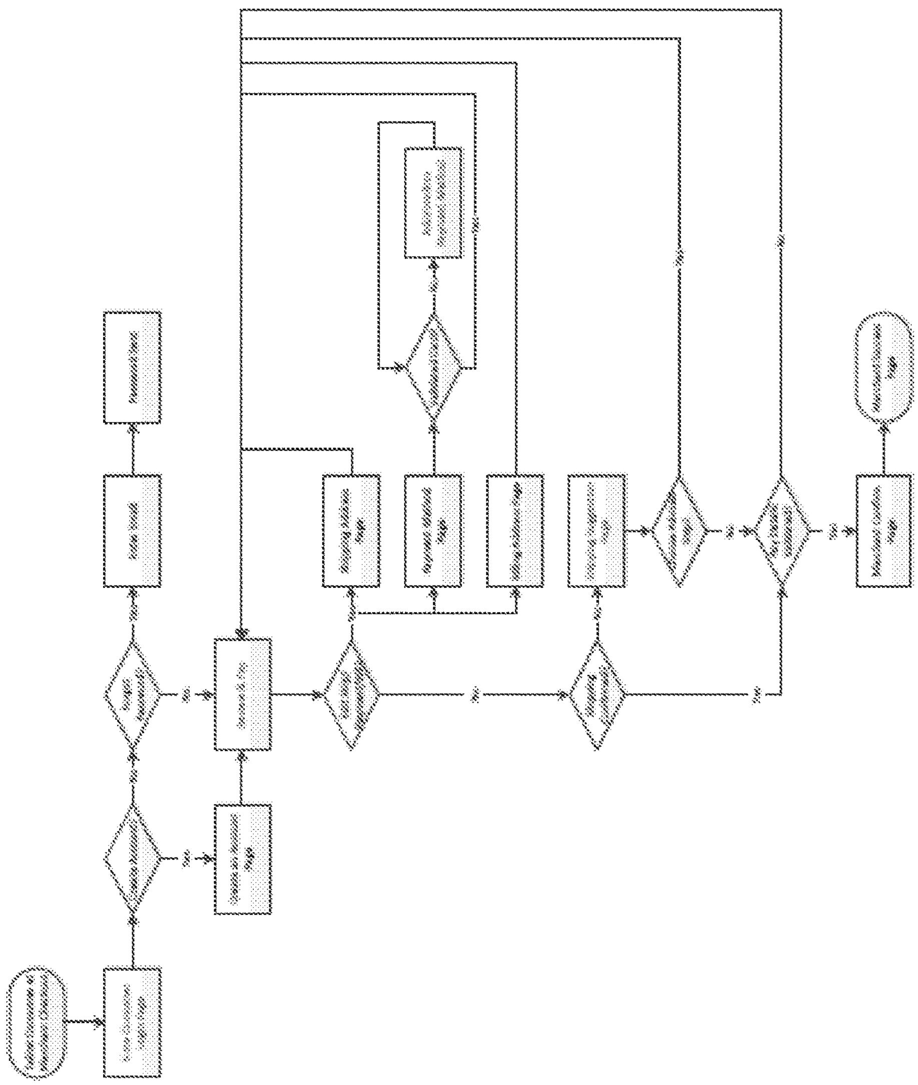

FIGS. 30A-30B show example user interfaces illustrating HAP connecting wallet with issuers in some embodiments of the HAP. In some embodiments, consumers have grown accustomed to expect seamless user experience and simplicity at the physical point of sale. Consumers using mobile banking applications on their mobile devices may be authenticated by their issuer using existing issuer credentials. Sensitive information are typically not entered and mainly viewed for enhanced security. Issuer mobile applications may be powered with the HAP capabilities, which may provide the following features: 1) Consumer may be authenticated, provisioned and distributed by the issuer; 2) the features may be embedded within the issuer App; 3) powered by wallet SDK(s); 4) Enabling technologies and preferences selected by the issuer; 5) Issuer embeds the wallet SDK in their mobile app; 6) Issuer updates their existing installed mobile app base; 7) Issuer updates their T&Cs to include the usage of the app for Payment; 8) Issuer may automatically enable the SDK for all the user's cards or prompt the user to select the cards to be enabled with the SDK; 9) Issuer may elect to link other services to the wallet SDK payment; 10) Issuer provides a data feed of the provisioned users to wallet for tracking and analytics. In some embodiments, user experience At Physical Retail: 1) User shops at a Wallet participating merchant store; 2) When the user is ready to pay at the cashier or self checkout; 3) The user selects the bank mobile app he wants to use for this payment; 4) This implicitly implies that the user is electing to use this issuer card for completing this transaction; 5) User is authenticated to his bank using his bank mobile credentials based is on the issuer authentication levels settings; 6) Upon successful user authentication, bank enables the Wallet SDK for the given card; 7) User presents his phone to the is terminal to complete the payment using card NFC or card QR.

In some embodiments, an issuer mobile app contains only issuer cards (i.e., no competing cards). Payment network provides the issuer the Wallet SDK package and documentation. In some embodiments, issuers may integrate Wallet SDK in their own apps and can test against Payment certification process as usually done for the base Payment network products. In some embodiments, issuers have full view of the transactions and the consumers receive the service and the support directly from their issuers. No federation required in this phase, given it is and issuer provided service for the issuer cards and authenticated by the issuer. In some embodiments, Wallet can provide additional capabilities if requested by the issuer. In some embodiments, Wallet mobile reference app is available for issuers who do not have a mobile app or do not wish to integrate the Wallet SDK into their existing apps. In some embodiments, Wallet may benefit by taking advantage of the installed base of mobile banking. Issuers are vested deeply in promoting Wallet as it is a direct promotion of their own brand and services. Wallet can focus on solving the issues that would accelerate acceptance and differentiate Wallet and Payment network from the competition.

In some embodiments, for Consumers desiring to benefit of the Wallet capability for in-app payment and in e-commerce, the consumer may need: 1) to create a Wallet account, with Wallet credentials. The consumer can create the account directly with Wallet through the Wallet destination site or Wallet mobile app or Lightbox during shopping. The consumer is asked to choose the participating Wallet bank from which to link his information to wallet. 2) Link his information at his issuers to his wallet created account. The consumer is redirected to his issuer where he logs in and data provisioning to Wallet occurs. Some consumers may elect to create a Wallet account and manually enter their information even if their issuer is Participation. For non-participating banks, the consumer may enter the information manually in wallet. If a consumer has established a Wallet account and credentials, the consumer can log on to his Wallet account through his issuer online banking. The consumers logs on to his issuer online banking and clicks on wallet. The consumer is federated from their issuers to wallet. Wallet identifies validates the federation for the given issuer and for the given user. The consumer may see a Wallet view providing a specific issuer only information.

The consumers may not be able to see the cards and services not associated with this issuer. If the consumer elects to see the cards not belonging to this issuer, the consumer may log on to Wallet with the Wallet credentials. Wallet may have multiple SDK, certain SDKs may be for issuers, others may be for merchants and partners. In addition to the core payment functionality, the SDK package may include the ability to enroll, add payment instruments, authentication and credential management, device finger printing all package in a secure hardened. The SDK has a set of modules that the issuer can elect to use or provide their own. The intention is not to create a custom development and ensure that the base is simple and modularized to reduce the future support needs. The VDC may be the storefront for distributing the SDK(s). Wallet may create a reference app that may use the modularized SDK to support the smaller issuers as well other markets outside the US. The issuer may control the user experience based on guidelines provided by wallet. Wallet provides guidelines to match the SDK functionality and to ensure consistent user experience and performance. The merchant SDK may have different merchant features. The user experience and the authentication in a merchant SDK is a Wallet standard and all the credentials used for the payment may be Wallet credentials. the plan is to partner with other third parties to enhance the functionality and the value proposition Package. Make it simple, modularize, enhance security, guide and Certify.

FIGS. 31A-31I show example user interfaces and a logic flow diagram illustrating wallet overlay on mobile devices (e.g., mobile phones, tablets, etc.) in some embodiments of the HAP. In some embodiments, Wallet may enable a tablet-optimized checkout to help consumers intuitively and seamlessly checkout online on their iPad by leveraging payment platform. The HAP may increase flow conversion through the tablet checkout channel; Increase overall mobile plus tablet transaction volume; Incremental new consumer adoption through the tablet checkout channel. In some implementations, for the current mobile web checkout experience, apply the updates for the mobile (iPhone & iPad) checkout that includes adding a new payment method, checkout details and other UX updates.

In some embodiments, checkout details treatment includes: display the purchase details such as shipping, discount, etc. as an expand/collapse section in the review page. Other features include: I Increase the dimensions of the checkout lightbox for the iPad flow; reduce number of "touches" into fields with auto-next; use a lightbox overlay from the merchant's site for the iPad flow; maintain the checkout window dimensions in both the landscape and portrait modes; enhancements for the visual design and interaction elements. standard handling of the footer UI.

In some embodiments, in addition to the above, additional framework changes to the mobile checkout experience would improve the user experience and funnel conversion for both new and existing Wallet consumers.

In some embodiments, change the initial landing page that currently displays the "Create an Account" and "Sign In" links to the "Log In" page directly. This page also has a "Create an Account" link and is standard with other Web & mobile sites.

In some embodiments, as upon sign-up or login, the consumer may be directed to the Review & Pay page, without any greyed out areas. There they can submit their shipping, payment and billing details in a non-linear flow. If there is no information yet, the consumer can begin adding in their details.

In some embodiments, the ability to add a new payment method during the checkout flow, and be able to select it for the current checkout. The ability to remove a payment method during the checkout flow, which should then be removed from the consumer's wallet.

In some embodiments, as a consumer, I want to be reduce the number of steps and touches when I checkout on my iPad device. Given: A consumer is shopping on the merchant site via their mobile browser on their iPad And: a merchant has integrated and has the Wallet buy widget available on their site. When: the Wallet checkout lightbox is loaded. Then: the consumer should still see the merchant site behind the lightbox for all pages (sign up, log in, payment). And: the spacing and field formats should be optimized for the iPad retina & non-retina displays for all pages (sign up, log in, payment). And: interaction elements (buttons, links, behaviors) use iOS standard experiences for all pages (sign up, log in, payment).

In some embodiments, as a consumer, I don't want to be shown multiple pages to choose between logging in and signing up. Given: A consumer is shopping on the merchant site via their mobile browser on their iPad. And: a merchant has integrated and has the Wallet buy widget available on their site. When: the Wallet checkout lightbox is loaded. Then: the consumer should be shown a log in page first that may also have a link to sign up.

In some embodiments, as a Wallet consumer, I want to be able to see what information is required and complete checkout non-linearly to provide the required payment information. Given: A consumer is shopping on the merchant site via their mobile browser on their iPad. And: a merchant has integrated and has the Wallet buy widget available on their site. When: the Wallet checkout lightbox is loaded. And: the consumer has either signed up or logged in successfully. Then: the consumer may first be directed to review page to confirm or provide the ship, pay or bill info individually regardless of having a saved profile or not.

In some embodiments, as a Wallet consumer, I want to be able to add new, remove and edit credit cards in my wallet directly from checkout on my iPad device. Given: A consumer is shopping on the merchant site via their mobile browser on their iPad. And: a merchant has integrated and has the Wallet buy widget available on their site. When: the Wallet checkout lightbox is loaded. And: the consumer has either signed up or logged in successfully. Then: the consumer can click from the review page to the Payment Method page to select or make changes to their wallet. And: the consumer can add additional credit cards to their wallet from the Payment Method page. And: the consumer can edit an existing or newly added credit cards in their wallet from the Payment Method page. And: the consumer can remove any existing or newly added credit cards in their wallet from the Payment Method page.

In some embodiments, as a Wallet merchant, I want an optimized mobile experience for my customers who are transacting on my site on their iPad without having to configure a separate mobile tablet configuration. Given: A merchant who has on-boarded and integrated Wallet on their site. And: the merchant has not configured a separate setting to enable mobile. And: a consumer is shopping on the merchant site via their mobile browser on their iPad. When: the consumer touches the Wallet buy widget after adding items to the cart. Then: the checkout lightbox should display as an overlay on top of the merchant site in an iPad-optimized format and UX for both retina & non-retina display through the end-to-end checkout experience.

In some embodiments, on the Review & Pay page, move the checkout details that lists out the Subtotal, Shipping, Gift Wrap, Discount, Misc, Tax info under the total price as an expand/collapse. Originally this was displayed at the bottom of the page, which forced the consumer to look towards the bottom of the review page in order to confirm the appropriate amount. The amount should be the first value for the consumer to confirm their purchase.

In some embodiments, in both landscape and portrait modes, the checkout lightbox should have the same dimensions regardless of orientation. For retina displays on iPhone & iPad, the display may need to be double the resolution for visual assets ("@2x~ipad" suffix for images).

In some embodiments, for the tablet checkout, the checkout widget should be displayed as a lightbox overlay on top of the merchant checkout. So both in portrait and landscape views, the lightbox should be overlain over the merchant's site. The background should be greyed out in order to call attention to the checkout lightbox.

In some embodiments, the input fields in the checkout light should focus the text field sequentially for the next responder chain through the form fields. The order should go from left-to-right and top-to-bottom. □The widget may recognize the user agent as iPad, which would then render the tablet checkout overlay as a lightbox.

In some embodiments, the mobile checkout may use a full page overlay that covers the screen completely. Currently, the links on the review page use a I "Change" hyperlink. Replace the hyperlink with the HTML5 mobile standards to make the enter row a link for the Shipping, Payment Method and Billing update functions.

In some embodiments, the current mobile links for the footer are difficult for consumers to open. So instead of the standard Web hyperlinks for the Terms of Service, Privacy Policy and Help, use the HTML5 mobile standards of using the horizontal bar as the footer links.

In some embodiments, for text or mixed-text fields, display the standard keypad by default. For digit-specific fields like the credit card number field, the keypad should use the numeric keypad only to improve the user experience. □Images for issuer card art may be loaded and displayed according to the size ratio specifications. The default card art images for other cards should have the "@2x_ipad" suffix. Images should not change their aspect ratio going from non-retina to retina display, or from portrait to landscape orientation.

In some embodiments of the Non-linear Checkout Flow, from the merchant checkout page, the following page that is displayed in the current mobile flow is the Wallet Create/Sign In page. This page is a redundant step that impedes flow conversion through checkout for the tablet experience.

Therefore the Wallet Create/Sign In page should be removed and the initial step should just display the Sign In page directly. That page still allows the user to sign up through a single page following clicking the "Create an Account" link from this page.

In some embodiments, the "Review and Continue" page may now be the central page for the Wallet checkout flow. So immediately following sign in or enrollment, the consumer may be directed to the "Review and Continue" page. If the consumer doesn't have any saved info in CS (getShippingDetail and getPaymentProfile), then the fields for shipping, payment method and billing may be blank. If the consumer does have saved info in CS, then the fields may be pre-populated on the "Review and Continue" page. If the non-Payment credit card being used has not yet been validated (CVV) and the consumer tries to complete the transaction from the "Review and Continue" page, then the consumer may be directed to update their payment method info. The credit card form fields may be pre-populated (masking the PAN except for the last four digits) and may be greyed-out/disabled. A message may be displayed to the consumer that they need to enter in their CW in order to validate their credit card. □The field cursor should be on the CVV field in order for the consumer to complete their validation.

In some embodiments, if the first card returned by CS is expired and the consumer tries to complete the transaction from the "Review and Continue" page, then the consumer may be directed to the payment method page to change or add a new payment method. A visual call-out may be displayed to the consumer for cards that are expired in their wallet. The expired card may be greyed-out/disabled from being selectable. The consumer can then go through completing each of the shipping, payment method and billing in a non-linear flow. Upon every submission for add or update to the shipping, payment method or billing pages, the consumer is return back to the "Review and Continue" page where they can complete the transaction.

In some embodiments, when the consumer enters in their shipping address and selects that they want to use the address as their billing for the purchase, then after continuing back to "Review and Continue" page both the shipping and billing fields should have the addresses. And from the "Review and Continue" page, the shipping address should be validated ("validatePurchase") with CYBS via CS. If there's a mismatch, then the consumer should be displayed with shipping address suggestion page where the consumer can either choose their own shipping or the system suggestion. If the consumer chooses the system suggestion, then they are redirected to the "Review and Continue" page to re-confirm the transaction. Otherwise, the transaction may be submitted for processing. Enabled for US & Canada only at this time.

In some embodiments, the updated Payment Method page should update the UX treatments for the "Back" button, along with the ability to add a new payment method ("+"). From the same page, a button to edit or remove at the top of the page should be presented. To edit, the consumer should click the top edit button, then select the row of the payment method to make the changes (update back to CS). To remove, the consumer should click the top edit button, then touch the "–" icon button to remove to the payment from the wallet (update back to CS). If there are no payment methods in ii the wallet, then the button should be greyed-out/disabled.

Figure 32A:
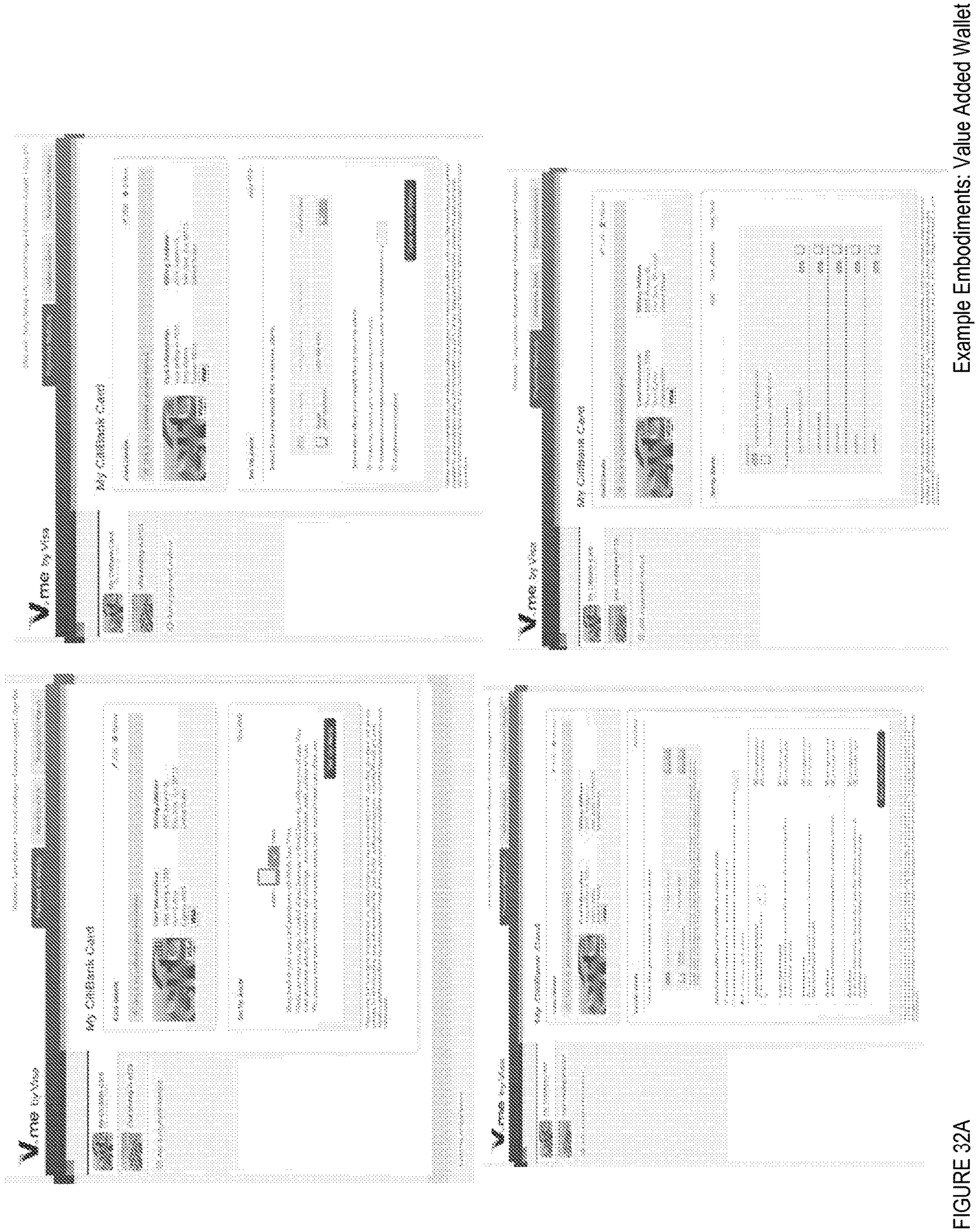
FIGS. 32A-32U show exemplary embodiments of value added wallet features and interfaces, in some embodiments of the HAP.
Figure 32B:
Figure 32C:
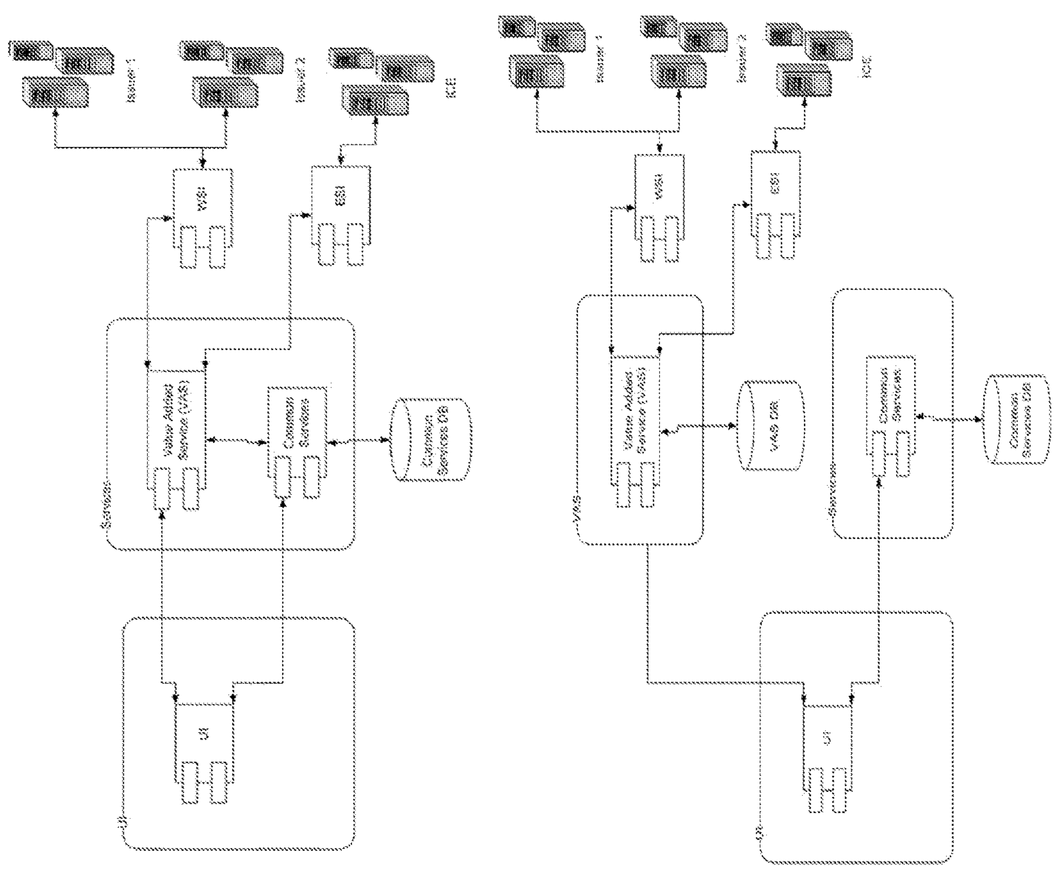
Figure 32D:
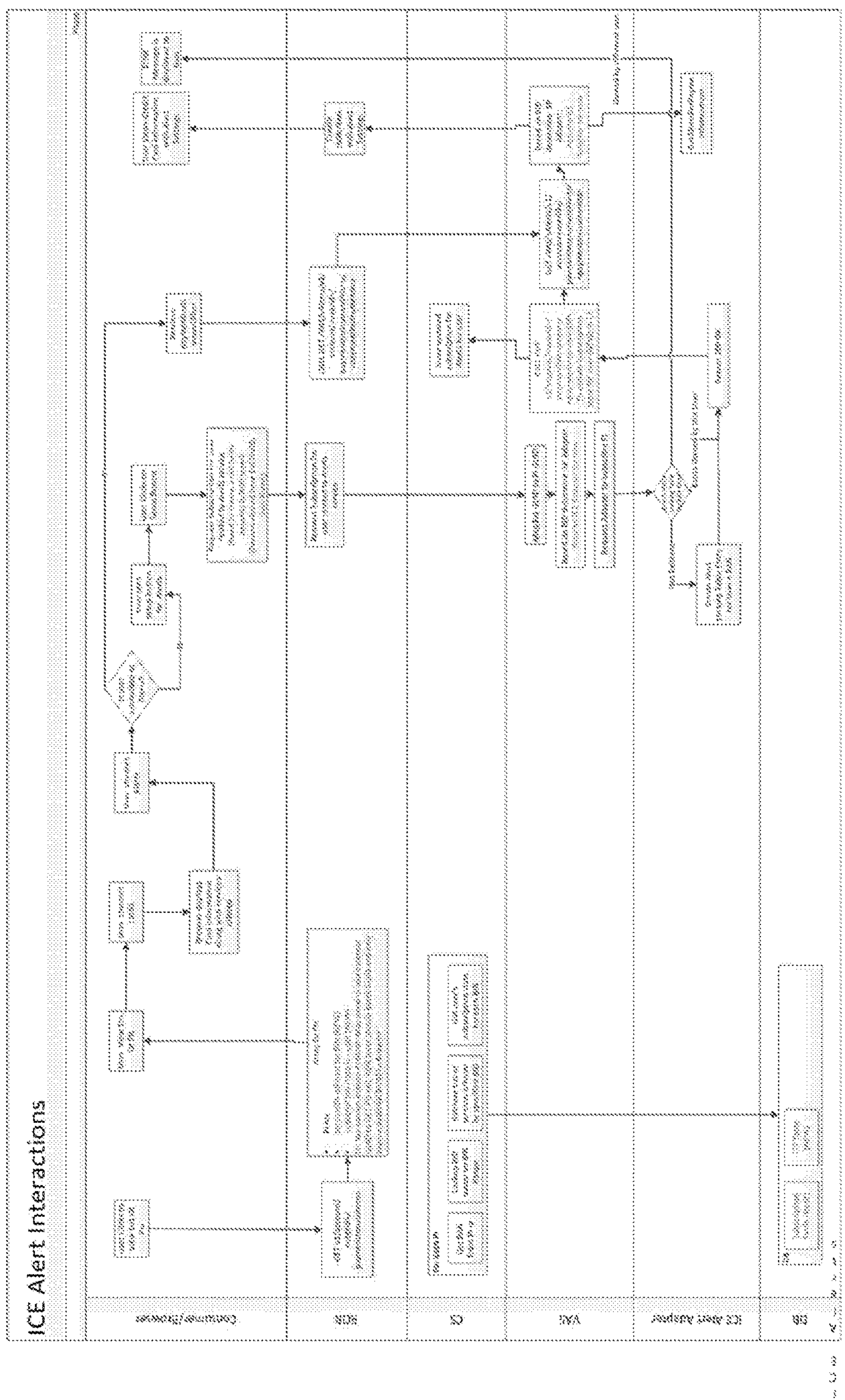
Figure 32E:
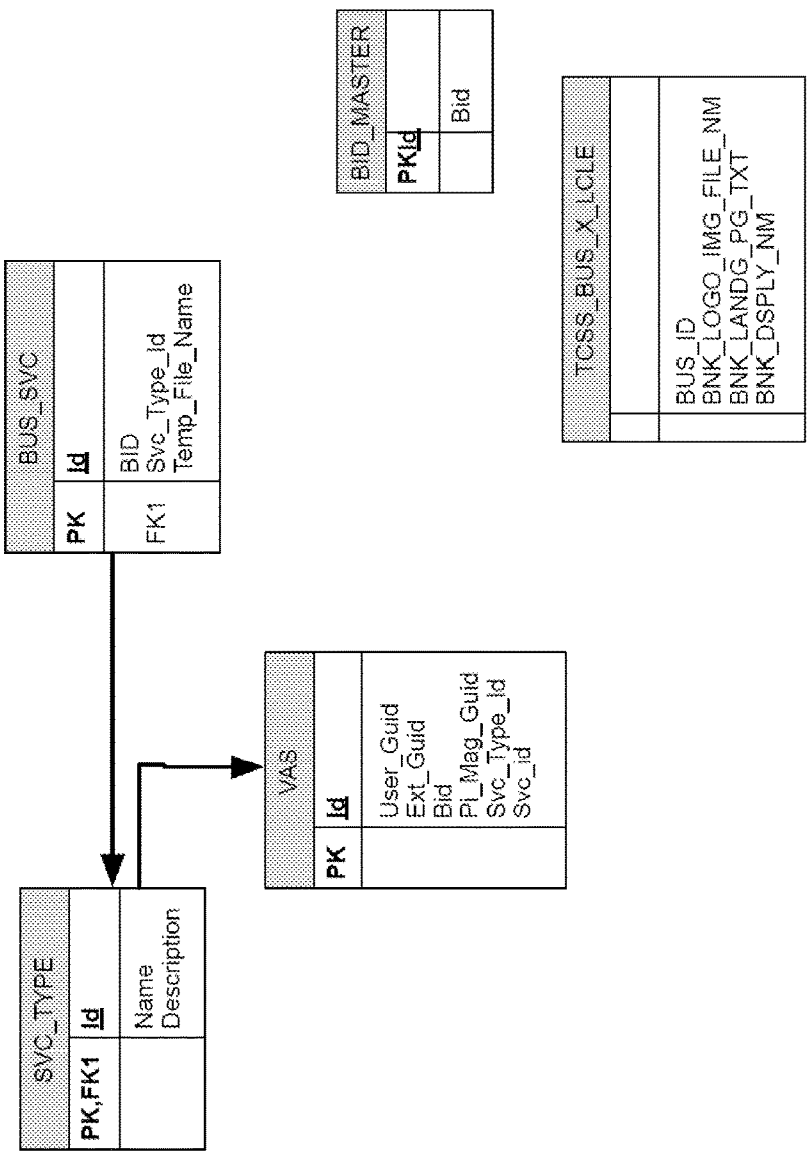
Figure 32F:
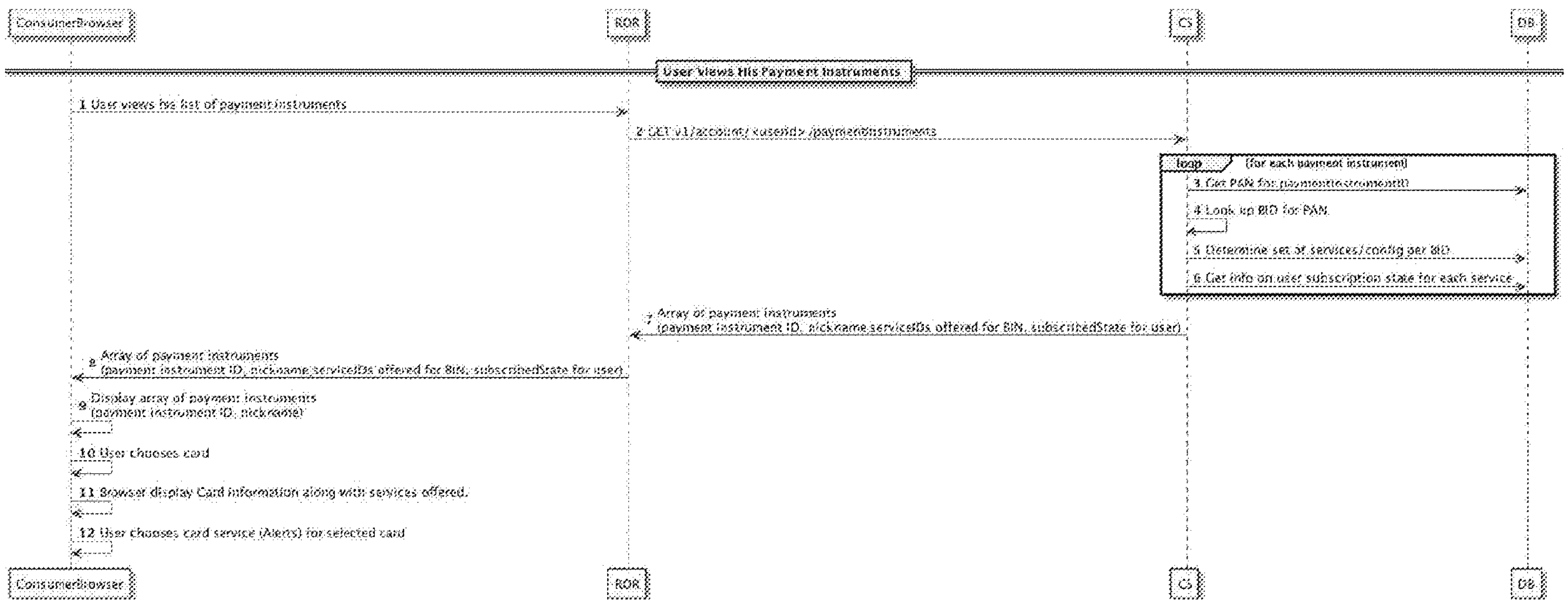
Figure 32G:
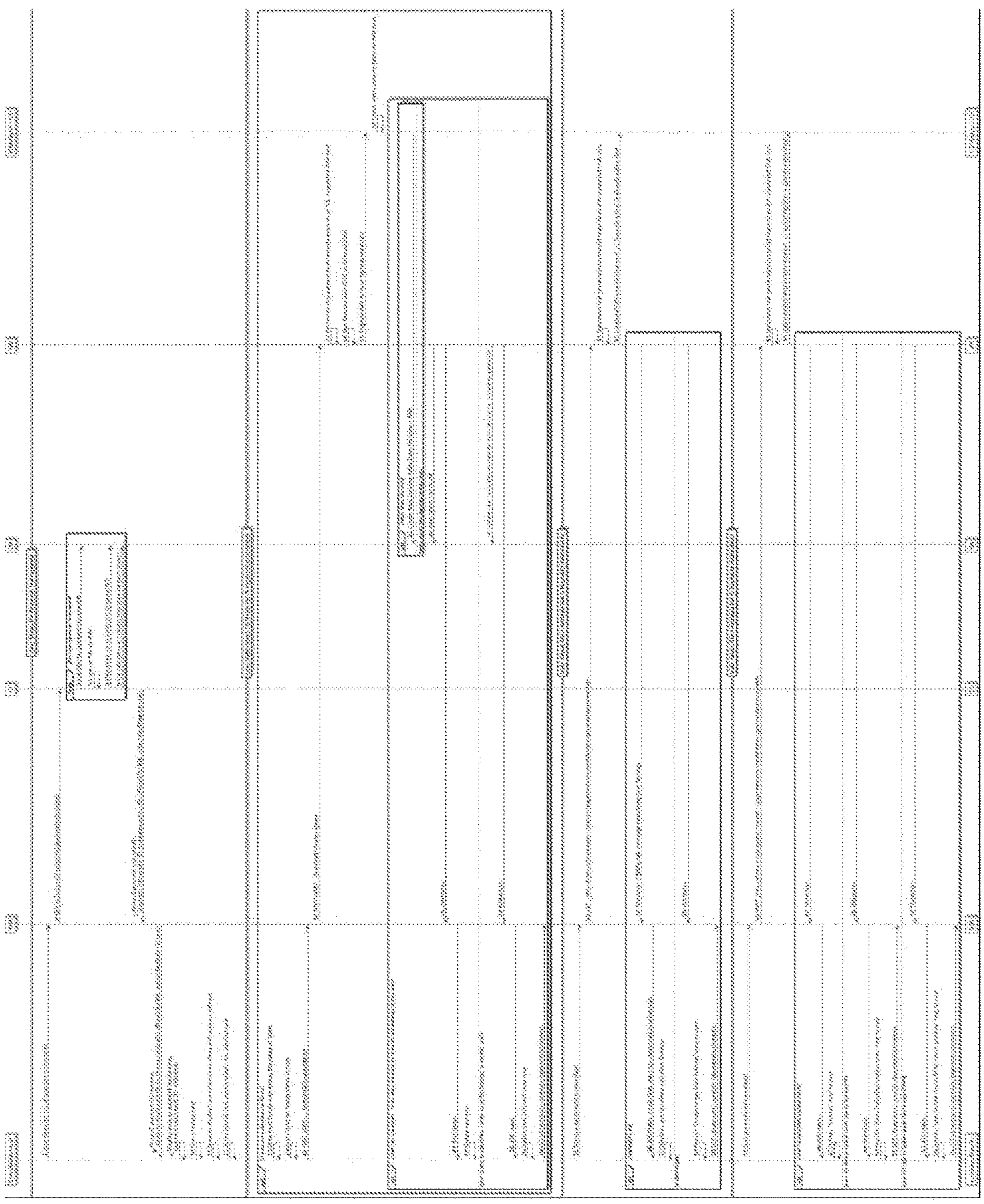
Figure 32H:
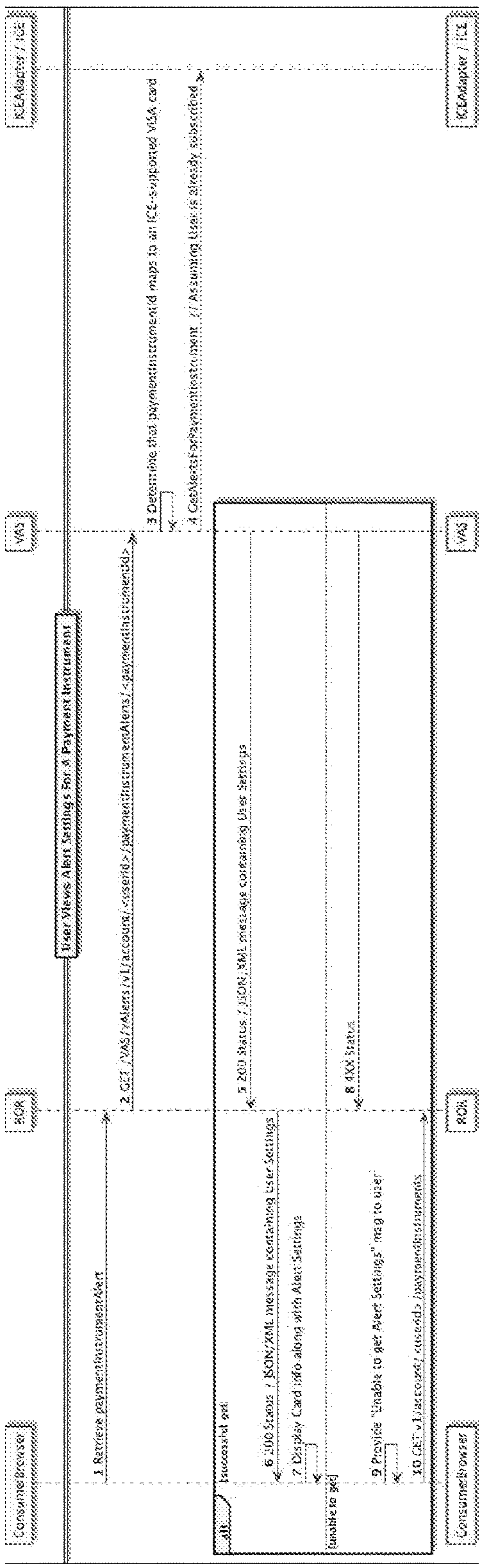
Figure 32I:
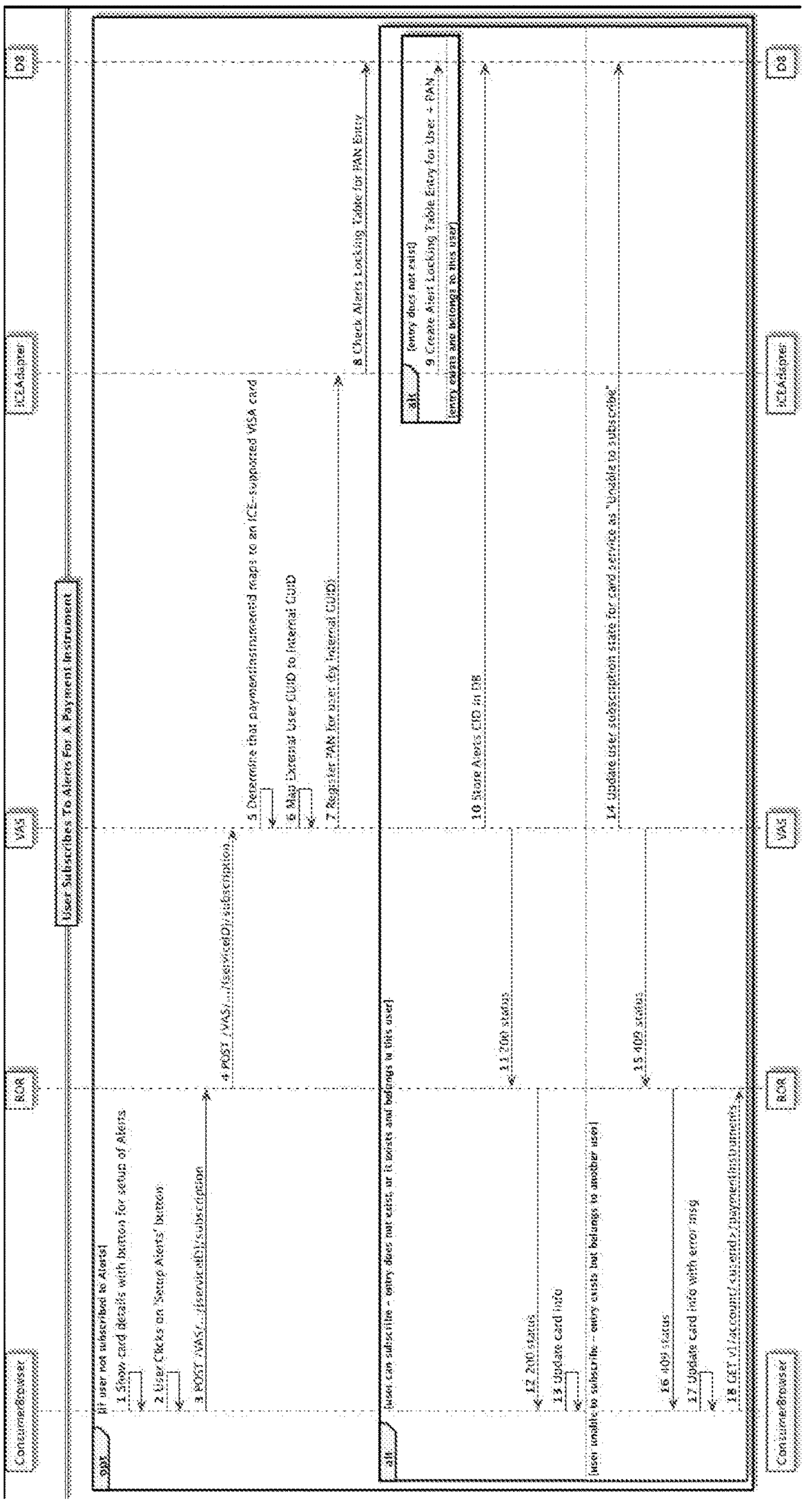
Figure 32J:
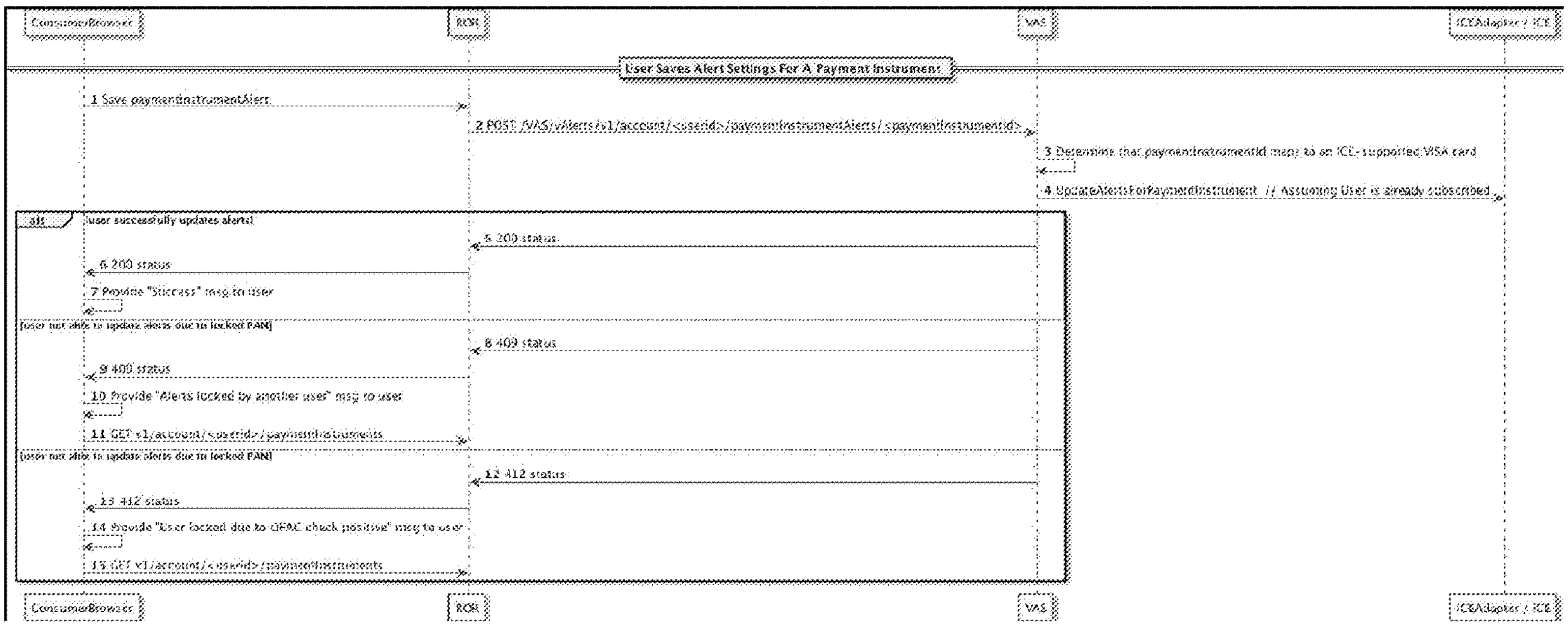
Figure 32K:
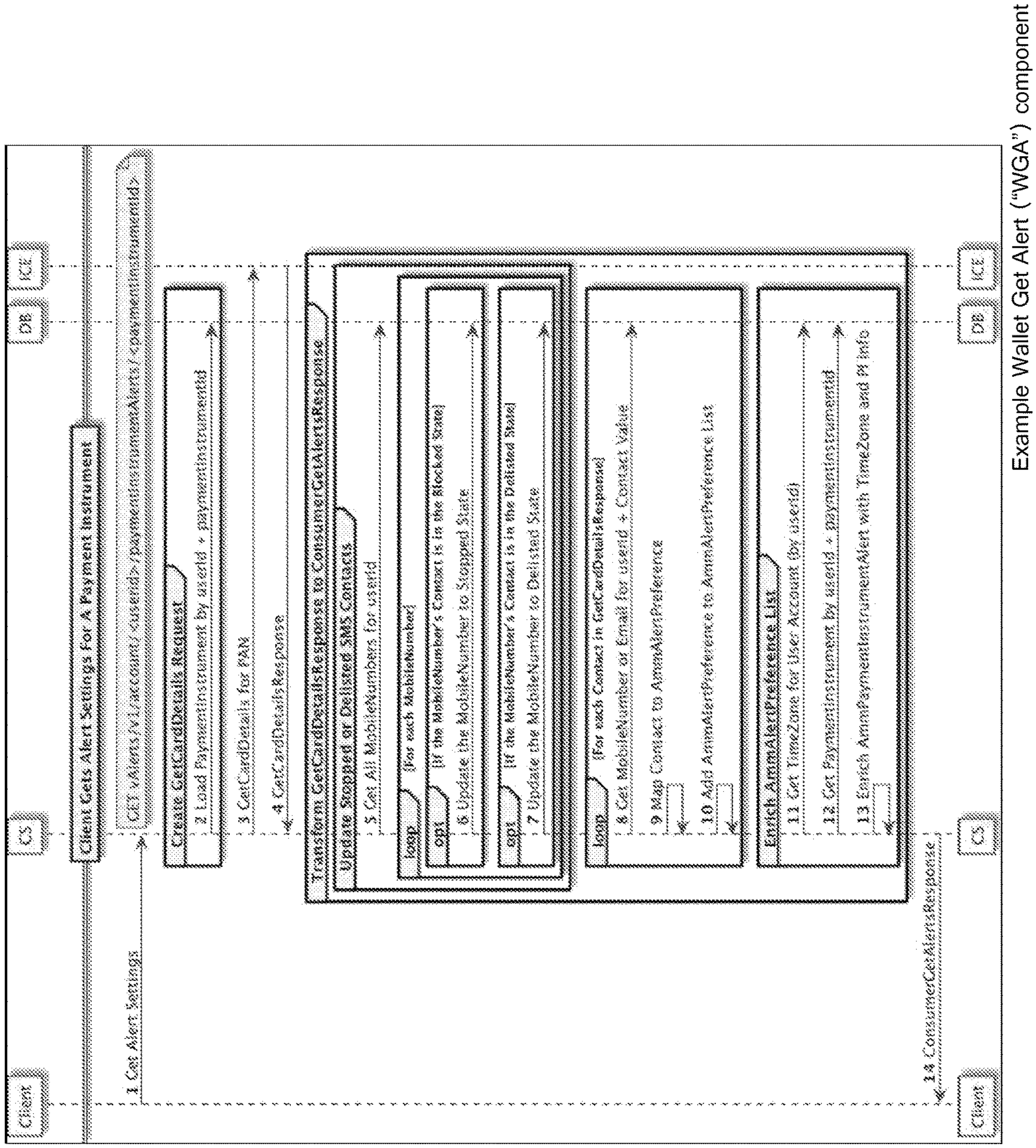
Figure 32L:
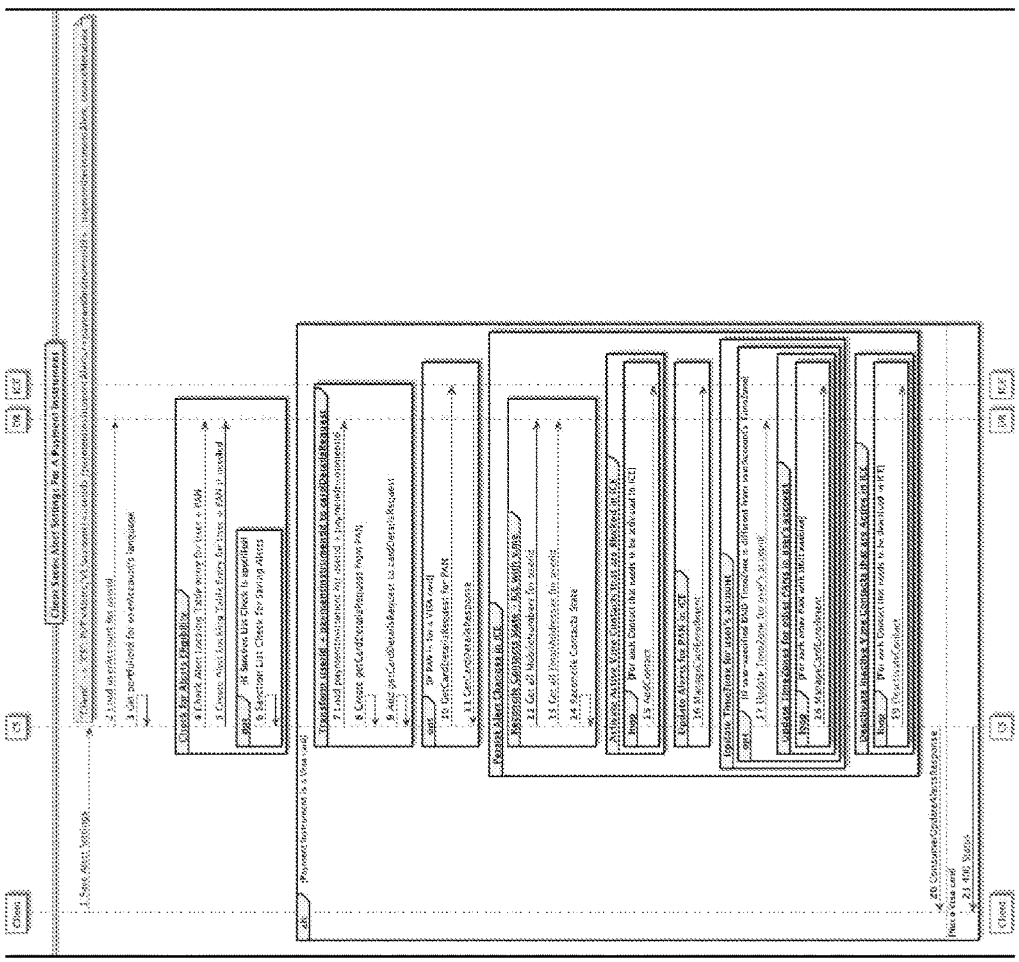
Figure 32M:
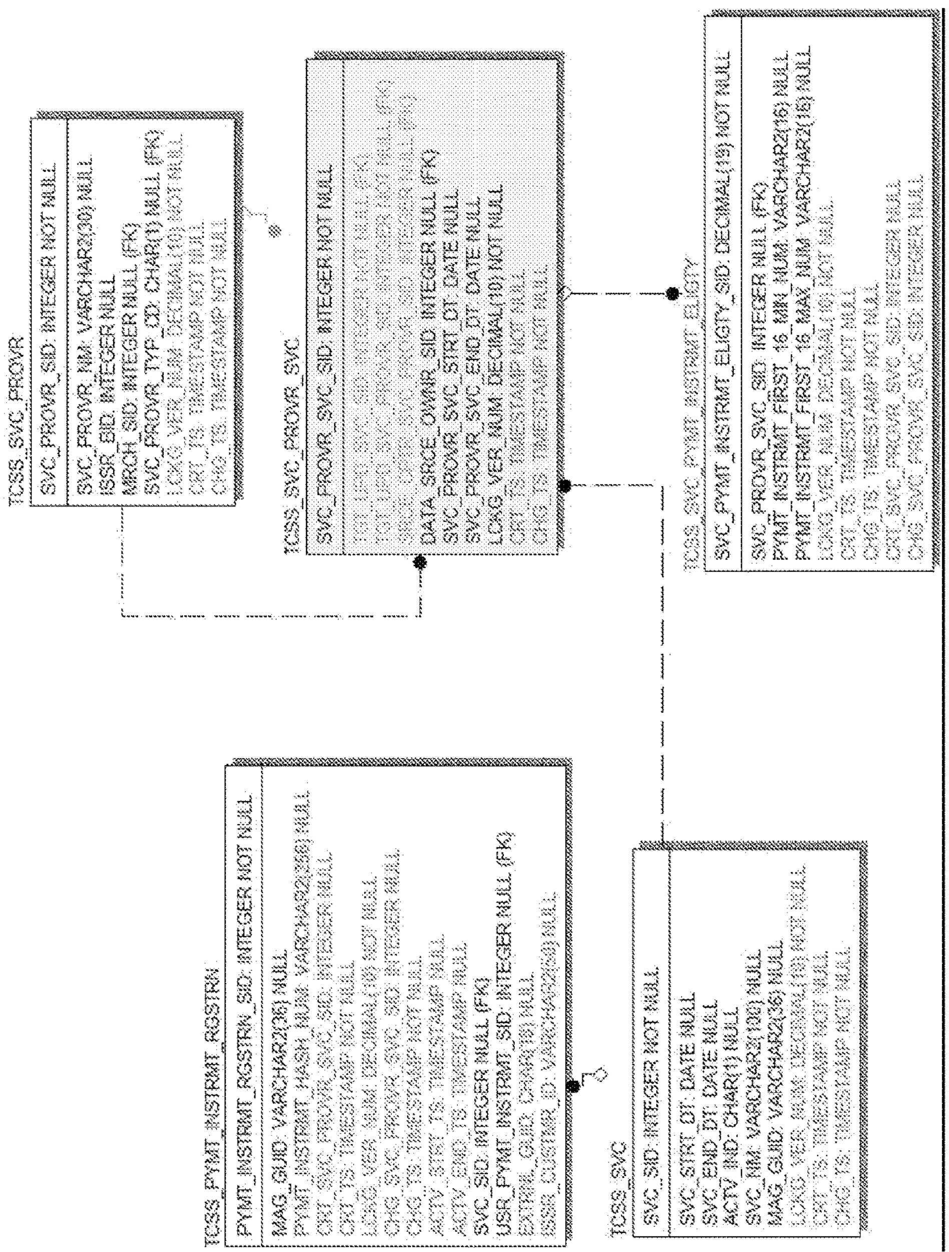
Figure 32N:
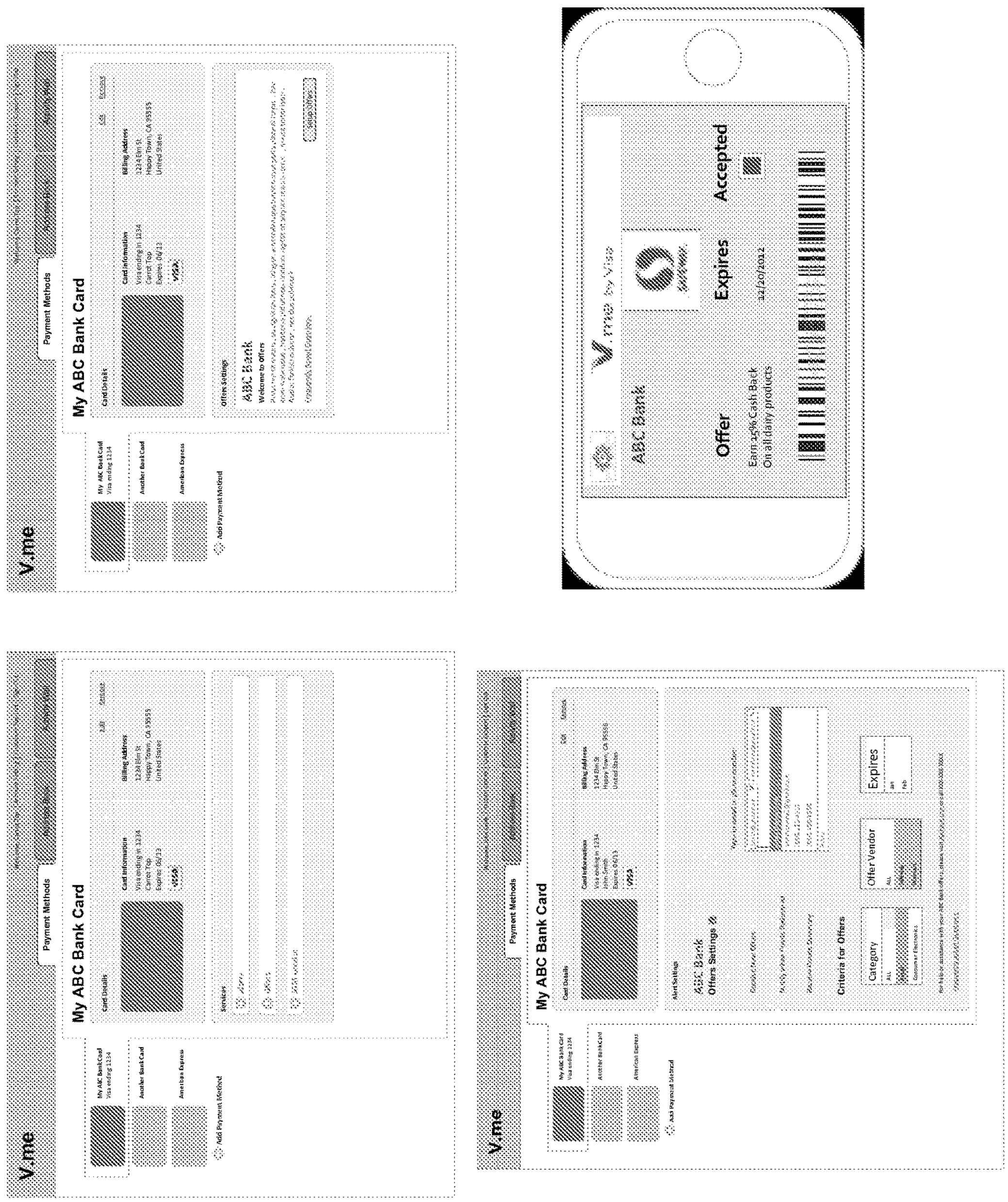
Figure 32O:
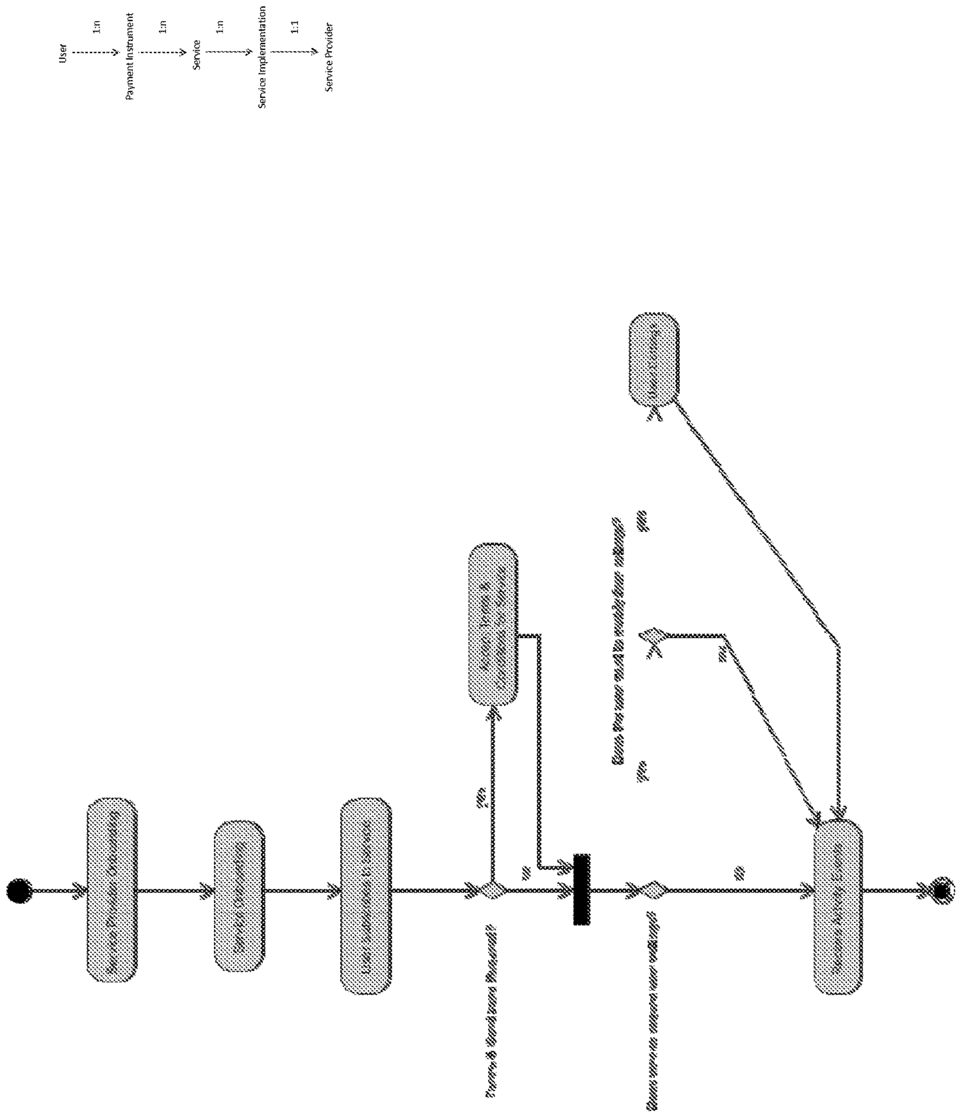
Figure 32P:
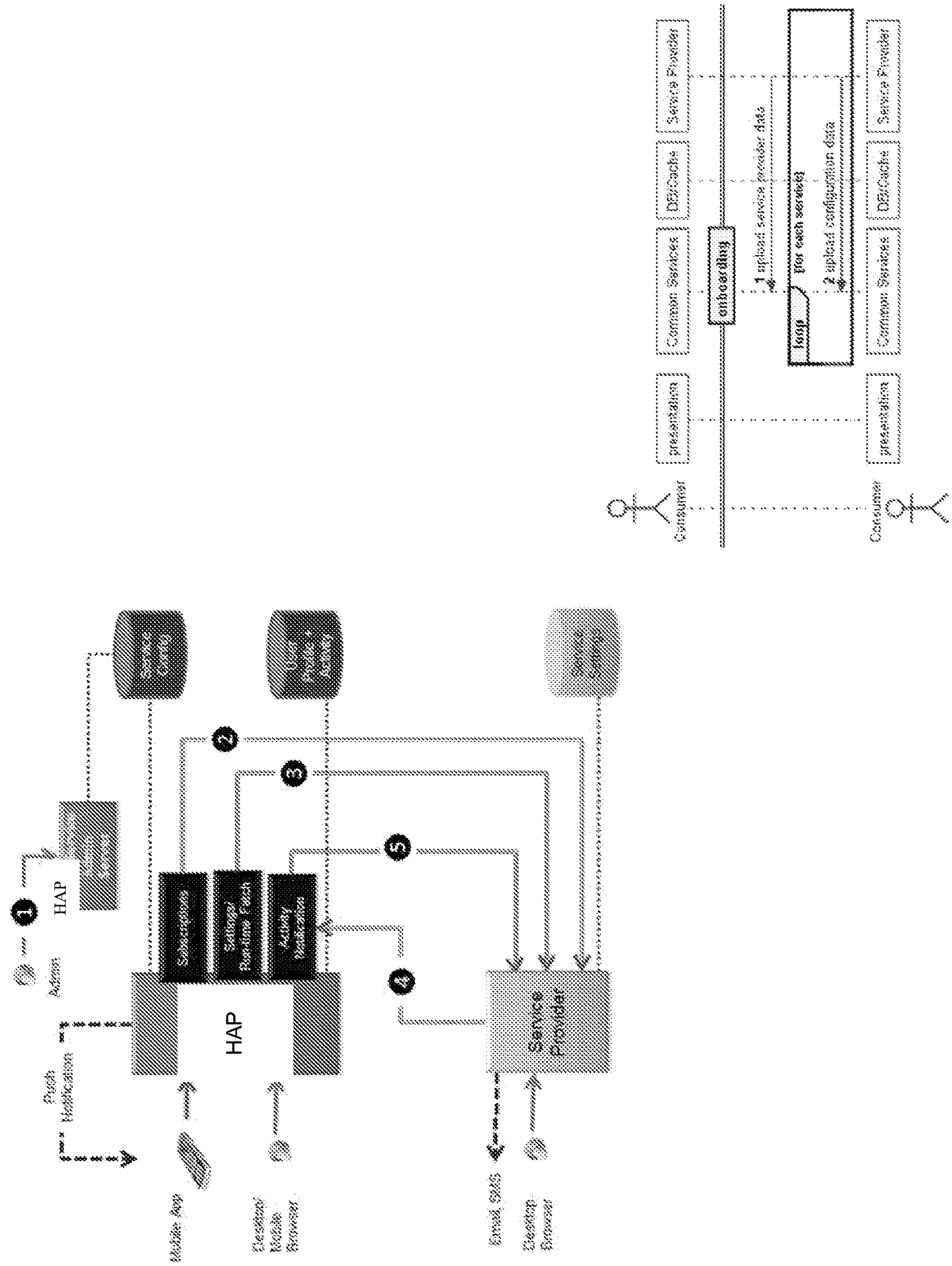
Figure 32Q:
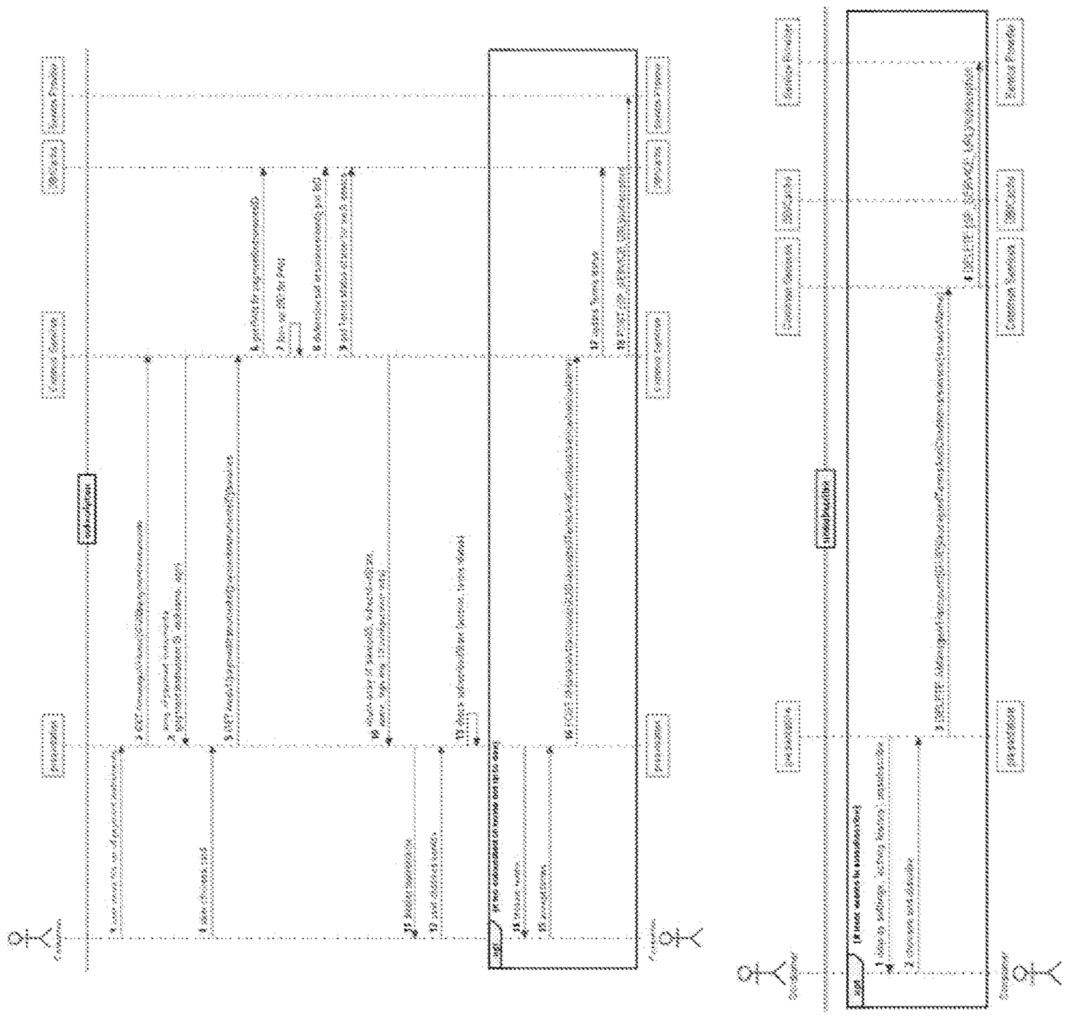
Figure 32R:
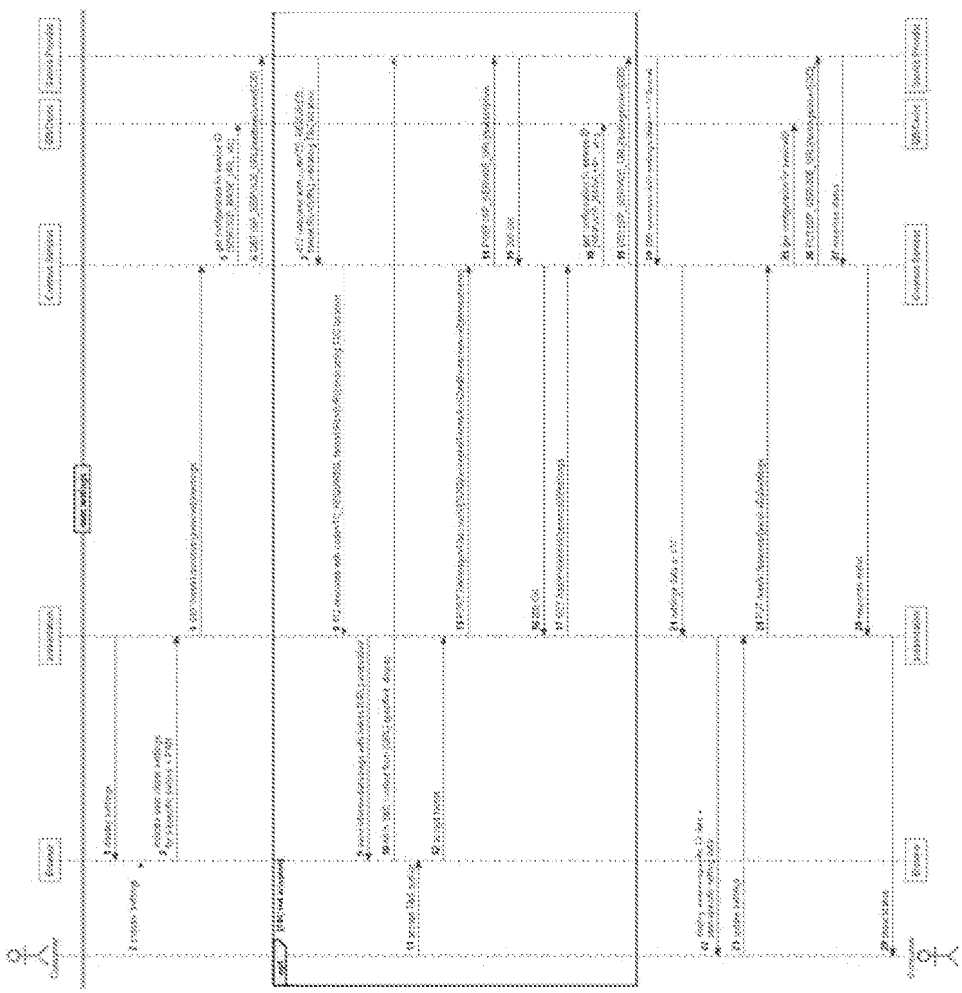
Figure 32S:
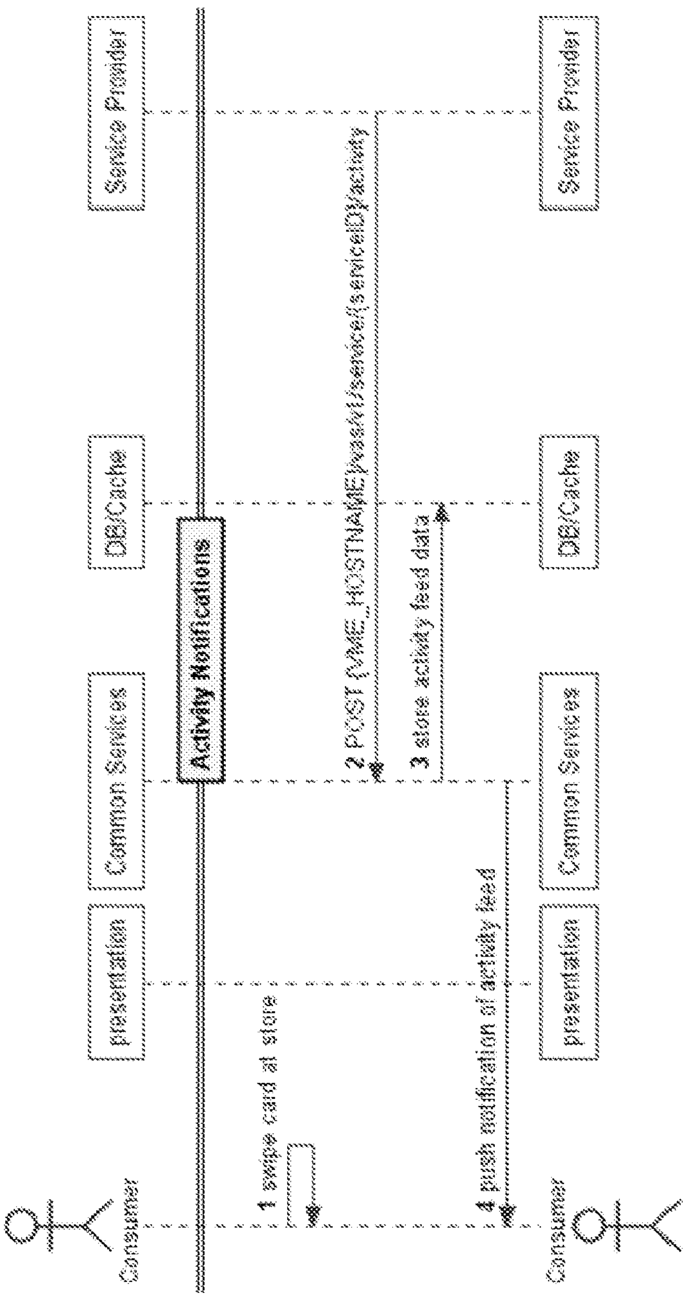
Figure 32T:
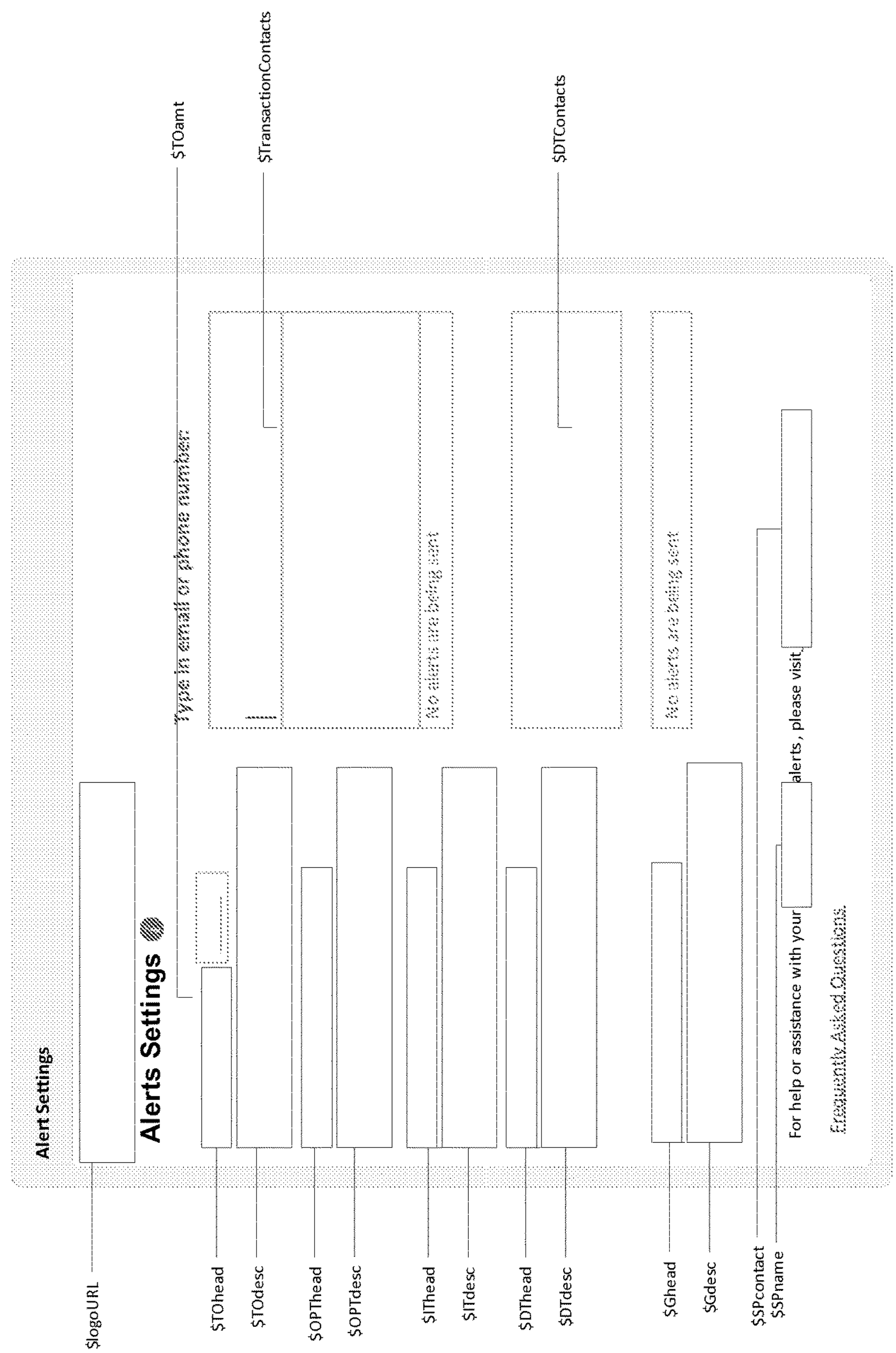
Figure 32U:
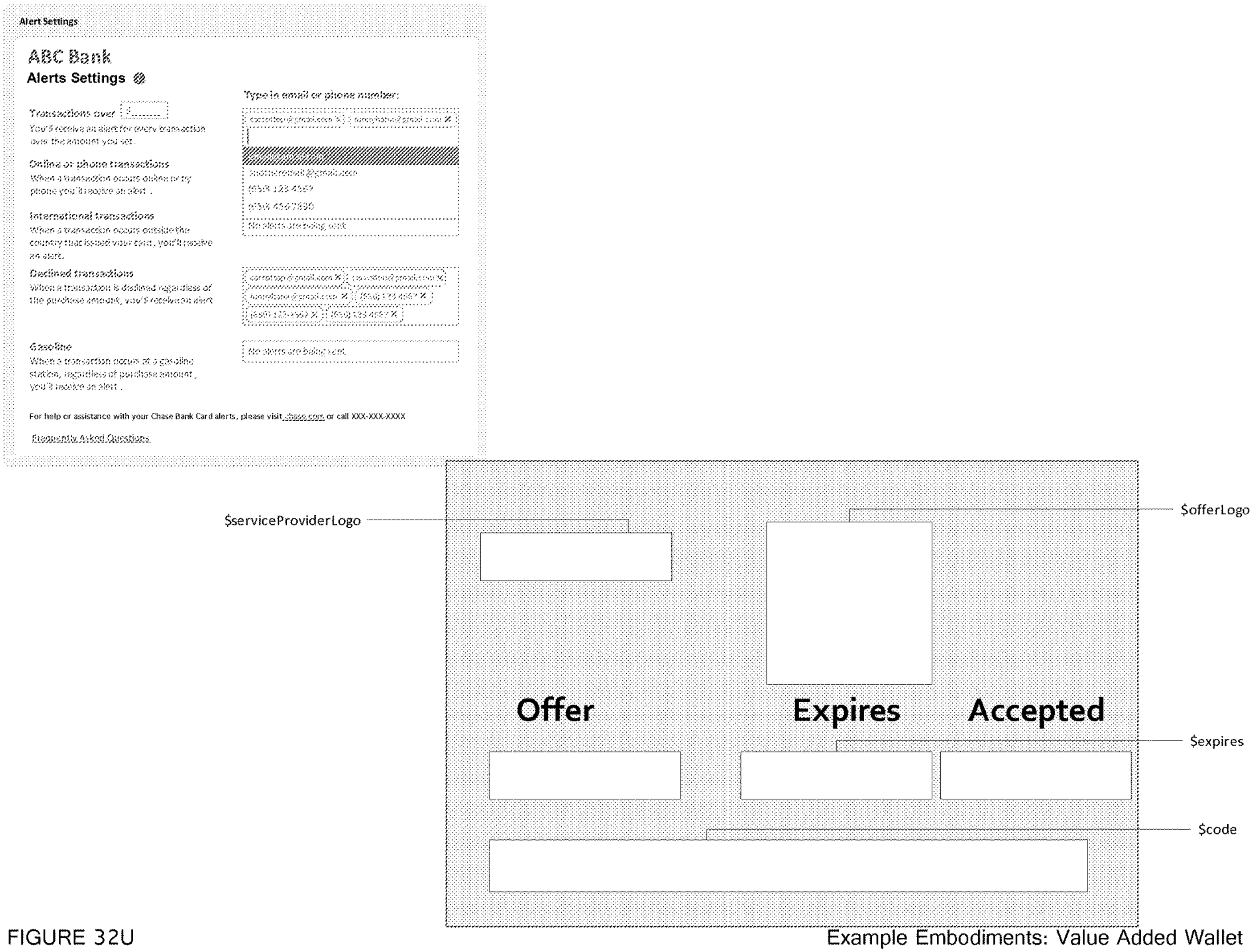

FIGS. 32A-32U show exemplary embodiments of value added wallet features and interfaces in some embodiments of the HAP. Referring to FIGS. 32A-32B, in some embodiments, user clicks the card on the left pane and there are no alerts setup for this card. User may see the "Setup Alerts" button for the first time setup. Once the user clicks the "Setup Alerts" button we may present the user with the available settings for that particular service provider. User clicks on the customize view then he may presented with the current ICE alerts. Once user confirms the alert settings he may be presented with his selections and with menu option to either Edit or Turn Off alerts. This is an example of alerts for an external service provider. User clicks the card on the left pane and there are no alerts setup for this card. User may see the "Setup Alerts" button for the first time setup. Once the user clicks the "Setup Alerts" button we may present the user with the available settings for that particular service provider. Notice that the settings are different as provided by the issuer. Once user confirms the alert settings he may be presented with his selections and with menu option to either Edit or Turn Off alerts.

In some embodiments, architecture consists of the following component interactions: ROR (UI); Common Services API (User profile and Payment Instrument); Value Added Services (VAS) for service provider integration.

Referring to FIG. 32C, VAS may be part of Common Services deployment. VAS API's may be exposed as REST services and UI layer may make the calls directly instead of going through Common Services. VAS may be responsible for all outbound communications with the service provider. ICE adapter may be developed in order to transform the VAS request to the appropriate ICE request to support the existing Alert feature. VAS may be an independent deployable component. Additional adapters may be developed in order support newly on boarded service providers.

Support future offerings from service providers. For example, offers, gift cards, etc. Independently developed and deployable component. Exposes a defined set of API's while hiding the details of the service provider API using adapters. Extensible to support different service providers through the development of adapters. VAS defines the following set of API's.

Subscription

POST {SP_SERVICE_URL)/subscription

DELETE {SP_SERVICE_URL)/subscription

Settings

GET {SP_SERVICE_URL)/settings/user/{CID}

PUT {SP_SERVICE_URL}/settings/user/{CID}

Referring to FIG. 32D, the sequence diagram describes a happy case scenario for subscription and settings API through VAS.

In some embodiments, and by way of non-limiting examples only, the following terms may be interpreted as following:

| | |
|---|---|
| Service | A category of service (e.g., Alerts, Offers). Payment defines the UI template, UI configuration schema, and APIs between the client and wallet and wallet and the service provider. |
| Service Implementation | An implementation of a service |
| Service Provider | One who implements a service |
| UI Template | Service-specific UI template, |

-continued

| | |
|---|---|
| UI Configuration Schema | Service-specific configuration template |
| UI Configuration | Configuration Schema-specific data, specified by Service Provider for a given Service Implementation |
| Settings | Service-implementation specific |
| Subscription | Notification to Service Provider that user is using a specific service implementation and that the user has accepted the latest version of the Terms and Conditions |
| Terms | An umbrella term denoting Terms and Conditions, Privacy Policy, Electronic Notice for a specific Service Implementation |

In some embodiments, a 3rd party service provider may integrate to Wallet to provide a value-added service (VAS) to a Wallet consumer. Examples of VAS include alerts, offers, and top-up.

FIGS. 32N-32U describes embodiments of the interaction between the Wallet consumer and one or more value-add services; the service lifecycle; the relationships between a consumer, her payment instruments, her available services and a service providers; the integration framework between Wallet and a service provider; and this integration framework in detail. Referring to FIG. 32N, in some embodiments, after the Wallet user logs into V.me, she is presented with a list of payment instruments on file. As illustrated below, the user then chooses a card and sees a list of available services for this card. In this case, the chosen card has three available services—alerts, offers, and ATM locator. If the user then chooses the 'Offers' service, she is optionally asked to accept terms and conditions, depending on whether she has previously not accepted this or if the terms have changed. After accepting the latest terms and conditions, the user is then able to configure the offers settings. The settings may be service-specific and could potentially also be service provider-specific; Payment may attempt to minimize service provider-specific settings, to ensure a consistent user experience across payment instruments for a given service. Once the offers-specific service settings have been configured by the user, she may start to receive offers at the specified email address and phone number. In addition, the user may choose to receive the offers on her Wallet activity wall, which is accessible from both the Wallet web site and the Wallet mobile app. It illustrates an offer received on the user's mobile device.

Referring to FIG. 32O, in some embodiments, services within the SPI framework have a generic, defined lifecycle. It describes the relationship between user, his payment instruments, services, implementation of these services, and the service providers that implement these services. The Wallet consumer may have multiple payment instruments. There are a set of services associated with each payment instrument. Each of these services (for a given payment instrument) is associated with a service provider; therefore, multiple service providers can provide the same service. When the consumer chooses a payment instrument, she can subscribe to associated service implementations. Because multiple service providers can provide the same service, there may be some differentiation allowed. For each service, Payment may define the parameters of differentiation allowed.

Referring to FIG. 32P, in some embodiments, there may be five main interactions between Wallet and service providers in this integration: 1) Onboarding: onboarding of the service provider and on-boarding of each service implementation that the service provider provides; 2) Subscription to Service: user subscribes to service implementation, when used for the first time or when service version changes; 3) User Settings: retrieving and updating of user settings for a given service implementation; 4) Activity Notification: activity item for a user related to a service implementation; 5) Activity Settings: updating the settings for a specific activity item. Step 3 specifies settings for the service (the offer service for a payment instrument) while step 5 specifies settings for an individual activity item (e.g., acceptance of an received offer). Step 4 enables Wallet to display activity information (e.g., alerts, offers) in a consolidated manner within a single application, where the user may filter and search, while also enabling Wallet to send push notifications to the Wallet mobile application with this activity information (if configured by the user). These five interactions listed above are described in detail in the following sections. Each section describes the interaction with a sequence diagram and a protocol specification. In addition, both Wallet and each service provider maintain different pieces of the data; this data model is described in each of these sections. Finally, communication between Wallet and the service provider needs to be secure.

Onboarding:

Onboarding consists of two phases: Onboarding of the service provider; Onboarding of each service implementation that the service provider provides. In some embodiments, two-way communication occurs between Wallet and the service provider; therefore, Phase 1 (service provider onboarding) requires that Wallet submits its X509 certificate, generate a service provider ID/password for the service provider, and distribute it. The service provider submits its X509 certificate and Visa-specific ID/password. Phase 2, onboarding of a service implementation, requires that the service provider: implement a specific service; a XML/JSON file containing the UI s configuration for the service. This UI configuration is based on the configuration template provided by Payment for this service. See Section [00234] for the template and related configuration data.; SP_SERVICE_URL; version of the service implementation. In some embodiments, the SP_SERVICE_URL is the common URL path for this service implementation. It is generally of this format:

https://{service_provider_hostname}/v{version}/service/{serviceID}

Payment assigns a serviceID for each service onboarded by the service provider. Payment also specifies the VME_HOSTNAME, which indicates the hostname is of the Wallet service. FIG. 32P describes an example sequence diagram.

Data Model: The UI configuration, service version number, Terms and Conditions, X509 certificate, and service invoker ID/password are provided manually by the service provider; they are uploaded into the V.me. Security: The PaymentID and password provided to the service provider are stored in an X500 Directory; the password is stored as a salted hash. The service provider ID/password, given to Payment by the service provider, are stored in a database; the password is encrypted. The service provider may in turn store the PaymentID/password and service provider ID/password securely. Process: All onboarding information communicated between Payment and the service provider is done manually, using an offline process. Information received by Payment may be validated and uploaded to the Wallet system. The service provider can initially test in the Wallet sandbox, and once ready, migrate to the production system:

Subscription:

The objective of subscription is to (1) link the user between Wallet and the service provider and to (2) convey the acceptance of the required T&C from Wallet to the service provider. When the user first chooses to use a service, Wallet may send a subscribe message to the service provider, providing sufficient information to enable the a service provider to link the Wallet account with the service provider's user account.

Before the user creates or updates her user settings, Wallet requests the service provider for the current user settings. If the user has either not enrolled or not accepted the latest version of the Terms and Conditions for the service implementation then a return code to that effect may be provided by the service provider. Based on this status code, Wallet may direct the user to an intermediate screen which displays the Terms and Conditions hosted by the service provider. On acceptance of the Terms and Conditions, a subscription notice is sent from Wallet to the service provider. Once the subscription is accepted by the SP, any subsequent calls to retrieve user settings should be successful.

Subscription occurs via the following REST call from Wallet to the service provider:

POST (SP_SERVICE_URL}/subscription

Unsubscribing occurs via the following REST call from Wallet to the service provider:

DELETE {SP_SERVICE_URL}/subscription

The body contains the following information: vme_user: user-specific Wallet GUID for external usage (EXTERNAL_GUID) service_provider_cid: customer ID (optional, if available to V.me); lastFour: last 4 digits of PAN; name: full name as specified for PAN; termsURL: url of the T&C accepted (optional, only if user is accepting T&Cs); the service should use the timestamp in the header as the time of acceptance This information enables the service provider to link the EXTERNAL_GUID to the customer record on its side, either via the CID or the last 4 digits of the PAN and the name. Note that the EXTERNAL_GUID sent by Wallet may always be the same for a Wallet user, irrespective of the service to which the user is subscribing.

Here is an example request body:

```
{
Vme_user: “342342”,
lastFour: “1234”,
name: “John Smith”
}
```

If the CID is not available, the service provider should use the userid, lastFour and name fields to attempt to identity the user account on its side. The service provider may return the following HTIT status codes: 200 OK—if success linking the accounts 400 Bad Request—if the URL or body could not be understood by the service provider, if the client sent incorrect data, or if the data failed validation 401 Unauthorized—if incorrect credentials sent 404 Not Found—if URL incorrect, including serviced; 406 Not Acceptable—if the only acceptable content types for the client is not supported by the system 412 Precondition Failed—if the service provider could not resolve the user account based on the CID, userid, lastFour and/or name; or, the user has not accepted the latest Terms and Conditions. In this case, the body may contain the code indicating the exact failure. For T&C acceptance precondition failure code, the body of the response may also contain the URL for the Terms and Conditions to be accepted as a precondition. After displaying this T&C and requiring the user to accept the T&C, Wallet may send a new subscription message with the termsURL field to indicate that the user has accepted this specific T&C. code: precondition failure code termsURL: url of the T&C required to be accepted by the user; 415 Unsupported Media Type—if a content type specified is not supported; 500 Internal Server Error—a server problem is preventing it from fulfilling the request.

In case of success, the service provider may return HTTP 200 and the CID. The CID is the foreign key that Wallet may use to reference the user when it communicates with the service provider. Therefore, the CID can be any unique key within this service provider's namespace. If it does not have a local key for the user, the service provider can simply return the EXTERNAL_GUID as the CID value in the response and Wallet may use this as the CID value in future communications.

Here is an example response

```
HTTP/1.1 200 OK
Content-Type: text/json; charset=utf-8
{
service_provider_cid: "12345abc"
}
```

In case of 500 Internal Server Error, Wallet may attempt to retry 3 times, before giving up. Data Model: Terms and Condition/Privacy Policy content as well as their acceptance by users may be managed by the service provider. Security: The subscription REST request is sent from Wallet to the service provider. It is over a SSL channel, with two-factor authentication.

User Settings:

This is used by Wallet to retrieve and update service implementation-specific and user-specific settings data from the service provider:

GET {SP_SERVICE_URI}/settings/user/{CID}

PUT {SP_SERVICE_URL}/settings/user/{CID}

The body contains a set of key-value pairs, where the keys correspond to the UI Configuration data specified during the service implementation onboarding process. See Section [00234] for the body schema. The service provider may return the following HITP status codes: 200 OK—success 400 Bad Request—if the URL or body could not be understood by the service provider, if the client sent incorrect data, or if the data failed validation 401 Unauthorized—if incorrect credentials sent 404 Not Found—if URL incorrect, including serviceID or CID 406 Not Acceptable—if the only acceptable content types for the client is not supported by the system 412 Precondition Failed—if the user is not subscribed or has not accepted the latest Terms and Conditions. The body of the response may contain the URL for the Terms and Conditions to be accepted as a precondition. Wallet may send a subscription message (see Section

[00202]) to remove the precondition before attempting a retry. code: recondition failure code termsURL: uri of the T&C required to be accepted by the user 415 Unsupported Media Type—if a content type specified is not supported 500 Internal Server Error—a server problem is preventing it from fulfilling the request.

In case of success, the service provider returns HTTP 200 OK. For both the GET and the PUT, the response body contains the key-value settings data. In case of 500 error, the Wallet system does NOT retry; instead, it tells the user that the service provider is unavailable Data Model The settings data is stored at the service provider and is not stored within V.me. This enables the service provider to provide the same service themselves and the consumer may see the same settings from all places (i.e., if a setting is updated on V.me, then that setting update should be reflected in that same service invoked from the service provider directly). Security: The subscription REST request is sent from Wallet to the service provider. It is over a SSL channel, with two-factor authentication. Performance: These calls occur in the user request path; therefore, their performance directly affects the user experience.

Activity Notifications:

Activity notifications are used to convey service activity information to V.me. This is a REST request sent from the service provider to V.me:

POST {VME_HOSTNAME}/vas/v1/service/{serviceID}

The body contains one or more "settings" data. See Section [00234] for the body schema, which contains a series of settings. Settings may have the following attributes:

ACTION can be

| Action | Description |
|---|---|
| POST | For new activity item |
| PUT | For update on an existing activity item |
| DELETE | Withdrawal of an activity item |

service_provider_cid: Service provider's customer ID, negotiated during subscription activityID: Unique ID within the service provider's namespace for this activity item; each new activity item may have an unique activityID. Here is an example body:

```
<settings action="POST" activity1D="3552" service_provider_cid="231" >
<setting key="issuerName" value="Bank of ABC"/>
<setting key="issuerLogo" value=" http://www.boa.com//
BANKamerica.jpg"/>
<setting key="offLogo" value="http://www.safeway.com/offers/logo.gif"/>
<setting key="off" value="Earn 15% Cash Back on all Dairy products"/>
<setting key="exp" value="2012-07-16T19:20:30" type=DATE/>
<setting key="acc" value="unaccepted"/>
<settings>
```

Wallet may return the following HTTP status codes: 200 OK; 400 Bad Request—if the URL or body could not be understood by V.me, if the client sent incorrect data, or if the data failed validation; 401 Unauthorized—if incorrect credentials sent; 404 Not Found—if URL incorrect, including serviced; 406 Not Acceptable—if the only acceptable content types for the client is not supported by the system; 415 Unsupported Media Type—if a content type specified is not supported; 500 Internal Server Error—a server problem is preventing it from fulfilling the request; In case of 500 Internal Server Error, it is up to the service provider whether it wants to retry a few times before giving up.

Alternative Pull Model:

In case the service provider cannot send activity notifications to V.me, Wallet can be configured to periodically poll the service provider to fetch this data. In this case, Wallet may invoke the following REST call:

GET {SP_SERVICE_URL}/activity/service/{serviceID}

The service provider may return the following HTTP status codes: 200 OK 400 Bad Request—if the URL or body could not be understood by V.me, if the client sent incorrect data, or if the data failed validation 401 Unauthorized—if incorrect credentials sent 404 Not Found—if URL incorrect, including serviced 406 Not Acceptable—if the only acceptable content types for the client is not supported by the system 415 Unsupported Media Type—if a content type specified is not supported 500 Internal Server Error—a server problem is preventing it from fulfilling the request. In case of success, the service provider may return an array of "activity" elements, each containing the following common attributes and child settings that are identical to the push model. In case of 500 Internal Server Error, Wallet may not retry until the next period. Data Model: All activity notification information sent to Wallet is stored in the Wallet database. This data is used for push notifications to mobile devices and for activity feed information.

Protocol:

All communication between Wallet and the service provider is over REST with JSON or XML content. SSL is used for channel security. In addition, two factor authentication is utilized for every request, with one factor being the SSL certificate and the other an ID/password. This information is exchanged during service provider onboarding. The request may have the following headers: For HTTP Basic authentication, the Authorization field is used to convey ID/password credentials. For the authorization string, the ID is followed by a colon and the password for this pair. The resulting string is encoded with the Base64 algorithm. The server may respond with a 401 Unauthorized if the authorization header is not specified.

Authorization: Basic QWxhZGRpbjpvcGVuIHN1c2FtZQ==

Content Type/Length—Several content types are supported for the request message body—XML, JSON, NVP. The server may respond with a 415 Unsupported Media Type if the content type is unacceptable. The content length is optional.

Content-Type: application/j son

Content-Length: 311

Accept Type—specifies the preferred response format. XML and JSON are acceptable. It may respond with a 406 Not Acceptable if the accept type only specifies other formats.

Accept: text/xml; application/json; application/soap+xml

Keep Alive: To minimize connection costs between the service provider and V.me, it is recommended that the service provider use HTIP keep-alive connections when connecting to Wallet and that it support HTIP keep-alive connections when Wallet connects to it.

Internationalization: Everything may be encoded in UTF-8. Text may be displayed without automatic conversion.

UITemplate Framework:

To display user settings and activity wall data, a templating approach may be used. The templating framework contains three parts: Template—consisting of HTML, CSS, JS; SP-specific configuration—consisting of XML/JSON; User-specific data-consisting of XML/JSON.

Template: A template is constructed using HTML, CSS, JS and contains variables that may be filled in either by the SP-specific configuration or the user-specific data. The fonts and placement of the data is controlled by the template. Here is an example template: FIG. 32T.

In this template, some text is built into the template and is shown above. For the remaining text strings and input boxes, variables are specified, which can be filled. Each variable, denoted as a key, may be unique within the template. Validation rules for each input box may also be specified here.

Template Configuration Schema

The schema to define the template is specified below:

| | | |
|---|---|---|
| settings | | Outermost element. Attributes include spi_id to specify it is service- provider specific, service_provider_cid to specify it is user-specific, activity_ID to specify it is an activity item specific. The attribute ‘action’ indicates whether it is a POST (new) (default), PUT (update), or DELETE (removal). |
| locale | | Child of ‘settings’, indicates the applicable locale; contains one or more ‘setting’ elements to indicate these settings are locale-specific |
| | country | 3-digit country code |
| | lang | 2-digit language code |
| setting | | Element may either appear as child of ‘settings’ or ‘locale’, if child of ‘settings’, then it is a global setting whereas if child of ‘locale’, then it is a locale-specific setting |
| | ID | If this setting is referred by another setting (optional); the ID may be unique within the service provider’s namespace |
| | key | key (this corresponds to the variables defined in the template) |
| | value | Literal value for the key (optional) |
| | refID | Reference value for the key (optional) |
| | type | Type of value; for a reference value, the type is inferred from the type specified in the reference. For literal values, if not specified, then type STRING is assumed. |

The configuration data may be specified at the V.me, service provider, user level, or activity item level, based on settings attributes.

Service Provider-Specific Configuration:

Each service provider that chooses to use the template above may specify a configuration file that can fill in service provider-specific strings. In the above template example, all the variables on the left are static strings that should be specified in this s configuration file (the variables on the right are user-specific settings data). This is a partial example configuration, in XML, for three of the variables in the template:

```
<?xml version="1.O" encoding="UTF-8"?>
<settings spi_id="abc">
  <locale country="840" lang="en-us">
    <setting key="logoURL"
value="http://www.abcbank.com/images/logo.gif"/>
    <setting key="TOhead"value="Transactions over US $"/>
    <setting key="TOdesc"value="You'll receive an alert for every
transaction over the amount you set.n/>
  </locale>
  <locale country="124" lang="en-can>
    <setting key="logoURL"
value="http://www.abcbank.comiimagesilogo.gif"i>
    <setting key="TOhead" value="Transa:ctions over CAN $"/>
    <setting key="TOdesc"value="You'll receive an alert for every
transaction over the amount you set.n/>
...
  </locale>
  <locale country="124" lang="fr-ca">
    <setting key="logoURL"
value="http://www.abcbank.com/images/logo.gif"/>
    <setting key="TOhead" value="Transactions sur CAN $"/>
    <setting key="TOdesc" value="Vous recevrez une alerte pour
chaque transaction sur le niontant que vous definissez."/>
  </locale>
</settings>
```

The spi_id attribute indicates it is a service provider implementation-specific configuration. In this example, for English, there is a trivial change between the two countries, in that the “US $” is present for the US and “CAN $” is present for Canada. Additionally, for Canadian French users, the text strings have been translated to French.

User-specific Data: This is a partial example configuration, in XML, for three of the variables in the template:

```
<?xml version="1.0" encoding="UTF-8"?>
<settings service provider cid="235">
 <!-- EMAIL and SMS are predefined constants -->
```

-continued

```
  <setting ID="1" type=EMAIL value="john.smith@yahoo.com" />
  <setting ID="2" type=SMS value="6505551212" />
<paymentInstrument lastFourPAN="1234">
   <!- this refers to the email address above -->
  <setting key="TransactionContacts" refID="1" />
  <setting key="TransactionContacts " refID="2" />
  <setting key="DTContacts" refID="1" />
  <setting key="DTContacts " refID="2" />
  <setting key="TOamt" value="50"/>
  <!-this variable is not used in display, but may be used for currency
conversion -->
  <setting key="TOamtCurrency" value="US"/>
  </paymentInstrument>
</settings>
```

The service_provider_cid indicates it is user-specific. The refID attribute for the setting elements above associate the alert with the contact. For example the following:

```
<setting key=" TransactionContacts" refID="1" />
<setting key=" TransactionContacts" refID="2" />
```

specifies that for the alert with the key TransactionContacts (relates to Transaction alert in the template provided above) reference ID 1 and 2 (relates to email with address john.smith@yahoo.com and sms for phone number 6505551212) have been selected. The variableSetting specifies any variables necessary for an alert. For example in the above XML, alert with key TOamt (associated with Threshold Over Amount in the template above) represents the minimum value for the alert trigger.

FIG. 32U shows an example of the display output by combining the template, the service-provider specific configuration and the user-specific settings data.

Activity Item-Specific Data:

An offer or an alert is an example of an activity item. It follows the same template model but the configuration data for this is denoted with an ‘activitiy_id’ attribute. Since all activity is also user-specific, the service_provider_cid attribute may also be present. If the action attribute is missing, POST is assumed as the default.

For example, FIG. 32U is an offer activity template; only a few fields are specified here for simplicity. Since the service provider logo is identical for all offers from the same service provider, this information may be specified once and uploaded into Wallet by the service provider during onboarding; hence only a "spi_id" is specified:

```
<?xml version="1.0" encoding="UTF-8"?>
<settings spi_id="235"?
  <setting key="serviceProviderLogo"
value="http://www.abcbank.com/images/logo.gif"/>
</settings>
```

In addition, the offer components that are per-user and per activity item may be specified separately, specifically with "activity_id" and "service_provider_cid" attributes. Therefore, here is a partial example configuration, in XML, for these variables in the template above:

```
<?xml version="1.0" encoding="UTF-8"?>
<settings activity_id="34525ss" service_provider_cid="235">
<setting key="offerLogo" value="http://merchant.com/images/logo.gif"/>
<setting key="expires" value="2012-07-16T19:20:30" type=DATE/>
</settings>
```

FIG. 33 shows a block diagram illustrating example service connections in some embodiments of the HAP. In one implementation, the HAP button 3302 may be an OAuth based button that allows users to sign in and connect their wallet profile 3315*a* in the wallet 3315 with their accounts at issuers 3305*a*, 3305*b* and merchants 3310*a*, 3310*b*, 3310*c*. Once connected, a bidirectional link may be established between the services (e.g., issuers, merchants, etc.; hereinafter "merchant") and the wallet with ongoing permissions explicitly agreed to by the user. In some implementations, the bi-directional link may facilitate, for example, updating of card information (e.g., expire date, new identifier, increased spending limit, and/or the like) from the issuer to the corresponding card slot in the wallet, and from the wallet to the merchant. Similarly, in some other implementations, change in customer information initiated by the customer from a merchant interface may flow to the wallet and from the wallet to the issuer, for example. In some embodiments, HAP may facilitate addition of an account or payment method and personal data to the wallet from an issuer website or an application, set up of default payment method and sharing of relevant info (e.g. contact and shipping information) with a merchant for an ongoing billing relationship, set up of one-way identity federation with a merchant to enable a customer to log in to a merchant through the wallet, real-time API calls for merchants to be able to display rich information about payment methods linked to customer relationship, and/or the like. In one implementation, for example, if a user provides a retailer Nordstrom with their nicknamed "personal card" and "business card", Nordstrom would be able to display those nicknames and a thumbnail of the issuer card-art (if provided by a connected issuer). Similarly the user could provide Nordstrom with their wallet nicknamed "home shipping address" and "work shipping address". If later on through the customer wallet application or portal, the customer updates their address or makes changes to their card nickname etc., those changes would be immediately reflected next time the customer visits Nordstrom because those accounts are connected by the HAP. In some implementations, the same frame work may facilitate any sort of customer-initiated unidirectional or bidirectional connection between the wallet and an outside service.

In some embodiments, various service providers may leverage the HAP to provide a variety of services. For example, an issuer connected to the wallet may provision card accounts to a wallet, dynamically update account status, card art, and/or the like, provide real-time balance data, publish targeted offers to customers; publish and update issuer "apps" or gadgets to the customer's wallet, and/or the like. A merchant connected to the wallet may allow customers to quickly link existing merchant accounts to a wallet account, allow customers to quickly create a merchant account by drawing information (with customer's permission) from the customer's wallet account, allow merchants to set up open authorization, recurring billing, subscription billing relationships with the customer, keep records up to date and access current information on file for their connected customers, show customers an inline display of current accounts (e.g. including card art) for accounts liked to their merchant relationship, allow returning customer to login to their merchant account with through wallet login widget, and/or the like. A loyalty provider connected to a wallet may add a loyalty account to a wallet, provide real-time points/currency balance, publish targeted rewards offers, access a loyalty account through a wallet login, and/or the like. A transit authority connected to a wallet may load or associate transit passes with the wallet, allow returning customer to login to their transit account or purse through the wallet login widget, allow redemption of transit passes or tickets from the wallet, and/or the like.

FIG. 34 shows a block diagram illustrating example HAP architecture in some embodiments of the HAP. In some embodiments, the HAP architecture may be a cross-channel and cross-entity framework comprising widget-based authentication and permission management between various commerce solution components and the wallet. In one implementation, for example, various approved commerce services 3402, issuers 3404, merchants 3406, and/or the like may have embedded a HAP button (e.g., 3408*a*, 3408*b*) in their native applications or sites. When the button is invoked on the web or on a mobile device, the button may trigger a HAP widget (e.g., 3410, 3415) to either connect a new service (e.g., 3402, 3404, 3406) to the wallet or authenticate the user. A user may input username and password credentials into the wallet widget (e.g., 3410) to get authenticated. The user may have control (e.g., create, view, manage, cancel, etc.) over the individual relationships and may configure permissions for each service they connect to. In one embodiment, the HAP may allow approved services, issuers and merchants permissions to obtain various information relating to the user and wallet such as consumer profile 3425, billing agreement 3430, redemption 3435, loyalty and rewards 344*o*, coupons/offers 3445, wish lists and stored items 3450, merchant applications/widgets 3455, Value Added Resellers (VAR)/Software-as-a-service (SaaS) commerce wallet plug-ins 3460, analytics 3465, account or points balance information 347*o*, payments 3475, and/or the like. In one implementation for example, the HAP may manage which services can connect to the wallet. In a further implementation, the HAP may pass along information from an approved and connected service such as a loyalty program (e.g., Star Woods Points program) to a merchant such that the merchant may provide the customer a special deal, offer or an opportunity to use or exchange points/currency when transacting. In one implementation, approved commerce services, issuers and merchants may be able to push information relating to any of the above to the wallet.

HAP Controller

Figure 35:
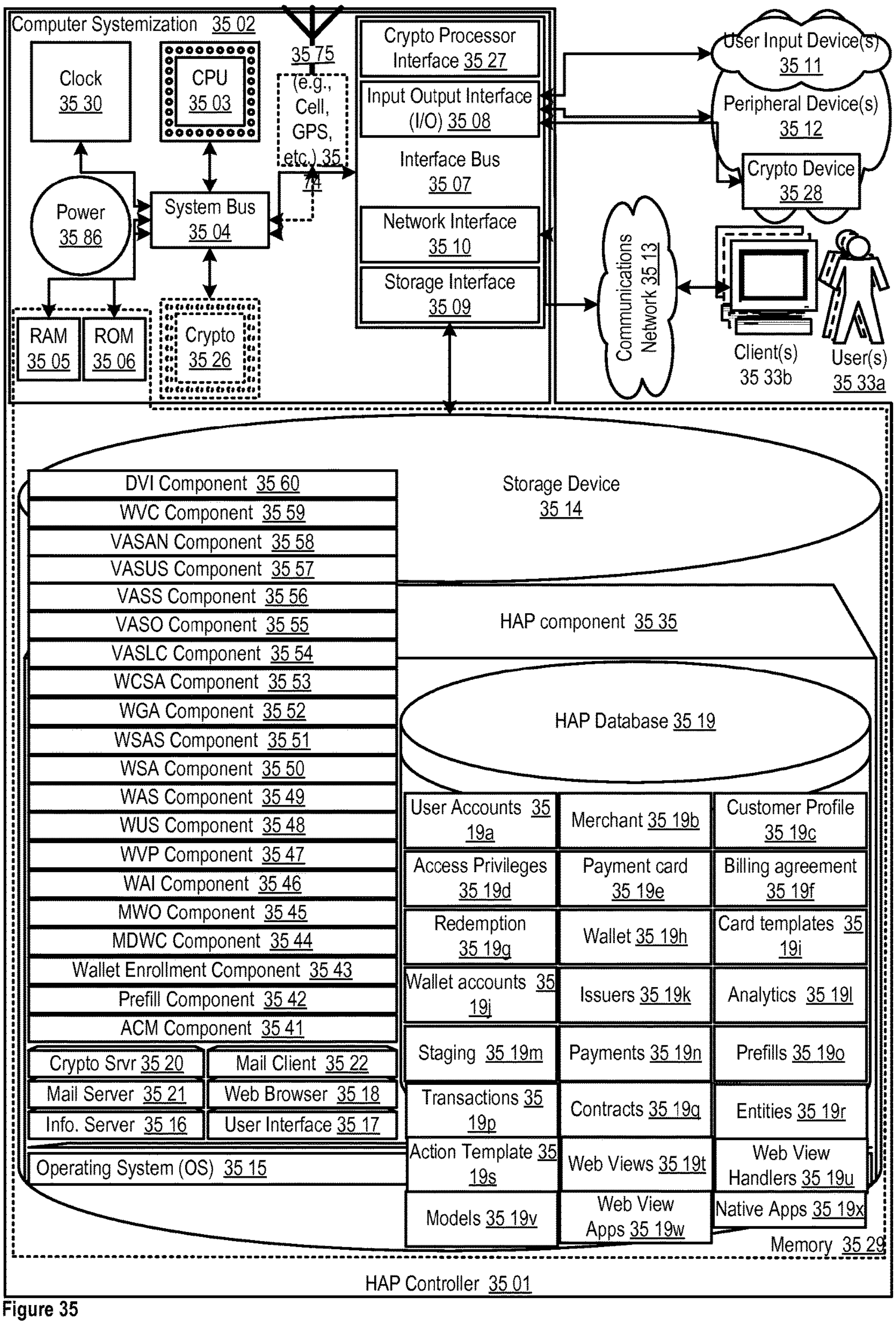
FIG. 35 shows a block diagram illustrating aspects of an exemplary embodiment of a HAP user interface controller, in one implementation of the HAP operation.

FIG. 35 shows a block diagram illustrating embodiments of a HAP controller. In this embodiment, the HAP controller 3501 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 3503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various is system components.

In one embodiment, the HAP controller 3501 may be connected to and/or communicate with entities such as, but not limited to: one or more users from user input devices 3511; peripheral devices 3512; an optional cryptographic processor device 3528; and/or a communications network 3513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The HAP controller 3501 may be based on computer systems that may comprise, but are not limited to, components such as: a computer systemization 3502 connected to memory 3529.

Computer Systemization

A computer systemization 3502 may comprise a clock 3530, central processing unit ("CPU(s)" and/or "processor(s)" (these terms are used interchangeable throughout the disclosure unless noted to the contrary)) 3503, a memory 3529 (e.g., a read only memory (ROM) 3506, a random access memory (RAM) 3505, etc.), and/or an interface bus 3507, and most frequently, although not necessarily, are all interconnected and/or communicating through a system bus 3504 on one or more (mother)board(s) 3502 having conductive and/or otherwise transportive circuit pathways through which instructions (e.g., binary encoded signals) may travel to effectuate communications, operations, storage, etc. The computer systemization may be connected to a power source 3586; e.g., optionally the power source may be internal. Optionally, a cryptographic processor 3526 and/or transceivers (e.g., ICs) 3574 may be connected to the system bus. In another embodiment, the cryptographic processor and/or transceivers may be connected as either internal and/or external peripheral devices 3512 via the interface bus I/O. In turn, the transceivers may be connected to antenna(s) 3575, thereby effectuating wireless transmission and reception of various communication and/or sensor protocols; for example the antenna(s) may connect to: a Texas Instruments WiLink WI1283 transceiver chip (e.g., providing 802.1in, Bluetooth 3.0, FM, global positioning system (GPS) (thereby allowing HAP controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 3529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athion, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor (s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the HAP controller and beyond through various interfaces. Should processing requirements dictate a greater amount speed and/or capacity, distributed processors (e.g., Distributed HAP), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the HAP may be achieved by implementing a microcontroller such as CAST's R8051XC2 microcontroller; Intel's MCS 51 (i.e., 8051 microcontroller); and/or the like. Also, to implement certain is features of the HAP, some feature implementations may rely on embedded components, zo such as: Application-Specific Integrated Circuit ("ASIC"), Digital Signal Processing ("DSP"), Field Programmable Gate Array ("FPGA"), and/or the like embedded technology. For example, any of the HAP component collection (distributed or otherwise) and/or features may be implemented via the microprocessor and/or via embedded components; e.g., via ASIC, coprocessor, DSP, FPGA, and/or the like. Alternately, some implementations of the HAP may be implemented with embedded components that are configured and used to achieve a variety of features or signal processing.

Depending on the particular implementation, the embedded components may include software solutions, hardware solutions, and/or some combination of both hardware/software solutions. For example, HAP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed 'by the customer or designer, after the FPGA is manufactured, to implement any of the HAP features. A hierarchy of programmable interconnects allow logic blocks to be interconnected as needed by the HAP system designer/administrator, somewhat like a one-chip programmable breadboard. An FPGA's logic blocks can be a programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the HAP may be developed on regular FPGAs and then migrated into a fixed version that more resembles ASIC implementations. Alternate or coordinating implementations may migrate HAP controller features to a final ASIC instead of or in addition to FPGAs. Depending on the implementation all of the aforementioned embedded components and microprocessors may be considered the "CPU" and/or "processor" for the HAP.

Power Source

The power source 3586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3586 is connected to at least one of the interconnected subsequent components of the HAP thereby providing an electric current to all subsequent components. In one example, the power source 3586 is connected to the system bus component 3504. In an alternative embodiment, an outside power source 3586 is provided through a connection across the I/O 3508 interface. For example, a USB and/or IEEE 1394 connection carries both data and power across the connection and is therefore a suitable source of power.

Interface Adapters

Interface bus(ses) 3507 may accept, connect, and/or communicate to a number of interface adapters, conventionally although not necessarily in the form of adapter cards, such as but not limited to: input output interfaces (I/O) 3508, storage interfaces 3509, network interfaces **351*o*, and/or the like. Optionally, cryptographic processor interfaces 3527** similarly may be connected to the interface bus. The interface bus provides for the communications of interface adapters with one another as well as with other components of the computer systemization. Interface adapters are adapted for a compatible interlace bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3509 may accept, communicate, and/or connect to a number of storage devices such as, but not limited to: storage devices 3514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3510 may accept, communicate, and/or connect to a communications network 3513. Through a communications network 3513, the HAP controller is accessible through remote clients 3533*b* (e.g., computers with web browsers) by users 3533*a*. Network interlaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed HAP), architectures may similarly be employed to pool, load balance, and/or otherwise increase the communicative bandwidth required by the HAP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 3510 may be used to engage with various communications network types 3513. For example, multiple network interfaces may be employed to allow for the communication over broadcast, multicast, and/or unicast networks.

Input Output interfaces (I/O) 3508 may accept, communicate, and/or connect to user input devices 3511, peripheral devices 3512, cryptographic processor devices 3528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 3511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 3512 may be connected and/or communicate to I/O and/or other facilities of the like such as network interfaces, storage interfaces, directly to the interface bus, system bus, the CPU, and/or the like. Peripheral devices may be external, internal and/or part of the HAP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the HAP controller may be embodied as an embedded, dedicated, and/or monitor-less (i.e., headless) device, wherein access would be provided over a network interface connection.

Cryptographic units such as, but not limited to, microcontrollers, processors 3526, interfaces 3527, and/or devices 3528 may be attached, and/or communicate with the HAP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 50o Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 3529. However, memory is a fungible technology and resource, thus, any number of memory embodiments may be employed in lieu of or in concert with one another. It is to be understood that the HAP controller and/or a computer systemization may employ various forms of memory 3529. For example, a computer systemization may be configured wherein the operation of on-chip CPU memory (e.g., registers), RAM, ROM, and any other storage devices are provided by a paper punch tape or paper punch card is mechanism; however, such an embodiment would result in an extremely slow rate of operation. In a typical configuration, memory 3529 will include ROM 3506, RAM 3505, and a storage device 3514. A storage device 3514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 3529 may contain a collection of program and/or database components and/or data such as, but not limited to: operating system component(s) 3515 (operating system); information server component(s) 3516 (information server); user interface component(s) 3517 (user interface); Web browser component(s) 3518 (Web browser); database(s) 3519; mail server component(s) 3521; mail client component(s) 3522; cryptographic server component(s) **352*o* (cryptographic server); the HAP component(s) 3535; account creation and management (ACM) component 3541; Prefill component 3542; Wallet Enrollment Component 3543; multi-directional wallet connector (MDWC) component 3544; Mobile Wallet Overlay ("MWO") component 3545; Wallet Alert Interactions ("WAI") component 3546; Wallet View Payment ("WVP") component 3547; Wallet User Subscription ("WUS") component 3548; Wallet Alert Settings ("WAS") component 3549; Wallet Subscription Alert ("WSA") component 3550; Wallet Saves Alert Setting ("WSAS") component 3551; Wallet Get Alert ("WGA") component 3552; Wallet Client Saves Alert ("WCSA") component 3553; VAS Life Cycle ("VASLC") component 3554; VAS Onboarding ("VASO") component 3555; VAS Subscription ("VASS") component 3556; VAS User Settings ("VASUS") component 3557; VAS Activity Notifications ("VASAN") component 3558; WVC component 3559; DVI component 356*o*; and/or the like (i.e., collectively a component collection). These components may be stored and accessed from the storage devices and/or from storage devices accessible through an interface bus. Although non-conventional program components such as those in the component collection, typically, are stored in a local storage device 3514**, they may also be loaded and/or stored in memory such as: peripheral devices, RAM, remote storage facilities through a communications network, ROM, various forms of memory, and/or the like.

Operating System

The operating system component 3515 is an executable program component facilitating the operation of the HAP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the HAP controller to communicate with other entities through a communications network 3513. Various communication protocols may be used by the HAP controller as a subcarrier transport mechanism for interaction, such as, but not limited to: multicast, TCP/IP, UDP, unicast, and/or the like.

Information Server

An information server component 3516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence a and Instant Messaging Protocol (PRIM), Internet Engineering Task Force's (IETF's) Session Initiation Protocol (SIP), SIP for Instant Messaging and Presence Leveraging a Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the HAP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the HAP database 3519, operating systems, other program components, user interfaces, Web browsers, and/or the like.

Access to the HAP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the HAP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the HAP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 3517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the HAP enabled nodes. The combined application may be nugatory on systems employing standard Web browsers.

Mail Server

A mail server component 3521 is a stored program component that is executed by a CPU 3503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the HAP.

Access to the HAP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3522 is a stored program component that is executed by a CPU 3503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program a component, system, user, and/or data communications, requests, information, and/or responses. Generally, the mail client provides a facility to compose and transmit electronic mail messages.

Cryptographic Server

A cryptographic server component 3520 is a stored program component that is executed by a CPU 3503, cryptographic processor 3526, cryptographic processor interface 3527, cryptographic processor device 3528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the HAP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the HAP component to engage in secure transactions if so desired. The cryptographic component facilitates the secure accessing of resources on the HAP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The HAP Database

The HAP database component 3519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the HAP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the HAP database is implemented as a data-structure, the use of the HAP database 3519 may be integrated into another component such as the HAP component 3535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 3519 includes several tables 3519*a-x*. A user accounts table 3519*a* includes fields such as, but not limited to: a user ID, merchant identifier, name, home address, work address, telephone number, email, merchant ID and/or the like. The user table may support and/or track multiple entity accounts on a HAP. A merchant/service provider table 3519*b* includes fields such as, but not limited to: merchant ID, user ID, merchant name, merchant location, merchant address, merchant category code, merchant api key, loyalty program ID and/or the like. A customer profile table 3519*c* includes fields such as, but not limited to: customer ID, user ID, merchant ID, payment card ID, preferred payment type, wallet_id, access_privilege_id, preference_setting, address_book, shipping_carriers, loyalty_programs, social_network, transaction_history, browser cookies, offers, coupons, alerts_feeds, alerts_triggers, other_wallet_accound_id, and/or the like. An Access Privileges table 3519*d* includes fields such as, but not limited to: access_privilege_id, axis_id, axis_name, role_id, role_name, entity_id, entity_name, context_id, context_name, action_id, action_name, info_type_id, info_type_name, action_template_id, wallet_id, customer ID, transaction execution authorization status, confirmation authorization status, billing authorization status, subscription payment authorization status, and/or the like. A payment card table 3519*e* includes fields such as, but not limited to: payment_card_id, user_id, identifier, brand, expiration date, spending limit, billing address, issuer, name, nick name, loyalty program ID, and/or the like. A billing agreement table 3519*f* includes fields such as, but not limited to: customer_id, billing_id, billing_date, billing_amount_limit, confirmation_requirement, authentication_level, billing_authorization_status, and/or the like. A redemption table 3519*g* includes fields such as, but not limited to: customer_id, loyalty_program_id, coupon_id, redemption_date, redemption_time, redemption_amount, redemption_type, transaction_id, and/or the like. A wallet table 3519*h* includes fields such as, but not limited to: wallet_id, user_id, prefill_id, billing_address, last_used_date, last_transaction_id, and/or the like. A card templates table 3519*i* includes fields such as, but not limited to: card_template_id, payment_card_id, card_type, file_card_front_location, file_card_back_location, card_front_template_location, card_back_template_location, template_type, and/or the like. A wallet accounts table 3519*j* includes fields such as, but not limited to: wallet_account_id, wallet_id, account_number, issuer_name, issuer_id, issuer_routing_number, access_privilege_id and/or the like. An issuers table 3519*k* includes fields such as, but not limited to: issuer_id, payment_card_id, user_id, issuer_name, issuer_server_url, and/or the like. An analytics table 35191 includes fields such as, but not limited to: customer_id, merchant_id, transaction_volume, transaction_amount, transaction_type, transaction_id and/or the like. An staging table 3519*m* includes fields such as, but not limited to: staging_table_id, BID, CID, account_number, user_id, customer_id, merchant_id, issuer identifier, and/or the like. A payments table 3519*n* includes fields such as, but not limited to: billing_id, billing_date, billing_amount, payment_card_id, authentication_level, and/or the like. An prefills table 35190 includes fields such as, but not limited to: prefills_id, user_id, wallet_id, wallet account_id, permissions, access rules, prefill_data, and/or the like. A transaction table 3519*p* includes fields such as, but not limited to: transaction_id, merchant_id, user_id, session_id, date, time, item_model, manufacturer, price, item_id, and/or the like. A contracts table 3519*q* includes fields such as, but not limited to: contract_id, contract_type, merchant_id, user_id, contract_expiration_date, total_authorized_charges, monthly_authorized_charges, and/or the like. An Entities table 3519*r* includes fields such as, but not limited to: entity_id, entity_category, issuer_id, merchant_id, consumer id, consumer bond, marketing_partner, loyalty_partner, shipping_carrier_id, social_network_id, wallet_provider_id, wallet_id, payment_network_id, other_3 rd_party_id, and/or the like. An Action_template table 35195 includes fields such as, but not limited to: action_tempalte_id, action_id, source_id, target_id, requestor_id, context_id, access_privilege_id, role_id, context_id, action_id, info_type_id, and/or the like. A web views table 3519*t* includes fields such as, but not limited to: web_view_id, target_device, target_environment, web_view_parser, last_used, last_updated, and/or the like. A web view handlers table 3519*u* includes fields such as, but not limited to: web_view_handler_id, web_view_id, native_handler, native_language, native_method_to_call, native_params_to_pass, button_identifier, element_identifier, tab_identifier, and/or the like. A models table 3519*v* includes fields such as, but not limited to: model_id, user_id, issuer_id, model_data, model_data_permissions, and/or the like. A web view apps table 3519*w* includes fields such as, but not limited to: web_view_app_id, app_language, app_target_device, universal_config, native_app_id, and/or the like. A native apps table 3519*x* includes fields such as, but not limited to: native_app_id, native_language, native_target_device, universal_config, web_view_app_id, and/or the like.

In one embodiment, the HAP database may interact with other database systems. For example, employing a distributed database system, queries and data access by search HAP component may treat the combination of the HAP database, an integrated data security layer database as a single database entity.

In one embodiment, user programs may contain various user interface primitives, which may serve to update the HAP. Also, various accounts may require custom database tables depending upon the environments and the types of clients the HAP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3519*a-x*. The HAP may be configured to keep track of various settings, inputs, and parameters via database controllers.

The HAP database may communicate to and/or with other components in a component collection, including itself, and/or facilities of the like. Most frequently, the HAP database communicates with the HAP component, other program components, and/or the like. The database may contain, retain, and provide information regarding other nodes and data.

The HAPs

The HAP component 3535 is a stored program component that is executed by a CPU. In one embodiment, the HAP component incorporates any and/or all combinations of the aspects of the HAP that was discussed in the previous figures. As such, the HAP affects accessing, obtaining and the provision of information, services, transactions, and/or the like across various communications networks. The features and embodiments of the HAP discussed herein increase network efficiency by reducing data transfer requirements the use of more efficient data structures and mechanisms for their transfer' and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the HAP's features and facilities, and in many cases reduce the costs, energy consumption/requirements, and extend the life of HAP's underlying infrastructure; this has the added benefit of making the HAP more reliable. Similarly, many of the features and mechanisms are designed to be easier for users to use and access, thereby broadening the audience that may enjoy/employ and exploit the feature sets of the HAP; such ease of use also helps to increase the reliability of the HAP. In addition, the feature sets include heightened security as noted via the Cryptographic components 3520, 3526, 3528 and throughout, making access to the features and data more reliable and secure.

The HAP component may transform hybrid application user inputs, and/or the like and use the HAP. In one embodiment, the HAP component 3535 takes inputs (e.g., launch DataApp input 205; web-view button input 212; web-view application request 206; model population request 215; web-view source code request 218 and/or the like) etc., and transforms the inputs via various components (e.g., to account creation and management (ACM) component 3541; Prefill component 3542; Wallet Enrollment Component 3543; multi-directional wallet connector (MDWC) component 3544; Mobile Wallet Overlay ("MWO") component 3545; Wallet Alert Interactions ("WAI") component 3546; Wallet View Payment ("WVP") component 3547; Wallet User Subscription ("WUS") component 3548; Wallet Alert Settings ("WAS") component 3549; Wallet Subscription Alert ("WSA") component 3550; Wallet Saves Alert Setting ("WSAS") component 3551; Wallet Get Alert ("WGA") component 3552; Wallet Client Saves Alert ("WCSA") component 3553; VAS Life Cycle ("VASLC") component 3554; VAS Onboarding ("VASO") component 3555; VAS Subscription ("VASS") component 3556; VAS User Settings ("VASUS") component 3557; VAS Activity Notifications ("VASAN") component 3558; WVC component 3559; DVI component 356—; and/or the like), into outputs (e.g., web-view application response 208; model population response 216; web-view source code response 220; and/or the like).

The HAP component enabling access of information between nodes may be developed by employing standard development tools- and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the HAP server employs a cryptographic server to encrypt and decrypt communications. The HAP component may communicate to and/or with other components in a component collection, including itself, and/or facilities of the like. Most frequently, the HAP component communicates with the HAP database, operating systems, other program components, and/or the like. The HAP may contain, communicate, generate, obtain, and/or provide program component, system, user, and/or data communications, requests, and/or responses.

Distributed HAPs

The structure and/or operation of any of the HAP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the HAP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the HAP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database is accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
$address = '192.168.0.100';
$port =255;
//create a server-side SSL socket, listen
//for/accept incoming communication
$sock = socket create(AF_INET, SOCK_STREAM, 0);
socket_bind($sock, $address, $port)
   or die('Could not bind to address');
socket_listen($sock);
$client = socket_accept($sock);
//read input data from client device in 1024 byte
//blocks until end of message
do {
      $input = ""
      $input = socket_read($client, 1024);
      $data .= $input;
} while($input != "")
// parse data to extract variables
$obj = json_decode($data, true);
// store input data in a database
mysql_connect("10.1.1.1",$srvr,$pass); // access database server
mysql_select("CLIENT_DB.SQL"); // select database to append
mysqlquery ("INSERT INTO UserTable (transmission) VALUES
($data)"); // add data to UserTable table in a CLIENT database
Mysql_close("CLIENTDB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for HAP (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that is other embodiments may be utilized and functional, logical, operational, organizational, structural and/or topological modifications may be made without departing from the scope and/or spirit of the disclosure. As such, all examples and/or embodiments are is deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a HAP individual and/or enterprise user, database configuration and/or relational model, data type, data transmission and/or network framework, syntax structure, and/or the like, various embodiments of the HAP, may be implemented that enable a great deal of flexibility and customization. For example, aspects of the HAP may be adapted for restaurant dining, online shopping, brick-and-mortar shopping, secured information processing, and/or the like. While various embodiments and discussions of the HAP have been directed to electronic purchase transactions, however, it is to be understood that the embodiments described herein may be readily configured and/or customized for a wide variety of other applications and/or implementations.

The invention claimed is:

1. A processor-implemented method of providing distributed model views utilizing a hybrid application environment, comprising:
receiving, at a processor on a mobile computing device, a request to create a hybrid web view within a native application at the mobile computing device;
communicating, in response to the request, a web view application request to a third-party data app developer server;
receiving, via the processor and from the third-party data app developer server in response to the web view application request, a web view application response, wherein the web view application response includes a web view, the web view including a graphic element having a hybrid application handler interaction link request;
encapsulating the web view in a native application structure using the native application;
transmitting, using the hybrid application handler interaction link request, a model population request to a secure data provider, the model population request including the native application structure and a native language representation of a current state of the web view;
receiving, in response to the model population request, a populated model containing one or more data values from the secure data provider; and
creating a web view environment insertion function using the populated model, wherein the web view environment insertion function is configured to populate the web view with a plurality of data values from the populated model.

2. The method of claim 1, wherein transmitting the model population request using the hybrid application handler interaction link request includes receiving an activation request corresponding to the graphic element.

3. The method of claim 2, wherein, in further response to the activation request, the native application accesses the secure data provider using the hybrid application handler interaction link request without the third-party data app developer server accessing the secure data provider.

4. The method of claim 1, further comprising receiving an indication to transmit the one or more data values from the secure data provider to a virtual wallet provider.

5. The method of claim 4, further comprising injecting the web view environment insertion function into a second web view including the one or more data values.

6. The method of claim 5, wherein the second web view includes an enrollment form to enroll one or more payment accounts in a virtual wallet of the virtual wallet provider.

7. The method of claim 6, wherein the native application includes the virtual wallet.

8. The method of claim 7, wherein the one or more data values includes one or more of a billing address, a personal account number, and an image of a payment device for a payment account of the one or more payment accounts.

9. The method of claim 8, further comprising assigning a reference alias from the virtual wallet to a merchant.

10. A non-transitory, processor-readable medium storing processor-issuable instructions for distributed model views utilizing a hybrid application environment, the instructions to:
receive a request to create a hybrid web view within a native application at a mobile computing device;
communicate, in response to the request, a web view application request to a third-party data app developer server;
receive, from the third-party data app developer server in response to the web view application request, a web view application response, wherein the web view application response includes a web view, the web view including a graphic element having a hybrid application handler interaction link request;
encapsulate the web view in a native application structure using the native application;
transmit, using the hybrid application handler interaction link request, a model population request to a secure data provider, the model population request including the native application structure and a native language representation of a current state of the web view;
receive, in response to the model population request, a populated model containing one or more data values from the secure data provider; and
create a web view environment insertion function using the populated model, wherein the web view environment insertion function is configured to populate the web view with a plurality of data values from the populated model.

11. The non-transitory, processor-readable medium of claim 10, wherein the instruction to transmit the model population request using the hybrid application handler interaction link request includes an instruction to receive an activation request corresponding to the graphic element.

12. The non-transitory, processor-readable medium of claim 11, wherein, in further response to the activation request, the native application includes an instruction to access the secure data provider using the hybrid application handler interaction link request without the third-party data app developer server accessing the secure data provider.

13. The non-transitory, processor-readable medium of claim 10, further comprising instructions to:
receive an indication to transmit the one or more data values from the secure data provider to a virtual wallet provider; and
inject the web view environment insertion function into a second web view including the one or more data values.

14. The non-transitory, processor-readable medium of claim 13, wherein the second web view includes an enrollment form to enroll one or more payment accounts in a virtual wallet of the virtual wallet provider and the native application includes the virtual wallet.

15. The non-transitory, processor-readable medium of claim 14, wherein the one or more data values includes one or more of a billing address, a personal account number, and an image of a payment device for a payment account of the one or more payment accounts.

16. The non-transitory, processor-readable medium of claim 14, further comprising an instruction to assign a reference alias from the virtual wallet to a merchant.

17. A distributed model views utilizing a hybrid application environment apparatus, comprising:

a memory; and a processor disposed in communication with the memory, and configured to issue a plurality of processing instructions stored in the memory, wherein the processor issues instructions to:

receive, at the processor, a request to create a hybrid web view within a native application at a mobile computing device;

communicate, in response to the request, a web view application request to a third-party data app developer server;

receive, via the processor and from the third-party data app developer server in response to the web view application request, a web view application response, wherein the web view application response includes a web view, the web view including a graphic element having a hybrid application handler interaction link request;

encapsulate the web view in a native application structure using the native application;

transmit, using the hybrid application handler interaction link request, a model population request to a secure data provider, the model population request including the native application structure and a native language representation of a current state of the web view;

receive, in response to the model population request, a populated model containing one or more data values from the secure data provider; and create a web view environment insertion function using the populated model, wherein the web view environment insertion function is configured to populate the web view with a plurality of data values from the populated model.

18. The apparatus of claim 17, wherein the instruction to transmit the model population request using the hybrid application handler interaction link request includes an instruction to receive an activation request corresponding to the graphic element; and wherein, in further response to the activation request, the native application includes an instruction to access the secure data provider using the hybrid application handler interaction link request without the third-party data app developer server accessing the secure data provider.

19. The apparatus of claim 18, further comprising instructions to:

receive an indication to transmit the one or more data values from the secure data provider to a virtual wallet provider; and inject the web view environment insertion function into a second web view including the one or more data values;

wherein the second web view includes an enrollment form to enroll one or more payment accounts in a virtual wallet of the virtual wallet provider and the native application includes the virtual wallet.

20. The apparatus of claim 19, further comprising an instruction to assign a reference alias from the virtual wallet to a merchant;

wherein the one or more data values includes one or more of a billing address, a personal account number, and an image of a payment device for a payment account of the one or more payment accounts.

* * * * *